(12) United States Patent
Carrigan et al.

(10) Patent No.: US 12,549,661 B2
(45) Date of Patent: Feb. 10, 2026

(54) USER INTERFACES FOR CONTENT STREAMING

(71) Applicant: Apple Inc., Cupertino, CA (US)

(72) Inventors: Taylor G. Carrigan, San Francisco, CA (US); Patrick L. Coffman, San Francisco, CA (US); Christopher Patrick Foss, San Francisco, CA (US); Eliza J. Von Hagen, Campbell, CA (US); Policarpo B. Wood, San Jose, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 18/306,202

(22) Filed: Apr. 24, 2023

(65) Prior Publication Data

US 2023/0259319 A1      Aug. 17, 2023

Related U.S. Application Data

(63) Continuation of application No. 16/583,209, filed on Sep. 25, 2019, now Pat. No. 11,635,928.
(Continued)

(51) Int. Cl.
*H04M 1/72415* (2021.01)
*G06F 3/04817* (2022.01)
(Continued)

(52) U.S. Cl.
CPC .... *H04M 1/72415* (2021.01); *G06F 3/04817* (2013.01); *G06F 3/0482* (2013.01);
(Continued)

(58) Field of Classification Search
CPC ........ G06F 3/14; G06F 3/0482; G06F 3/0484; G06F 3/04847; G06F 3/04817;
(Continued)

(56) References Cited

U.S. PATENT DOCUMENTS 6,323,846 B1    11/2001   Westerman et al.
6,570,557 B1     5/2003   Westerman et al.
(Continued)

FOREIGN PATENT DOCUMENTS

AU    2017286129 A1    10/2018
CN     103984494 A      8/2014
(Continued)

OTHER PUBLICATIONS

Cast Media Control Notifications, Available online at: <https://support.google.com/chromecast/answer/7206638?hl=en>, retrieved using <https://web.archive.org>, Sep. 5, 2018.
(Continued)

*Primary Examiner* — Nicholas Ulrich
(74) *Attorney, Agent, or Firm* — Kubota & Basol LLP

(57) ABSTRACT

In some embodiments, an electronic device operates in a streaming mode to automatically stream content from the electronic device to a playback destination. In some embodiments, an electronic device presents selectable options to control playback of content on a streaming destination while the electronic device streams content to the streaming destination. In some embodiments, an electronic device presents visual indications that the electronic device is operating in a streaming mode to stream content to a playback destination. In some embodiments, an electronic device presents a user interface for controlling electronic devices that automatically reconfigures to support different user inputs and issues different commands based on the type of electronic device being controlled. In some embodiments, an electronic device presents a user interface for controlling electronic devices that automatically provides context-specific selectable options based on the content being displayed on the electronic device being controlled.

39 Claims, 160 Drawing Sheets

Related U.S. Application Data

(60) Provisional application No. 62/806,790, filed on Feb. 16, 2019, provisional application No. 62/788,683, filed on Jan. 4, 2019.

(51) Int. Cl.
| | |
|---|---|
| *G06F 3/0482* | (2013.01) |
| *G06F 3/0484* | (2022.01) |
| *G06F 3/04847* | (2022.01) |
| *G06F 3/14* | (2006.01) |
| *H04L 65/1094* | (2022.01) |
| *H04L 65/75* | (2022.01) |
| *H04N 21/422* | (2011.01) |
| *H04N 21/436* | (2011.01) |
| *H04N 21/472* | (2011.01) |

(52) U.S. Cl.
CPC ........ *G06F 3/0484* (2013.01); *G06F 3/04847* (2013.01); *G06F 3/14* (2013.01); *H04L 65/1094* (2022.05); *H04L 65/764* (2022.05); *H04N 21/42204* (2013.01); *H04N 21/4222* (2013.01); *H04N 21/43615* (2013.01); *H04N 21/47217* (2013.01)

(58) Field of Classification Search
CPC ... H04L 65/764; H04L 65/613; H04L 67/025; H04M 1/72415; H04N 21/4222; H04N 21/47217; H04N 21/42204; G08C 2201/93
See application file for complete search history.

(56) References Cited

U.S. PATENT DOCUMENTS

| | | | |
|---|---|---|---|
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,356,251 | B2 | 1/2013 | Strober |
| 8,381,135 | B2 | 2/2013 | Hotelling et al. |
| 8,479,122 | B2 | 7/2013 | Hotelling et al. |
| 9,037,683 | B1 | 5/2015 | Yoden |
| 9,084,003 | B1 | 7/2015 | Sanio et al. |
| 9,348,458 | B2 | 5/2016 | Hotelling et al. |
| 9,933,937 | B2 | 4/2018 | Lemay et al. |
| 9,948,980 | B2 | 4/2018 | Glazier et al. |
| 10,123,077 | B2 | 11/2018 | Glazier et al. |
| 10,313,426 | B2 | 6/2019 | Kim et al. |
| 10,649,723 | B2 | 5/2020 | Nakagawa |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2013/0278484 | A1 | 10/2013 | Hwang et al. |
| 2014/0007187 | A1 | 1/2014 | Harrison |
| 2014/0055251 | A1* | 2/2014 | Son .................. H04M 1/72415 340/12.54 |
| 2015/0058450 | A1 | 2/2015 | Hahm et al. |
| 2015/0188724 | A1* | 7/2015 | Kim .................. H04N 7/181 340/3.71 |
| 2015/0381702 | A1* | 12/2015 | Heeter .............. G06F 3/04842 715/716 |
| 2016/0050242 | A1 | 2/2016 | Li et al. |
| 2016/0173937 | A1 | 6/2016 | Shih et al. |
| 2016/0182585 | A1 | 6/2016 | Mcrae |
| 2016/0255121 | A1 | 9/2016 | Mcrae |
| 2017/0011624 | A1* | 1/2017 | Guihot .................. G08C 17/02 |
| 2017/0195735 | A1* | 7/2017 | Kaliamoorthi ... H04N 21/42203 |
| 2017/0214784 | A1* | 7/2017 | Masuoka .......... H04M 1/72415 |
| 2018/0088894 | A1 | 3/2018 | Vanblon et al. |
| 2018/0335903 | A1 | 11/2018 | Coffman et al. |
| 2018/0343492 | A1 | 11/2018 | Konig et al. |
| 2019/0052745 | A1* | 2/2019 | Wu .................. H04M 1/72415 |
| 2019/0320219 | A1 | 10/2019 | Yoden |
| 2020/0220914 | A1 | 7/2020 | Carrigan et al. |

FOREIGN PATENT DOCUMENTS

| | | |
|---|---|---|
| CN | 105359199 A | 2/2016 |
| CN | 105940358 A | 9/2016 |
| WO | 2013169849 A2 | 11/2013 |
| WO | 2014105276 A1 | 7/2014 |
| WO | 2015102572 A1 | 7/2015 |
| WO | 2017044239 A1 | 3/2017 |

OTHER PUBLICATIONS

Final Office Action received for U.S. Appl. No. 16/583,209, mailed on Jul. 8, 2021, 8 pages.
Final Office Action received for U.S. Appl. No. 16/583,209, mailed on May 20, 2020, 31 pages.
International Preliminary Report on Patentability received for PCT Patent Application No. PCT/US2019/68177, mailed on Jul. 15, 2021, 14 pages.
International Search Report received for PCT Patent Application No. PCT/US2019/068177, mailed on Jun. 23, 2020, 6 pages.
Invitation to Pay Additional Fees received for PCT Patent Application No. PCT/US2019/068177, mailed on Apr. 2, 2020, 15 pages.
Multitasking with Chromecast, Available online at: <https://support.google.com/chromecast/answer/6207179?hl=en>, retrieved using <https://web.archive.org>, Apr. 29, 2016.
Non-Final Office Action received for U.S. Appl. No. 16/583,209, mailed on Dec. 11, 2019, 23 pages.
Non-Final Office Action received for U.S. Appl. No. 16/583,209, mailed on Feb. 11, 2022, 42 pages.
Non-Final Office Action received for U.S. Appl. No. 16/583,209, mailed on Nov. 10, 2020, 32 pages.
Notice of Allowance received for U.S. Appl. No. 16/583,209, mailed on Aug. 23, 2022, 7 pages.
Notice of Allowance received for U.S. Appl. No. 16/583,209, mailed on Dec. 12, 2022, 7 pages.
Written Opinion received for PCT Patent Application No. PCT/US2019/68177, mailed on Jun. 23, 2020, 12 pages.
Liz, "How to Auto Connect to a Chromecast Device in Android", Available online at: <http://rettgergalactic.com/blog/2014/02/connect-to-chromecast-android/>, Feb. 18, 2014.
European Search Report received for European Patent Application No. 19845648.5, mailed on Jul. 21, 2023, 4 pages.
Search Report received for Chinese Patent Application No. 202111197326.4, mailed on Apr. 9, 2024, 4 pages (2 pages of English Translation and 2 pages of Official Copy).

* cited by examiner

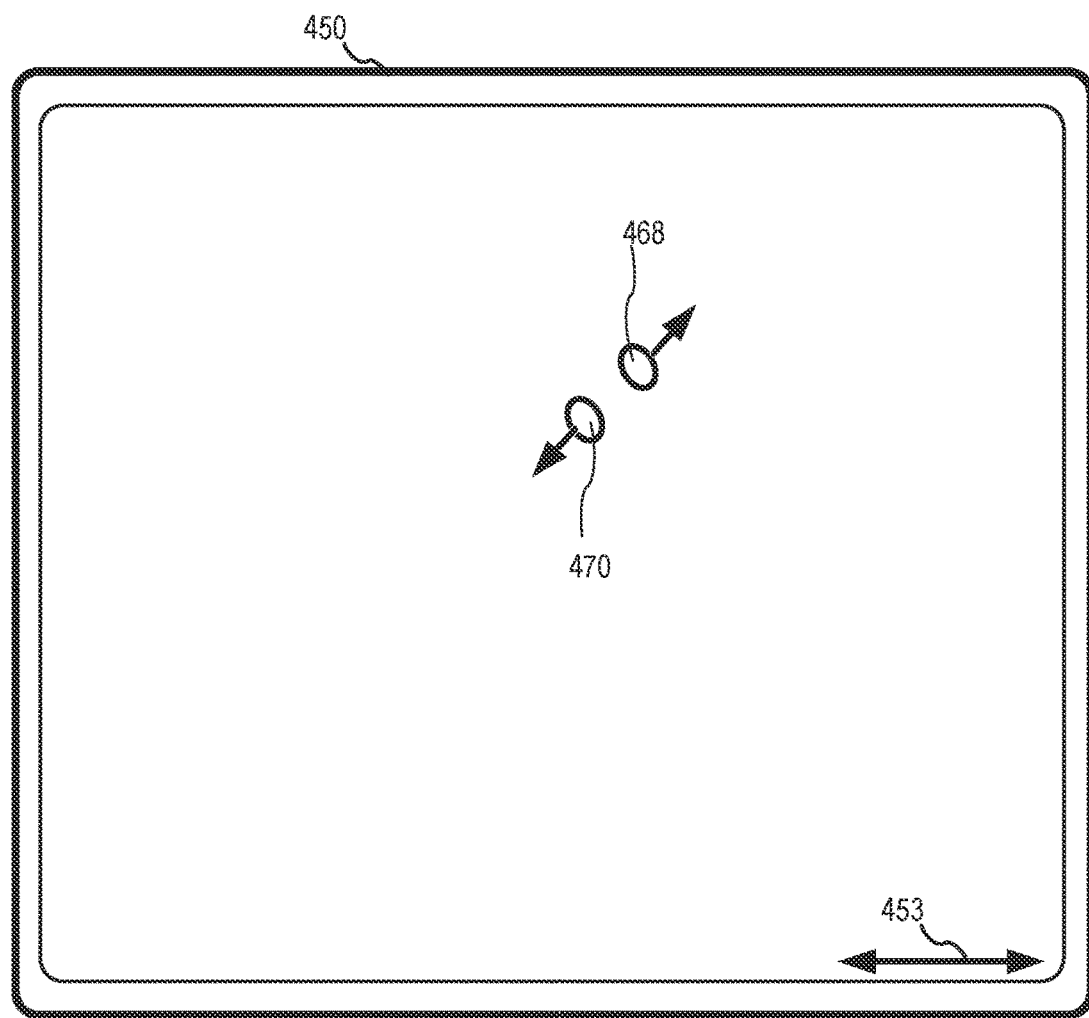
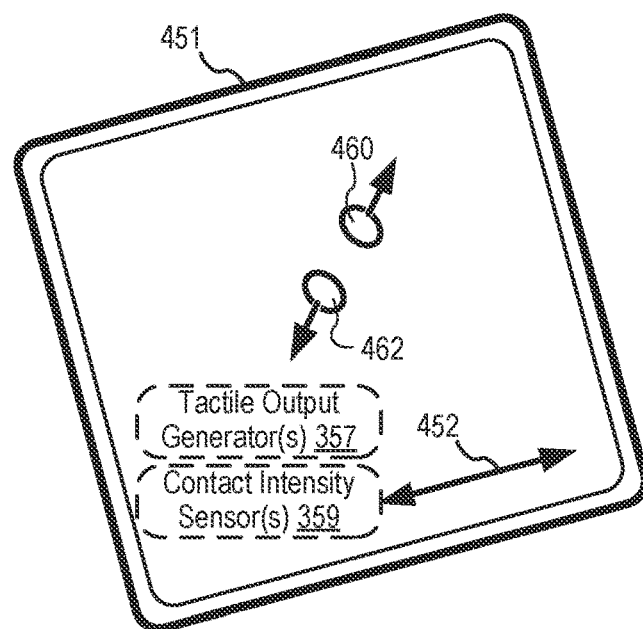
FIG. 4B

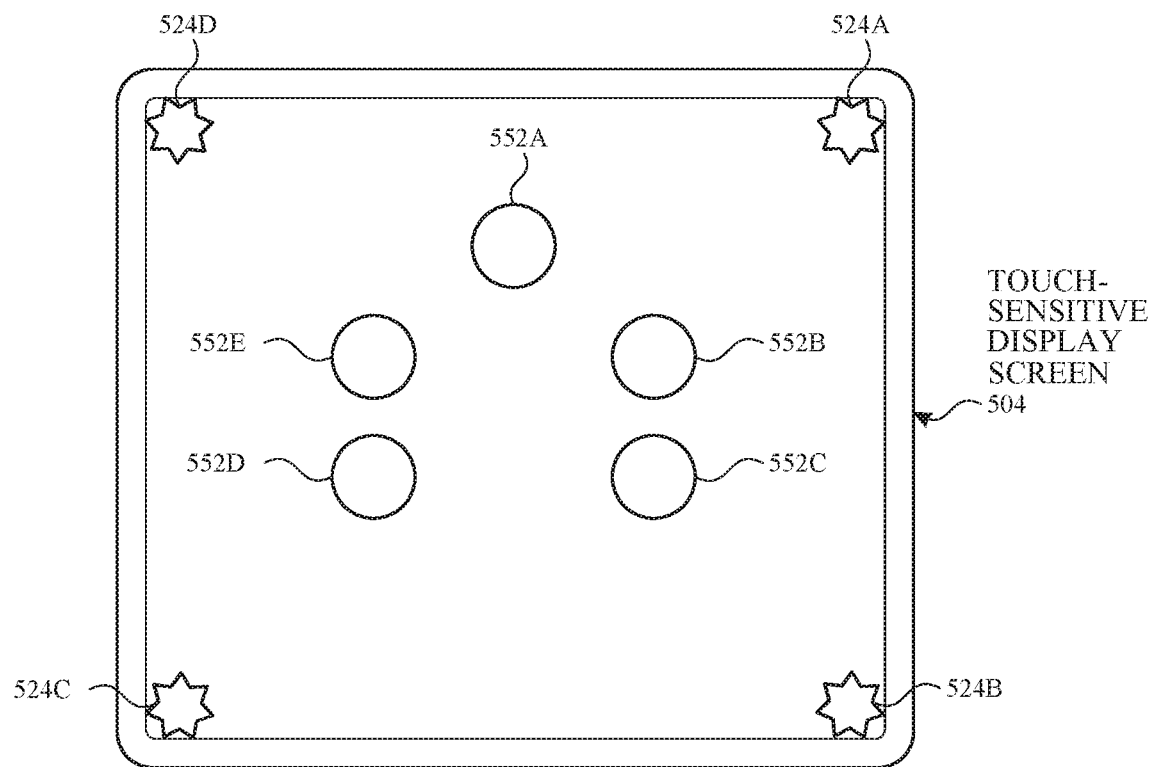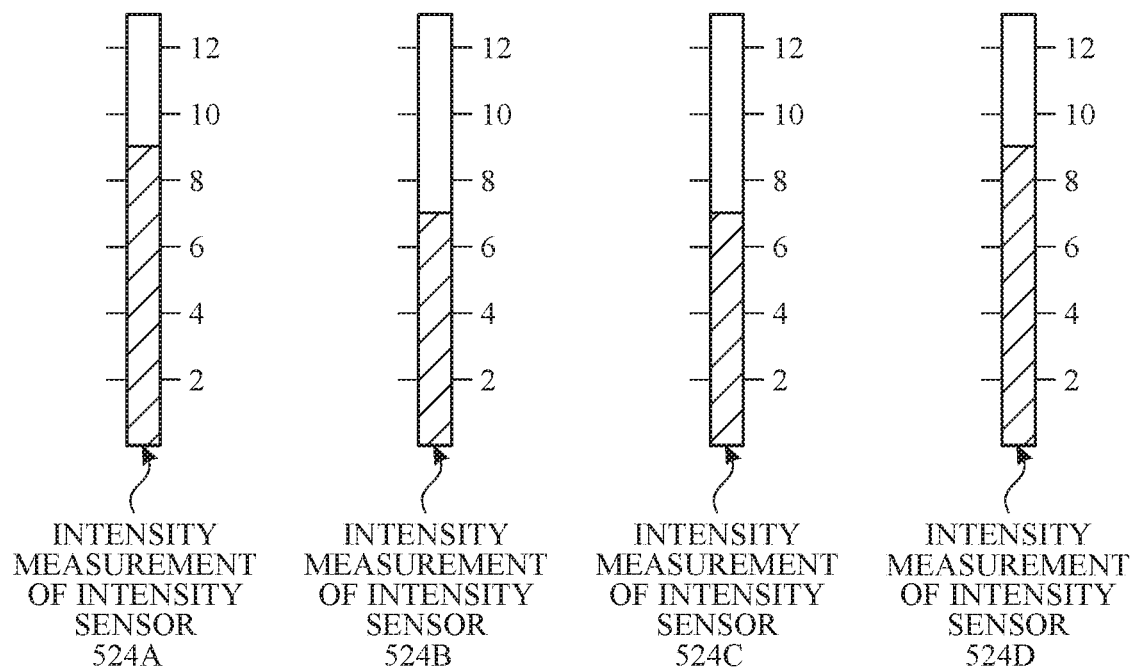
FIG. 5C

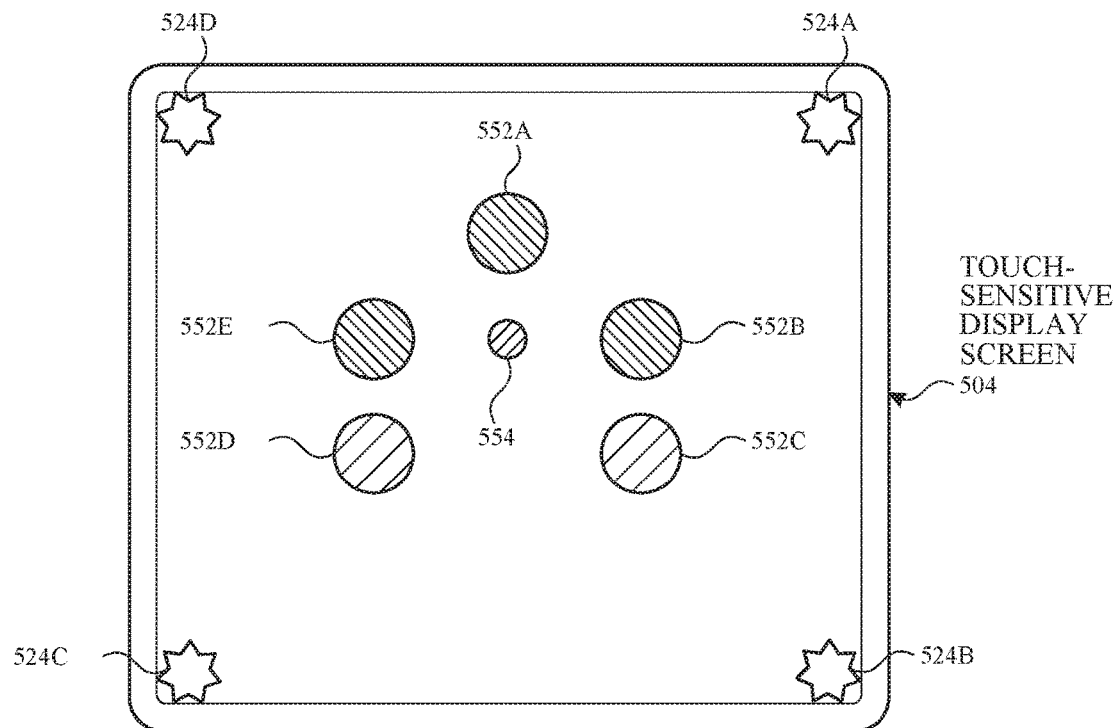
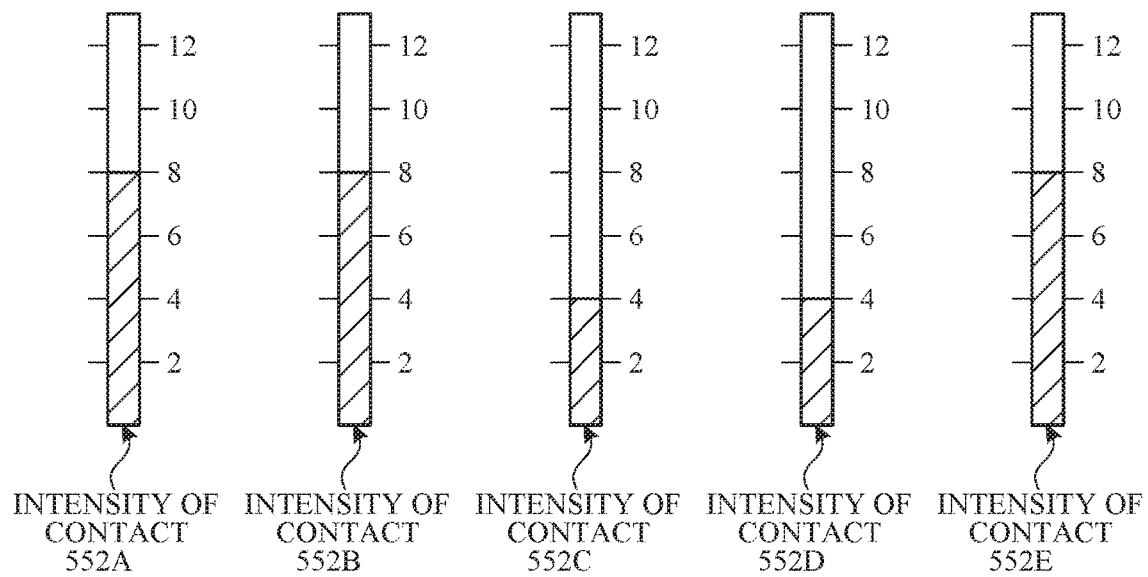
*FIG. 5D*

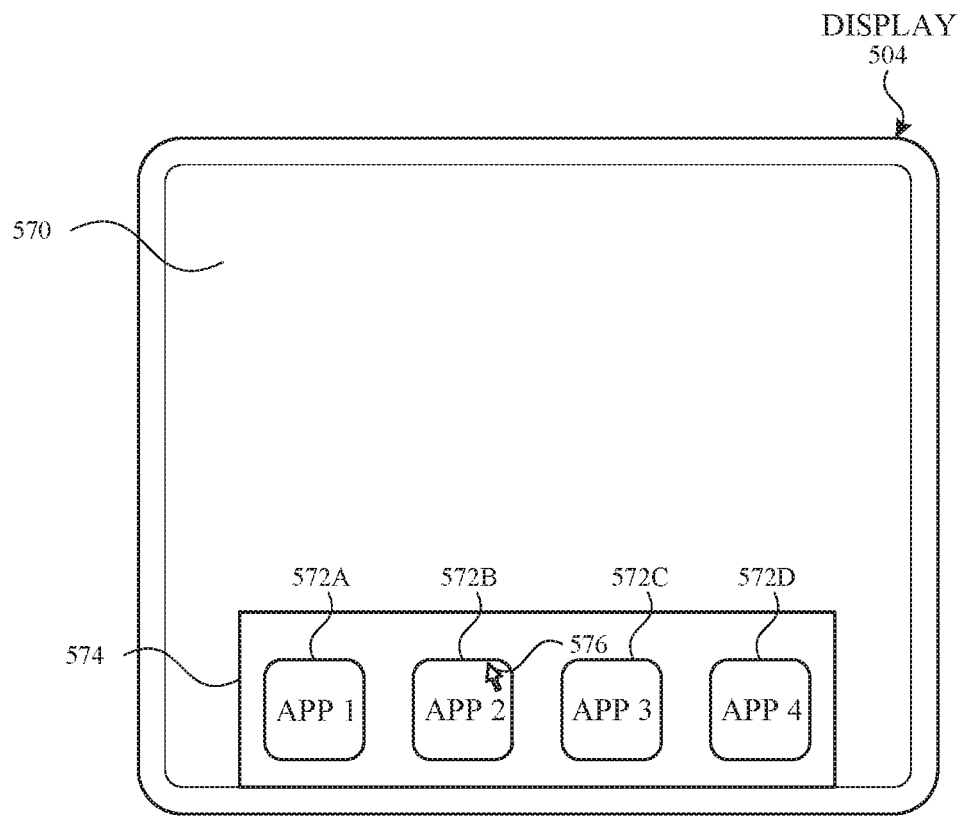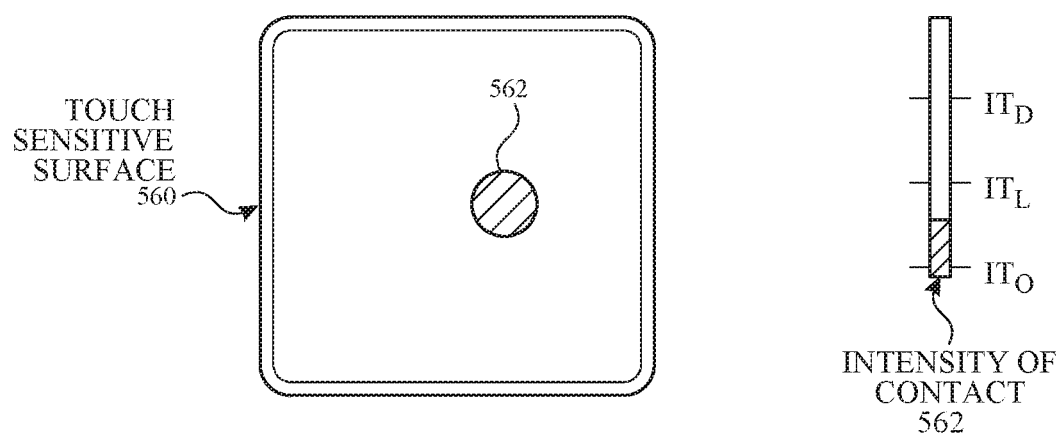
FIG. 5E

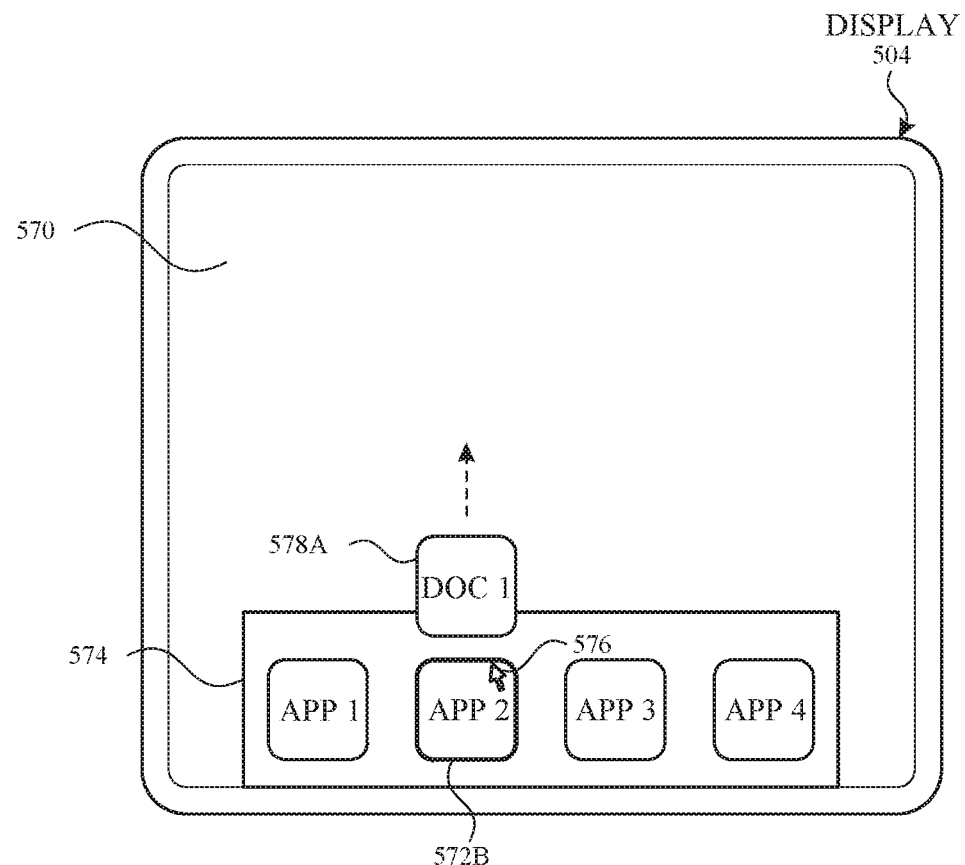
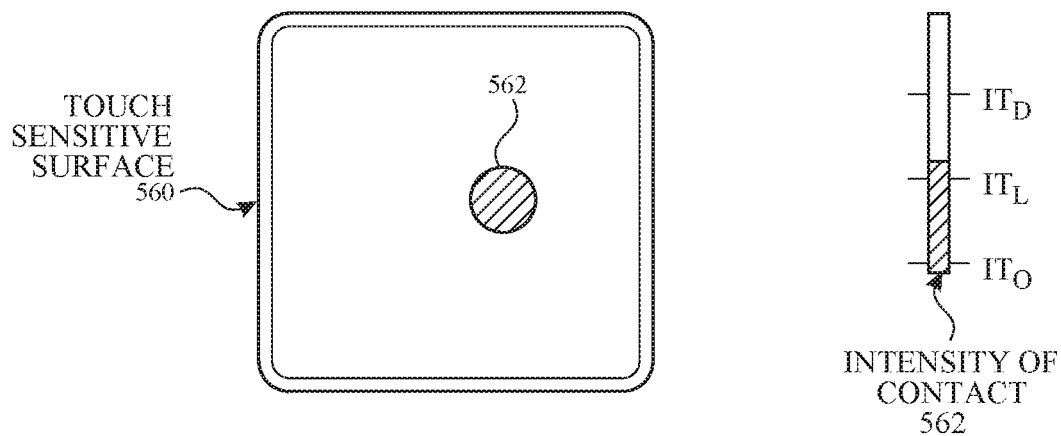
FIG. 5F

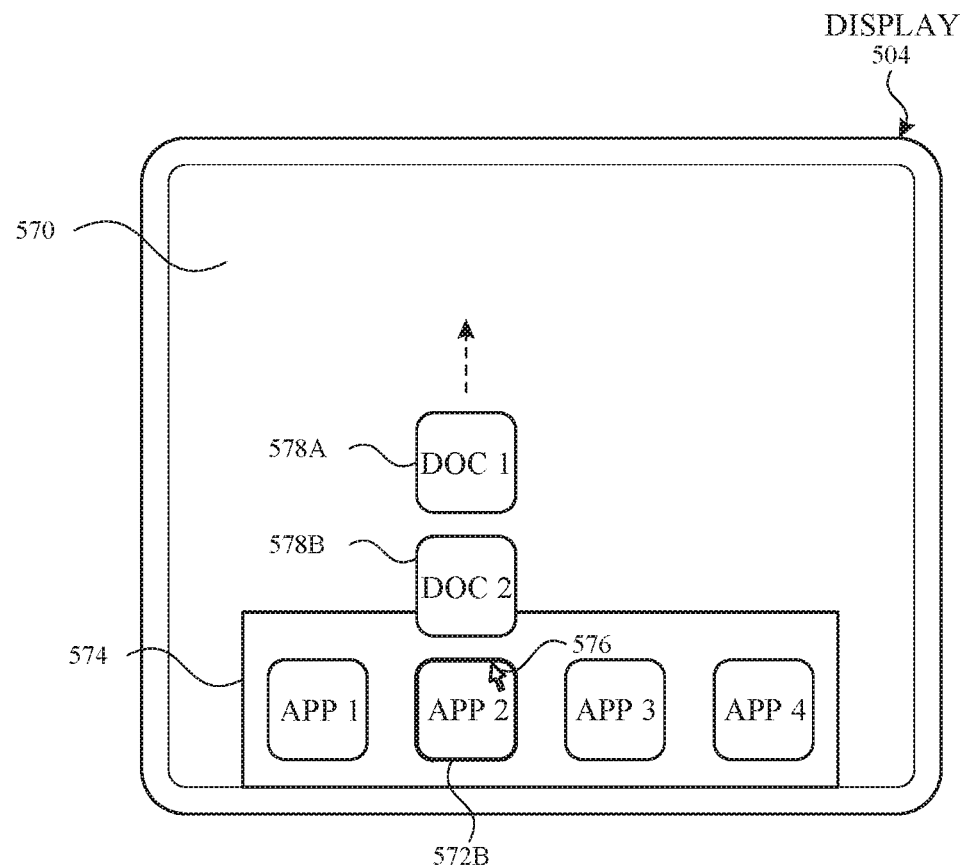
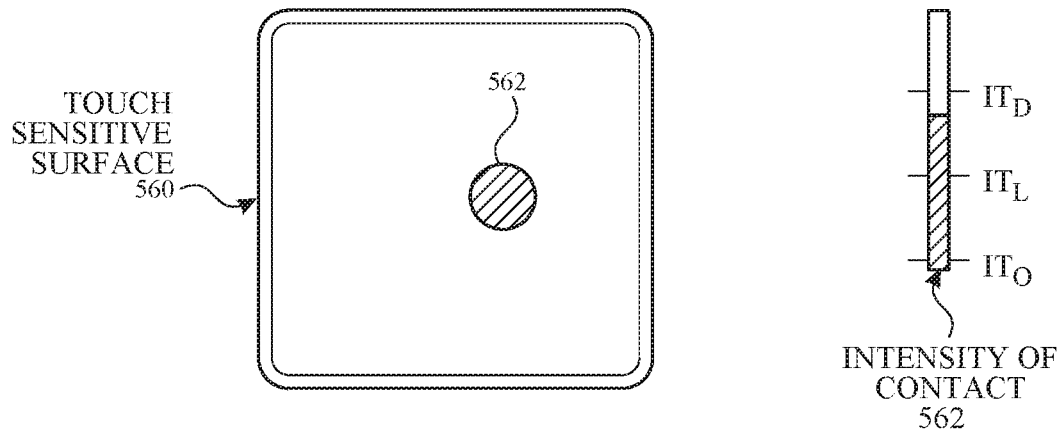
*FIG. 5G*

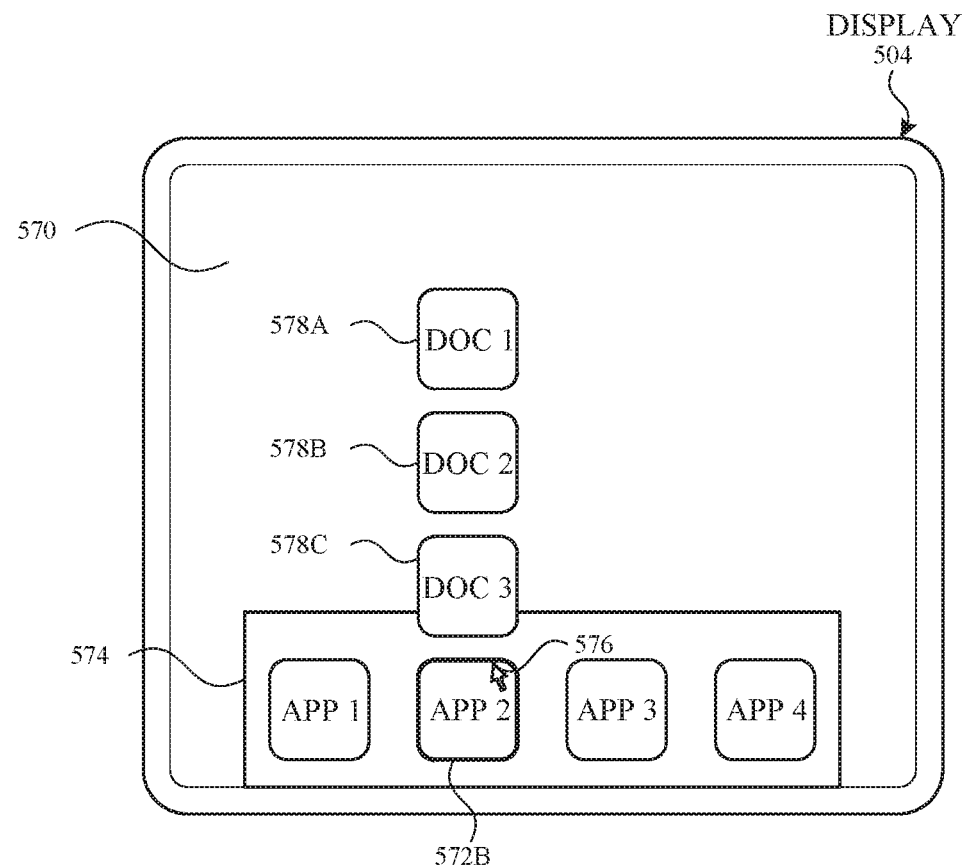
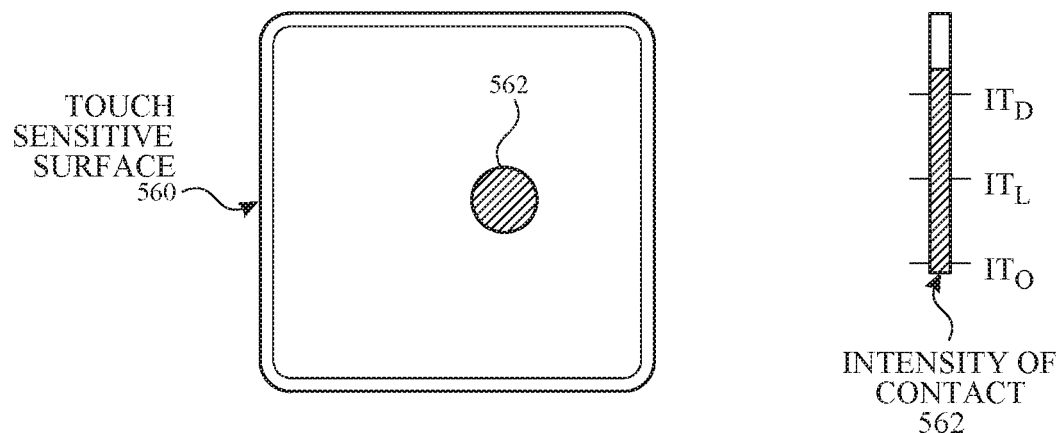
FIG. 5H

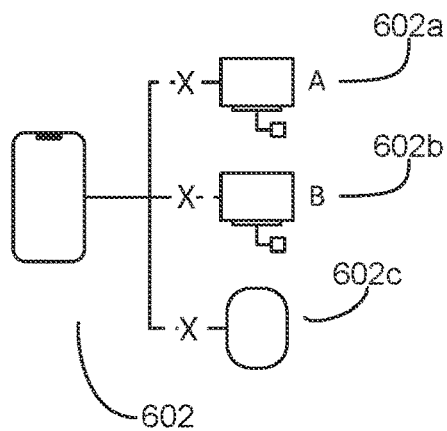
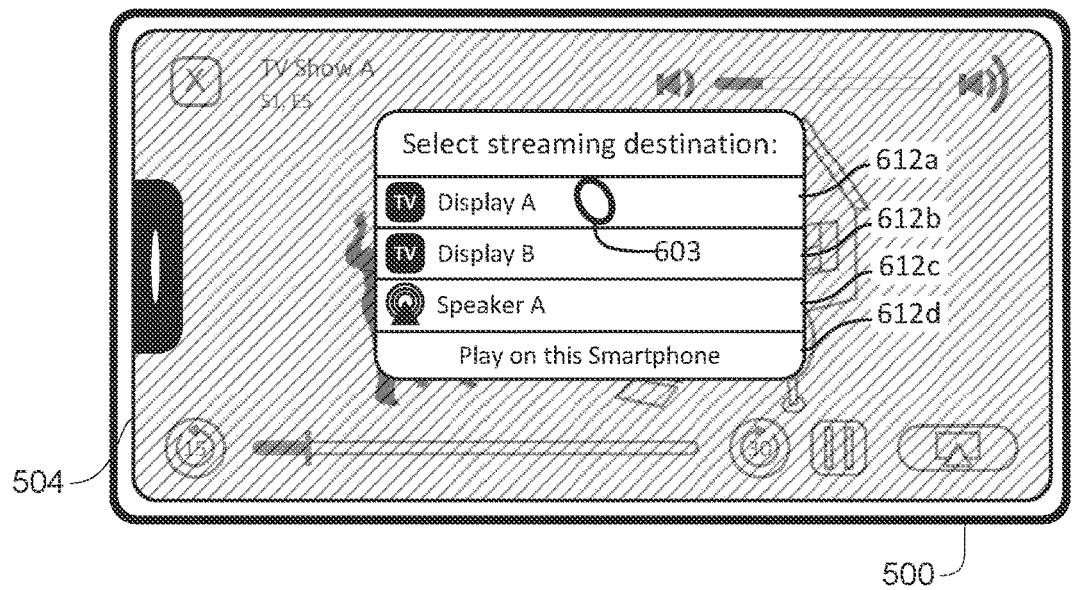
FIG. 6G

In accordance with a determination that the second electronic device is displaying a passcode entry user interface, the remote control user interface includes a passcode entry field overlaid on the virtual touchpad region and a virtual numeric keypad user interface — 1546

USER INTERFACES FOR CONTENT STREAMING

CROSS REFERENCE TO RELATED APPLICATIONS

This application is a continuation of U.S. patent application Ser. No. 16/583,209, filed Sep. 25, 2019, and published as U.S. Publication No. 2020-0220914 on Jul. 9, 2020, which claims the benefit of U.S. Provisional Patent Application No. 62/788,683, filed Jan. 4, 2019, and U.S. Provisional Patent Application No. 62/806,790, filed Feb. 16, 2019, the contents of all of which are hereby incorporated by reference in their entireties for all purposes.

FIELD OF THE DISCLOSURE

This relates generally to electronic devices that present user interfaces for indicating the streaming of content from the electronic devices to streaming playback destination devices and for remotely controlling other electronic devices, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to control the streaming of content from a first electronic device to a second electronic device. In some circumstances, users wish to remotely control a second electronic device using the first electronic device. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to operating an electronic device in a streaming mode to automatically stream content from the electronic device to a playback destination. Some embodiments described in this disclosure are directed to presenting, on an electronic device, selectable options to control playback of content on a streaming destination while the electronic device streams content to the streaming destination. Some embodiments of the disclosure are directed to presenting, on an electronic device, visual indications that the electronic device is operating in a streaming mode to stream content to a playback destination. Some embodiments of the disclosure are directed to presenting, on an electronic device, a user interface for controlling electronic devices that automatically reconfigures to support different user inputs and issues different commands based on the type of electronic device being controlled by the user interface. Some embodiments of the disclosure are directed to presenting, on an electronic device, a user interface for controlling electronic devices that automatically provides different context-specific selectable options based on the content being displayed on the electronic device being controlled by the user interface.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 7A-7J are flow diagrams illustrating a method of operating a first electronic device in a streaming mode for streaming content to a second electronic device with a content application in accordance with some embodiments.

DETAILED DESCRIPTION

Figure 1A:
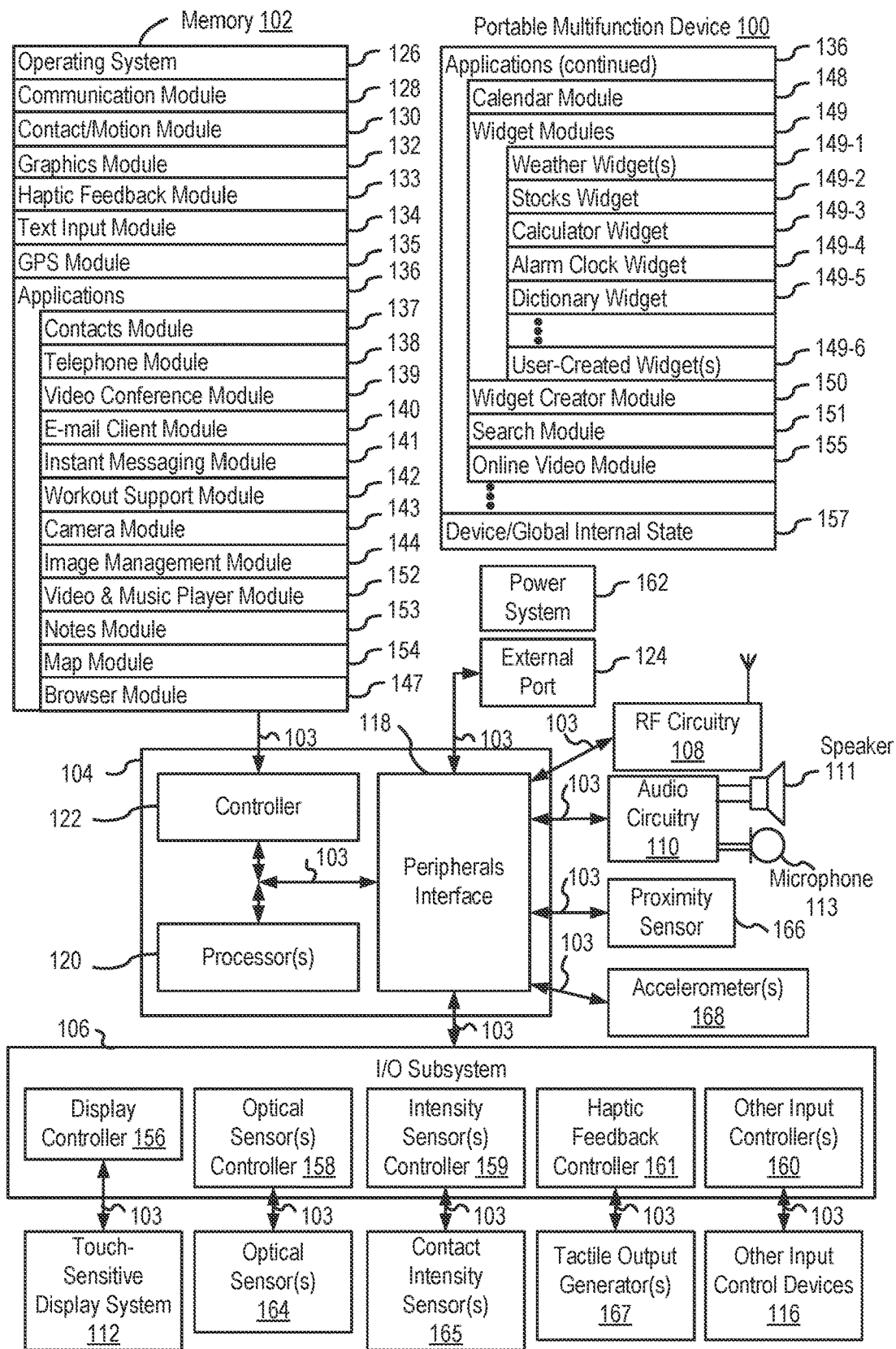
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for controlling and/or indicating content streaming to devices. There is also a need for electronic devices that provide efficient methods for remotely controlling other electronic devices. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
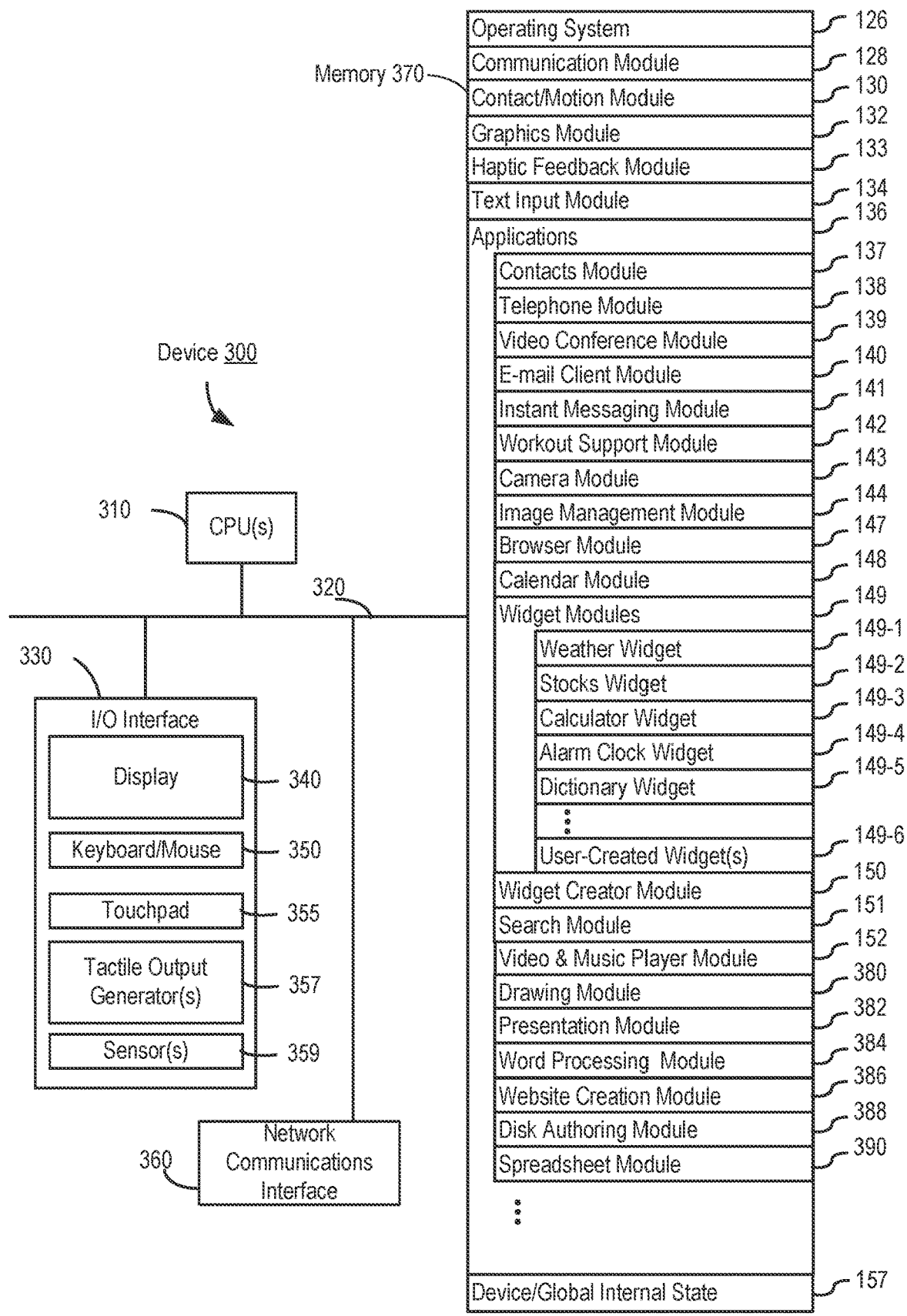
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;

Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
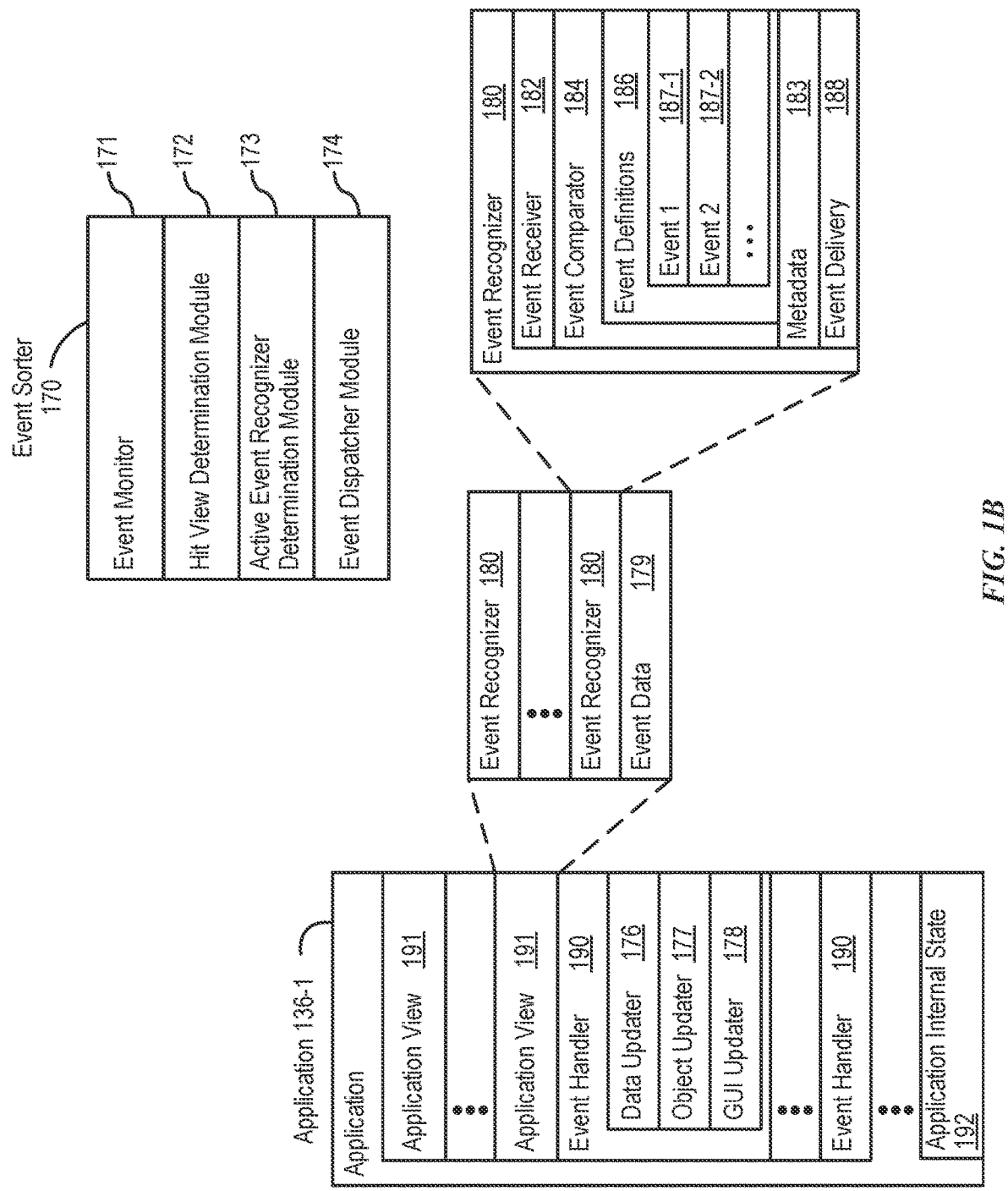
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
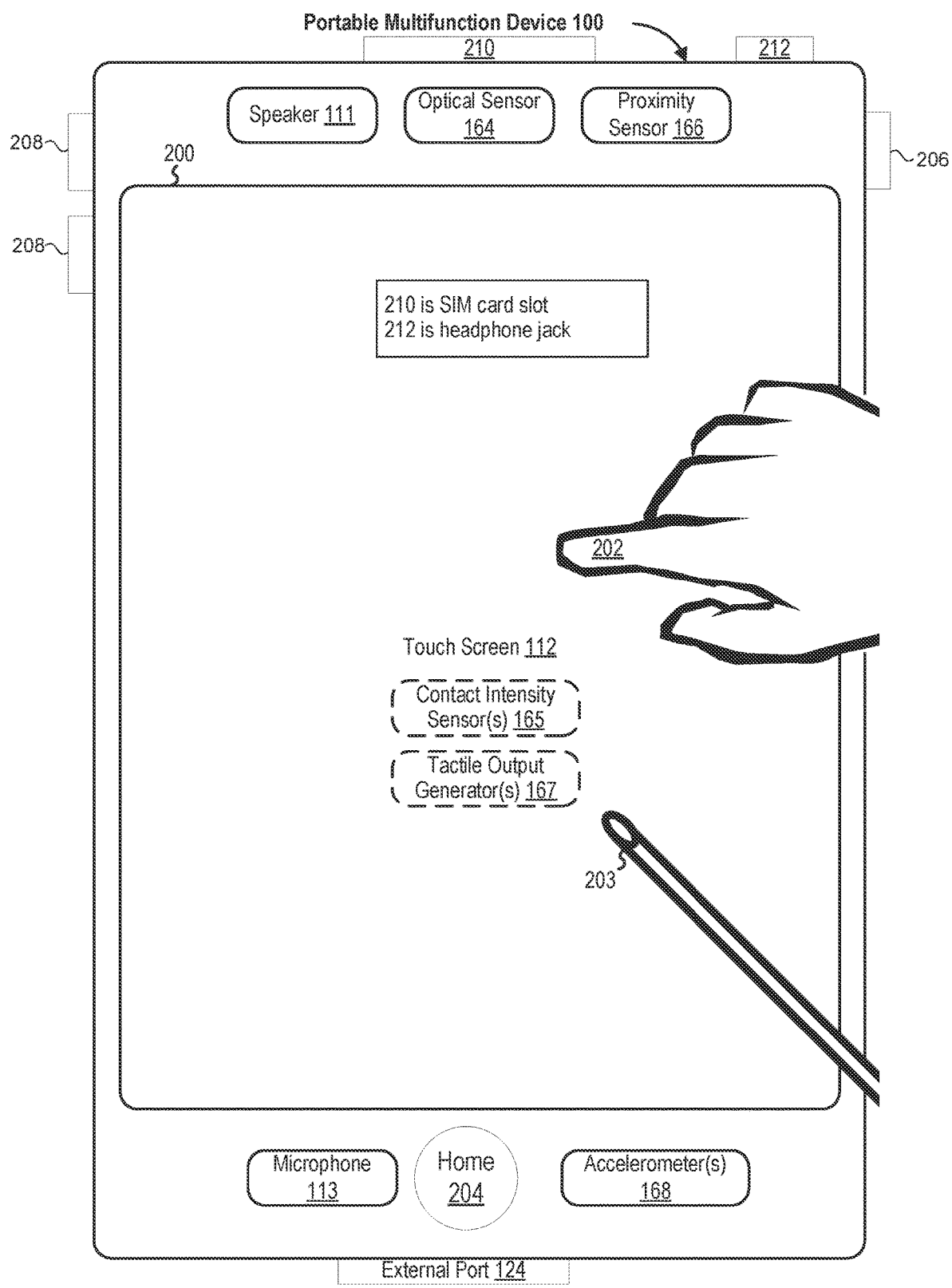
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
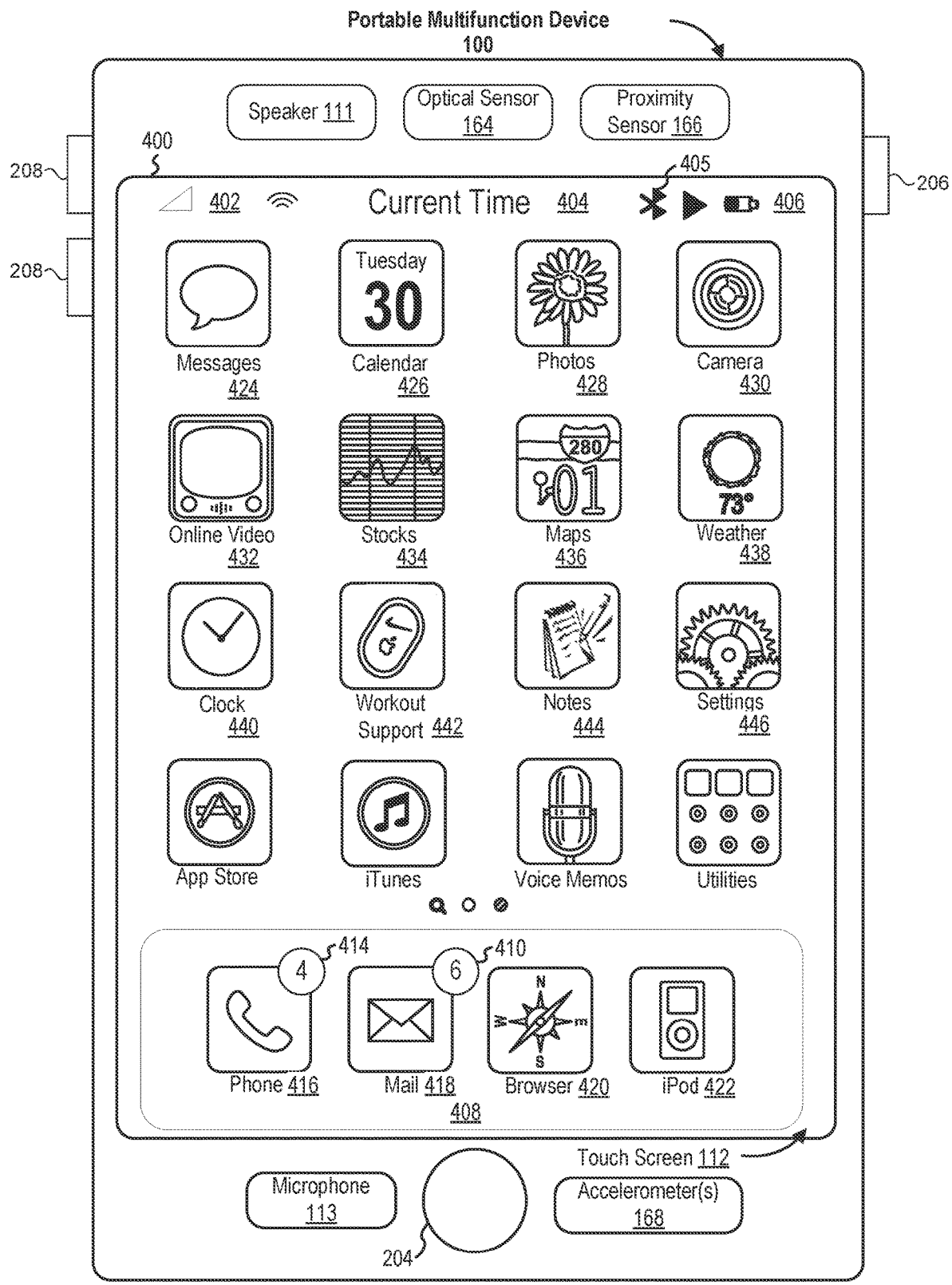
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
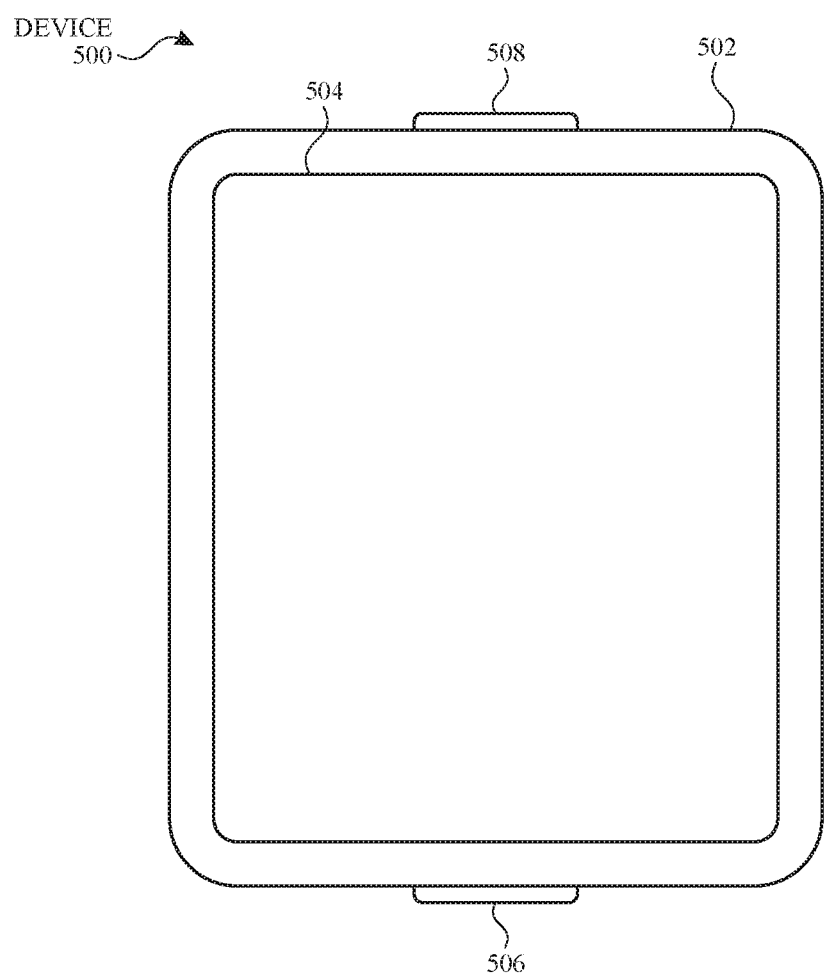
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
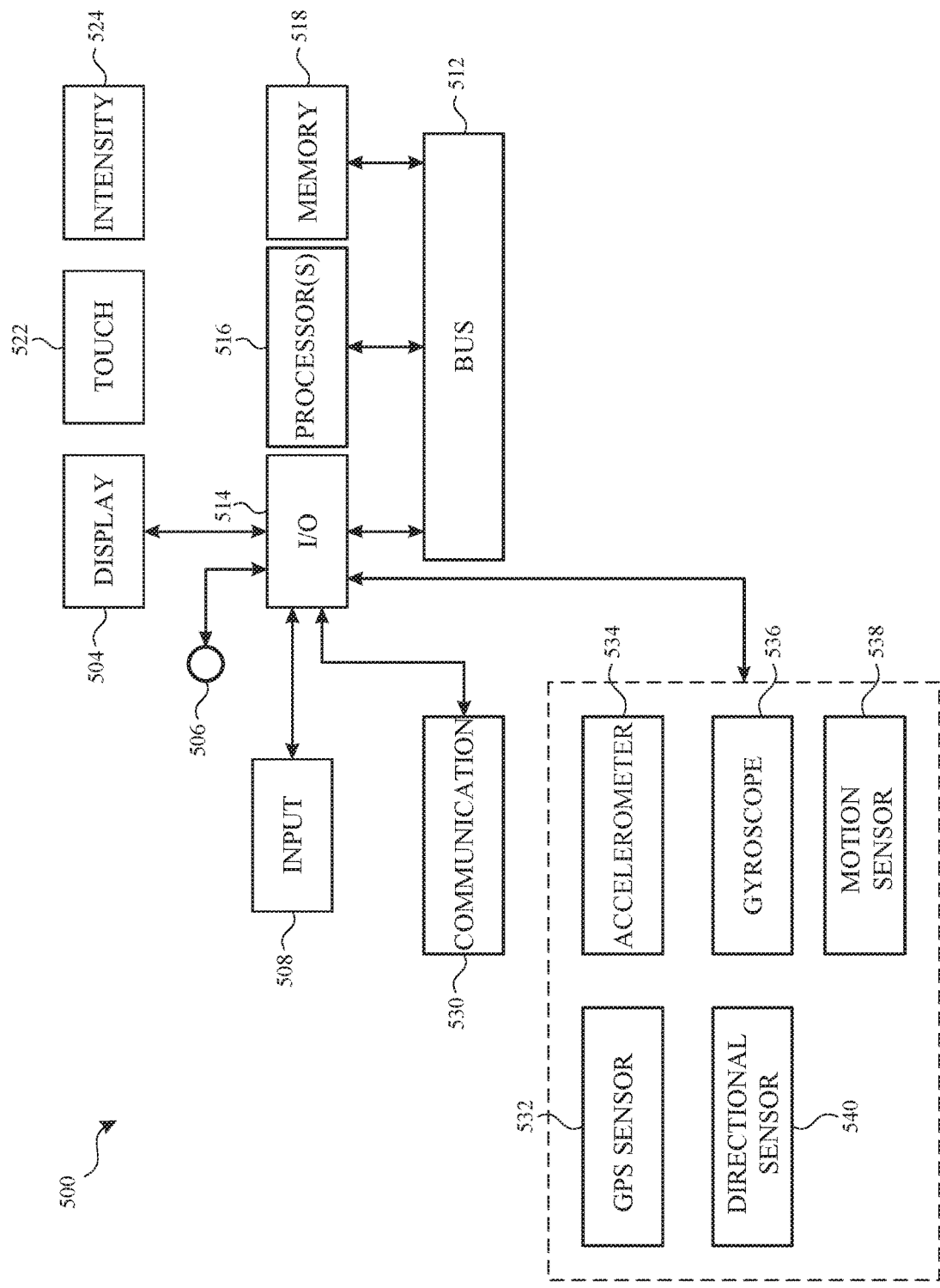
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, and 1500 (FIGS. 7, 9, 11, 13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5J. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
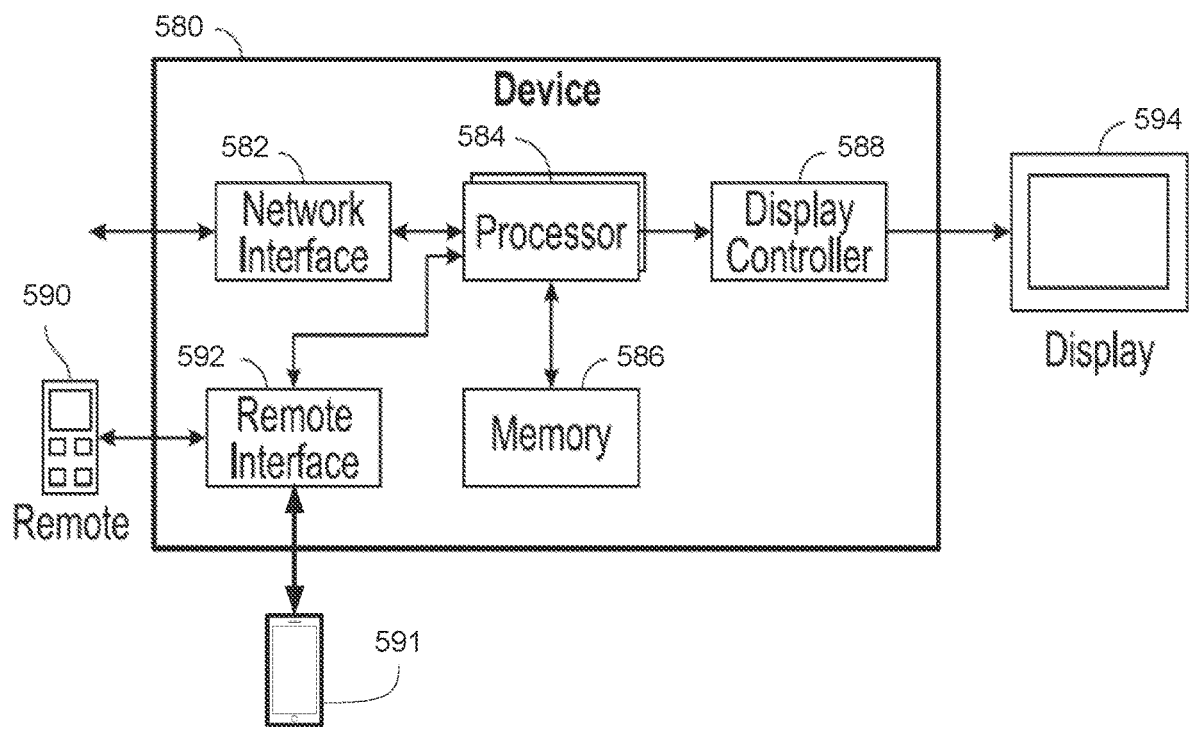
FIGS. 5I-5J illustrate block diagrams of exemplary architectures for devices according to some embodiments of the disclosure.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700, 900, 1100, 1300, and 1500).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

Figure 5J:
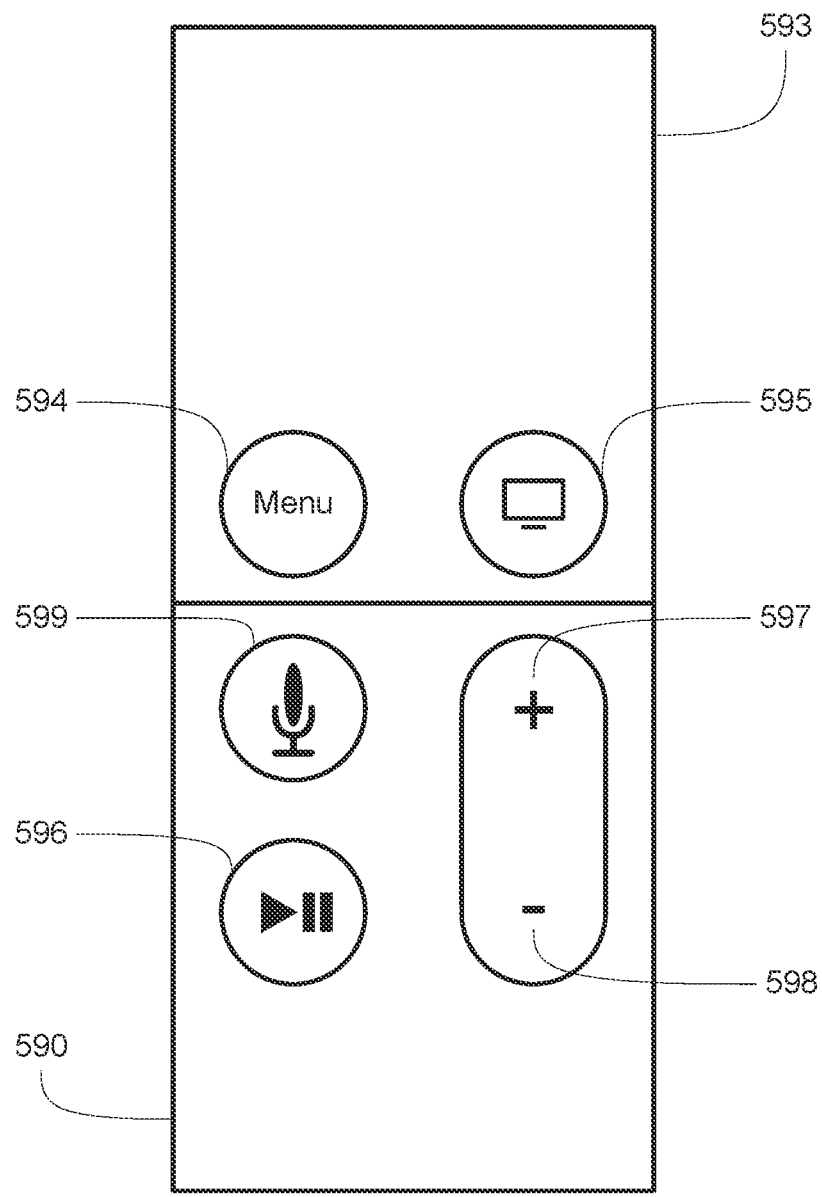

FIG. 5J illustrates an exemplary structure for remote 590 according to some embodiments of the disclosure. In some embodiments, remote 590 optionally corresponds to one or more of multifunction device 100 in FIGS. 1A and 2, device 300 in FIG. 3, and device 500 in FIG. 5A. Remote 590 optionally includes touch-sensitive surface 593, similar to touch-sensitive surface 451 in FIG. 4. In some embodiments, touch-sensitive surface 593 is edge-to-edge (e.g., it extends to the edges of remote 590, such that little or no surface of remote 590 exists between the touch-sensitive surface 593 and one or more edges of remote 590, as illustrated in FIG. 5J). Touch-sensitive surface 593 is optionally able to sense contacts as well as contact intensities (e.g., clicks of touch-sensitive surface 593), as previously described in this disclosure. Further, touch-sensitive surface 593 optionally includes a mechanical actuator for providing physical button click functionality (e.g., touch-sensitive surface 593 is "clickable" to provide corresponding input to device 580). Remote 590 also optionally includes buttons 594, 595, 596, 597, 598, and 599. Buttons 594, 595, 596, 597, 598, and 599 are optionally mechanical buttons or mechanical button alternatives that are able to sense contact with, or depression of, such buttons to initiate corresponding action(s) on, for example, device 580. In some embodiments, selection of "menu" button 594 by a user navigates device 580 backwards in a currently-executing application or currently-displayed user interface (e.g., back to a user interface that was displayed previous to the currently-displayed user interface), or navigates device 580 to a one-higher-level user interface than the currently-displayed user interface. In some embodiments, selection of "home" button 595 by a user navigates device 580 to a main, home, or root user interface from any user interface that is displayed on device 580 (e.g., to a home screen of device 580 that optionally includes one or more applications accessible on device 580). In some embodiments, selection of "play/pause" button 596 by a user toggles between playing and pausing a currently-playing content item on device 580 (e.g., if a content item is playing on device 580 when "play/pause" button 596 is selected, the content item is optionally paused, and if a content item is paused on device 580 when "play/pause" button 596 is selected, the content item is optionally played). In some embodiments, selection of "+" 597 or "−" 598 buttons by a user increases or decreases, respectively, the volume of audio reproduced by device 580 (e.g., the volume of a content item currently-playing on device 580). In some embodiments, selection of "audio input" button 599 by a user allows the user to provide audio input (e.g., voice input) to device 580, optionally, to a voice assistant on the device. In some embodiments, remote 590 includes a microphone via which the user provides audio input to device 580 upon selection of "audio input" button 599. In some embodiments, remote 590 includes one or more accelerometers for detecting information about the motion of the remote.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes
Automatic Content Streaming

Users interact with electronic devices in many different manners, including using an electronic device to present content, such as audio or video content. In some embodiments, a first electronic device is able to stream content to a second electronic device to present the content using the second electronic device. The embodiments described below provide ways in which a first electronic device operates in a streaming mode for presenting content on a second electronic device using a content application. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
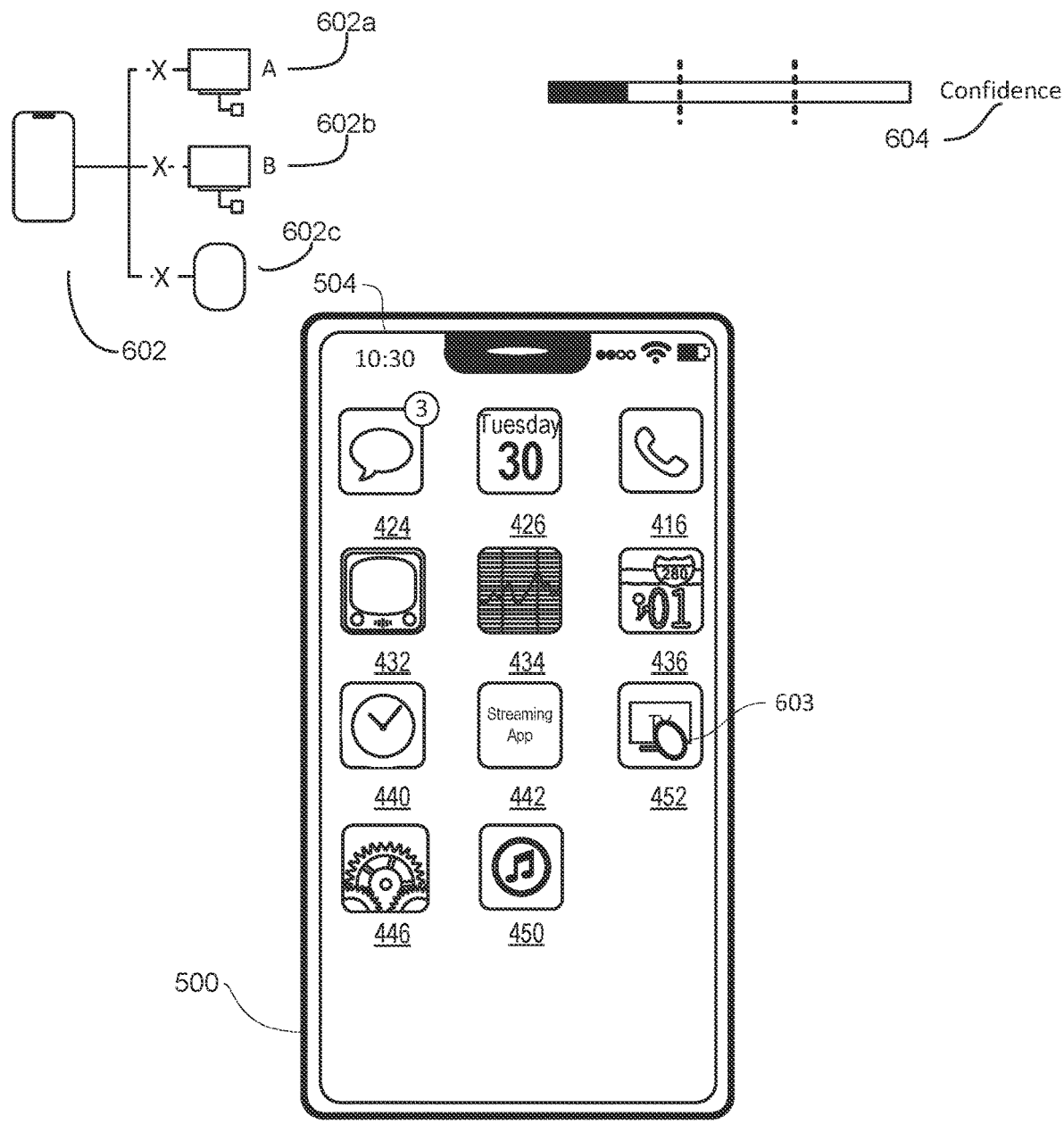
FIGS. 6A-6X illustrate exemplary ways in which a first electronic device operates in a streaming mode for streaming content to a second electronic device with a content application in accordance with some embodiments.
Figure 6B:
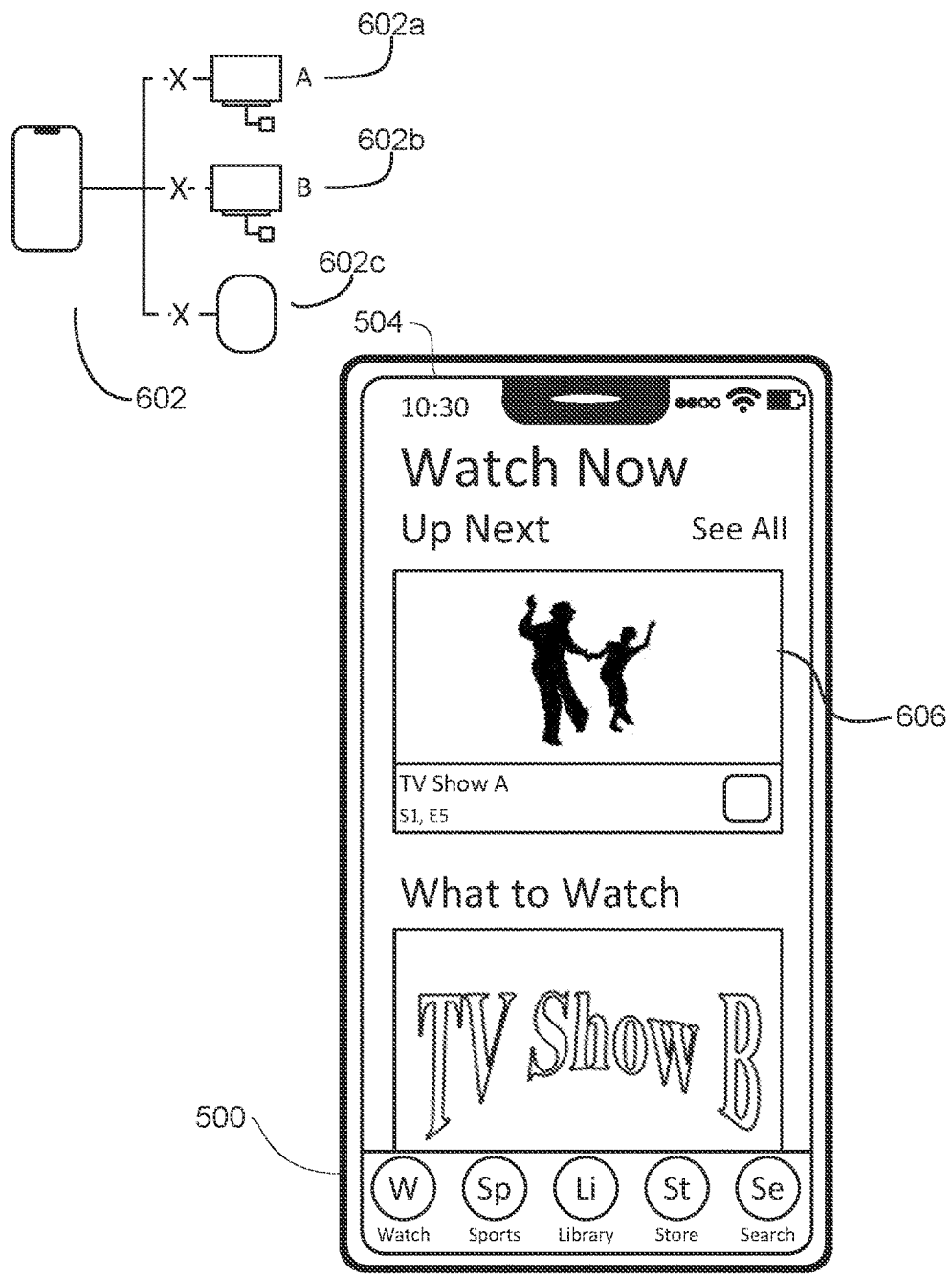
Figure 6C:
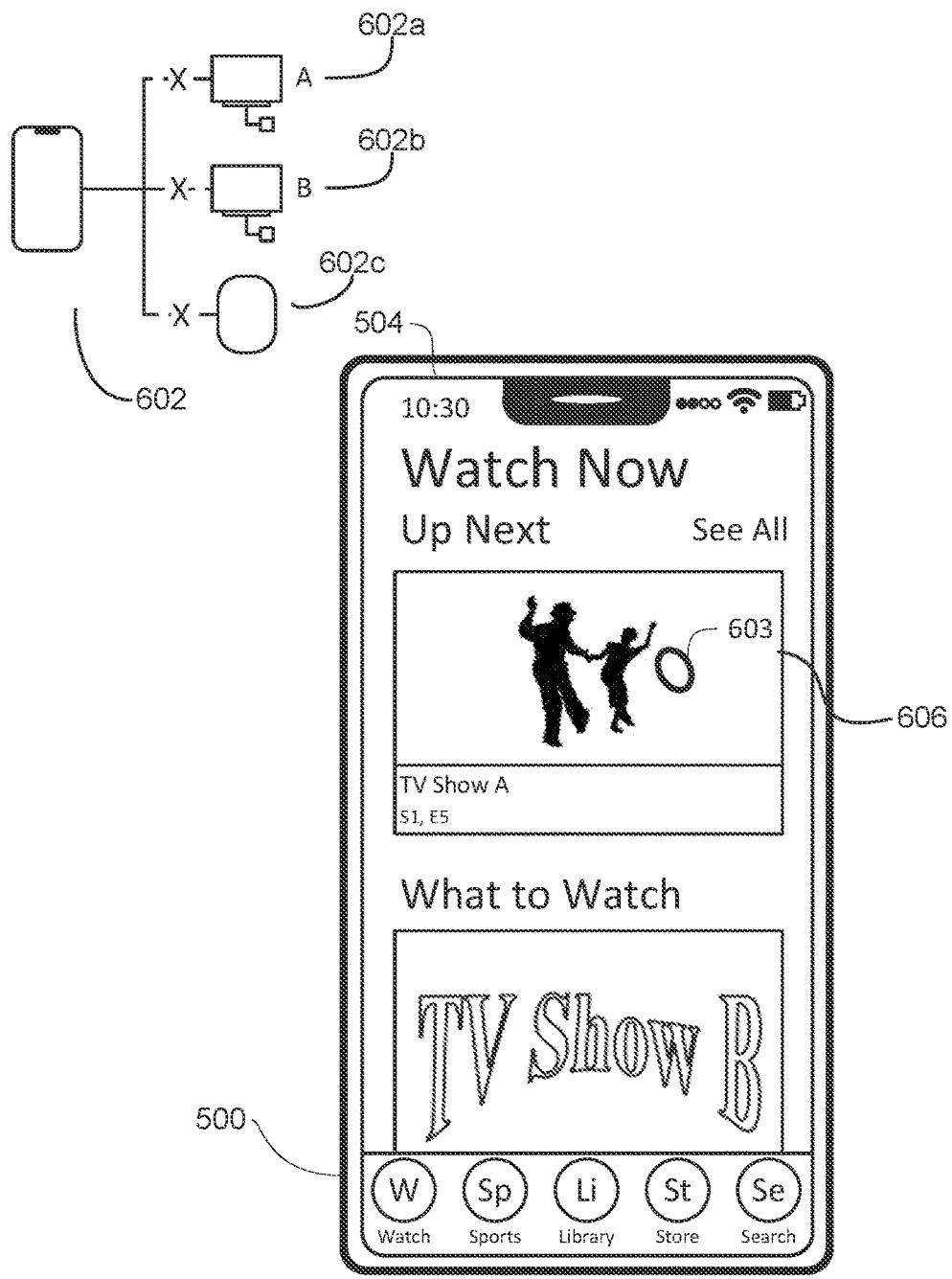
Figure 6D:
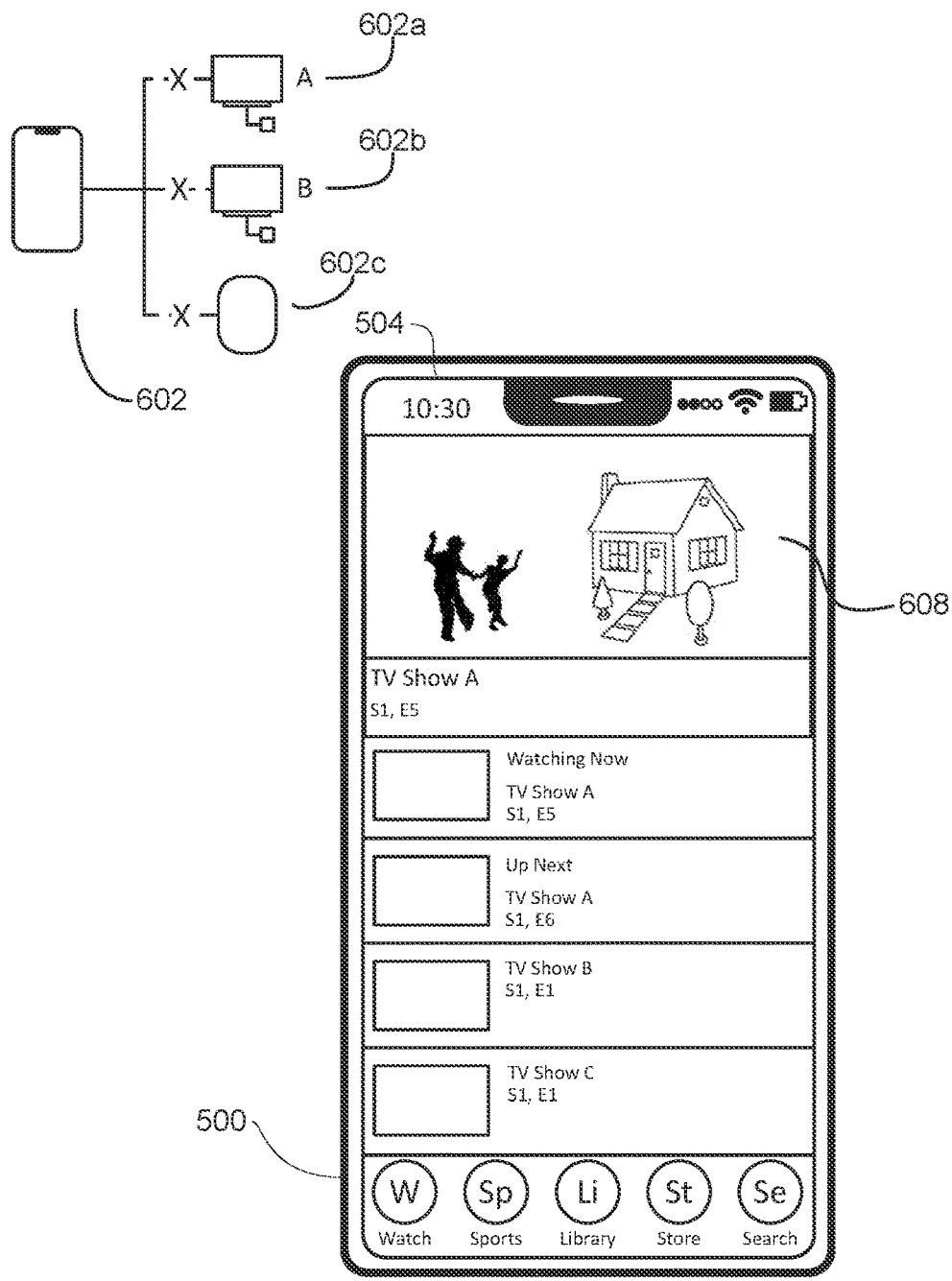
Figure 6E:
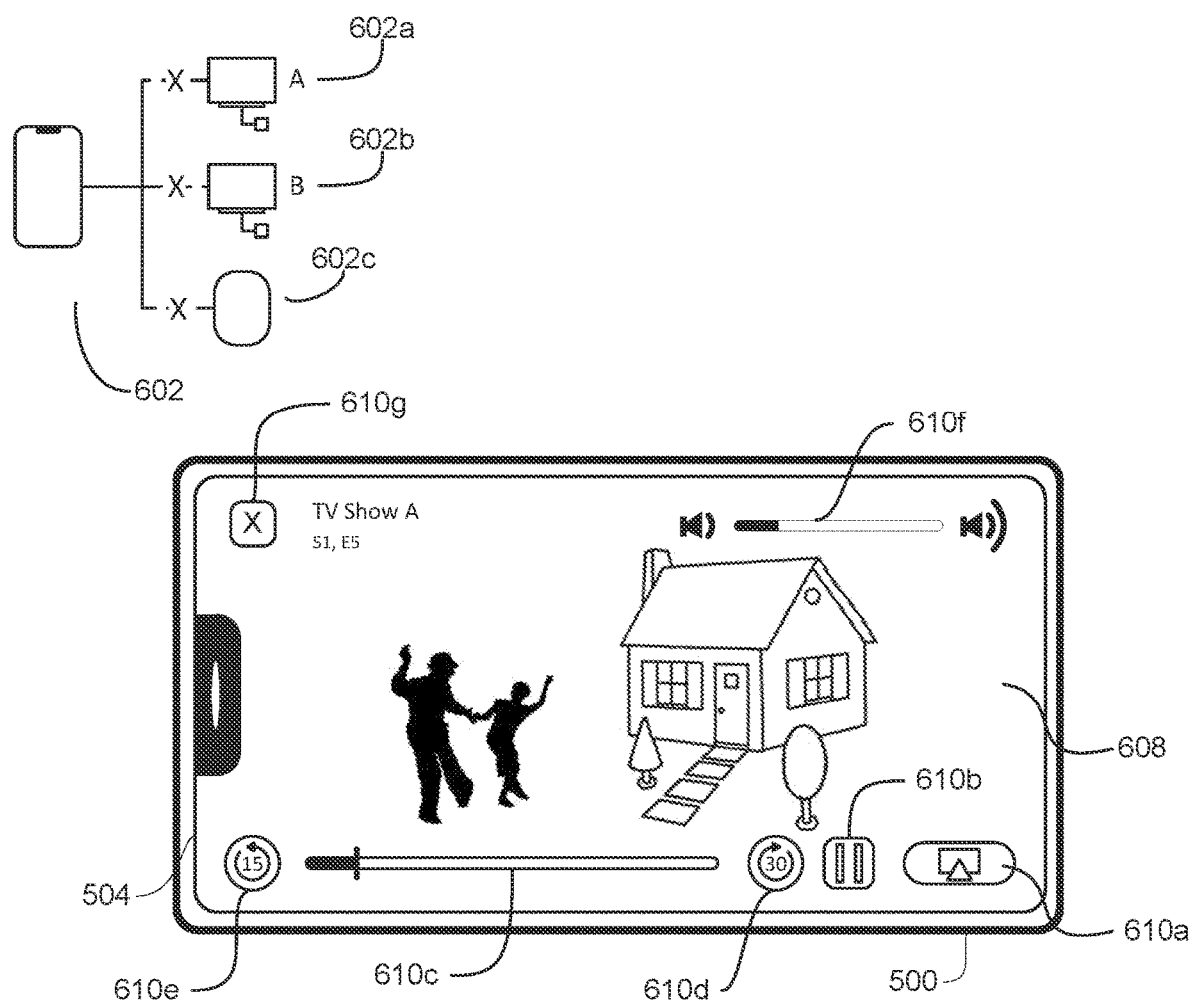
Figure 6F:
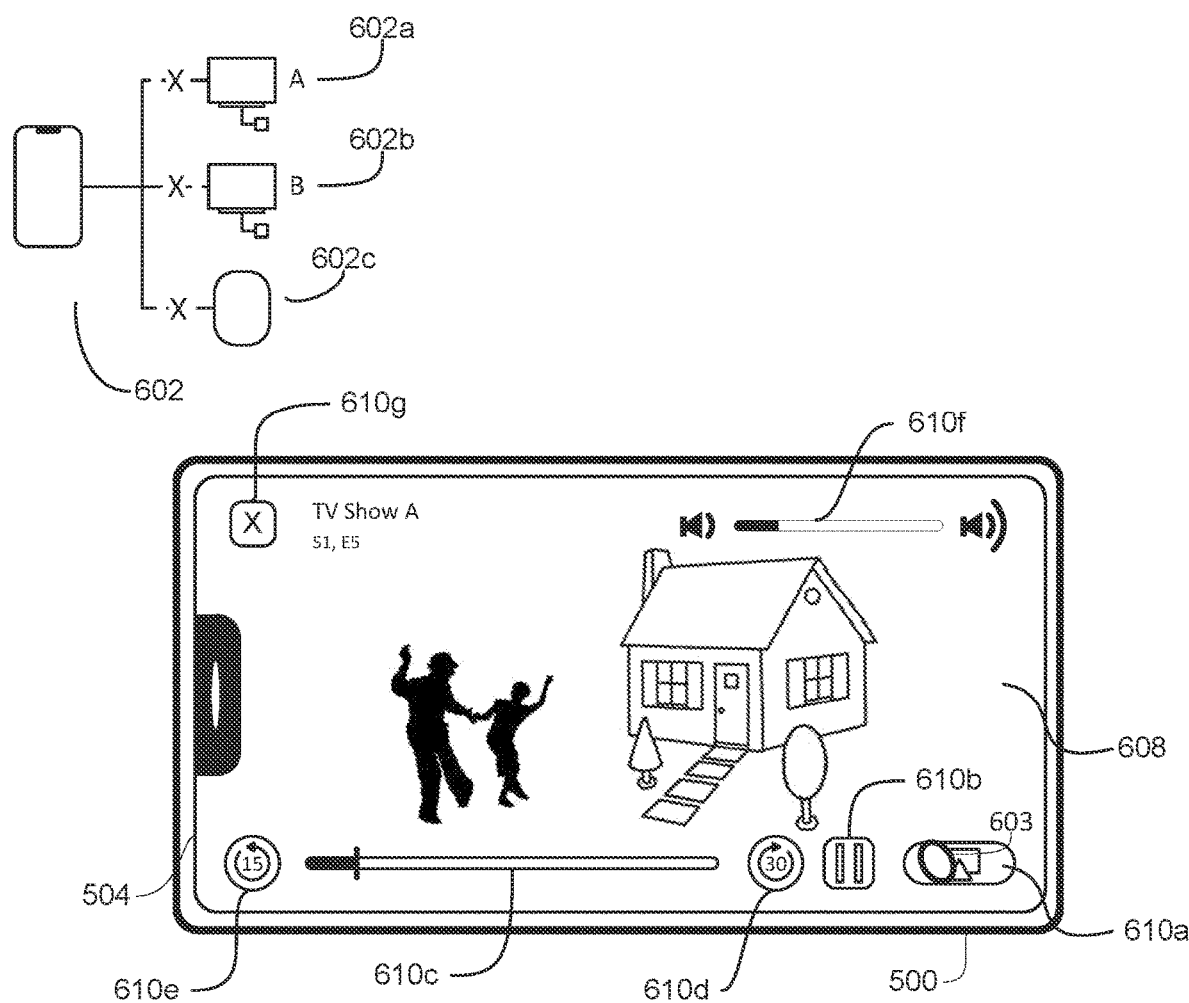
Figure 6H:
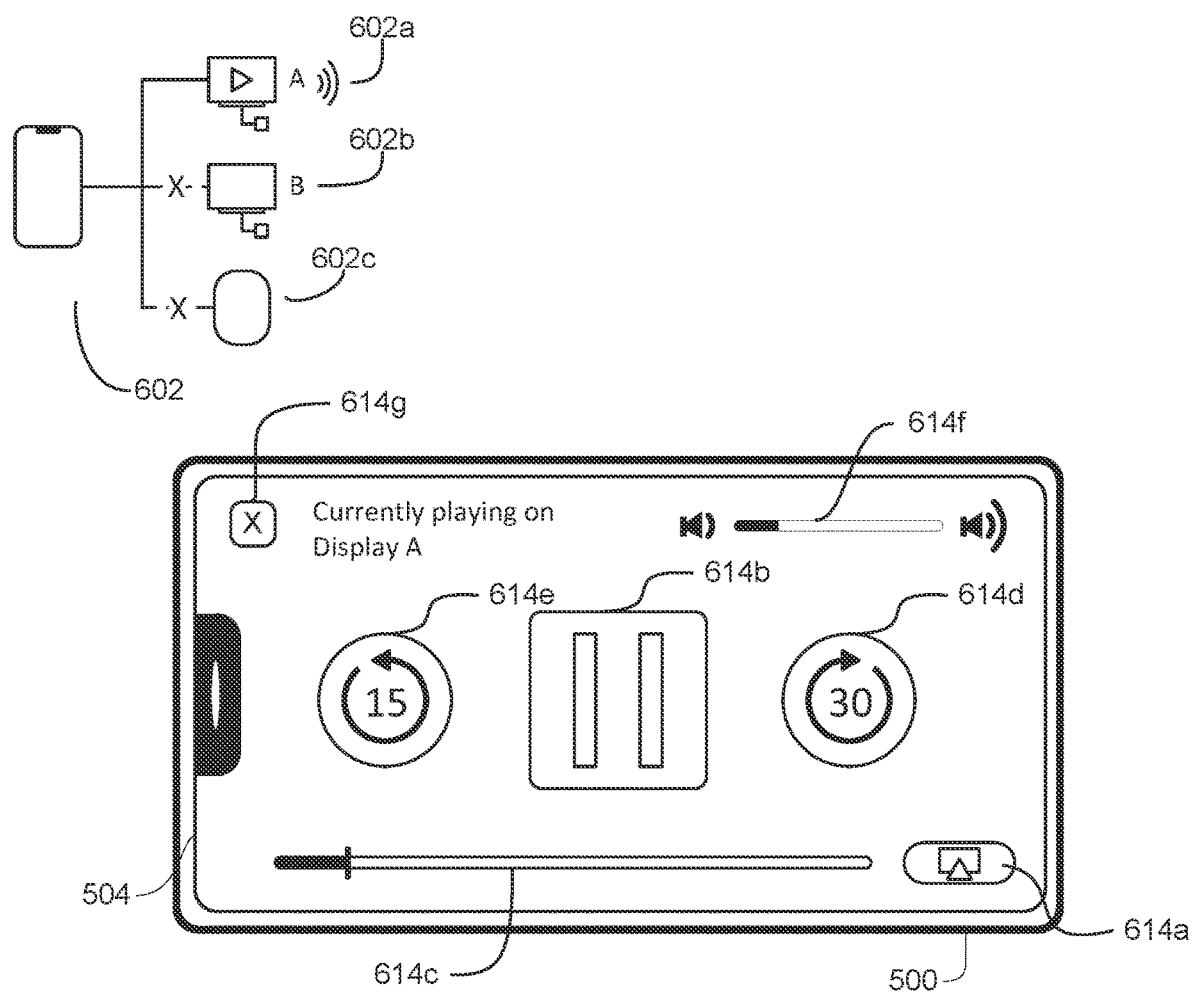
Figure 6I:
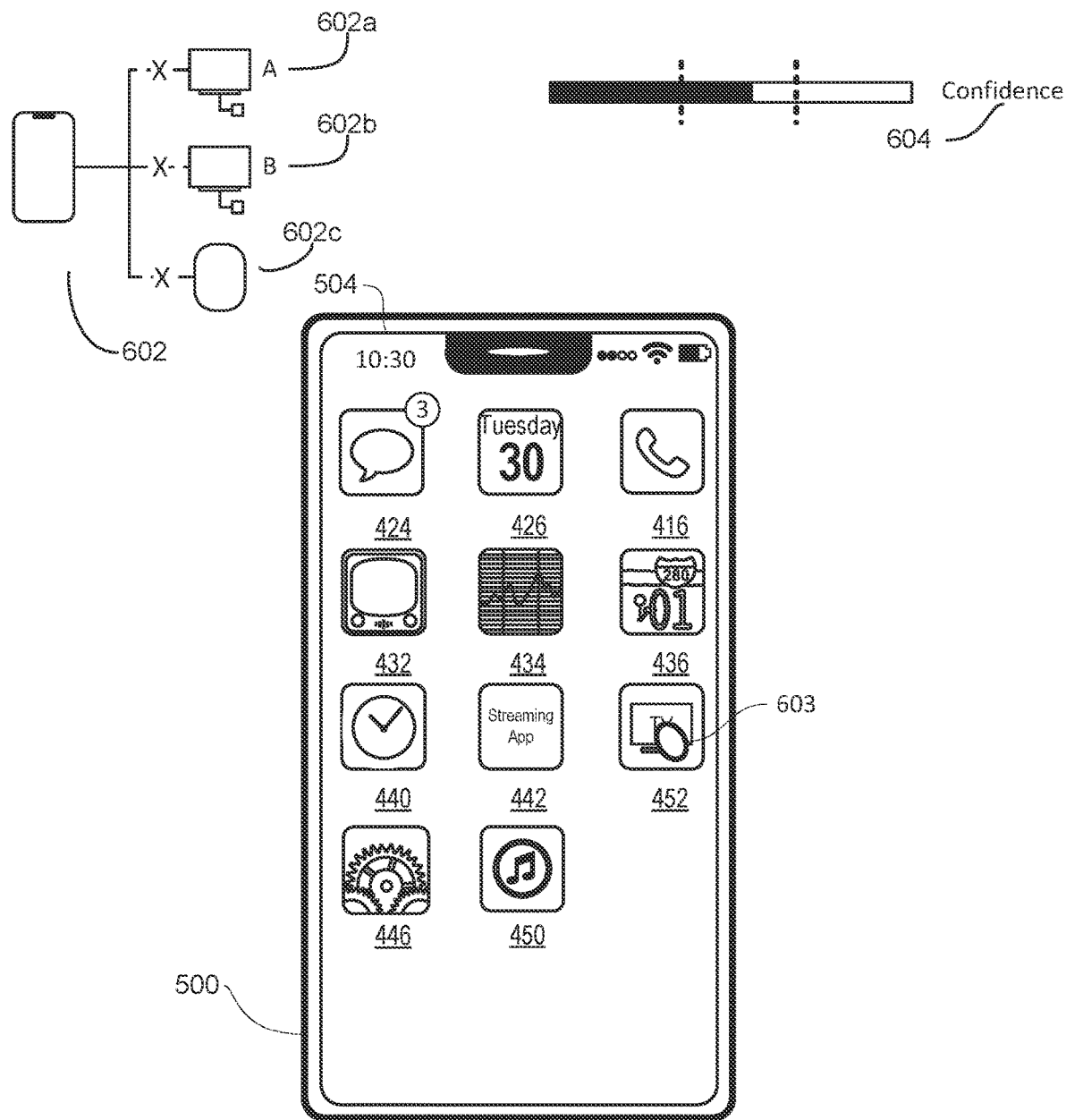
Figure 6J:
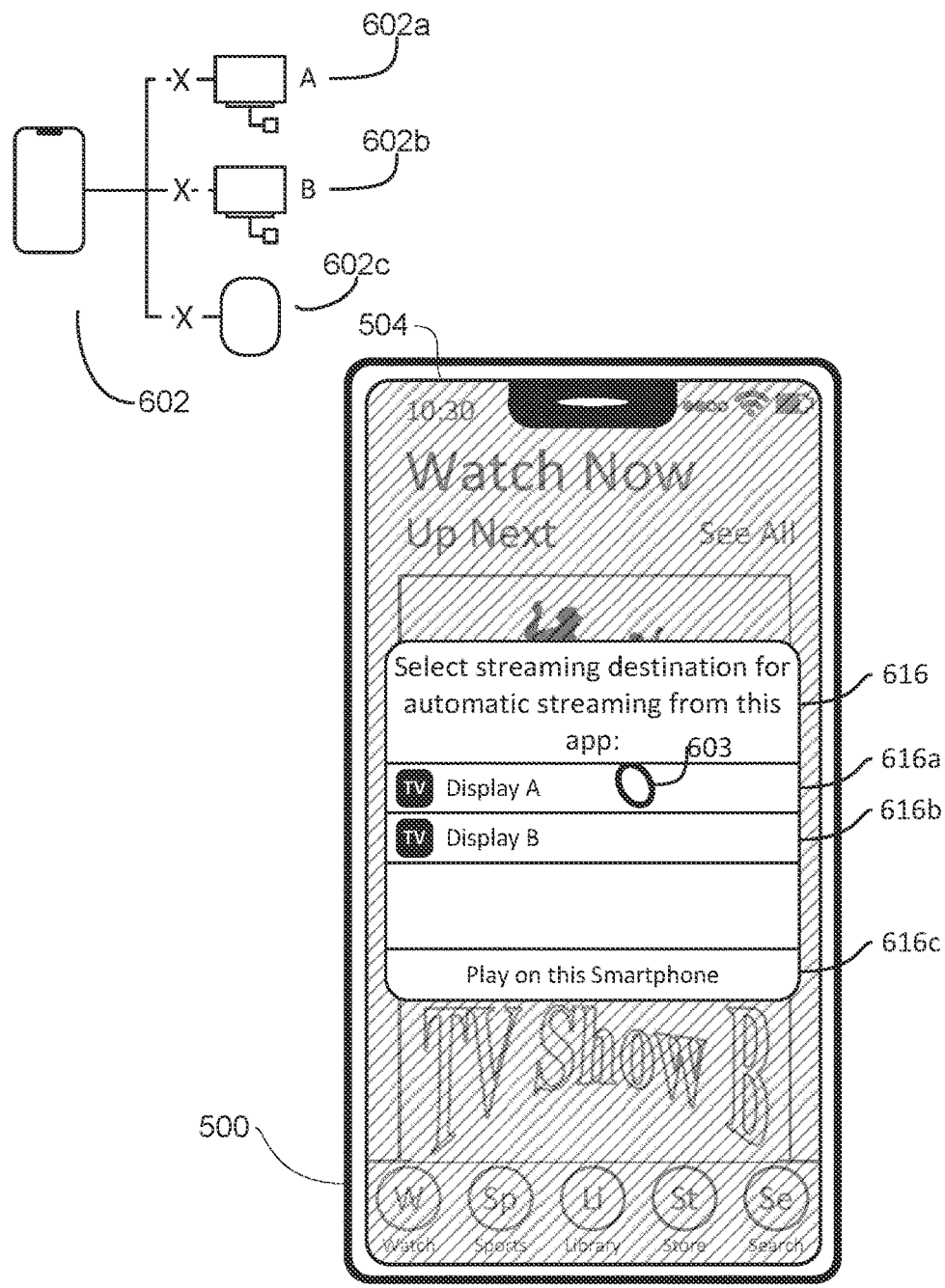
Figure 6K:
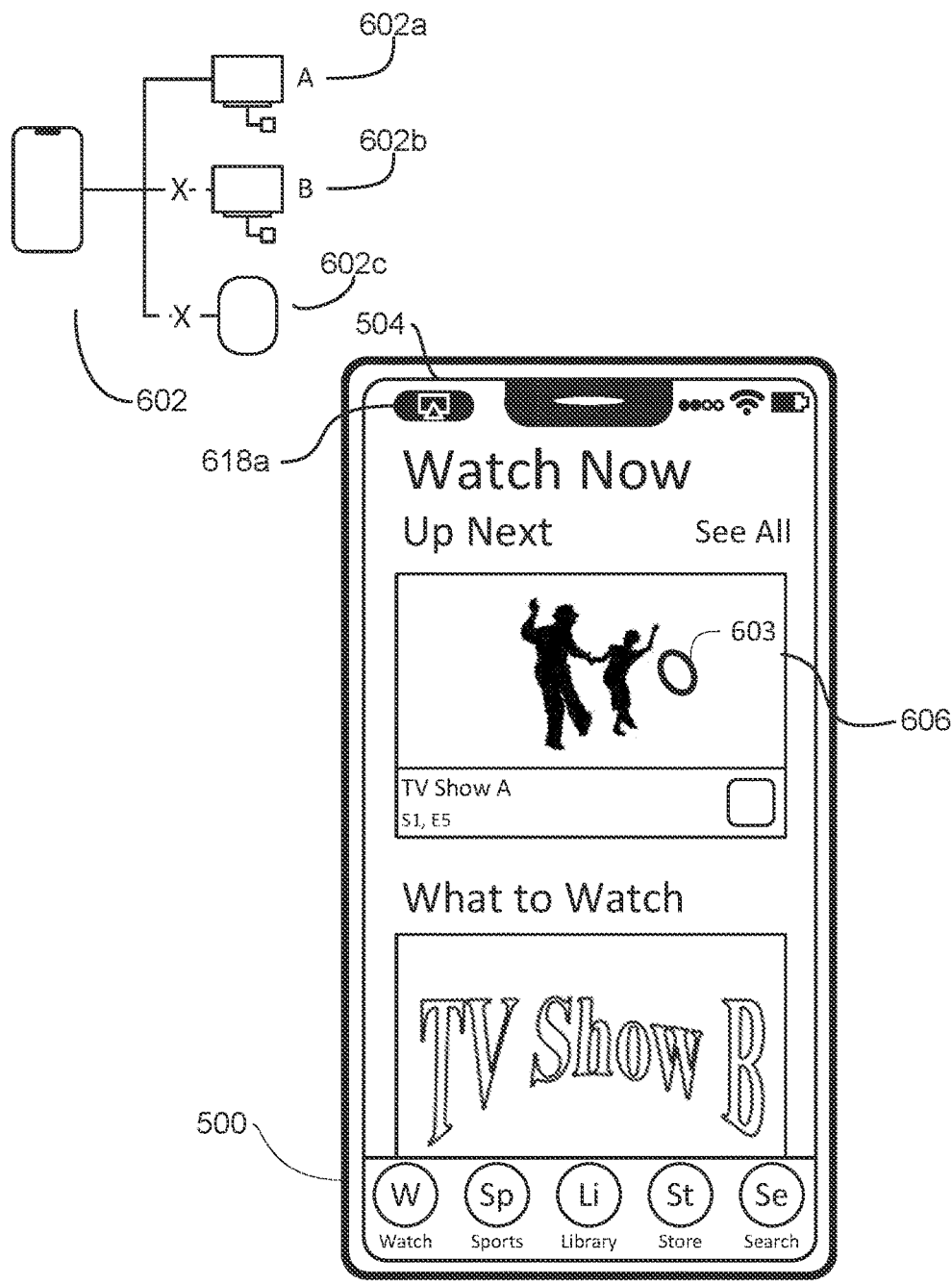
Figure 6L:
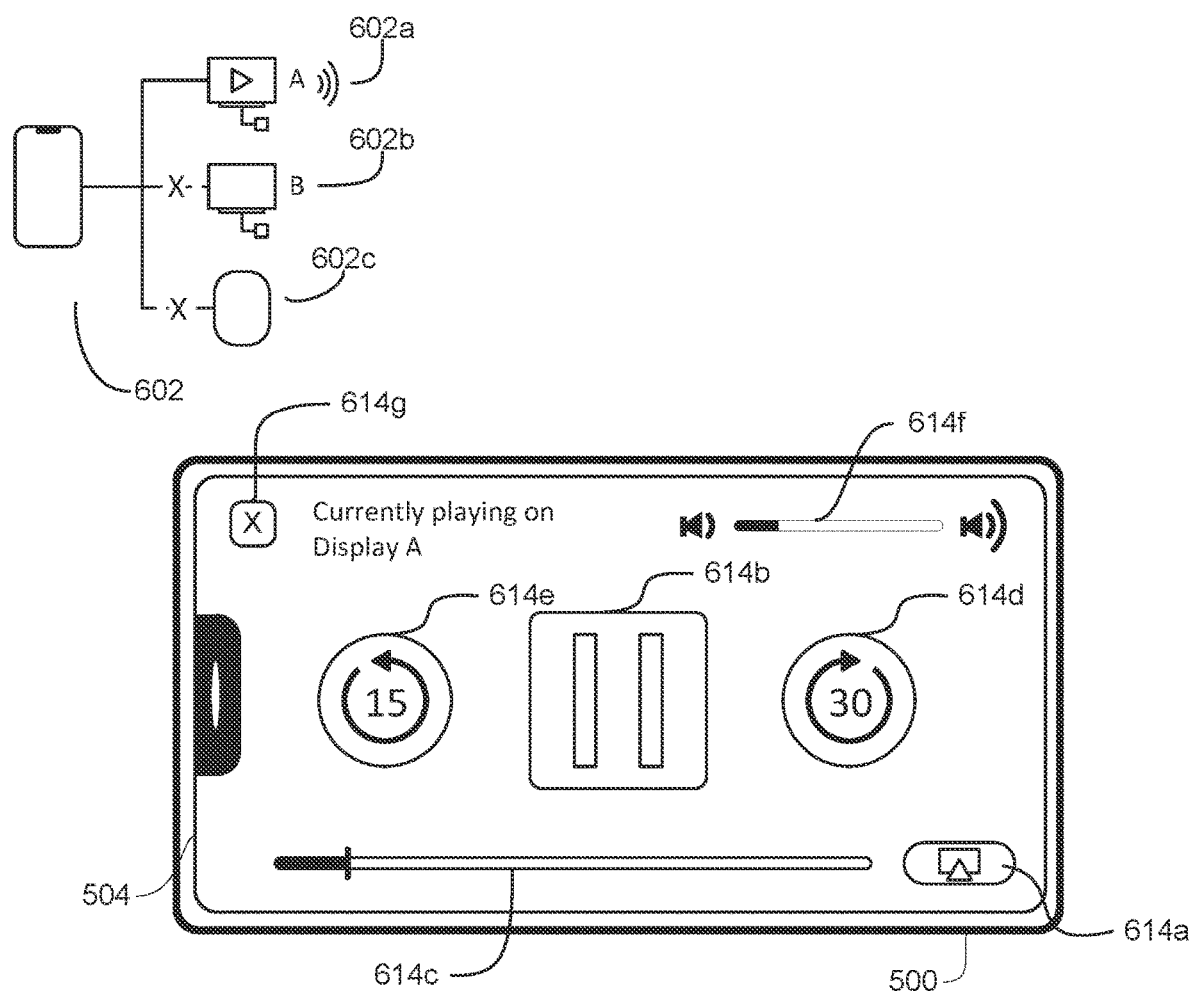
Figure 6M:
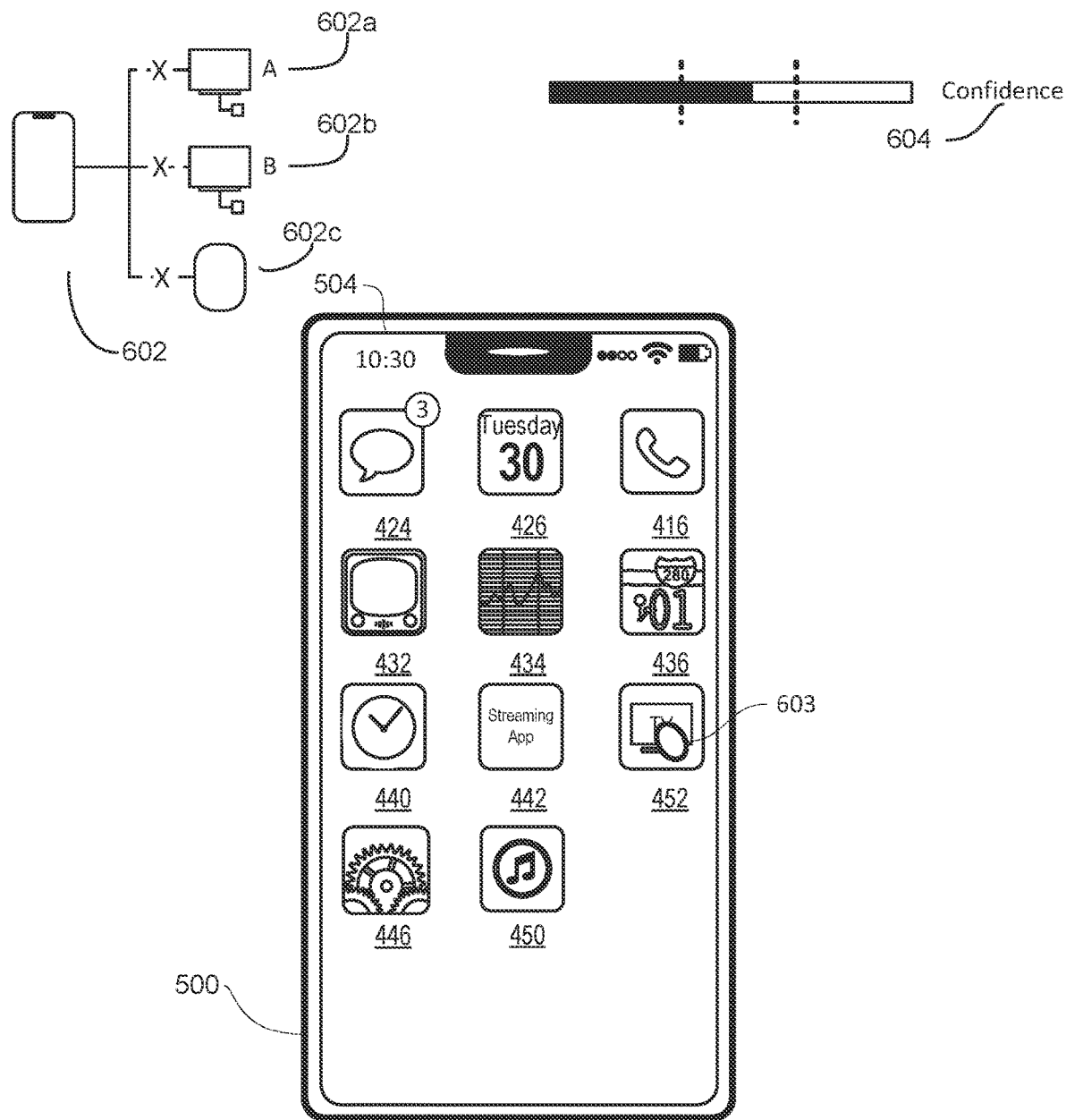
Figure 6N:
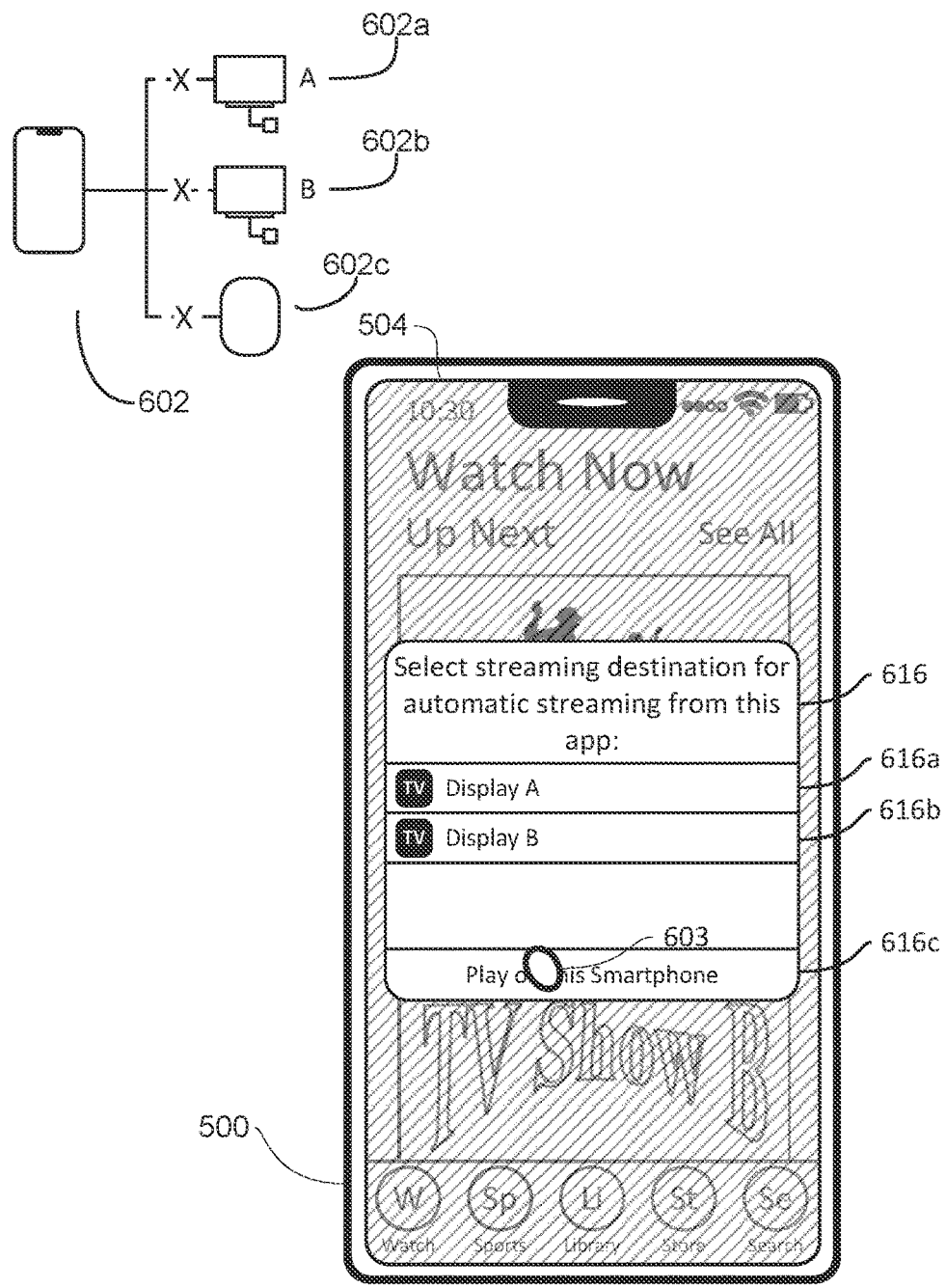
Figure 6O:
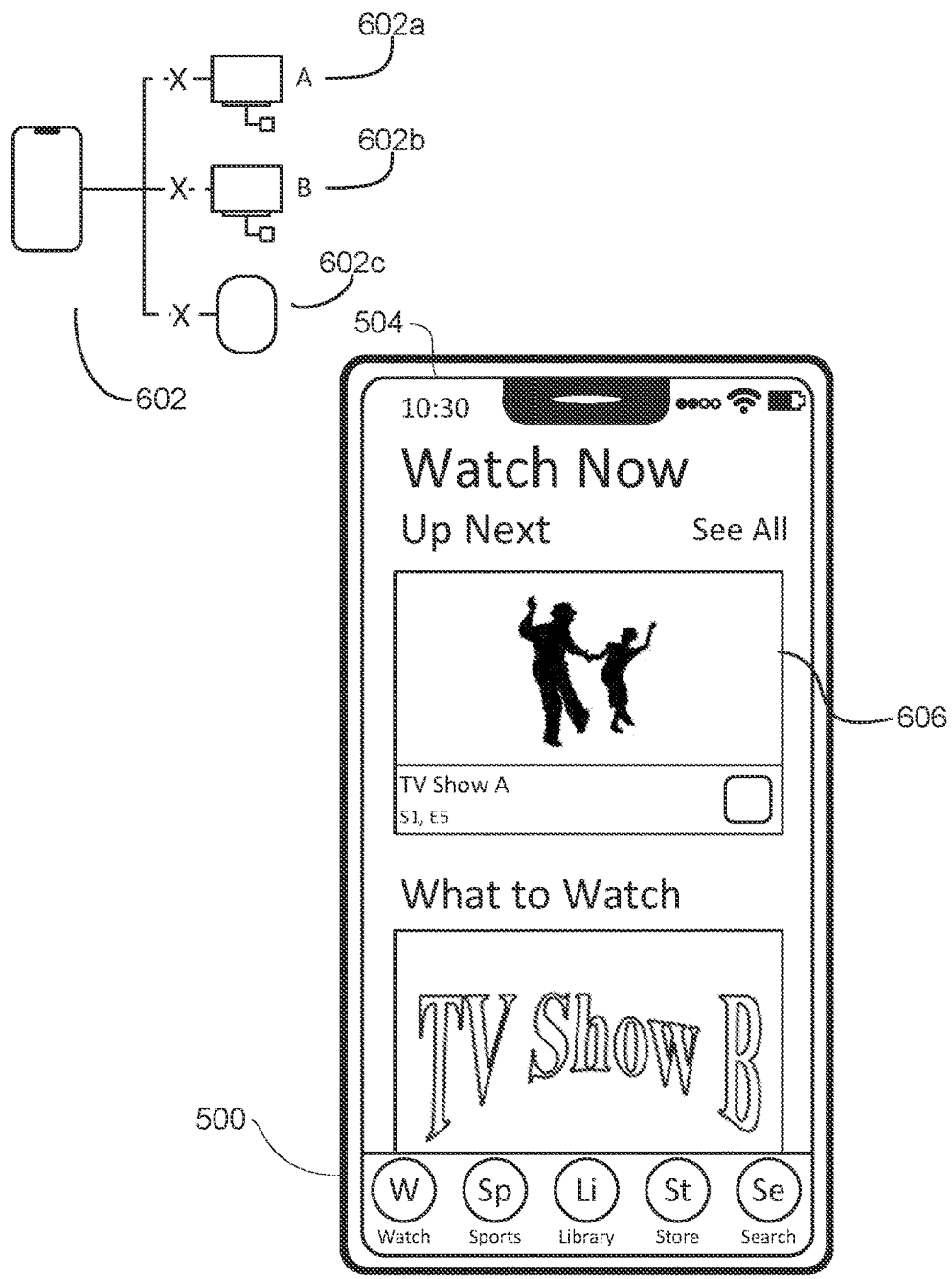
Figure 6P:
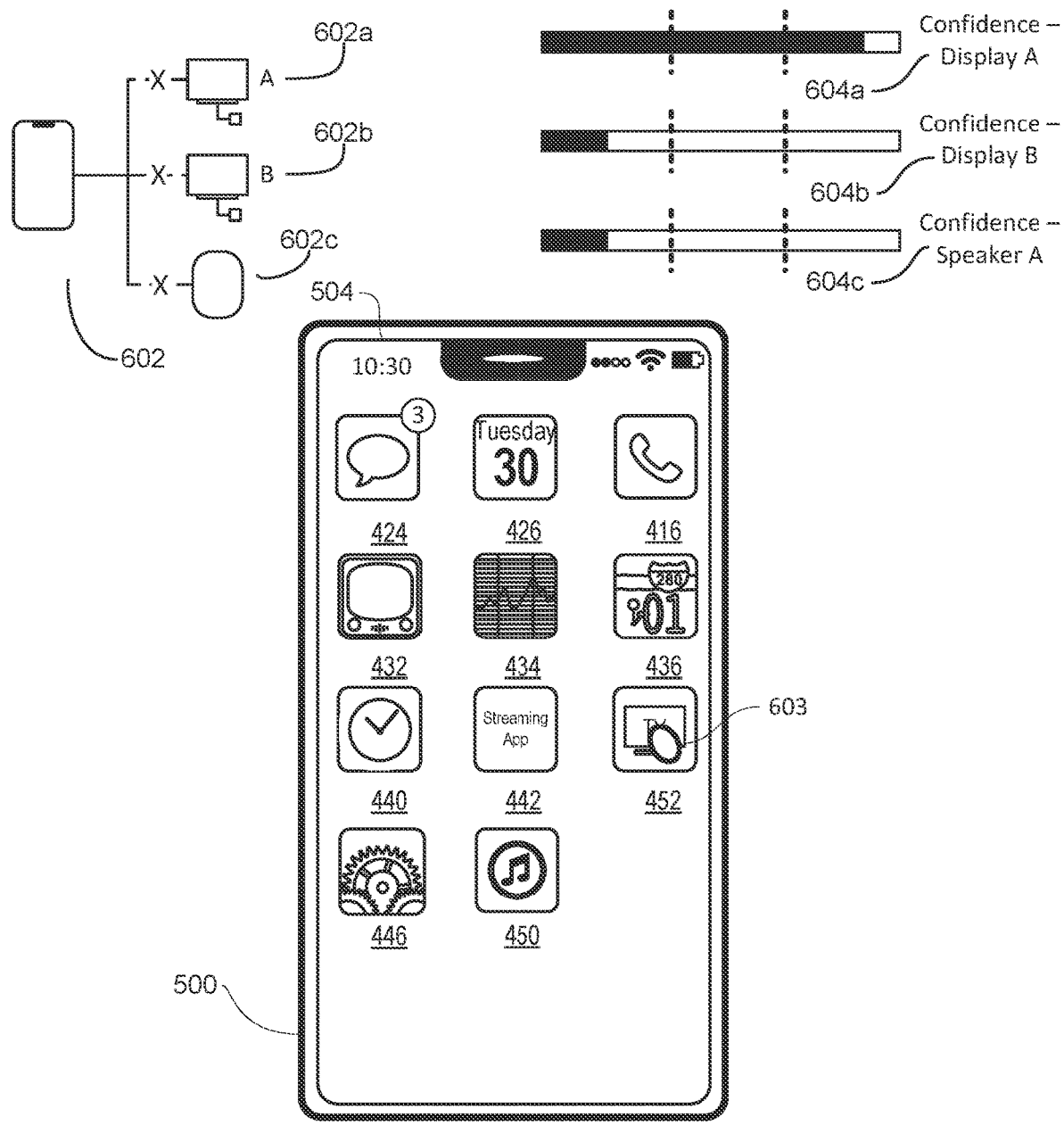
Figure 6Q:
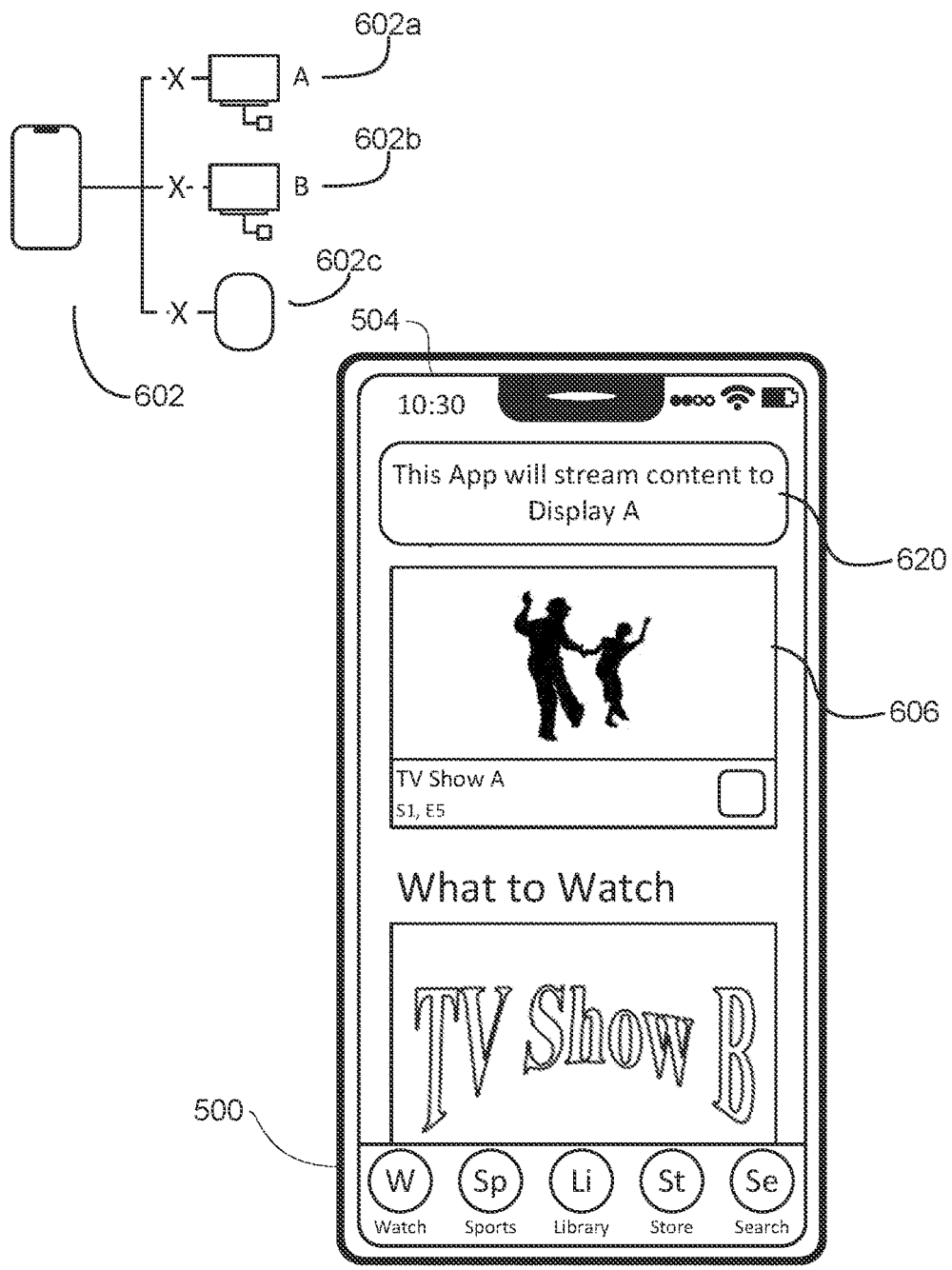
Figure 6R:
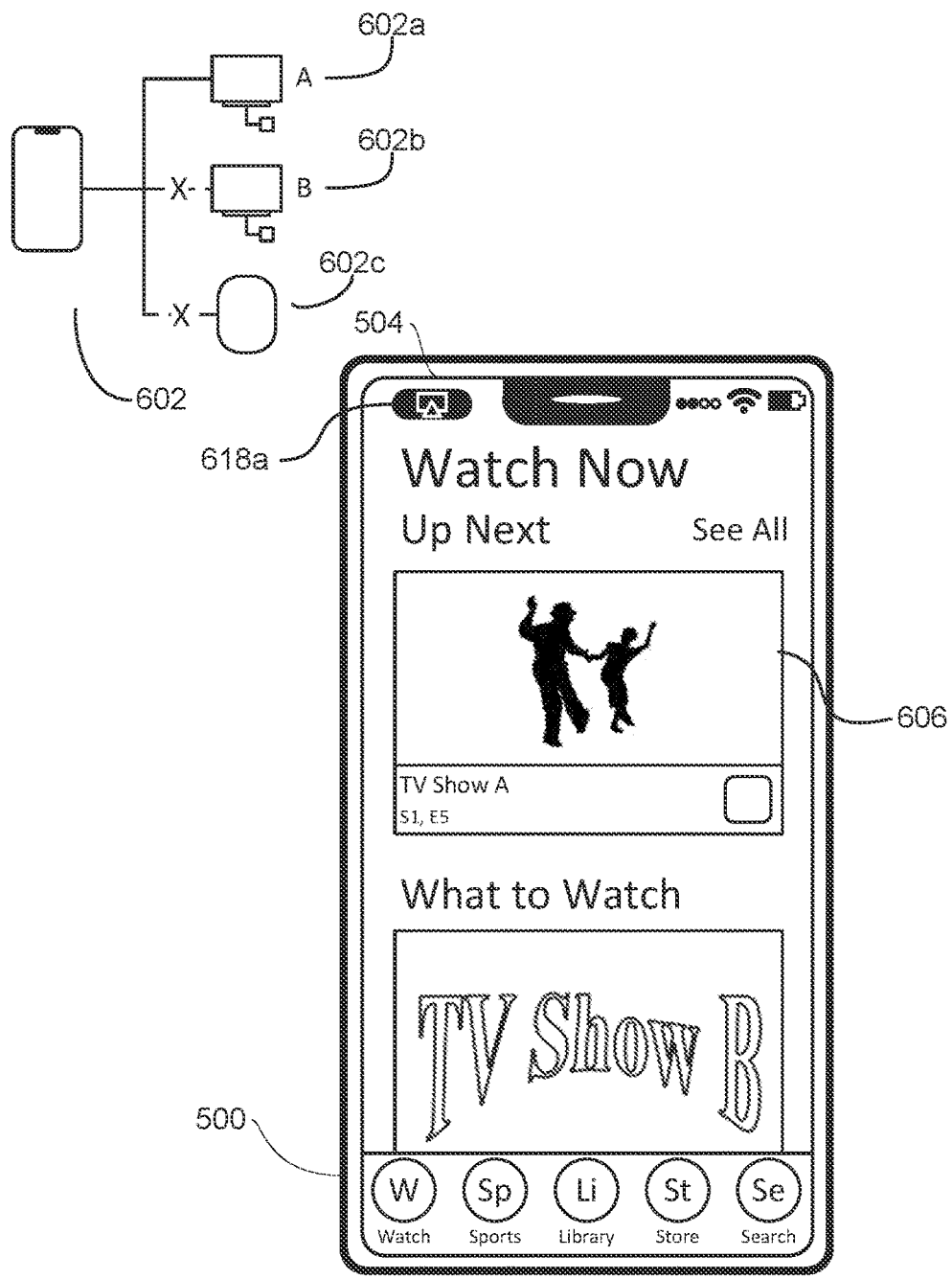
Figure 6S:
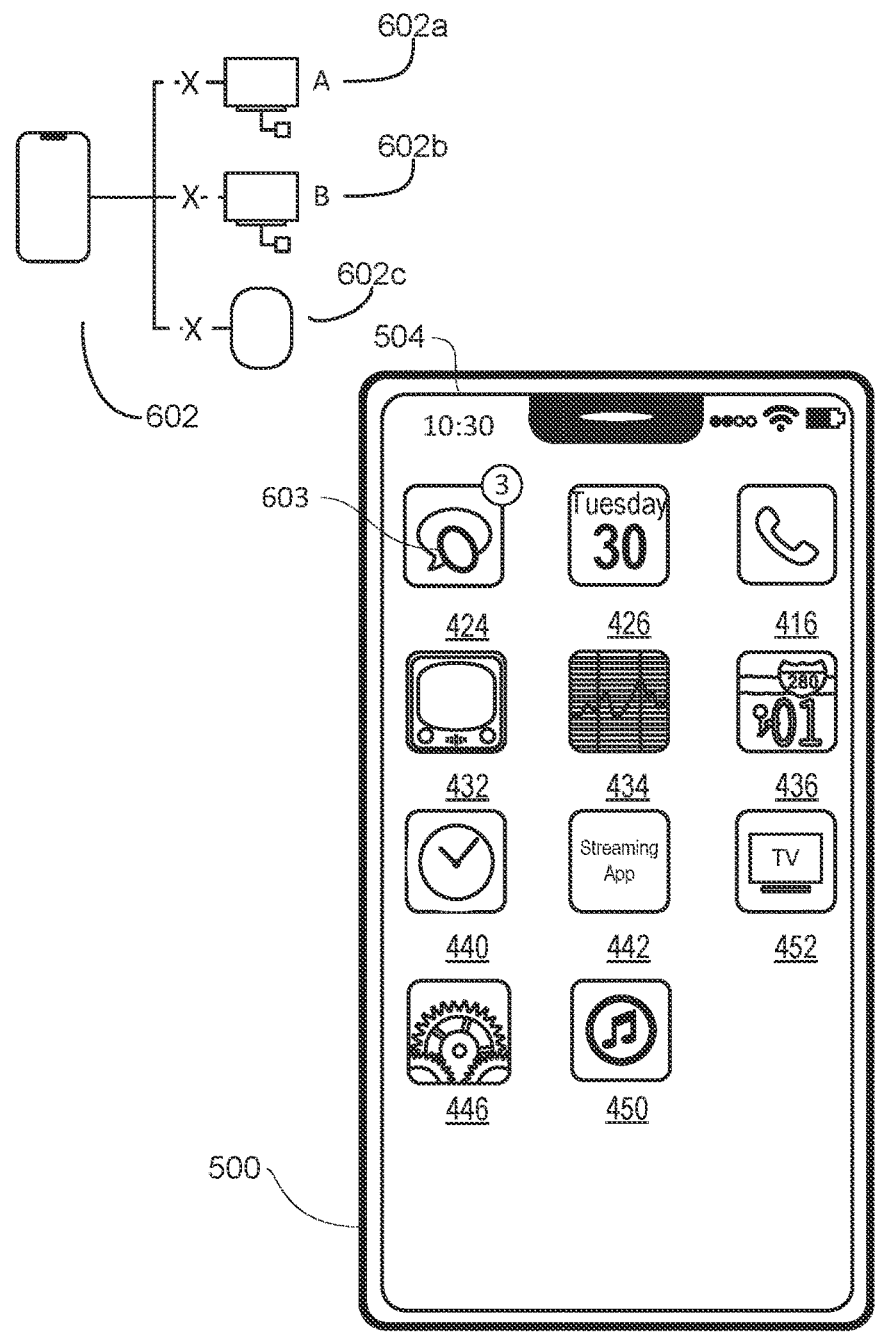
Figure 6T:
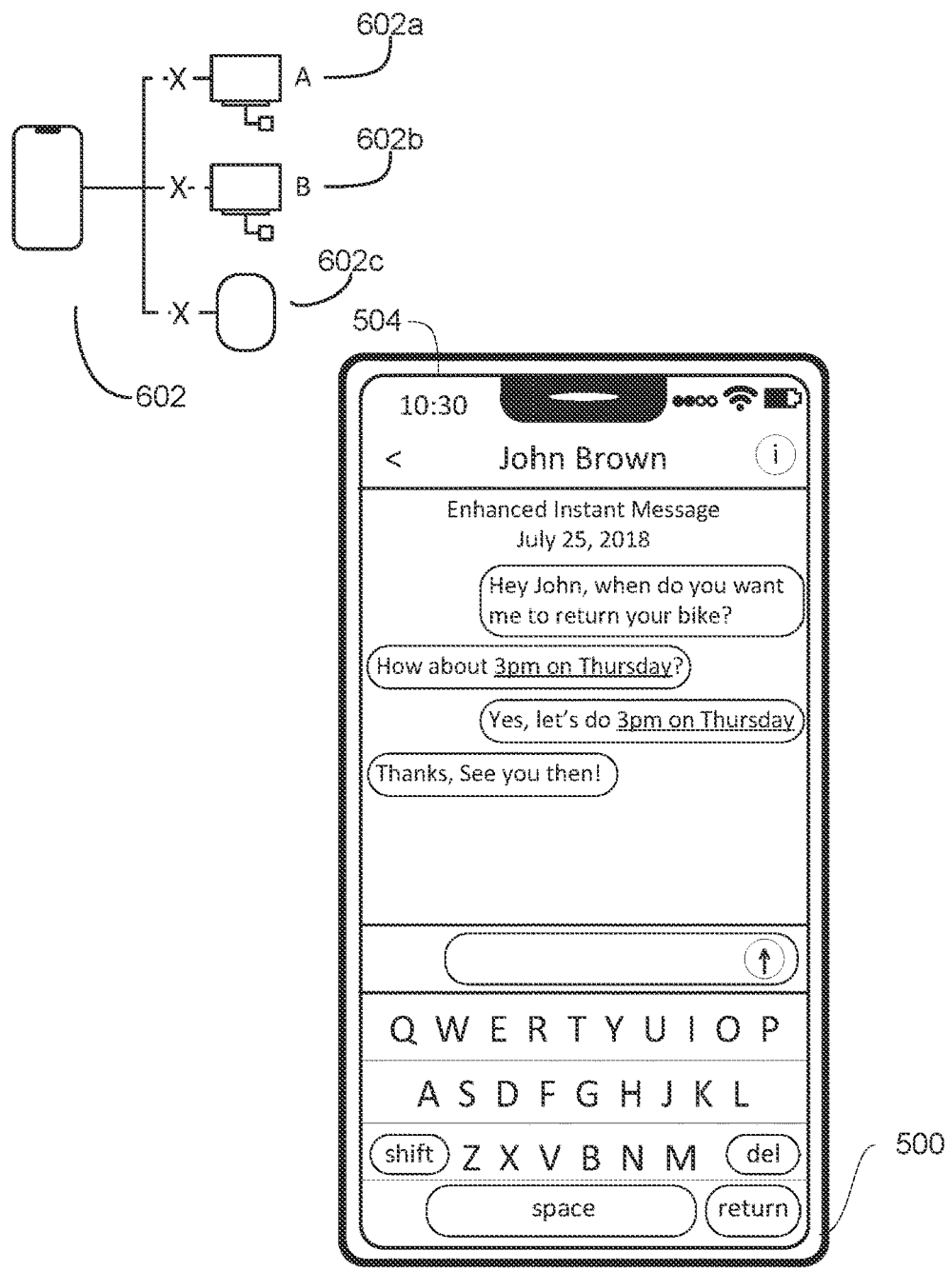
Figure 6U:
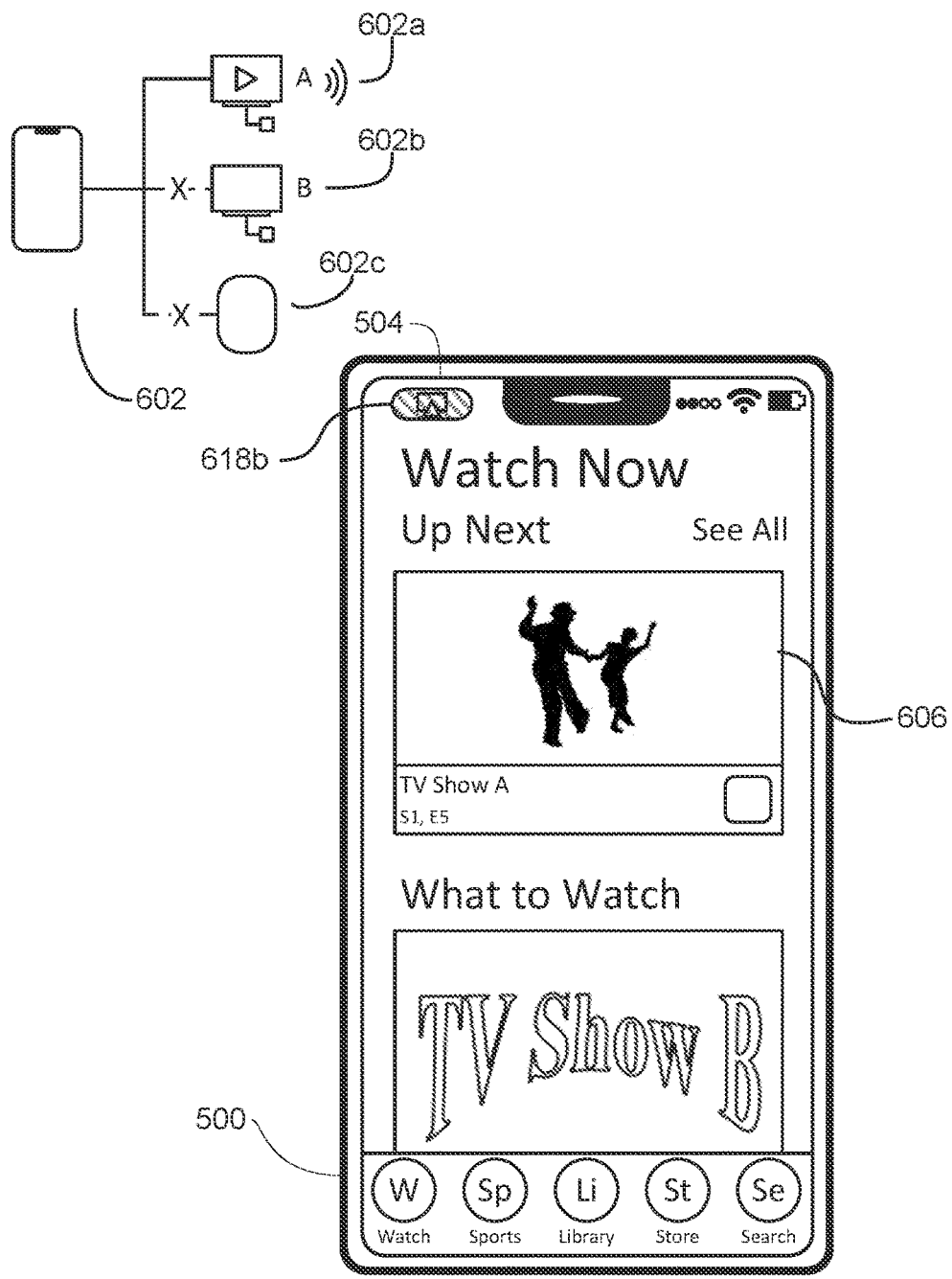
Figure 6V:
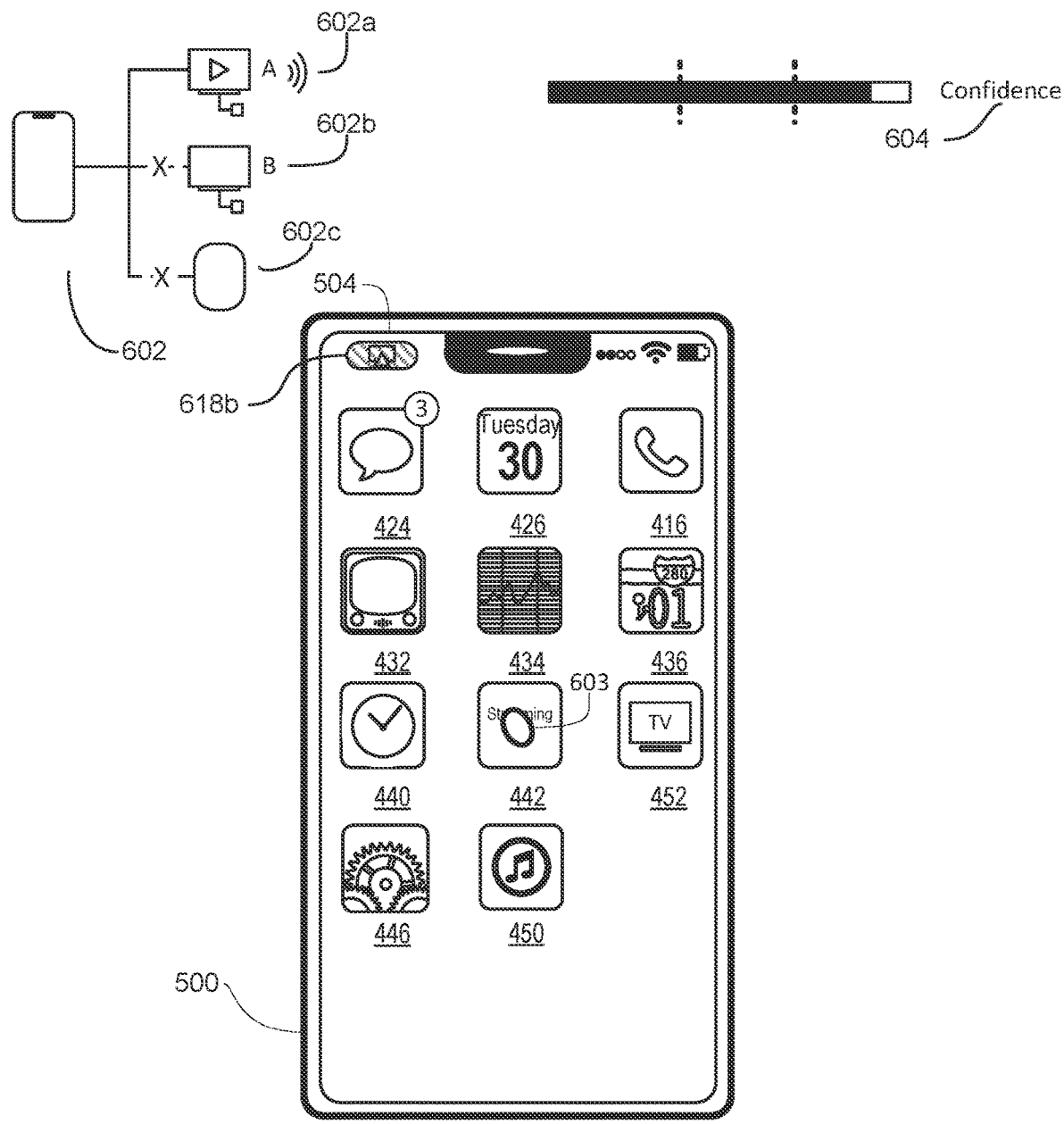
Figure 6W:
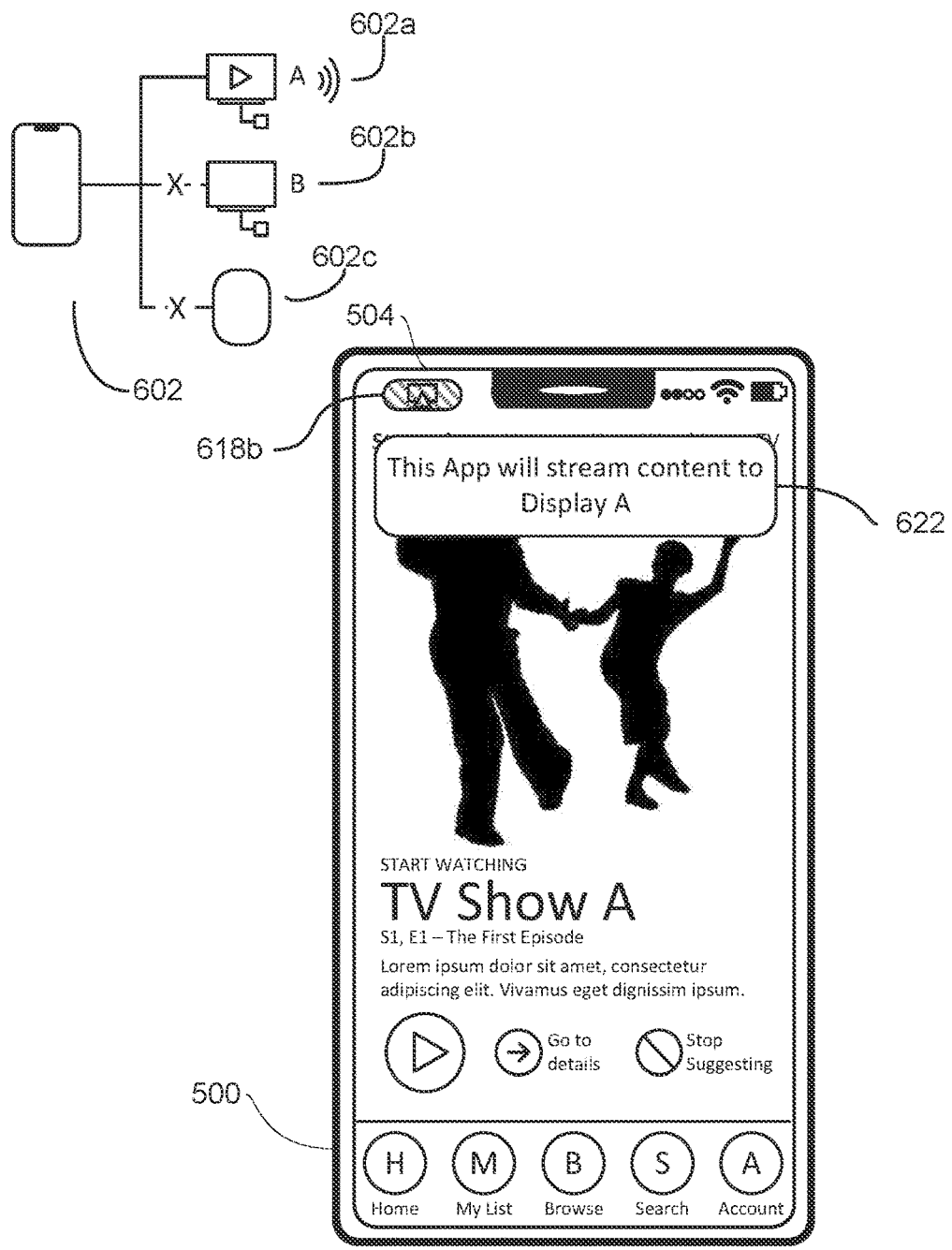
Figure 6X:
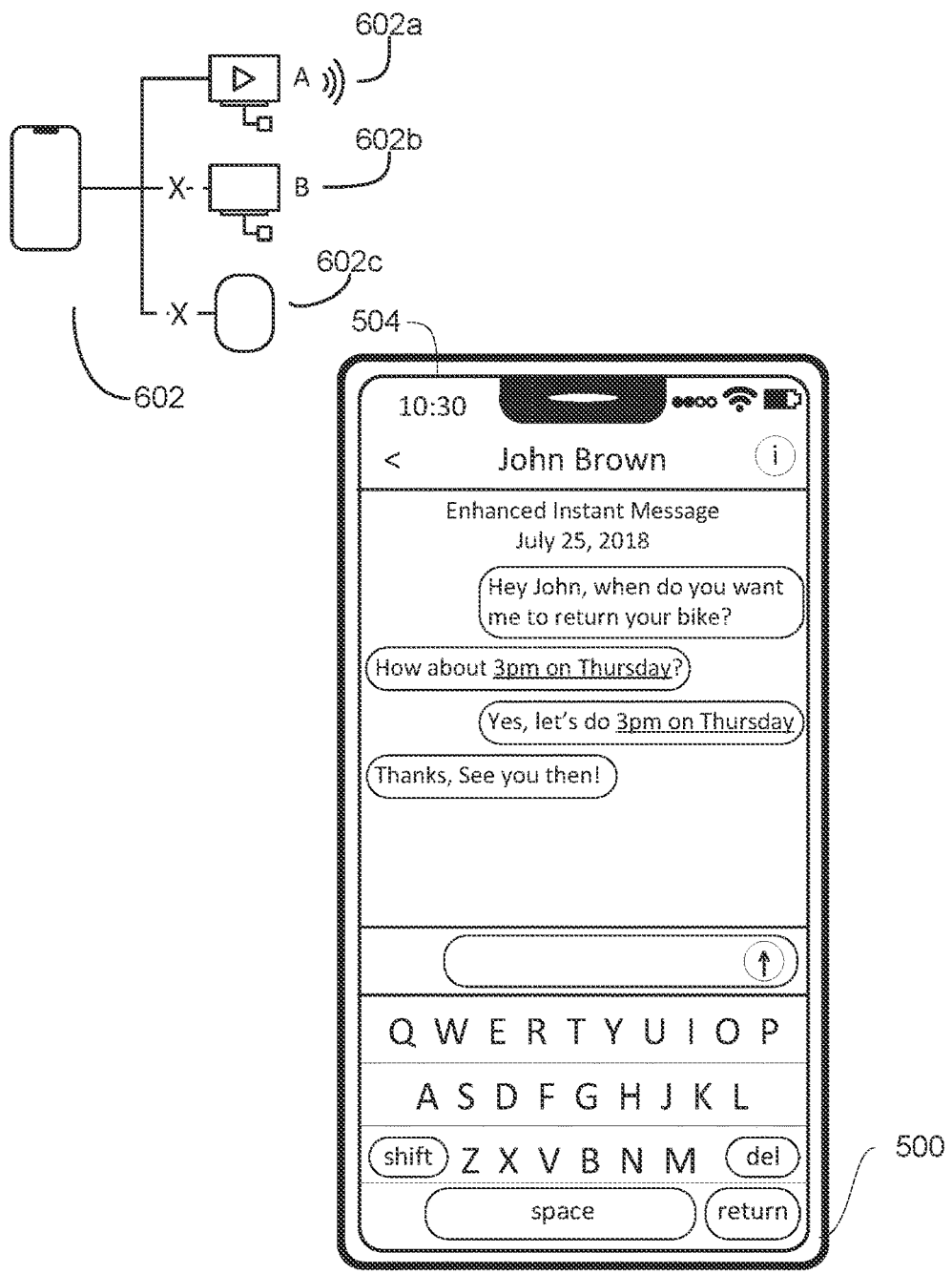
Figure 7A:
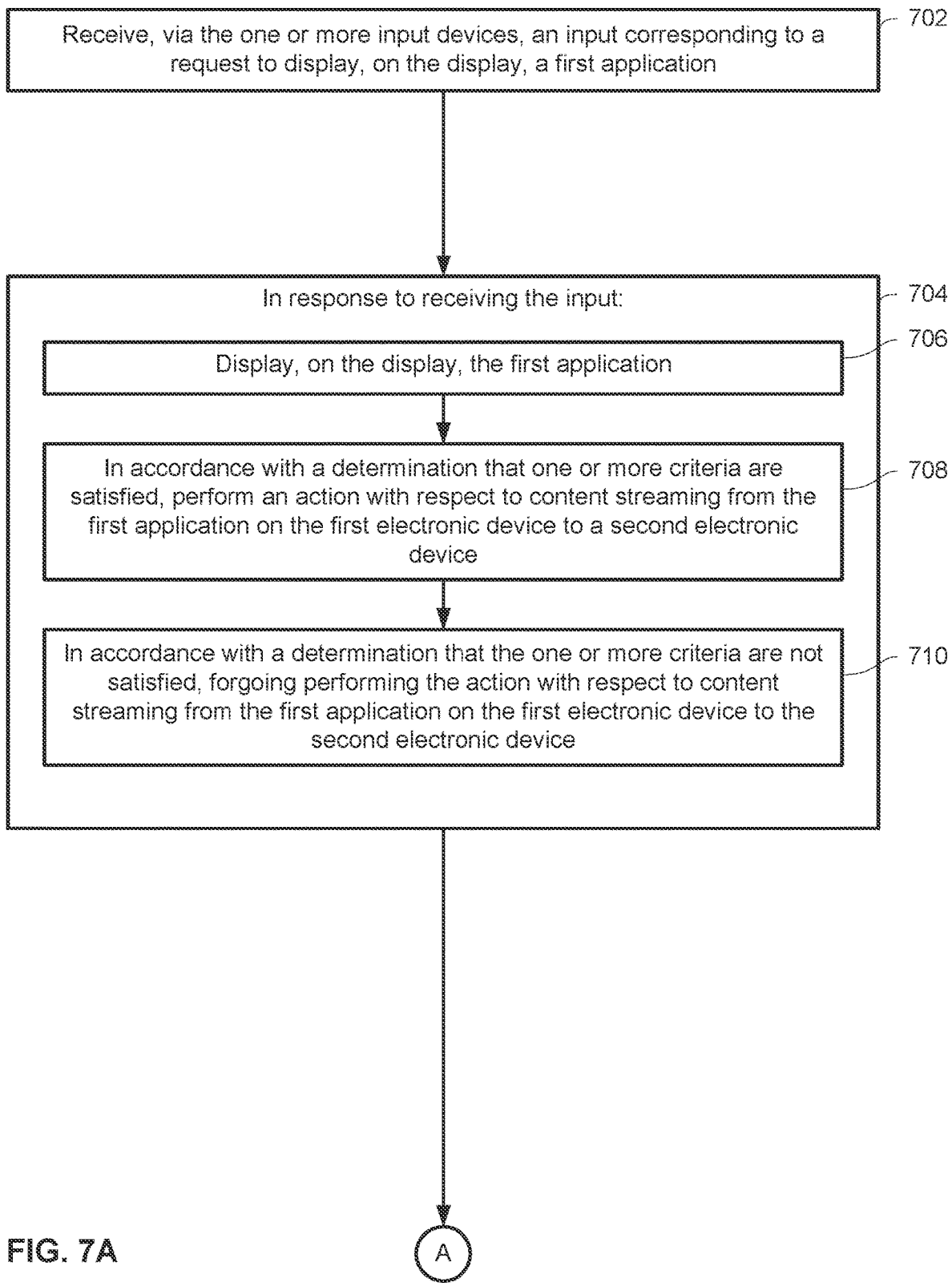
Figure 7B:
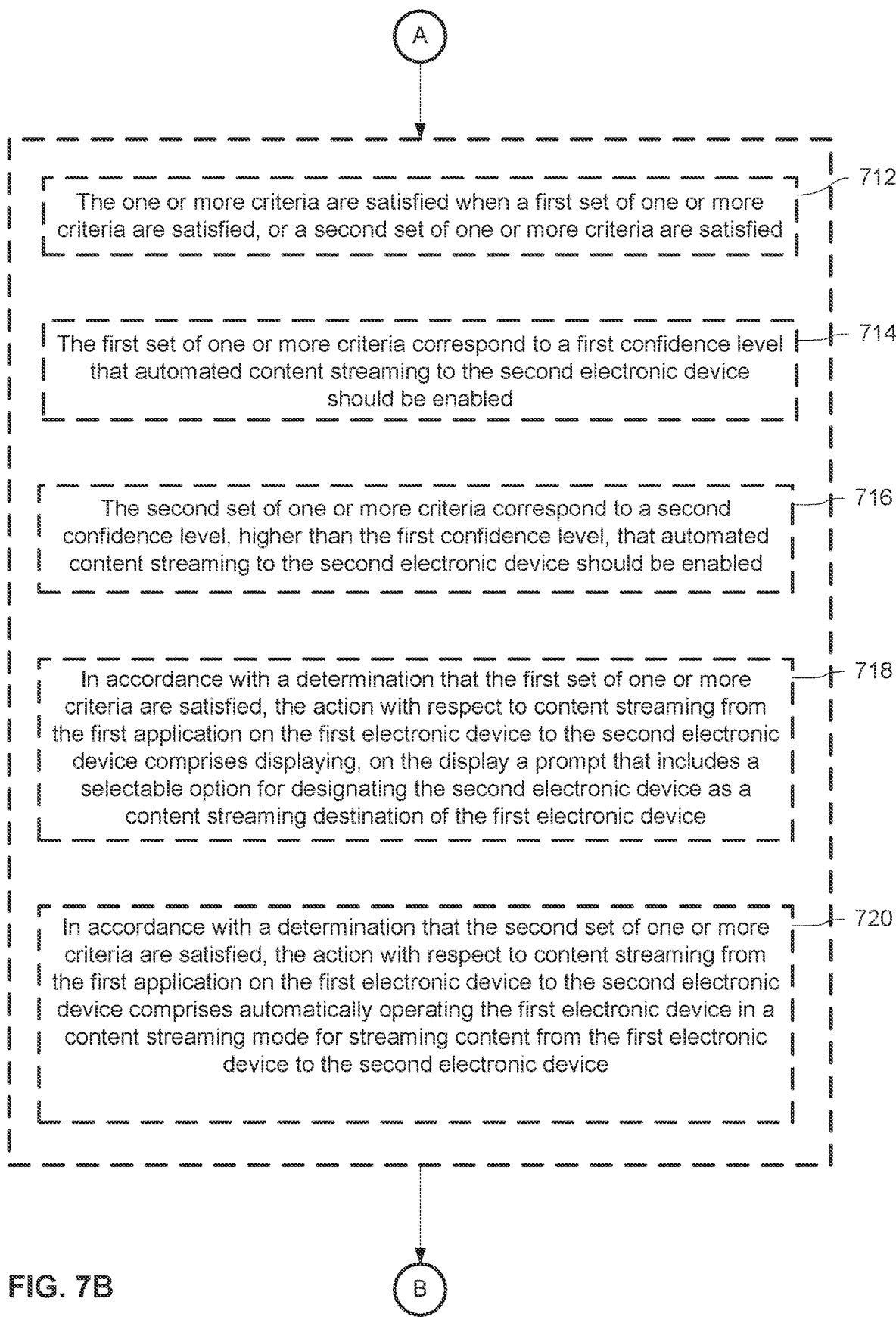
Figure 7C:
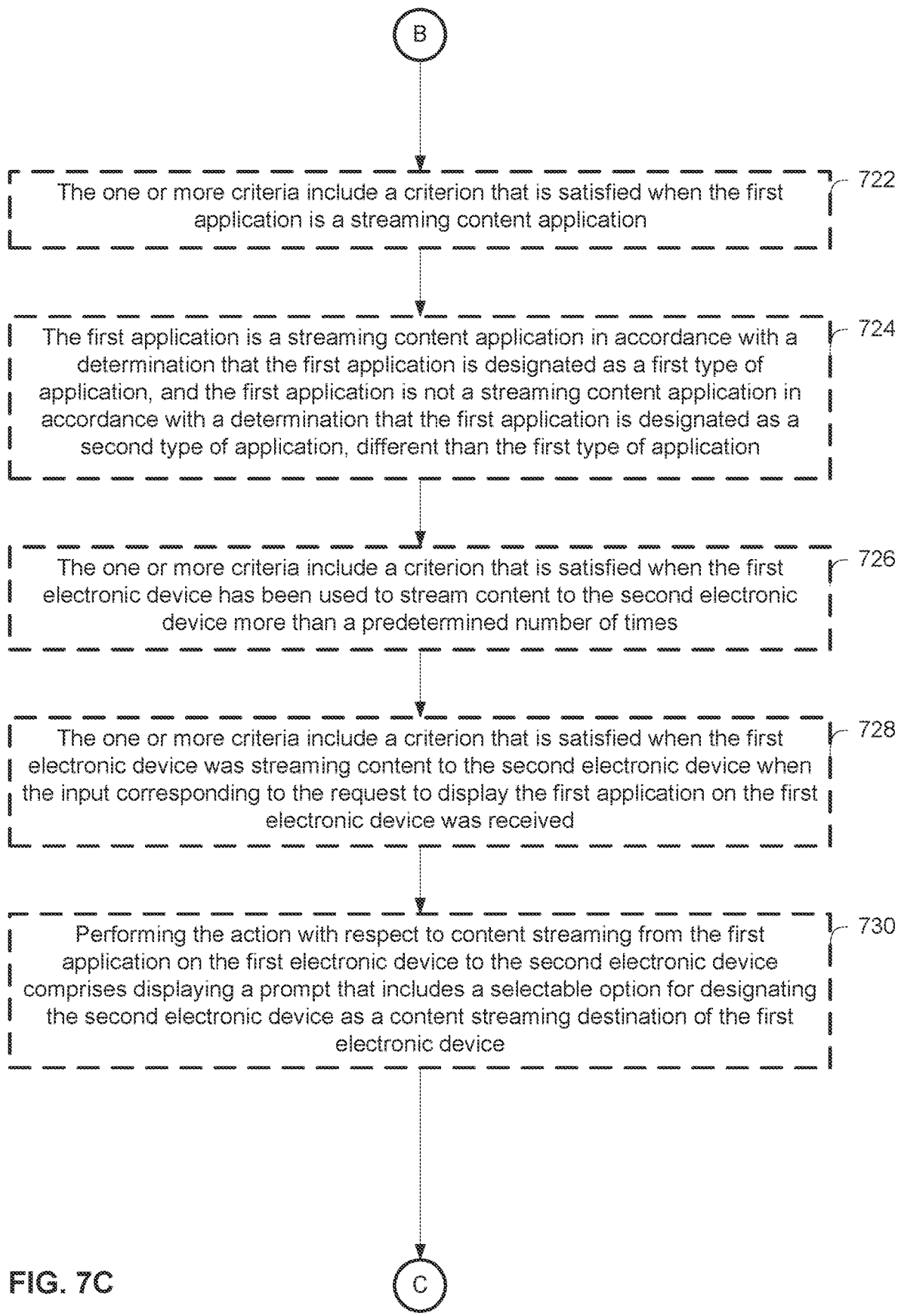
Figure 7D:
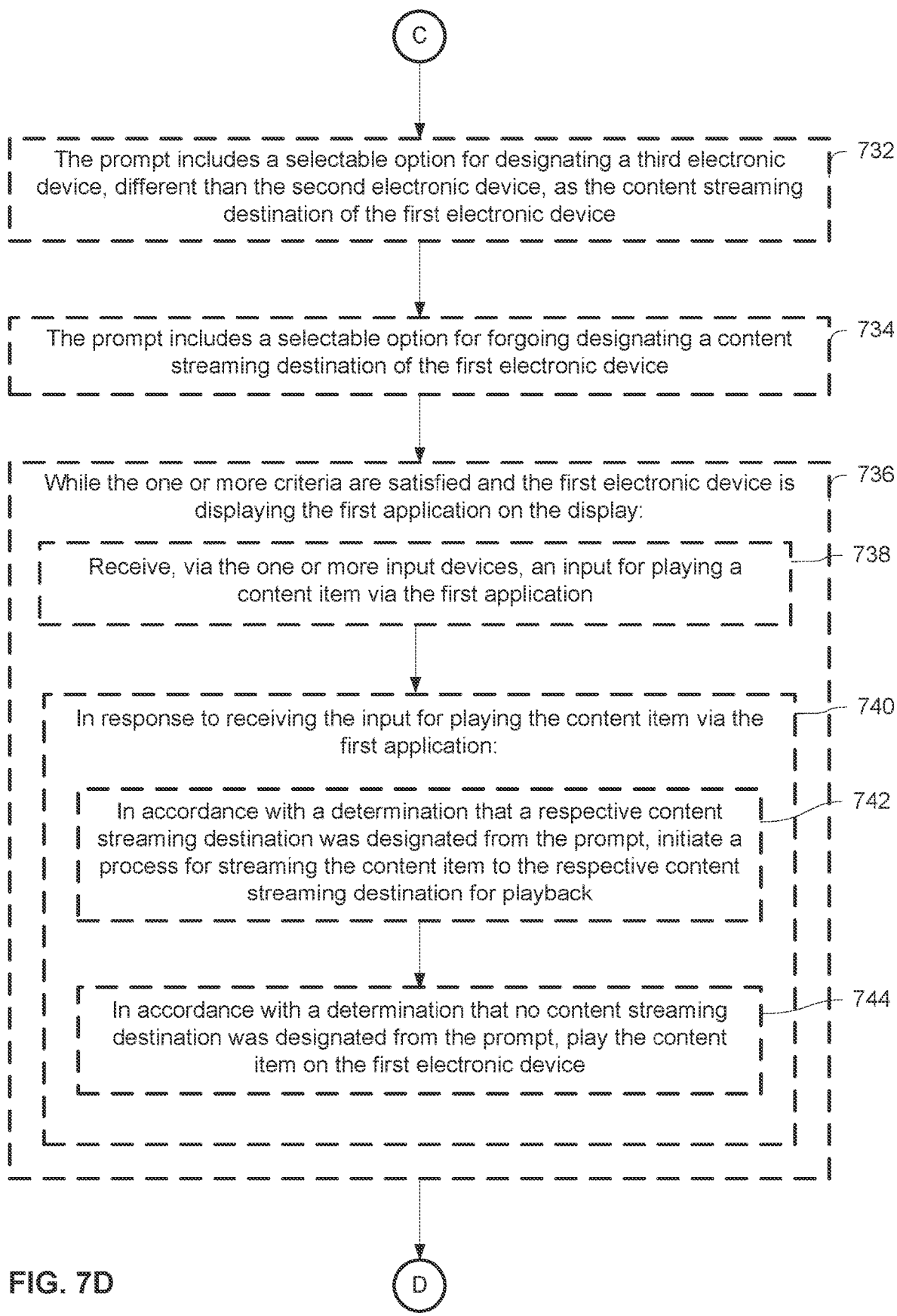
Figure 7E:
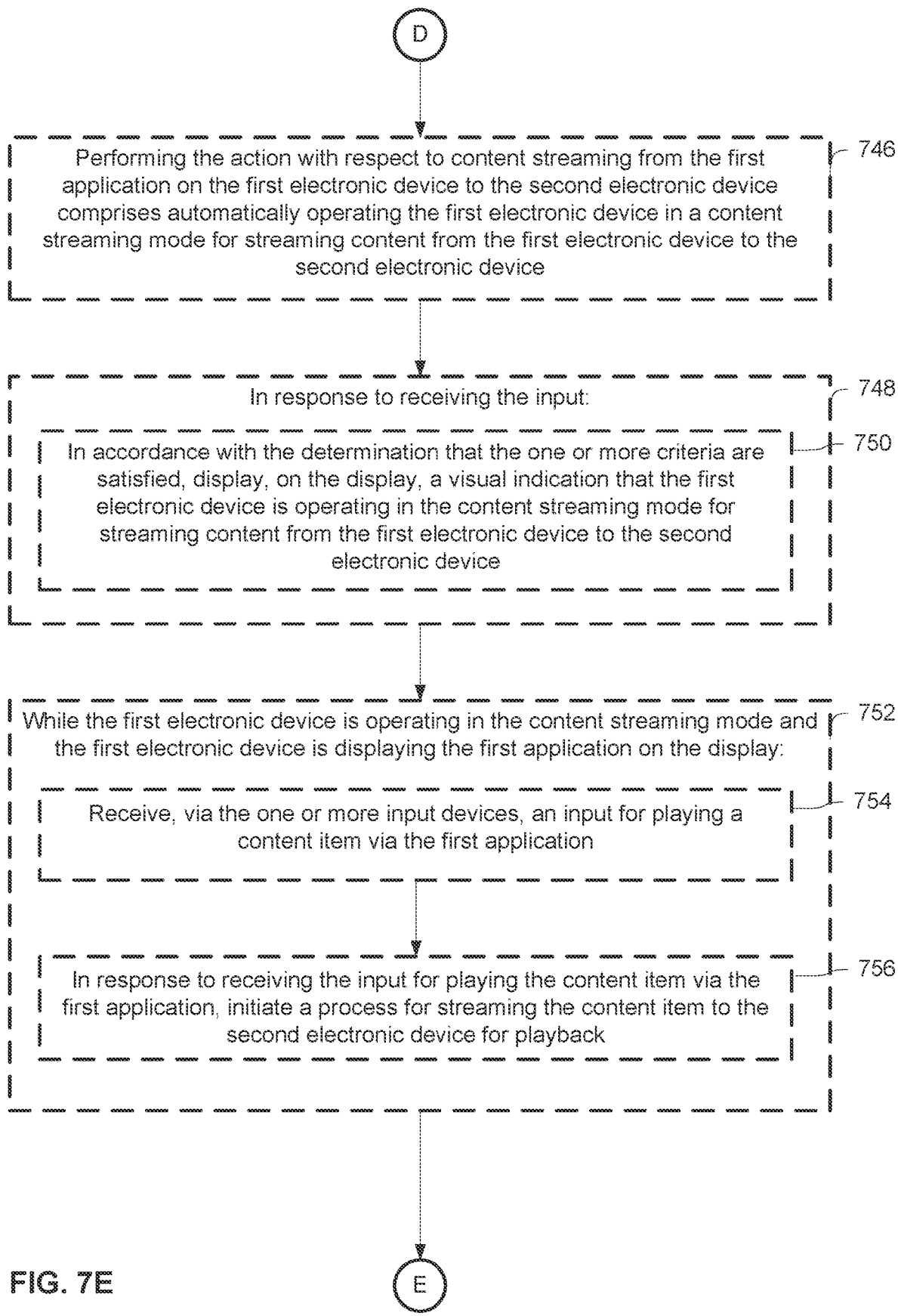
Figure 7F:
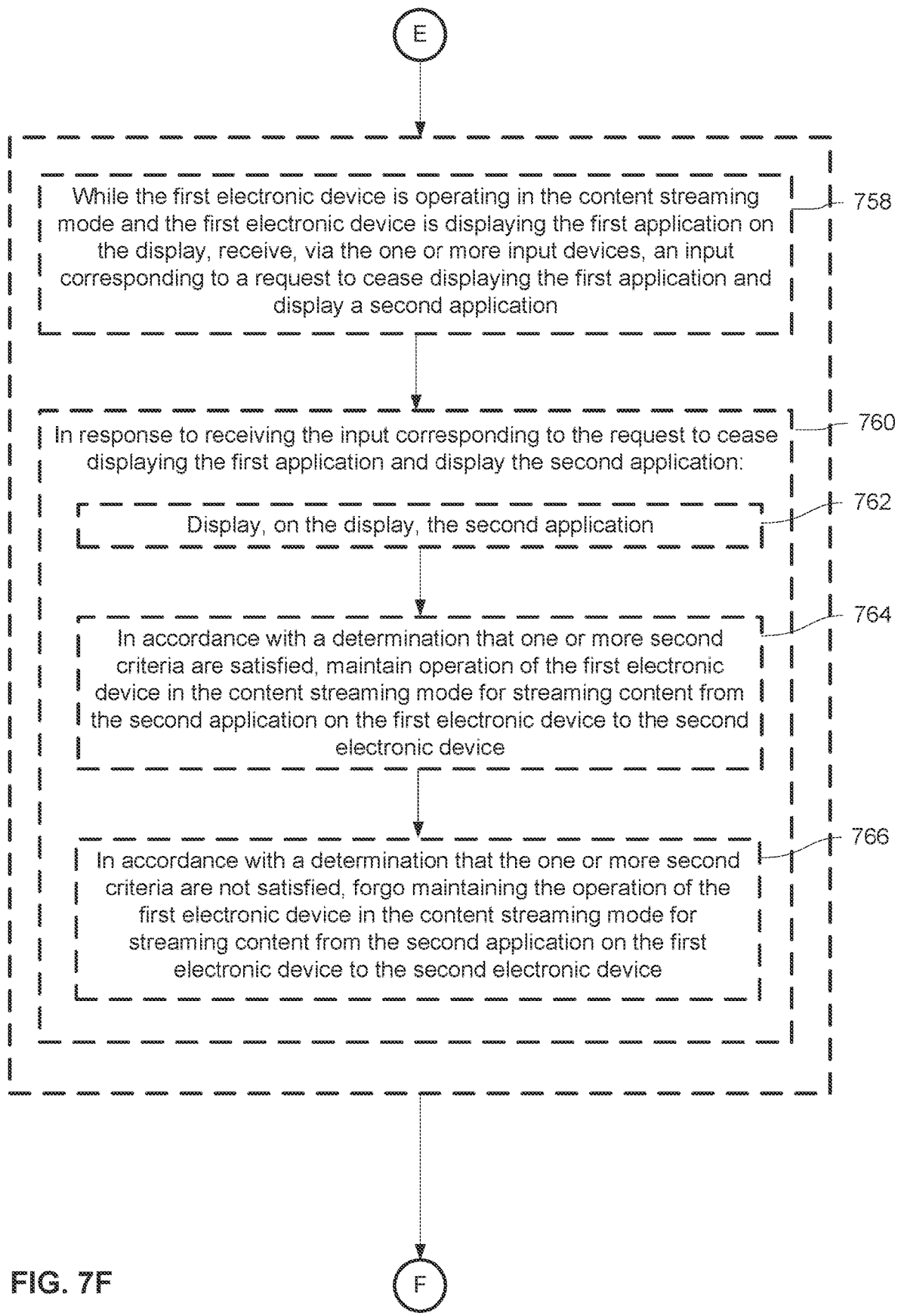
Figure 7G:
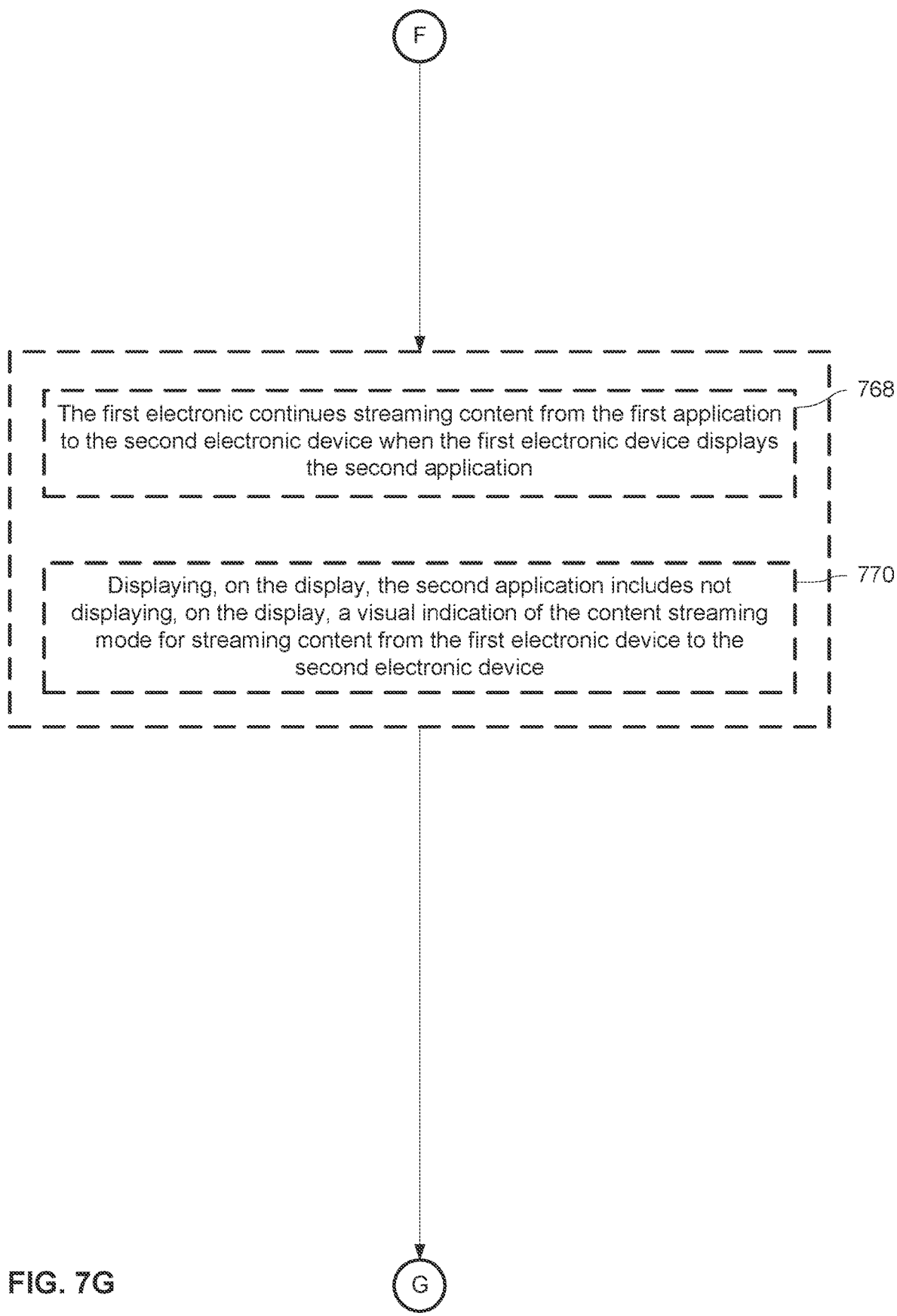
Figure 7H:
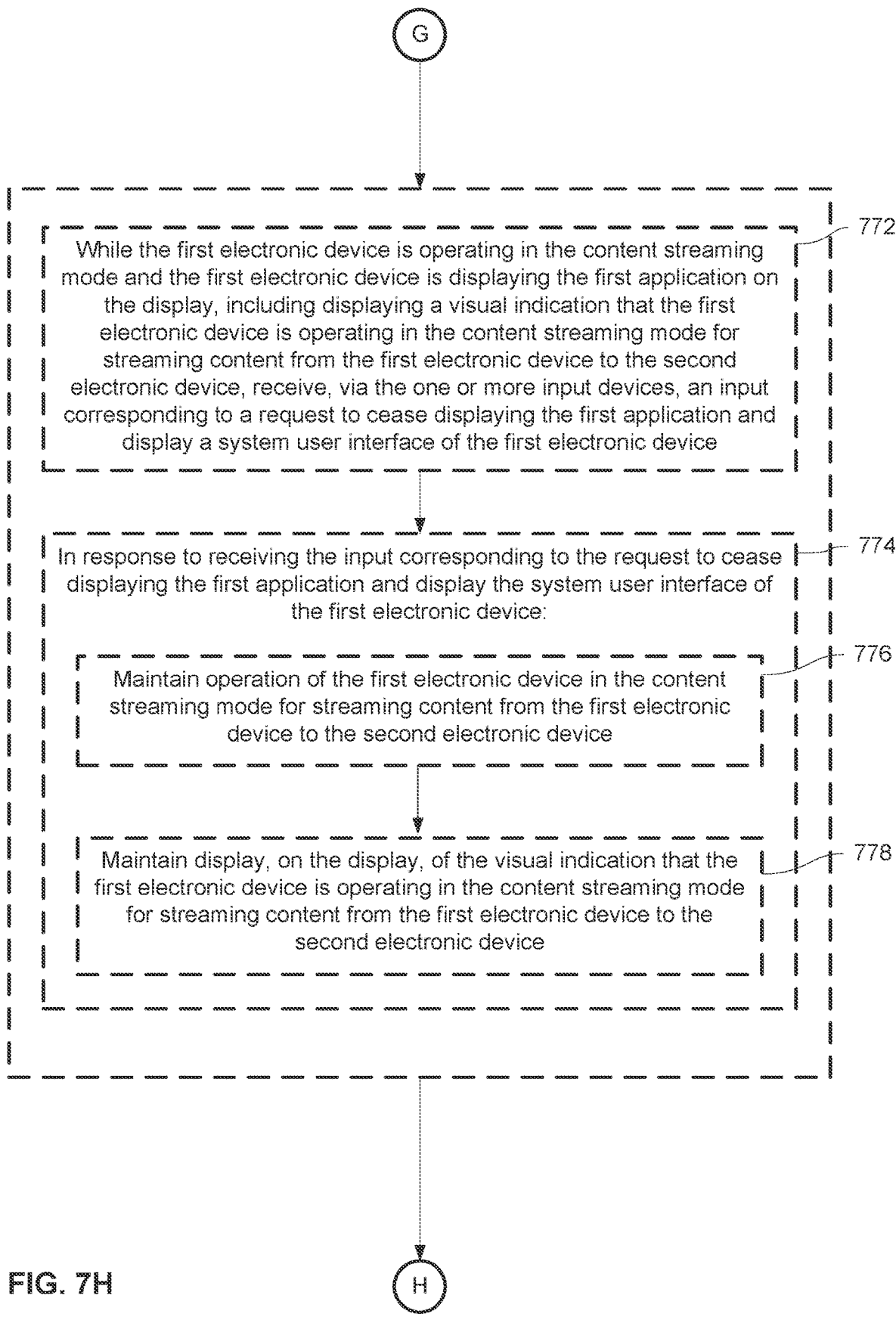
Figure 71:
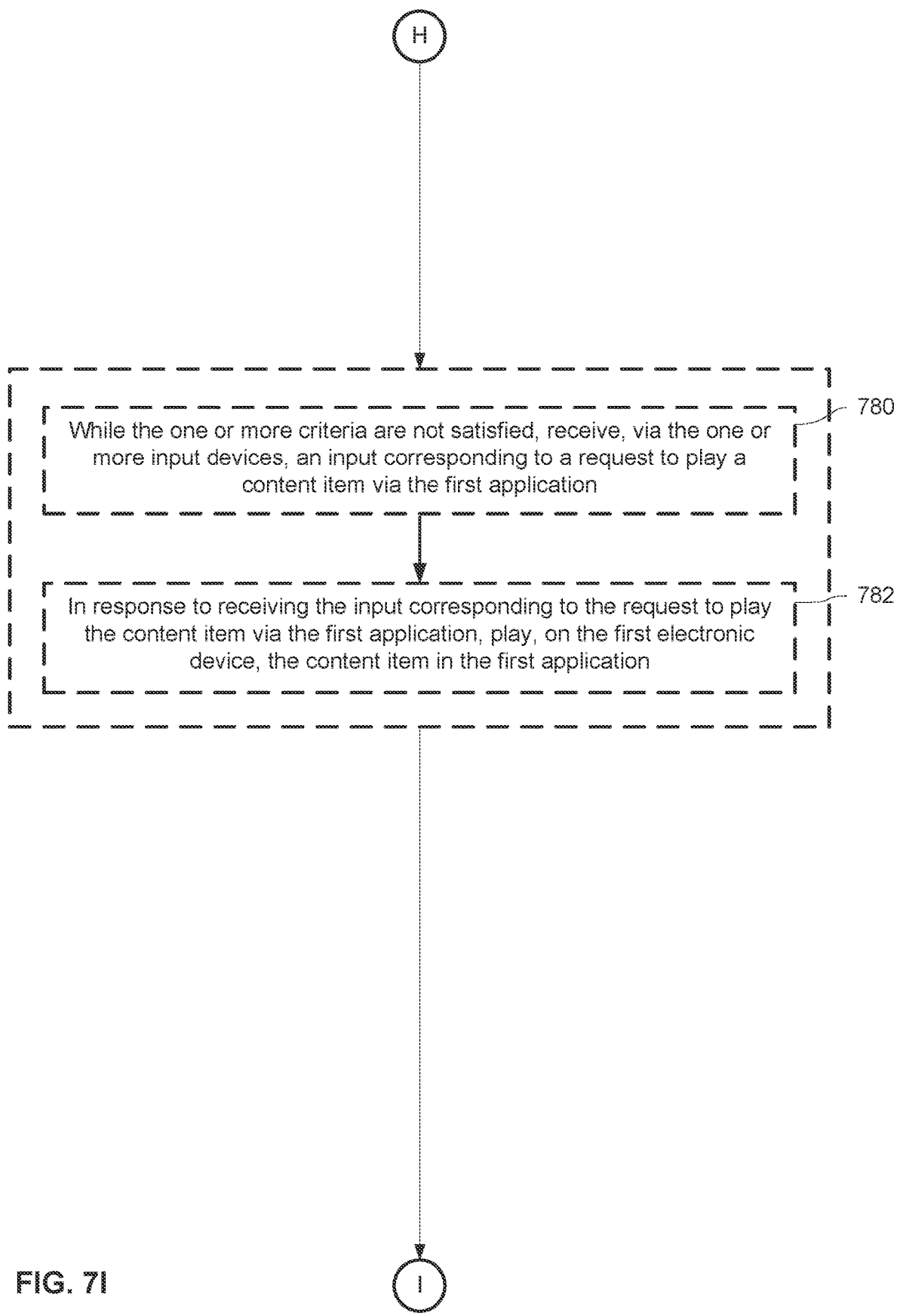
Figure 7J:
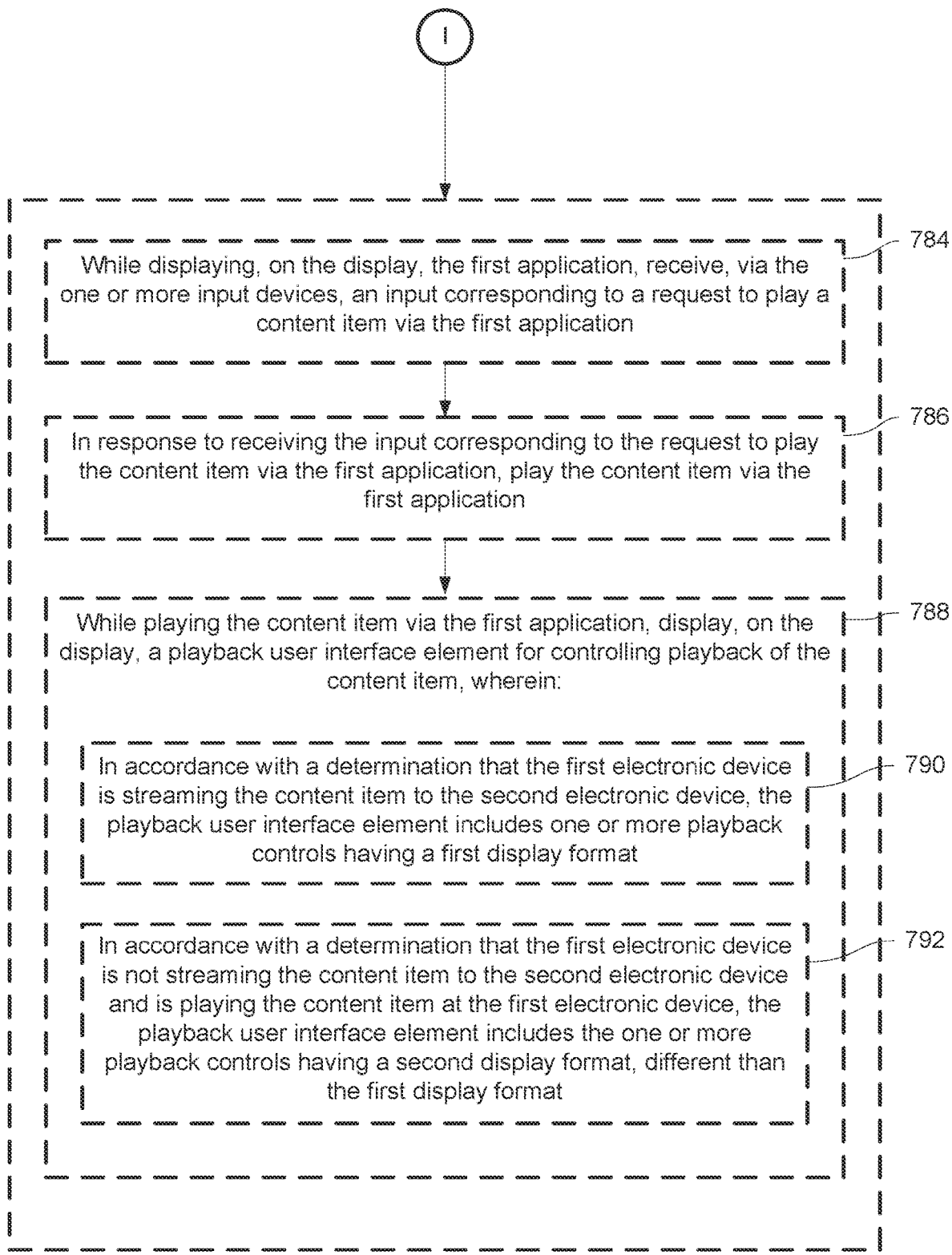

FIGS. 6A-6X illustrate exemplary ways in which a first electronic device operates in a streaming mode for streaming content to a second electronic device with a content application. The embodiments in these figures are used to illustrate the processes described below, including the processes described with reference to FIGS. 7A-7J.

FIGS. 6A-6H illustrate operation of the electronic device 500 when the confidence that the electronic device should operate in the streaming mode to stream content to a streaming destination does not reach either of a first or second predetermined confidence threshold. FIG. 6A illustrates an exemplary device 500 that includes touch screen 504. The electronic device is optionally in communication with the other electronic devices indicated in legend 602, including a first display device 602a, a second display device 602b, and a speaker 602c. The communication link between the electronic device 500 and the other electronic devices 602a-c allows the electronic device 500 to enter a streaming mode with respect to one or more of the electronic devices 602a-c to stream content to the respective electronic device with a content application, as will be described herein.

As shown in FIG. 6A, the electronic device 500 presents a home screen user interface. The home screen user interface includes a selectable option 452 that when selected (e.g., with contact 603) causes the electronic device 500 to present a first content application. The user selects (e.g., with contact 603) the selectable option 452. When the user selects the option 452, the electronic device 500 determines that the confidence 604 that the electronic device 500 should enter the streaming mode to automatically stream content with the first content application to a streaming destination (e.g., one of electronic devices 602a-c) is below a first predetermined threshold based on one or more criteria, such as the type of application that is selected, the number of times the user has streamed content from the first electronic device to one of the available streaming destinations, and whether the first electronic device is currently streaming content to a streaming destination when the application is selected. A second predetermined threshold that is greater than the first predetermined threshold is optionally also based on similar criteria.

FIG. 6B illustrates the electronic device 500 presenting the user interface of the first content application. The user interface includes a representation 606 of an item of content that is available through the first content application. Because the confidence that the electronic device 500 should enter the streaming mode did not meet either of the first or second predetermined confidence thresholds, the electronic device 500 does not enter the streaming mode. Any content that is played with the content application will automatically play on the electronic device 500 itself, rather than being automatically streamed to a streaming destination.

As shown in FIG. 6C, the user selects (e.g., with contact 603) the representation 606 of the item of content. As shown in FIG. 6D, in response to the user's selection, the electronic device 500 presents the content, which includes video content 608.

FIG. 6E illustrates the presentation of the video content 608 when the electronic device 500 is oriented in a landscape orientation. While presenting the video content 608, the electronic device 500 also presents a number of selectable options for controlling the playback of the content, including a streaming option 610a, a pause option 610b, a scrubber bar 610c, a skip forward option 610d, a skip backwards option 610e, a volume bar 610f, and an option 610g to close the full-screen landscape view of the video content 608.

As shown in FIG. 6F, the user selects (e.g., with contact 603) the streaming option 610a. In response, as shown in FIG. 6G, the electronic device presents a plurality of selectable options that, when selected, cause the electronic device 500 to stream the content to one of a plurality of available streaming destinations, including an option 612*a* to stream to the first display device, an option 612*b* to stream to the second display device, an option 612*c* to stream to the speaker, and an option 612*d* to forgo streaming the content and to instead continue to present the content on the electronic device 500 itself. The user selects (e.g., with contact 603) the option 612*a* to stream to content to the first display device.

In response to the user's selection, the first electronic device ceases to present the video content itself-instead, streaming the video content to the first display device 602*a*—and presents a plurality of playback control options, as shown in FIG. 6H. The playback control options include a streaming menu option 614*a*, a pause option 614*b*, a scrubber bar 614*c*, a skip forward option 614*d*, a skip backwards option 614*e*, a volume bar 614*f*, and an option 614*g* to cease displaying the playback control options. That is to say, the electronic device 500 presents controls 614*a*-614*g* that correspond to the controls 610*a*-610*g* that were presented while the electronic device 500 played the content on the electronic device 500 itself. However, while operating in the streaming mode, the controls 614*a*-614*g* are larger than the controls 610*a*-610*g* that were presented when the electronic device 500 presented the content because there is no need to leave room on the display 504 for presenting the content when it is being streamed to another electronic device. As indicated in legend 602, the electronic device 500 is currently streaming the content on the first display 602*a*, which includes streaming audio and video content.

FIGS. 6I-6O illustrate operation of electronic device 500 when the level of confidence that the electronic device 500 should operate in the streaming mode exceeds a first predetermined confidence threshold, but does not exceed a second, higher, predetermined confidence threshold. In FIG. 6I, the electronic device 500 presents the home screen user interface and the user selects (e.g., with contact 603) the first streaming application 452. In this example, when the user selects the first streaming application 452, the electronic device 500 determines that the confidence 604 that the streaming mode should be initiated with respect to a streaming destination exceeds the first predetermined threshold, but does not exceed the second predetermined threshold.

As shown in FIG. 6J, in response to the user's selection and the confidence level shown in FIG. 6I, the electronic device 500 presents the content application user interface and a menu 616 for selecting a streaming destination for the electronic device 500 to stream content to with the content application while in the streaming mode. The menu 616 includes an option 616*a* to select the first display as the streaming destination, an option 616*b* to select the second display as the streaming destination, and an option 616*c* to forgo entering the streaming mode and instead play content on the electronic device 500. The user selects (e.g., with contact 603) the option 616*a* to initiate the streaming mode with the first display as the streaming destination.

As shown in FIG. 6K, in response to the user's selection, the electronic device 500 enters the streaming mode to stream content to the first display 602*a*, as indicated in the legend 602. The electronic device 500 presents an indication 618*a* that it is operating in the streaming mode. Visual indications of the streaming mode are described in more detail below with reference to FIGS. 10A-110. The user selects (e.g., with contact 603) the representation 606 of the item of content. In response to the user's selection, the electronic device 500 streams the selected content to the first display device.

As shown in FIG. 6L, the legend 602 indicates that the first electronic device is streaming content to the first display device 602*a* and that the first display device 602*a* presents audio and video content. While streaming the content to the first display device 602*a*, the electronic device 500 presents the plurality of playback control options 614*a*-*g* described above with reference to FIG. 6H.

In FIG. 6M, the user once again selects (e.g., with contact 603) the option 452 to present the content application in a circumstance in which the electronic device 500 determines that the confidence 604 that the electronic device 500 should enter the streaming mode is between the first predetermined threshold and the second predetermined threshold.

In response to the user's selection, as shown in FIG. 6N, the electronic device 500 presents the content application including the menu 616 for selecting a streaming destination that the electronic device will stream content to with the content application while operating in the streaming mode. As shown in FIG. 6N, the user selects (e.g., with contact 603) the option 616*c* to forgo initiating the streaming mode, and instead play content from the content application on device 500 itself.

As shown in FIG. 6O, in response to the user's selection, the electronic device 500 presents the content application without entering the streaming mode. As indicated in legend 602, the electronic device is not streaming content to any of the available streaming destinations and is not configured to automatically stream content to any of the available streaming destinations. If the user were to select the representation 616 of the item of content, the content would play on the electronic device 500 such as in FIG. 6E. As shown in FIG. 6O, the electronic device 500 does not present the streaming mode visual indicator (e.g., streaming mode visual indicator 618 illustrated in FIG. 6K) because it is no longer operating in the streaming mode.

FIGS. 6P-6R illustrate operation of the electronic device 500 when the confidence that the electronic device should operate in the streaming mode exceeds the first and second predetermined confidence thresholds. FIG. 6P illustrates the home screen user interface. The user selects (e.g., with contact 603) the option 452 to present the content application. The electronic device 500 determines the confidence 604*a* that the streaming mode should be initiated with the first display device 602*a*, the confidence 604*b* that the streaming mode should be initiated with the second display device 602*b*, and the confidence 604*c* that the streaming mode should be initiated with the speaker device 602*c*. In some situations, the confidence for each available streaming destination is different from the confidence for the other remaining available streaming destinations because past user behavior with respect to each of the streaming destinations may be different. For example, if the user has streamed content to the first display device 602*a* with the content application more times than the user has streamed content to the second display device 602*b* with the content application, the confidence 604*a* that the electronic device 500 should enter the streaming mode with the first display device 602*a* is higher than the confidence 604*b* that the electronic device 500 should enter the streaming mode with the second display device 602*b*. As shown in FIG. 6P, the confidence 604*a* that the streaming mode should be initiated with the first display device 602*a* exceeds the first and second predetermined thresholds, whereas the confidences 604*b* and 604*c* that the streaming mode should be initiated with the second display device 602*b* or the speaker device 602*c* is below the first predetermined threshold.

In response to the user's selection and the determined confidences 604*a-c*, the electronic device presents the content application including an indication 620 that the streaming mode is being initiated to stream content with the content application to the first display device (e.g. because the confidence with respect to the first display device 602*a* was higher than the second threshold, and because the confidence with respect to the first display device 602*a* was higher than the confidences with respect to the other potential playback destinations—in some embodiments, if instead the confidence with respect to the second display device 602*b* was higher than the second threshold and higher than the confidences with respect to the other potential playback destination, device 500 would have optionally automatically initiated the streaming mode for the second display device 602*b* rather than the first display device 602*a*).

FIG. 6R illustrates the content application user interface once the streaming mode has been initiated. The electronic device 500 presents the indication 618*a* that it is operating in the streaming mode. As shown in legend 602 of FIG. 6R, the electronic device 500 is configured to automatically stream content with the content application to the first display device 602*a*. If the user were to select the representation 606 of the item of content, the electronic device 500 would stream the content to the first display device 602*a* in a manner similar to that described with reference to FIG. 6L.

FIG. 6S illustrates the home screen user interface. The user selects (e.g., with contact 603) an option 424 to present a messaging application. As shown in FIG. 6T, in response to the user's selection, the electronic device 500 presents the messaging application and does not initiate the streaming mode because the messaging application is optionally not an application with the primary function of presenting or streaming content.

In FIG. 6U, the electronic device 500 is streaming content to the first display device 602*a*, as indicated in the legend 602. The electronic device 500 presents a visual indication 618*b* that the electronic device 500 is operating in the streaming mode and currently streaming content to a playback destination (e.g., the second display device 602*a*). As mentioned previously, additional details regarding the various visual indications 618 corresponding to the streaming mode will be described in more detail with reference to FIGS. 10A-11G.

In FIG. 6V, the electronic device 500 presents the home screen user interface while continuing to stream content to the first display device 602*a* (e.g., in response to the user exiting the content application while device 500 was streaming content to the first display device 602*a*). The home screen user interface includes the indication 618*b* that the electronic device 500 is in the streaming mode and is currently streaming content to a playback destination (e.g., the first display device 602*a*). The user selects (e.g., with contact 603) an option 442 to present a second content application on the electronic device 500. The electronic device 500 determines that the confidence 604 that the electronic device 500 should operate in the streaming mode to automatically stream content with the second content application exceeds the second predetermined threshold, in part because the electronic device 500 is already operating in the streaming mode to stream content to the first display device 602*a* with the first content application.

As shown in FIG. 6W, in response to the user's selection, the electronic device 500 presents the user interface of the second content application. The user interface includes an indication 622 that the electronic device 500 will operate in the streaming mode to automatically stream content to the first display device 602*a* with the second content application. The electronic device 500 continues to present the indication 618*b* that the electronic device 500 is operating in the streaming mode and is currently streaming content to a playback destination.

FIG. 6X illustrates the messaging application user interface (e.g., in response to the user exiting the second content application, and requesting display of the messaging application while device 500 was streaming content to the first display device 602*a*). As indicated in the legend 602 of FIG. 6X, the electronic device 500 is operating in the streaming mode and streaming content to the first display device 602*a*. The electronic device 500 does not present the streaming mode visual indicator while displaying the messaging user interface, because the electronic device 500 is streaming content to the first display device using a content application such as the first content application or the second application, not the messaging application, and because the messaging application is optionally not an application for which a primary purpose is to provide or stream content.

FIGS. 7A-7J are flow diagrams illustrating a method 700 of operating a first electronic device in a streaming mode for streaming content to a second electronic device with a content application. The method 700 is optionally performed at an electronic device such as device 100, device 300, device 500, device 501, device 510, and device 591 as described above with reference to FIGS. 1A-1B, 2-3, 4A-4B and 5A-5J. Some operations in method 700 are, optionally, combined and/or order of some operations is, optionally, changed.

As described below, the method 700 provides ways to operate a first electronic device in a streaming mode for streaming content to a second electronic device with a content application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device (e.g., electronic device 500, a smartphone, media player, tablet or wearable device including a touch screen, a personal computer including or in communication with one or more input devices such as a keyboard, trackpad, or touch screen, or a set-top box in communication with a display, such as a television, a speaker, and a remote that includes a touch panel or touch screen.) with one or more processors and memory receives (702), via the one or more input devices, an input corresponding to a request to display, on the display, a first application, such as contact 603 illustrated in FIG. 6A. In some examples, the first application is optionally a content application, such as a video or audio playback or streaming application. In some embodiments, the input is a request to launch, open or otherwise display the content application on the first electronic device, such as selecting an icon for displaying the content application on the first electronic device.

In some embodiments, in response to receiving the input (704), the first electronic device displays (706), on the display, the first application, such as the content application illustrated in FIG. 6B. In some examples, the first electronic device optionally presents a user interface of the first application. In some embodiments, the user interface includes a plurality of representations of items of content (e.g., video or audio content) that when selected cause a respective item of content to be presented to the user.). In accordance with a determination that one or more criteria are satisfied, the first electronic device performs (708) an action with respect to content streaming from the first application on the first electronic device to a second electronic device, such as displaying the streaming destination menu 616 illustrated in FIG. 6J.

In some examples, the one or more criteria optionally include criteria satisfied based on a number of times the user has streamed content from the first electronic device to the second electronic device, a number of times the user has streamed content with the first application to any playback destination (e.g., the second electronic device or other electronic devices with content playback capabilities), and/or whether the first application is a content consumption application (e.g., an application in which the electronic device is able to play content, such as music, videos, movies, television shows, etc.). In some embodiments, the action with respect to content streaming is initiating a content streaming mode on the first electronic device with the second electronic device (e.g., such that content played on the first electronic device will be streamed from the first electronic device to the second electronic device for playback) or displaying, on the display in communication with the first electronic device, a prompt to select a playback destination of one or more available playback destinations including the second electronic device to initiate the content streaming mode on the first electronic device with respect to the selected playback destination. The content streaming mode optionally includes configuring the first and second electronic devices to stream a selected item of content from the first application (or from a different content application on the first electronic device) on the first electronic device to the second electronic device (e.g., playing the content on the second device by streaming it from the first electronic device to the second electronic device, optionally with the ability to control the playback using the first electronic device). While in the content streaming mode, when the first electronic device detects a user input for playing an item of content, the item of content is optionally streamed to a playback destination to play the content (e.g., instead of the content being played on the first electronic device itself).

In some embodiments, accordance with a determination that the one or more criteria are not satisfied, such as confidence 604 illustrated in FIG. 6A, the first electronic device forgoes (710) performing the action with respect to content streaming from the first application on the first electronic device to the second electronic device, such as in FIG. 6B.

In some examples, if the criteria are not satisfied, the first electronic device optionally does not initiate the content streaming mode or present a prompt to select a playback destination to initiate the content streaming mode. When the first electronic device is not operating in the content streaming mode, in response to a user input for playing an item of content, the first electronic device optionally plays the selected content on the first electronic device itself, rather than streaming the content to a playback destination. In some embodiments, while the first electronic device is not operating in the content streaming mode, the user is able to select an option to stream the selected content to a playback destination which, in some embodiments, also initiates the content streaming mode. Initiating the content streaming mode optionally causes subsequently selected content to also be streamed to the playback destination without the user needing to re-enable the content streaming mode. In some embodiments, the content is streamed without entering the content streaming mode. In some embodiments, the selected content is streamed to the playback destination but subsequently-selected content is not streamed and is instead played natively on the first electronic device, unless and until the user affirmatively provides another input to the first electronic device to cause the subsequently-selected content to the streamed to the second (or other) electronic device.

The above-described manner of automatically performing a content streaming action when the criteria are satisfied in response to a user providing input for displaying an application on the first electronic device allows the first electronic device to automatically perform the content streaming action in situations in which the user is likely to wish to perform content streaming from the first electronic device to a second electronic device, which simplifies interactions between the user and the electronic device and enhances the operability of the electronic device (e.g., by performing the content streaming action in response to the input to present the first application without requiring further input to perform the content streaming action), which, additionally, reduces power and improves battery life of the electronic device by enabling the user to use the electronic device more quickly and efficiently.

In some embodiments, the one or more criteria are satisfied when a first set of one or more criteria are satisfied, or a second set of one or more criteria are satisfied (712), such as the first confidence 604 threshold in FIG. 6I or the second confidence 604a threshold in FIG. 6P. In some examples, the first set of criteria optionally correspond to medium-confidence criteria and the second set of one or more criteria optionally correspond to high-confidence criteria. The first set of one or more criteria and/or the second set of one or more criteria optionally include criteria satisfied based on a number of times the user has streamed content from the first electronic device to the second electronic device, a number of times the user has streamed content with the first application to any playback destination (e.g., the second electronic device or other electronic devices with content playback capabilities), whether the first electronic device is currently streaming content to the second electronic device (e.g., using a second application) and/or whether the first application is a content consumption application (e.g., an application in which the electronic device is able to play content, such as music, videos, movies, television shows, etc.). In some embodiments, the first set of one or more criteria correspond to a first confidence level that automated content streaming to the second electronic device should be enabled (714), such as the first confidence 604 threshold illustrated in FIG. 6I. In some examples, the first confidence level is optionally medium confidence. For example, the first set of one or more criteria include a criterion that is satisfied when the number of times the user has streamed content from the first electronic device to the second electronic device meets a first predetermined threshold, a criterion that is satisfied when the number of times the user has streamed content with the first application to any playback destination (e.g., the second electronic device or other electronic devices with content playback capabilities) meets a first predetermined threshold, a criterion that is satisfied when the first electronic device is currently streaming content to the second electronic device (e.g., using a second application) and/or a criterion that is satisfied when the first application is a content consumption application (e.g., an application in which the electronic device is able to play content, such as music, videos, movies, television shows, etc.). In some embodiments, not all of the above-mentioned criteria must be satisfied in order to satisfy the first set of one or more criteria corresponding to the first confidence level. For example, satisfying a predetermined number of possible criteria (e.g., 3) satisfies the first one or more criteria or the one or more criteria are optionally weighted and the first one or more criteria are satisfied when enough criteria "weight" are satisfied. In some embodiments, the second set of one or more criteria correspond to a second confidence level, higher than the first confidence level, that automated content streaming to the second electronic device should be enabled (716), such as the second confidence 604*a* threshold illustrated in FIG. 6P. In some examples, the second confidence level is optionally high confidence. In some embodiments, the second criteria encompass the first criteria and add further criteria, making the second criteria a higher threshold to meet than the first criteria. For example, the second set of one or more criteria include a criterion that is satisfied when the number of times the user has streamed content from the first electronic device to the second electronic device meets a second predetermined threshold, a criterion that is satisfied when the number of times the user has streamed content with the first application to any playback destination (e.g., the second electronic device or other electronic devices with content playback capabilities) meets a second predetermined threshold, a criterion that is satisfied when the first electronic device is currently streaming content to the second electronic device (e.g., using a second application) and/or a criterion that is satisfied when the first application is a content consumption application (e.g., an application in which the electronic device is able to play content, such as music, videos, movies, television shows, etc.). In some embodiments, not all of the above-mentioned criteria must be satisfied in order to satisfy the first set of one or more criteria corresponding to the first confidence level. For example, satisfying a predetermined number of possible criteria (e.g., 4) satisfies the first one or more criteria or the one or more criteria are optionally weighted and the first one or more criteria are satisfied when enough criteria "weight" are satisfied. The second thresholds associated with the second set of one or more criteria are optionally higher than the first thresholds associated with the first set of one or more criteria. Optionally, a higher number of the subset of the criteria need to be satisfied to meet the second set of one or more criteria than the number of the subset of the criteria that to be met to meet the first set of one or more criteria or, optionally, a higher amount of criteria "weight" needs to be satisfied in order to meet the second set of one or more criteria than the amount of criteria "weight" that needs to be satisfied to meet the first set of one or more criteria. In some embodiments, in accordance with a determination that the first set of one or more criteria are satisfied, the action with respect to content streaming from the first application on the first electronic device to the second electronic device comprises displaying, on the display a prompt, such as streaming destination menu 616, that includes a selectable option 616*a* or 616*b* for designating the second electronic device as a content streaming destination of the first electronic device (718), such as in FIG. 6N. In some embodiments, the prompt further includes selectable options for designating other electronic devices as the streaming destination and a selectable option for playing content natively on the first electronic device itself without entering the streaming mode. In response to detecting selection of one of the selectable options corresponding to a streaming destination, the first electronic device optionally enters the streaming mode to stream content to the selected streaming destination. In some embodiments, such as in FIG. 6Q, in accordance with a determination that the second set of one or more criteria are satisfied, the action with respect to content streaming from the first application on the first electronic device to the second electronic device comprises automatically operating the first electronic device in a content streaming mode for streaming content from the first electronic device to the second electronic device (720). In some examples, automatically operating optionally includes without further user input after the input to display the first application. In some embodiments, the first electronic device enters the streaming mode, which causes the electronic device to automatically stream content to the second electronic device in response to a user input to present the content.

The above-described manner of identifying two sets of criteria allows the first electronic device to perform different actions with respect to content streaming from the first electronic device to the second electronic device depending on which criteria are satisfied, which simplifies interactions between the user and the electronic device and enhances the operability of the electronic device (e.g., by tailoring the electronic device's actions to the criteria that apply), which, additionally, reduces power and improves battery life of the electronic device by enabling the user to use the electronic device more quickly and efficiently.

In some embodiments, the one or more criteria include a criterion that is satisfied when the first application is a streaming content application (722), such as the content application illustrated in FIG. 6Q. In some examples, a streaming content application is optionally an application with a primary purpose of providing content, such as audio content and video content including TV shows and movies.

The above-described manner of performing the action with respect to content streaming from the first electronic device to the second electronic device when the first application is a streaming content application allows the first electronic device to perform the action with respect to streaming from the first electronic device to the second electronic device when the first application supports content streaming, which simplifies interactions between the user and the electronic device and enhances the operability of the electronic device (e.g., by performing the action when the first application is presented without requiring further user input to do so), which, additionally, reduces power and improves battery life of the electronic device by enabling the user to use the electronic device more quickly and efficiently.

In some embodiments, the first application is a streaming content application in accordance with a determination that the first application is designated as a first type of application, such as the streaming application illustrated in FIG. 6Q, and the first application is not a streaming content application in accordance with a determination that the first application is designated as a second type of application, different than the first type of application (724), such as the messaging application illustrated in FIG. 6X. In some embodiments, application type is designated by a third party, such as an operating system of the electronic device, an application store, or a developer or publisher of the first application.

Thus, in some embodiments, which applications are considered streaming content applications, and which are not, are predetermined and set by an entity other than the user of the electronic device or the electronic device itself. The above-described manner of determining whether the first application is a streaming content application based on an application designation allows the first electronic device to efficiently determine whether the first application is a streaming content application, which simplifies interactions between the user and the electronic device and enhances the operability of the electronic device (e.g., by leveraging existing application classifications to determine whether or not to perform the action with respect to streaming content), which, additionally, reduces power and improves battery life of the electronic device by enabling the user to use the electronic device more quickly and efficiently.

In some embodiments, the one or more criteria include a criterion that is satisfied when the first electronic device has been used to stream content to the second electronic device more than a predetermined number of times (726), such as confidence 604*a* illustrated in FIG. 6P. In some examples, the predetermined number of times is optionally 3, 5, 7 or some other number of times. In some embodiments, the more times the user streams content from the first electronic device to the second electronic device, the more confident the first electronic device is that content should automatically be streamed to the second electronic device when the first electronic device is in communication with the second electronic device.

The above-described manner of performing the action with respect to streaming content from the first electronic device to the second electronic device based on the number of times the first electronic device has streamed content to the second electronic device allows the first electronic device to automatically stream content to the second electronic device if the first electronic device has streamed to the second electronic device many times in the past, which simplifies interactions between the user and the electronic device and enhances the operability of the electronic device (e.g., by automatically performing an action that has been performed many times in the past), which, additionally, reduces power and improves battery life of the electronic device by enabling the user to use the electronic device more quickly and efficiently.

In some embodiments, such as in FIG. 6V, the one or more criteria include a criterion that is satisfied when the first electronic device 500 was streaming content to the second electronic device 602*a* when the input 603 corresponding to the request to display the first application 442 on the first electronic device was received (728). In some embodiments, the first electronic device was streaming content to the second electronic device using a second application when the request to display the first application on the first electronic device was received.

The above-described manner of performing the action with respect to streaming content from the first electronic device to the second electronic device based on whether the first electronic device is already streaming content to the second electronic device allows the first electronic device to continue to stream content to the second electronic device from multiple applications, which simplifies interactions between the user and the electronic device and enhances the operability of the electronic device (e.g., by remaining in the streaming mode without requiring additional user input to do so), which, additionally, reduces power and improves battery life of the electronic device by enabling the user to use the electronic device more quickly and efficiently.

In some embodiments, such as in FIG. 6N, performing the action with respect to content streaming from the first application on the first electronic device 500 to the second electronic device 602*a* comprises displaying a prompt 616 that includes a selectable option 616*a* for designating the second electronic device 602*a* as a content streaming destination of the first electronic device 500 (730). In some examples, the prompt optionally further includes, in addition to an option to designate the second electronic device as the content streaming destination of the first electronic device, selectable options that, when selected, cause the electronic device to initiate the streaming mode with respect to different electronic devices as the streaming destination and a selectable option that, when selected, causes the first electronic device to present the content natively on the first electronic device itself (e.g., rather than entering the streaming mode).

The above-described manner of displaying a prompt that includes selectable options for designating the content streaming destination allows the first electronic device to be configured to stream content before the content begins playing, which simplifies interactions between the user and the electronic device and enhances the operability of the electronic device, which, additionally, reduces power and improves battery life of the electronic device by enabling the user to use the electronic device more quickly and efficiently by reducing user errors and thus reducing inputs required to correct user error.

In some embodiments, such as in FIG. 6N, the prompt includes a selectable option 616*b* for designating a third electronic device 602*b*, different than the second electronic device 602*a*, as the content streaming destination of the first electronic device 500 (732). In some examples, the second and third electronic devices are optionally display devices, set-top box devices, speaker devices, or other types of devices configured to present content such as audio and video content.

The above-described manner of providing multiple options for streaming destinations allows the first electronic device to give the user a choice of which electronic device to use as the streaming destination, which simplifies interactions between the user and the electronic device and enhances the operability of the electronic device (e.g., by presenting multiple options at once), which, additionally, reduces power and improves battery life of the electronic device by enabling the user to use the electronic device more quickly and efficiently.

In some embodiments, such as in FIG. 6N, the prompt 616 includes a selectable option 616*c* for forgoing designating a content streaming destination of the first electronic device 500 (734). In some embodiments, in response to detecting selection of the selectable option for forgoing designating a content streaming destination, the first electronic device will play content natively on the first electronic device in response to an input requesting to present content, instead of streaming the content to a content playback destination.

The above-described manner of presenting an option to forgo designating a streaming destination allows the first electronic device to play content on the first electronic device itself, which simplifies interactions between the user and the electronic device and enhances the operability of the electronic device, which, additionally, reduces power and improves battery life of the electronic device by enabling the user to use the electronic device more quickly and efficiently.

In some embodiments, such as in FIG. 6K, while the one or more criteria are satisfied and the first electronic device 500 is displaying the first application on the display 504 (736), such as the content application, the electronic device 500 receives (738), via the one or more input devices, an input 603 for playing a content item 606 via the first application. In some embodiments, the electronic device receives selection of the content item in the first application or selection of an input for playing the first content item, such as an option presented in the first application user interface or in another user interface, such as a system user interface. In some embodiments, other inputs are possible. In some embodiments, such as in FIGS. 6K-L, in response to receiving the input 603 for playing the content item 606 via the first application (740), in accordance with a determination that a respective content streaming destination 602*a* was designated from the prompt 616, the first electronic device 500 initiates (742) a process for streaming the content item to the respective content streaming destination 602*a* for playback. In some embodiments, when the first electronic device is operating in the streaming mode because the user selected a content playback destination other than the first electronic device in the displayed prompt, the content is streamed to the respective content streaming destination and presented on the respective content streaming destination. In some embodiments, such as in FIGS. 6C-D, in accordance with a determination that no content streaming destination was designated from the prompt 616, the first electronic device 500 plays (744) the content item 608 on the first electronic device 500. In some embodiments, the first electronic device does not enter the streaming mode because the user did not select a content playback destination other than the first electronic device in the displayed prompt, and the content is played on the first electronic device.

The above-described manner of presenting the content on either the second electronic device or the first electronic device based on user input to select or forgo selecting a streaming destination allows the first electronic device to provide the user with options for how to present content, which simplifies interactions between the user and the electronic device and enhances the operability of the electronic device, which, additionally, reduces power and improves battery life of the electronic device by enabling the user to use the electronic device more quickly and efficiently.

In some embodiments, such as in FIGS. 6Q-R, performing the action with respect to content streaming from the first application on the first electronic device 500 to the second electronic device 602*a* comprises automatically operating the first electronic device 500 in a content streaming mode for streaming content from the first electronic device 500 to the second electronic device 602*a* (746). In some examples, automatically operating optionally includes without further user input after the input to display the first application. In some embodiments, in response to detecting a user input for opening the first application, the electronic device optionally opens the first application and, without further input from the user, enters the streaming mode for streaming content from the first electronic device to the second electronic device with the first application. While in the streaming mode, content is automatically streamed to the second electronic device in response to a user input for presenting the content. As shown in FIG. 6Q, upon entering the streaming mode, the electronic device 500 presents a banner 620 indicating that the streaming mode is being entered. When the electronic device is a tablet, the banner is presented in the center of an application that is displayed full-screen. When the electronic device is a tablet and the application is presented in a split-screen view, the banner is presented either in the center of the screen or centered in the user interface of the content application (e.g., on the side of the display that has the user interface for the content application).

The above-described manner of automatically operating the first electronic device in the streaming mode allows the first electronic device to stream content to a playback destination automatically, which simplifies interactions between the user and the electronic device and enhances the operability of the electronic device (e.g., by streaming the content without requiring additional user inputs to configure the first electronic device to stream the content), which, additionally, reduces power and improves battery life of the electronic device by enabling the user to use the electronic device more quickly and efficiently.).

In some embodiments, such as in FIGS. 6P-6R, in response to receiving the input 603 (748), in accordance with the determination that the one or more criteria 604*a* are satisfied, the first electronic device 500 displays (750), on the display 504, a visual indication 618*a* that the first electronic device 500 is operating in the content streaming mode for streaming content from the first electronic device 500 to the second electronic device 602*a*. In some examples, the visual indication that the first electronic device is operating in the content streaming mode is optionally presented in a system indicator region of the electronic device. In some embodiments, one or more steps of process 1100 are performed by the first electronic device when presenting the streaming mode visual indicator.

The above-described manner of presenting the streaming mode visual indicator allows the first electronic device to convey to the user that it is operating in the streaming mode, which simplifies interactions between the user and the electronic device and enhances the operability of the electronic device (e.g., by making it clear to the user whether or not content will be streamed when it is played), which, additionally, reduces power and improves battery life of the electronic device by enabling the user to use the electronic device more quickly and efficiently by reducing user errors and thus reducing inputs required to correct user error.

In some embodiments, such as in FIGS. 6K-L, while the first electronic device 500 is operating in the content streaming mode and the first electronic device 500 is displaying the first application on the display 504 (752), the first electronic device 500 receives (754), via the one or more input devices, an input 603 for playing a content item 606 via the first application. In some examples, the electronic device is optionally receiving an indication that the user selected a representation of the content item or that the user selected a selectable option for playing the content item. In some embodiments, such as in FIGS. 6K-L, in response to receiving the input 603 for playing the content item 606 via the first application, the first electronic device 500 initiates (756) a process for streaming the content item to the second electronic device 602*a* for playback. In some embodiments, the electronic device initiates the process without receiving an additional input for streaming the content from the first electronic device to the second electronic device.

The above-described manner of streaming the content in response to detecting a user input for playing the content while the first electronic device is operating in the streaming mode allows the first electronic device to present content on the second electronic device, which simplifies interactions between the user and the electronic device and enhances the operability of the electronic device (e.g., by presenting the content on an electronic device that may be better suited for presenting content), which, additionally, reduces power and improves battery life of the electronic device by enabling the user to use the electronic device more quickly and efficiently.

In some embodiments, such as in FIG. 6U-6V, while the first electronic device 500 is operating in the content streaming mode and the first electronic device 500 is displaying the first application on the display 504, the first electronic device receives (758), via the one or more input devices, an input 603 corresponding to a request to cease displaying the first application and display a second application 442. In some examples, the input optionally includes a sequence of one or more inputs, such as an input to close the user interface of the first application on the first electronic device followed by a user input to present the user interface of the second application on the first electronic device. In some embodiments, such as in FIG. 6V-W, in response to receiving the input 603 corresponding to the request to cease displaying the first application and display the second application (760), the first electronic device 500 displays (762), on the display 504, the second application, such as the second content application illustrated in FIG. 6W. In some embodiments, the first electronic device presents, on the display, the user interface of the second application. In some embodiments, such as in FIGS. 6V-W, in accordance with a determination that one or more second criteria 604 are satisfied, the first electronic device 500 maintains (764) operation of the first electronic device 500 in the content streaming mode for streaming content from the second application, such as the second content application illustrated in FIG. 6W, on the first electronic device to the second electronic device 602a. In some examples, the one or more second criteria optionally include a criterion that is satisfied when the second application is a streaming media application. The first electronic device optionally remains in the streaming mode and is configured to stream content with the second application from the first electronic device to the second electronic device. In some embodiments, such as in FIGS. 6S-6T, in accordance with a determination that the one or more second criteria are not satisfied, the first electronic device 500 forgoes (766) maintaining the operation of the first electronic device in the content streaming mode for streaming content from the second application, such as the messaging application illustrated in FIG. 6T, on the first electronic device to the second electronic device 602a. In some examples, the first electronic device optionally does not stream content with the second application from the first electronic device to the second electronic device. In some embodiments, the first electronic device remains in the streaming mode to continue to stream content with the first application from the first electronic device to the second electronic device.

The above-described manner of determining whether or not to operate the first electronic device in the streaming mode to stream content with the second application allows the first electronic device to use the streaming mode for multiple applications when appropriate, which simplifies interactions between the user and the electronic device and enhances the operability of the electronic device (e.g., by remaining configured to stream content when the criteria are satisfied without requiring further user input to set up the streaming mode again), which, additionally, reduces power and improves battery life of the electronic device by enabling the user to use the electronic device more quickly and efficiently.

In some embodiments, such as in FIG. 6X, the first electronic device 500 continues (768) streaming content from the first application to the second electronic device 602a when the first electronic device displays the second application, such as the messaging application illustrated in FIG. 6X. In some embodiments, the first electronic device remains in the streaming mode to stream content with the first application to the second electronic device. In some embodiments, such as in FIG. 6X, the first electronic device 500 displaying (770), on the display, the second application, such as the messaging application illustrated in FIG. 6X, includes not displaying, on the display, a visual indication of the content streaming mode for streaming content from the first electronic device to the second electronic device 602a. In some embodiments, the first electronic device presents a streaming mode visual indicator when it is in the streaming mode while presenting a system user interface or a user interface of a streaming content application (e.g., the first application). In some embodiments, presenting the streaming mode visual indicator includes performing one or more steps of process 1100. The second application is optionally a non-streaming application, such as a social media application, a messaging application, a productivity application, a game application, or some other application with a primary purpose other than presenting audio content or video content such as TV shows or movies. In accordance with a determination that the first electronic device is presenting the user interface of a non-streaming application, the first electronic device optionally does not present the streaming mode visual indicator.

The above-described manner of presenting the streaming mode visual indication when the first electronic device presents a streaming content application and not presenting the streaming mode visual indication when the first electronic device presents a non-streaming application allows the first electronic device to avoid creating confusing by implying that content played in the non-streaming application will be streamed to the second electronic device, which simplifies interactions between the user and the electronic device and enhances the operability of the electronic device (e.g., by providing clear indications to the user to reduce user error), which, additionally, reduces power and improves battery life of the electronic device by enabling the user to use the electronic device more quickly and efficiently.

In some embodiments, such as in FIGS. 6U-6V, while the first electronic device 500 is operating in the content streaming mode and the first electronic device is displaying the first application, such as the content application illustrated in FIG. 6U, on the display 504, including displaying a visual indication 618b that the first electronic device is operating in the content streaming mode for streaming content from the first electronic device to the second electronic device 602a, the first electronic device receives (772), via the one or more input devices, an input corresponding to a request to cease displaying the first application and display a system user interface of the first electronic device, such as the home screen user interface illustrated in FIG. 6V. In some embodiments, a user interface of the operating system of the first electronic device, as opposed to a user interface of a user-installed application on the first electronic device, is displayed. In some embodiments, the first electronic device displays the visual indication that the first electronic device is operating in the contents streaming mode using one or more steps of process 1100. The streaming mode visual indicator is optionally displayed in a system indicator region of the user interface. In some embodiments, such as in FIG. 6V, in response to receiving the input corresponding to the request to cease displaying the first application and display the system user interface of the first electronic device (774), such as the home screen user interface illustrated in FIG. 6V, the first electronic device maintains (776) operation of the first electronic device in the content streaming mode for streaming content from the first electronic device to the second electronic device 602a, as indicated in the legend 602 of FIG. 6V. In some embodiments, the first electronic device continues to stream the content to the second electronic device and the second electronic device continues to present the content. In some embodiments, such as in FIG. 6V, the first electronic device 500 maintains (778) display, on the display 504, of the visual indication 618b that the first electronic device is operating in the content streaming mode for streaming content from the first electronic device to the second electronic device 602a. In some examples, while the first electronic device continues to stream the content to the second electronic device and while the first electronic device presents the system user interface, the first electronic device optionally continues to present the streaming mode visual indicator in the system indicator region.

The above-described manner of continuing to present the streaming mode visual indicator when the first electronic device presents a system user interface allows the first electronic device to convey to the user that the content continues to be streamed while the system user interface is displayed, which simplifies interactions between the user and the electronic device and enhances the operability of the electronic device, which, additionally, reduces power and improves battery life of the electronic device by enabling the user to use the electronic device more quickly and efficiently.

In some embodiments, such as in FIGS. 6C-D, while the one or more criteria (e.g., confidence 604 illustrated in FIG. 6A) are not satisfied, the first electronic device 500 receives (780), via the one or more input devices, an input 603 corresponding to a request to play a content item 606 via the first application. In some embodiments, the first electronic device is not operating in the streaming mode. In some embodiments, such as in FIGS. 6C-6E, in response to receiving the input 603 corresponding to the request to play the content item 606 via the first application, the first electronic device 500 plays (782), on the first electronic device 500, the content item 608 in the first application. In some embodiments, the first electronic device presents the content using the first electronic device itself, rather than streaming the content to a streaming destination.

The above-described manner of playing the content on the first electronic device allows the first electronic device to provide the user with options for how to present the content, which simplifies interactions between the user and the electronic device and enhances the operability of the electronic device, which, additionally, reduces power and improves battery life of the electronic device by enabling the user to use the electronic device more quickly and efficiently.

In some embodiments, such as in FIG. 6C, while displaying, on the display 504, the first application, the first electronic device 500 receives (784), via the one or more input devices, an input 603 corresponding to a request to play a content item 606 via the first application. In some embodiments, the electronic device detects selection of a representation of the content item or detecting selection of a selectable option for playing the content item. In some embodiments, such as in FIG. 6D, in response to receiving the input corresponding to the request to play the content item 608 via the first application, the first electronic device plays (786) the content item 608 via the first application. In some embodiments, such as in FIG. 6E, while playing the content item 608 via the first application, the first electronic device 500 displays (788), on the display 504, a playback user interface element 610a-g for controlling playback of the content item 608. In some embodiments, such as in FIG. 6H, in accordance with a determination that the first electronic device 500 is streaming the content item to the second electronic device 602a, the playback user interface element includes one or more playback controls 614a-g having a first display format (790).

In some embodiments, the second electronic device presents the content item. The playback controls are optionally presented in a full-screen format including a play/pause option, a fast forward option, a rewind option, volume control options, language and subtitles options, and an option for displaying a remote control user interface. In some embodiments, when the playback controls are presented in the full-screen format, the first electronic device does not concurrently display the content item. The playback controls in the first display format optionally continues to be displayed by the first electronic device in the first application user interface until the user dismisses the playback controls or dismisses the first application, or until the display becomes inactive (e.g., due to a predetermined amount of time passing since the last user input or due to a user input for deactivating the display). That is to say, in some embodiments, the playback controls in the first display format do not auto-dismiss.

In some embodiments, such as in FIG. 6F, in accordance with a determination that the first electronic device 500 is not streaming the content item to the second electronic device 602a and is playing the content item at the first electronic device, the playback user interface element includes the one or more playback controls 610a-g having a second display format, different than the first display format (792). In some embodiments, the first electronic device displays the content item while displaying the playback controls. The playback controls are optionally disposed along an edge (e.g., the bottom edge) of the display. The playback controls in the second display format are optionally smaller (e.g., one or more of the selectable options are smaller) than the playback controls in the first display format. In some embodiments, the playback controls include a play/pause option, a fast forward option, a rewind option, volume control options, and language and subtitles options. The playback controls optionally do not include the remote user interface option. In some embodiments, the playback controls are temporarily presented in response to detecting a user input at the first electronic device and, after a predetermined amount of time (e.g., 0.5 seconds, 1 second, 2 seconds, or some other amount of time) the electronic device ceases to display the playback controls.

The above-described manner of presenting playback controls in different formats depending on whether the content is played on the first electronic device or if the content is streamed to the second electronic device allows the first electronic device to use more space for the playback controls when the first electronic device is not presenting the content and to present the playback controls and the content at the same time when the first electronic device is presenting the content, which simplifies interactions between the user and the electronic device and enhances the operability of the electronic device, which, additionally, reduces power and improves battery life of the electronic device by enabling the user to use the electronic device more quickly and efficiently.

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, and 1500) are also applicable in an analogous manner to method 700 described above with respect to FIGS. 7A-7J. For example, the operation of the electronic device in the streaming mode described above with reference to method 700 optionally has one or more of the characteristics of the presentation of playback control options and presentation of visual indications of the streaming mode, etc., described herein with reference to other methods described herein (e.g., methods 900, 1100, 1300, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 7A-7J are, optionally, implemented by components depicted in FIGS. 1A-1B. For example, displaying operations 706, 718, 730, 750, 758, 762, 770, 772, 774, 778, 788, 790, and 792, receiving operations 702, 738, 754, 758, 772, 780, and 784, and initiating operation 742 and 756 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Playback Control Elements

Users interact with electronic devices in many different manners, including using an electronic device to present content, such as audio or video content. In some embodiments, a first electronic device is able to stream content to a second electronic device to present the content using the second electronic device. The embodiments described below provide ways in which a first electronic device presents playback control elements including selectable options to control playback on the streaming destination while the electronic device operates in the streaming mode to stream content to the playback destination. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
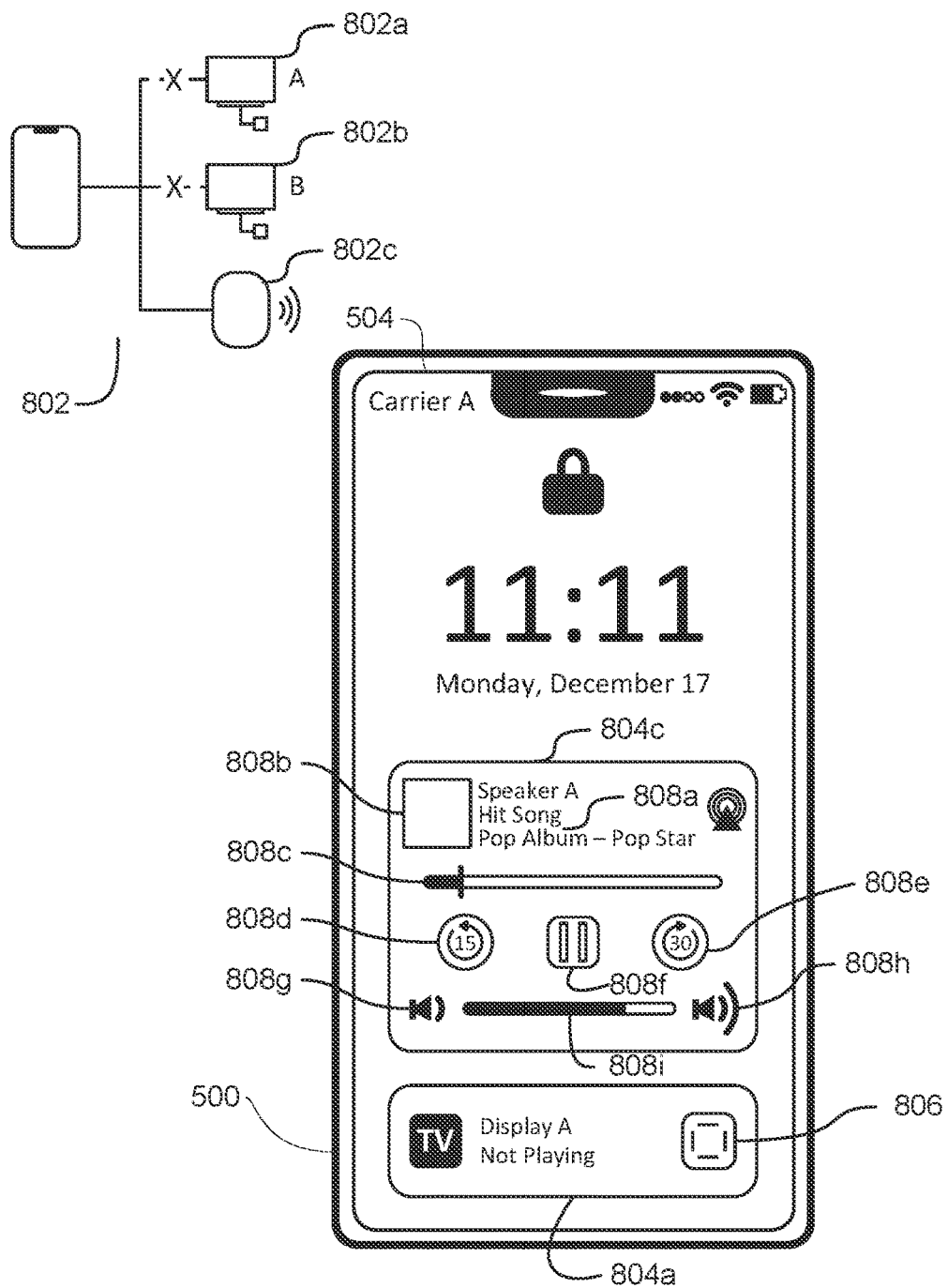
FIGS. 8A-8S illustrate exemplary ways in which an electronic device presents selectable options to control playback of content on a streaming destination while the electronic device streams content to the streaming destination in accordance with some embodiments.
Figure 8B:
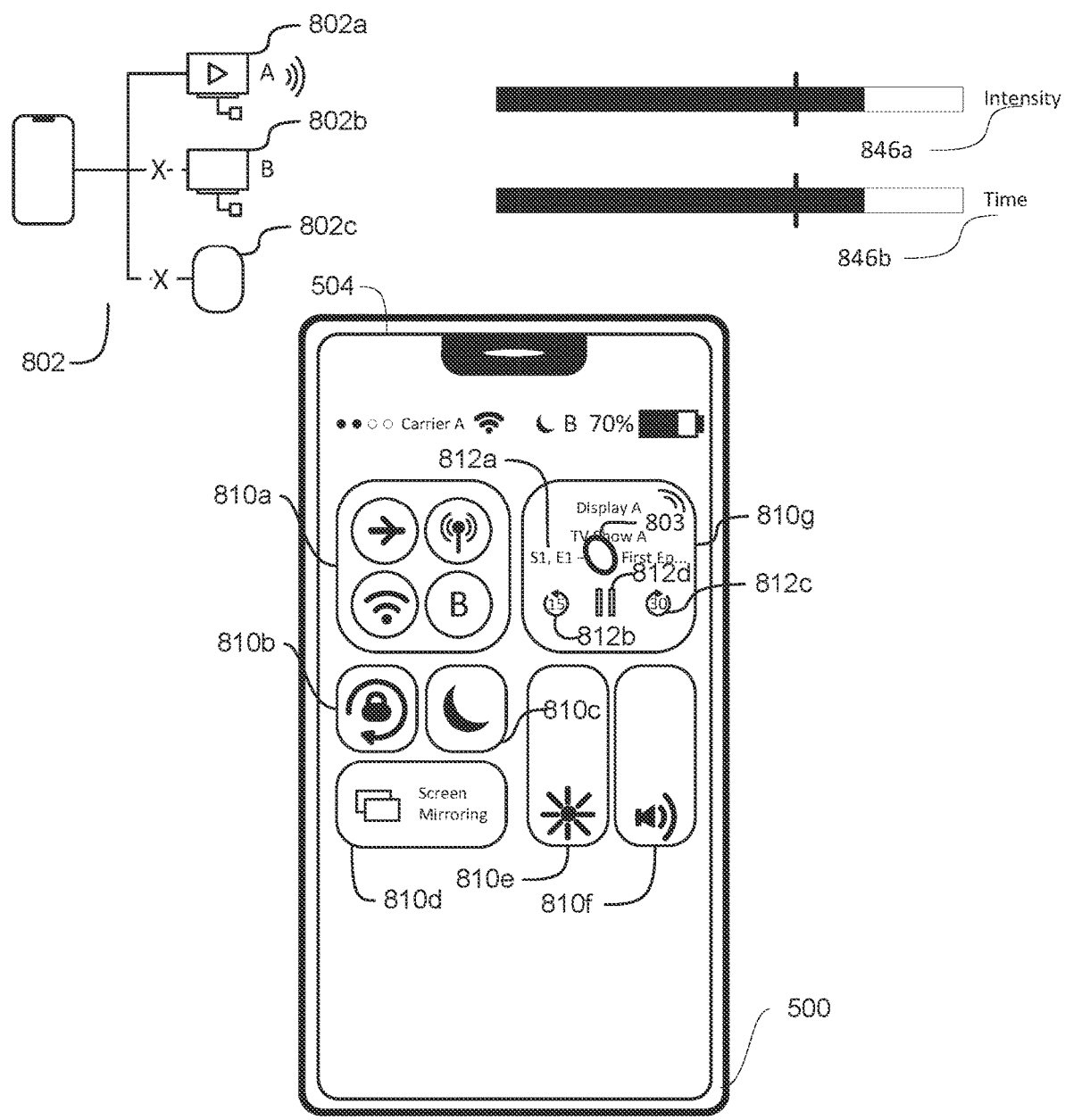
Figure 8C:
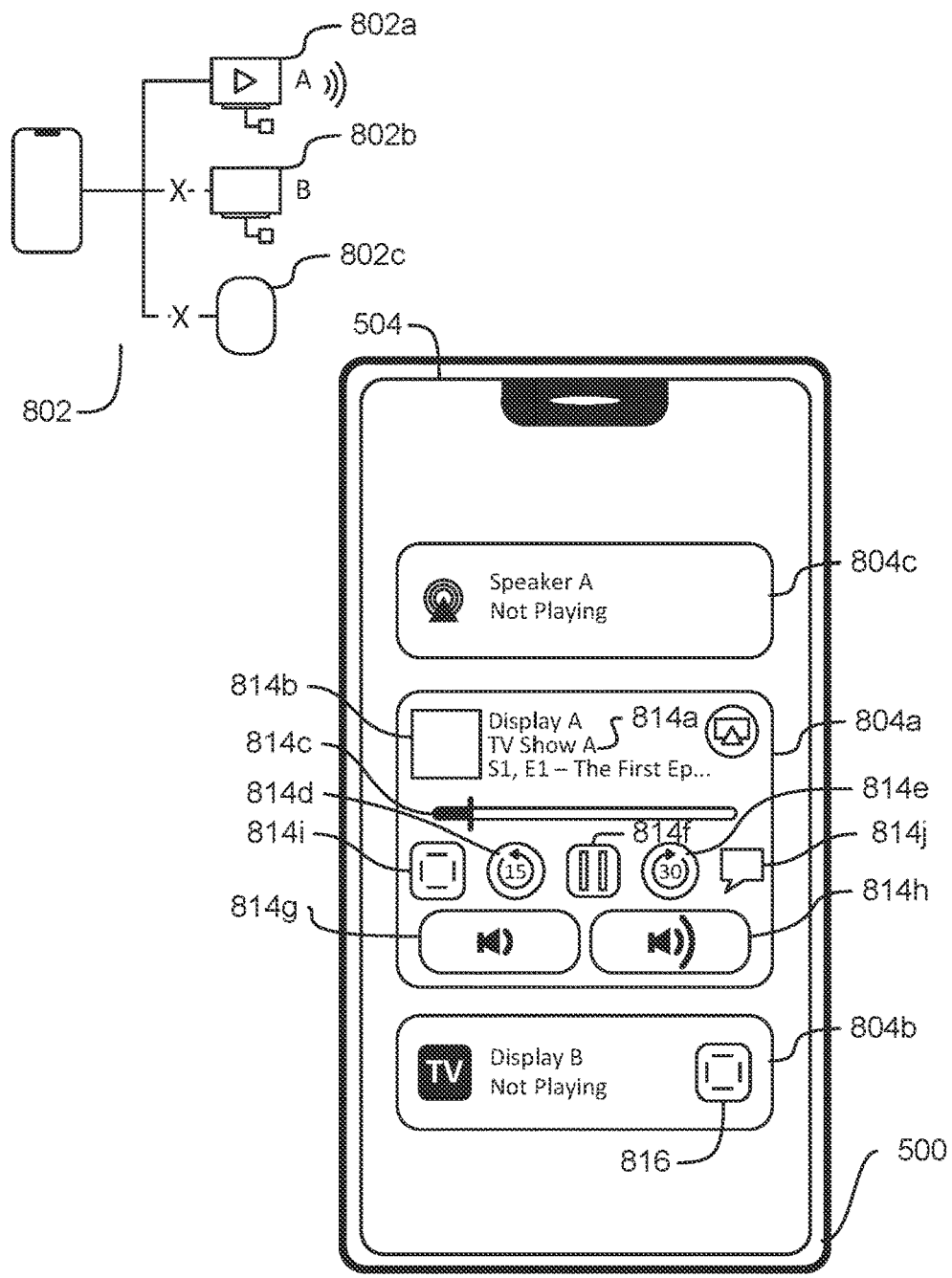
Figure 8D:
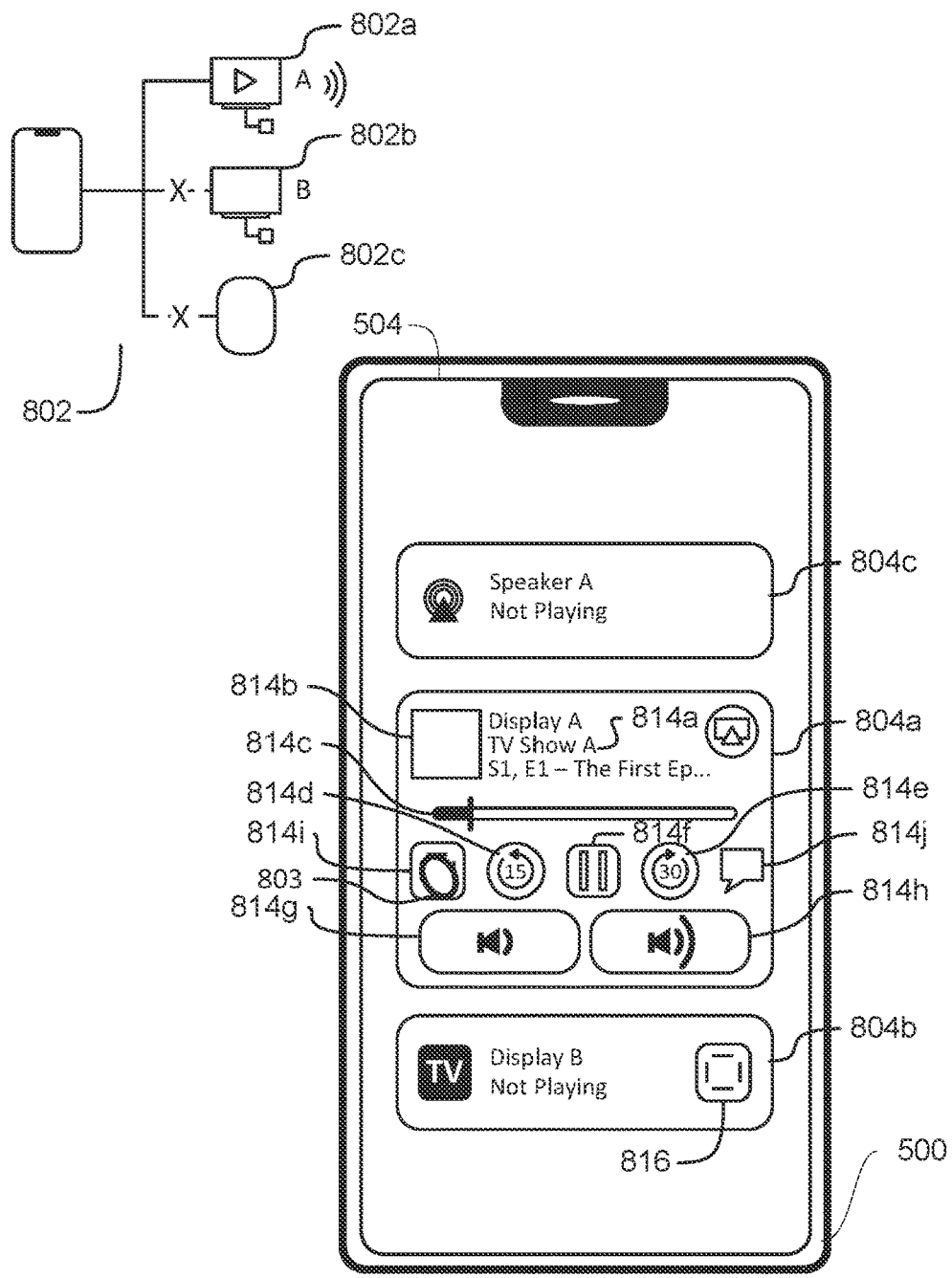
Figure 8E:
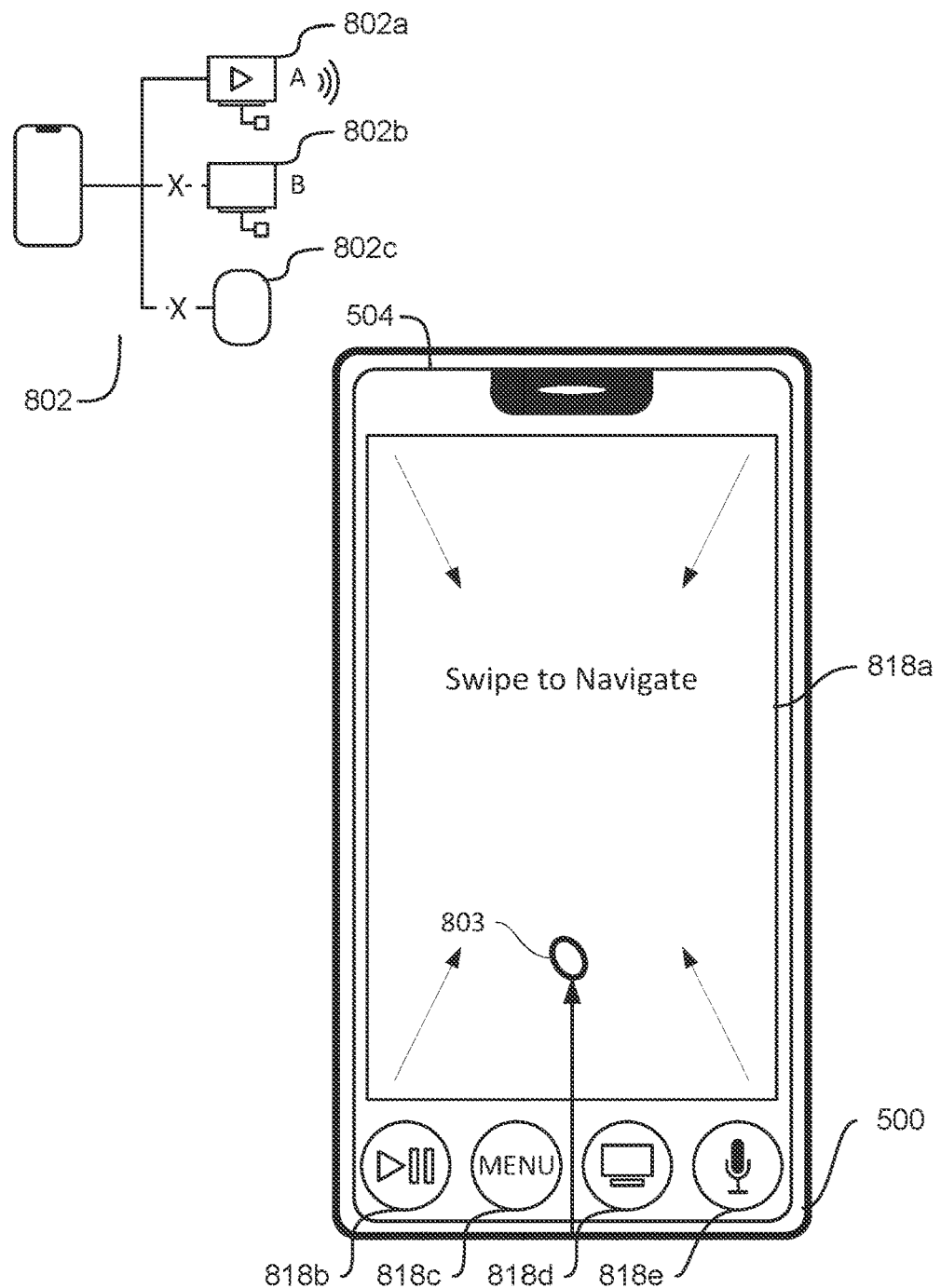
Figure 8F:
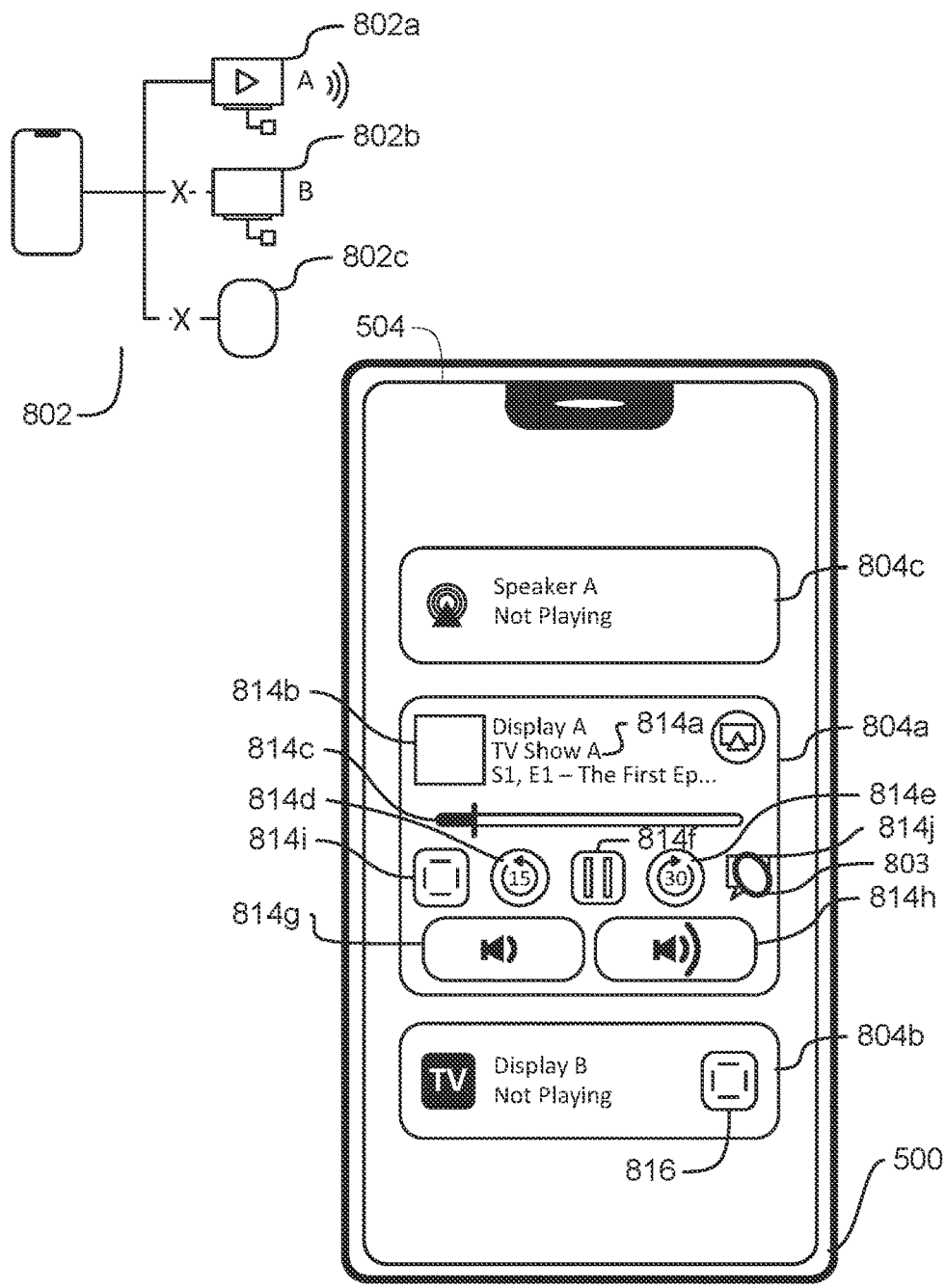
Figure 8G:
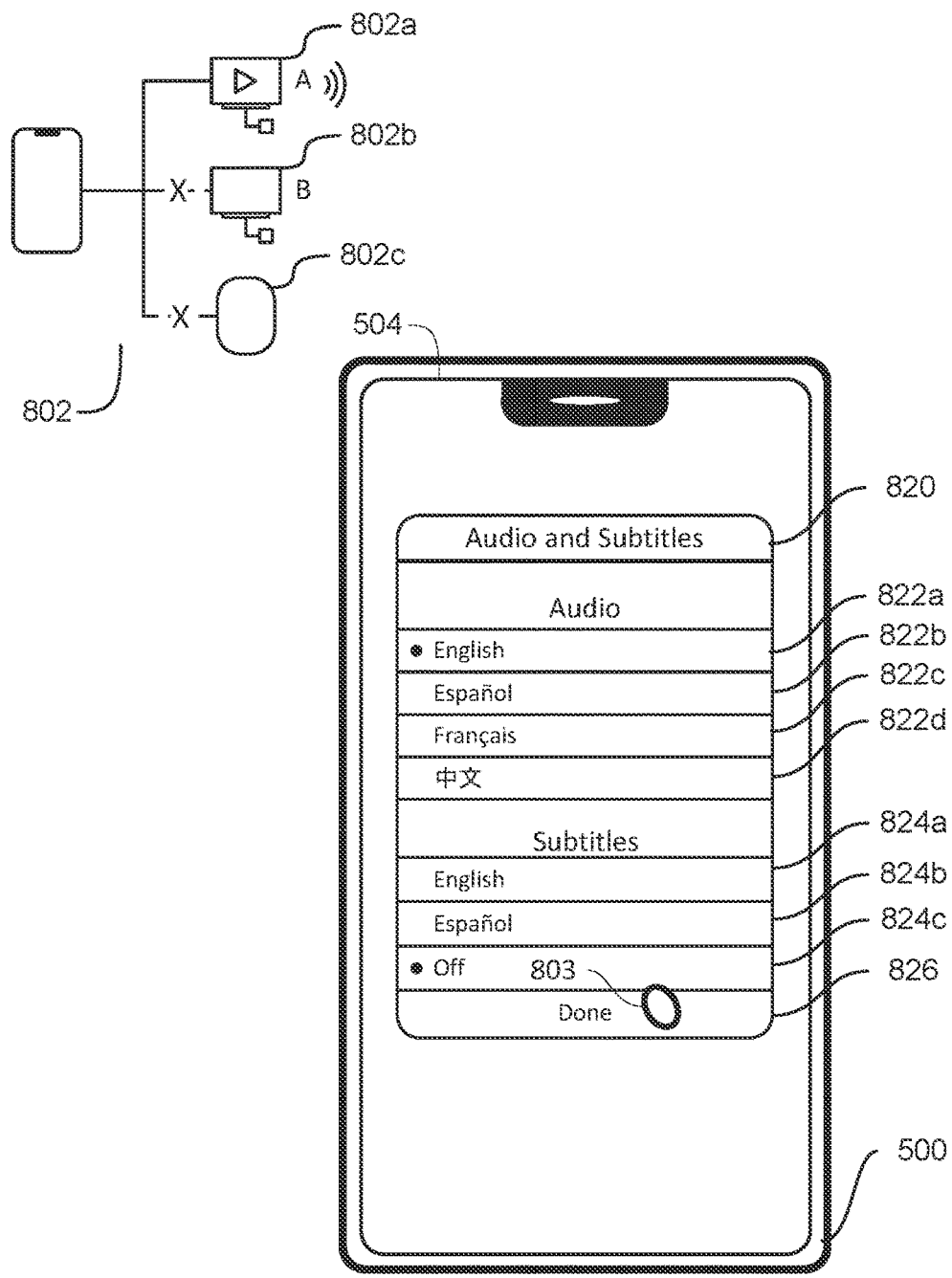
Figure 8H:
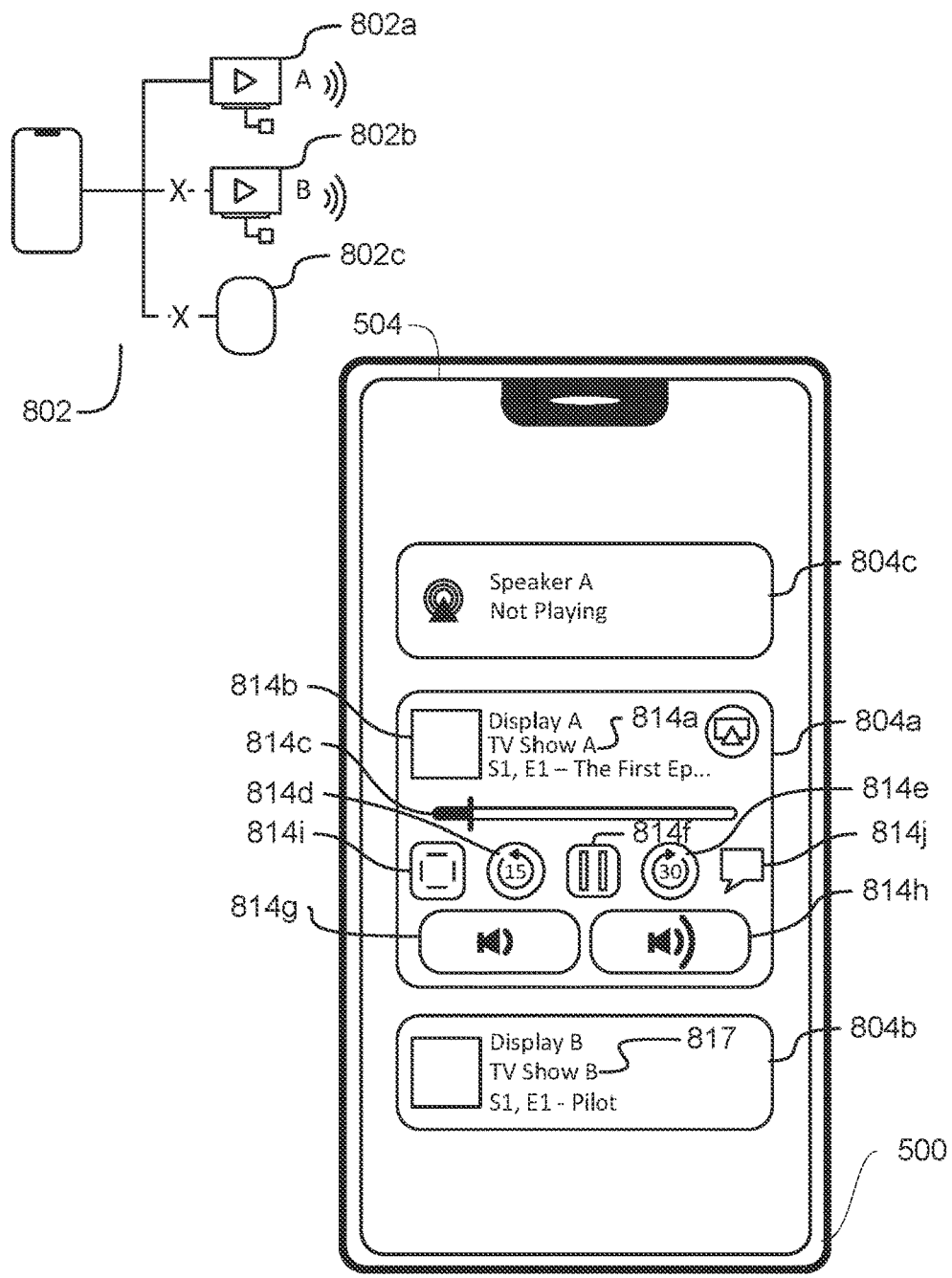
Figure 8I:
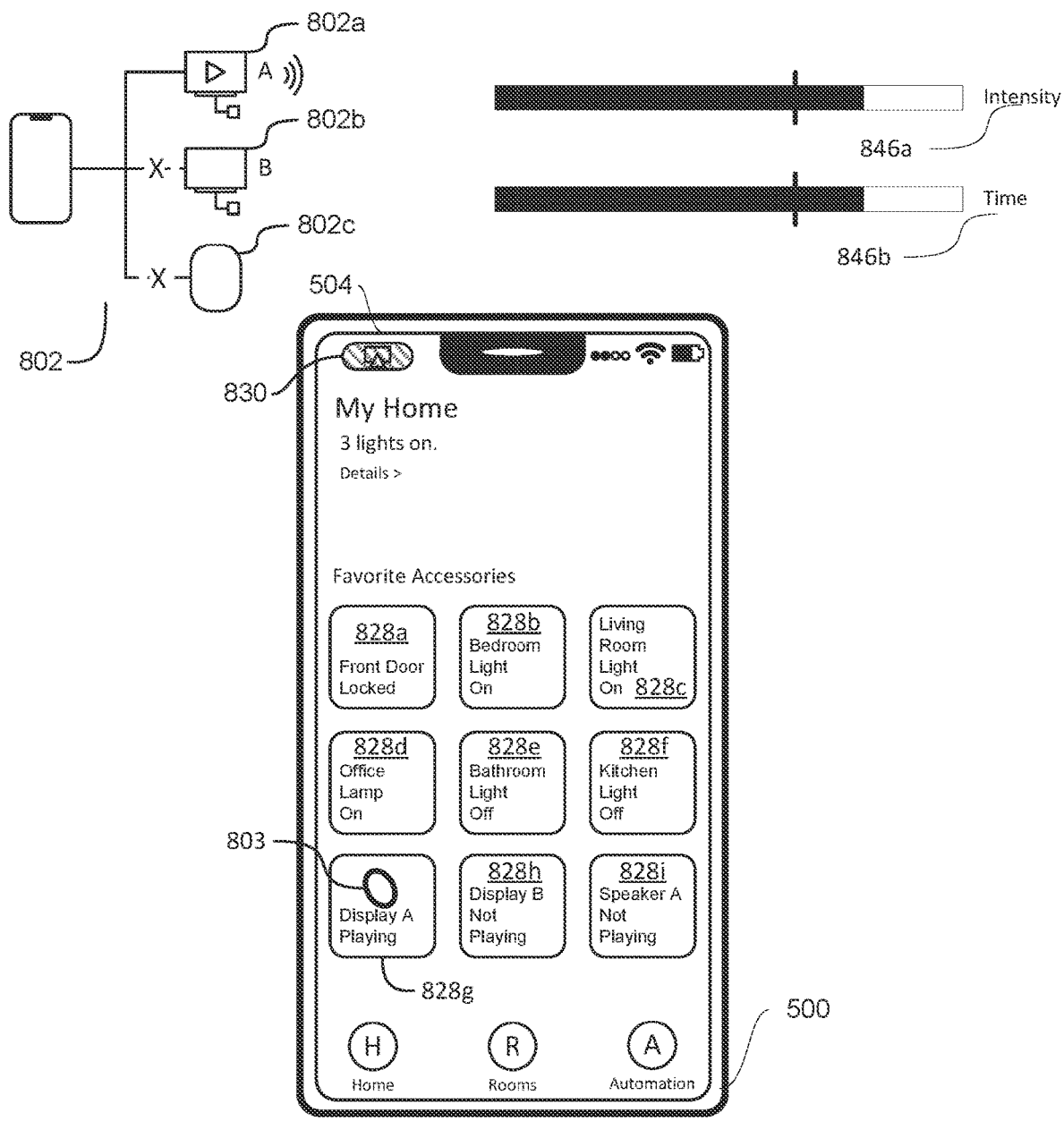
Figure 8J:
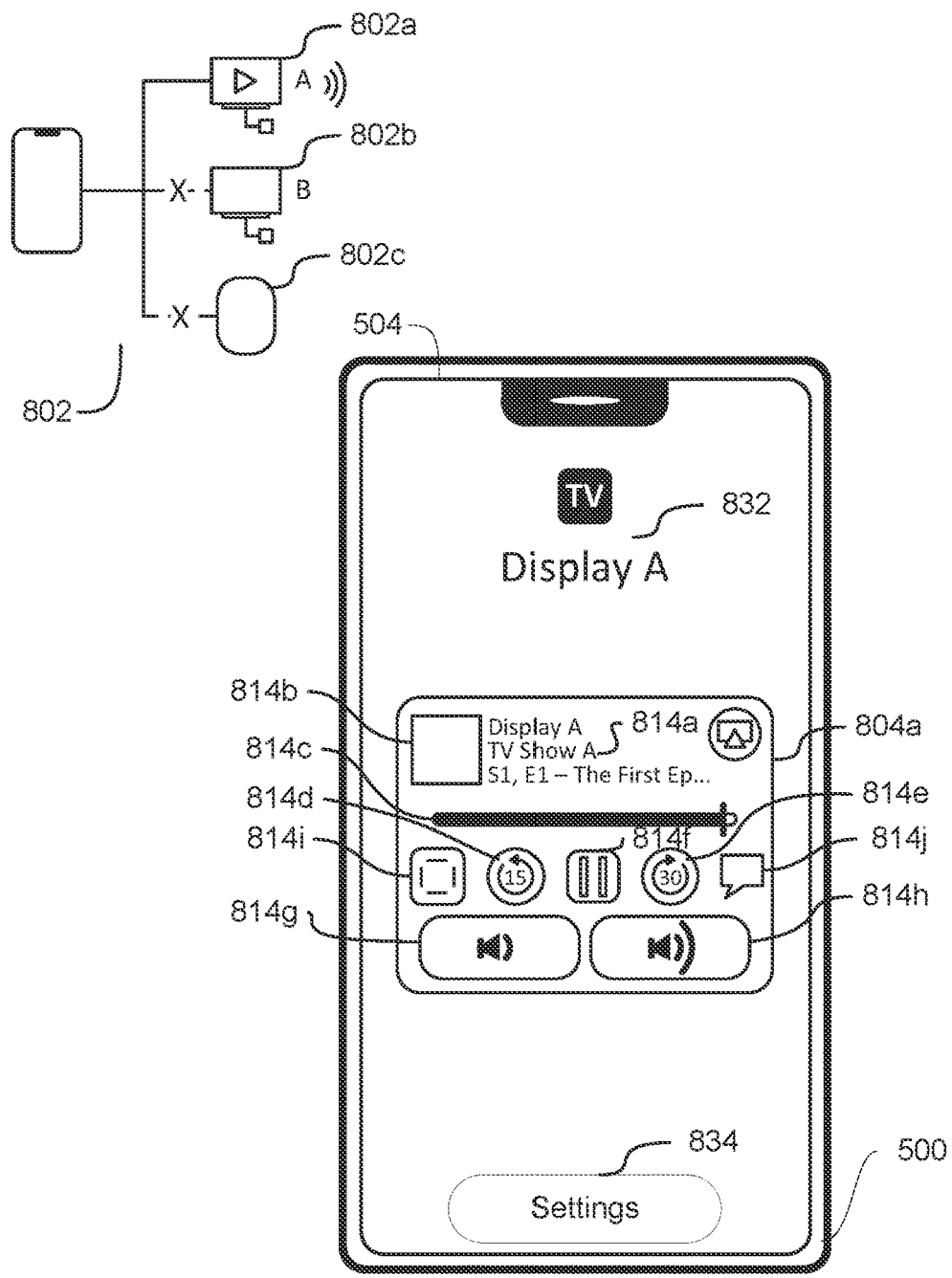
Figure 8K:
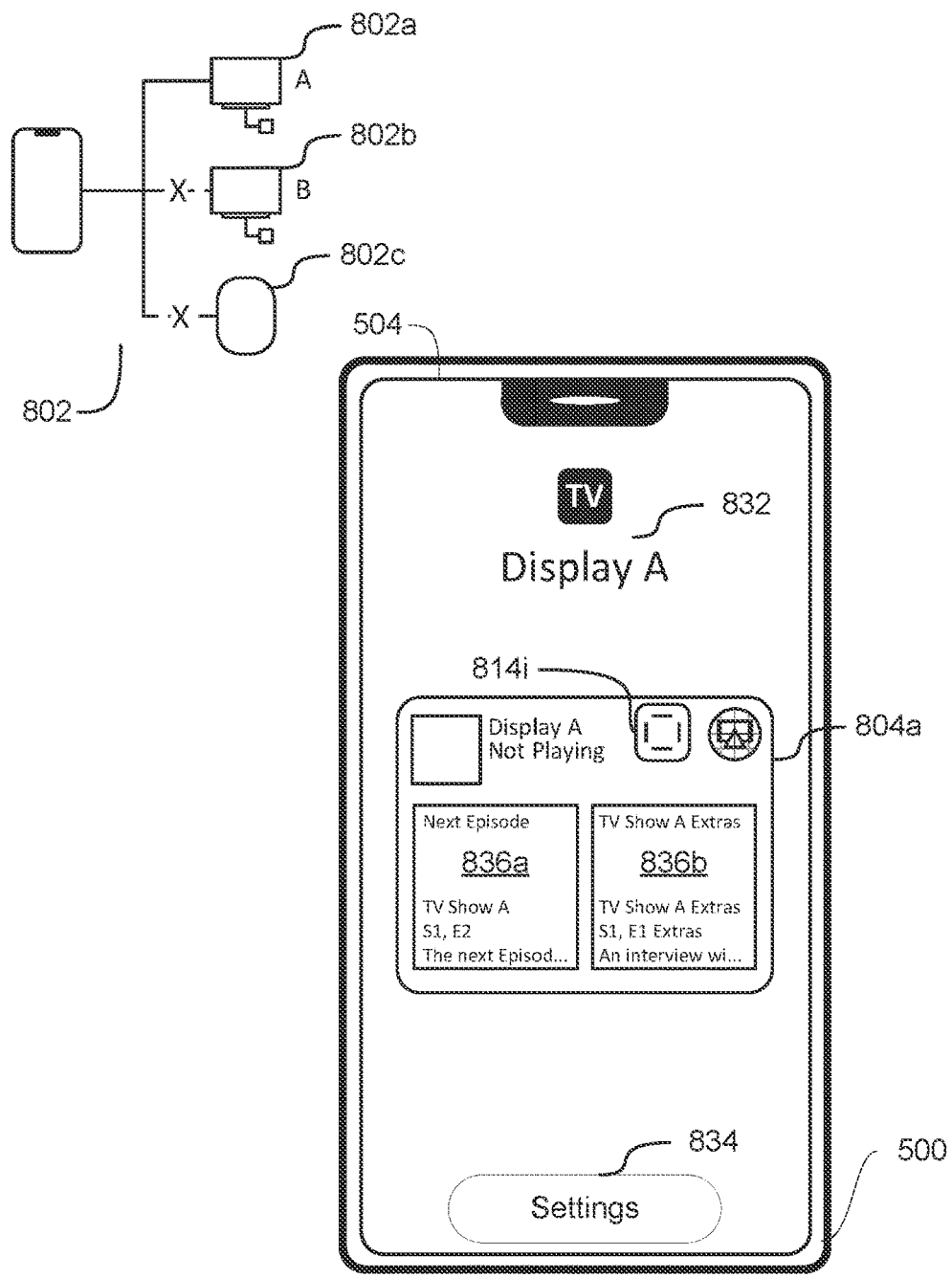
Figure 8L:
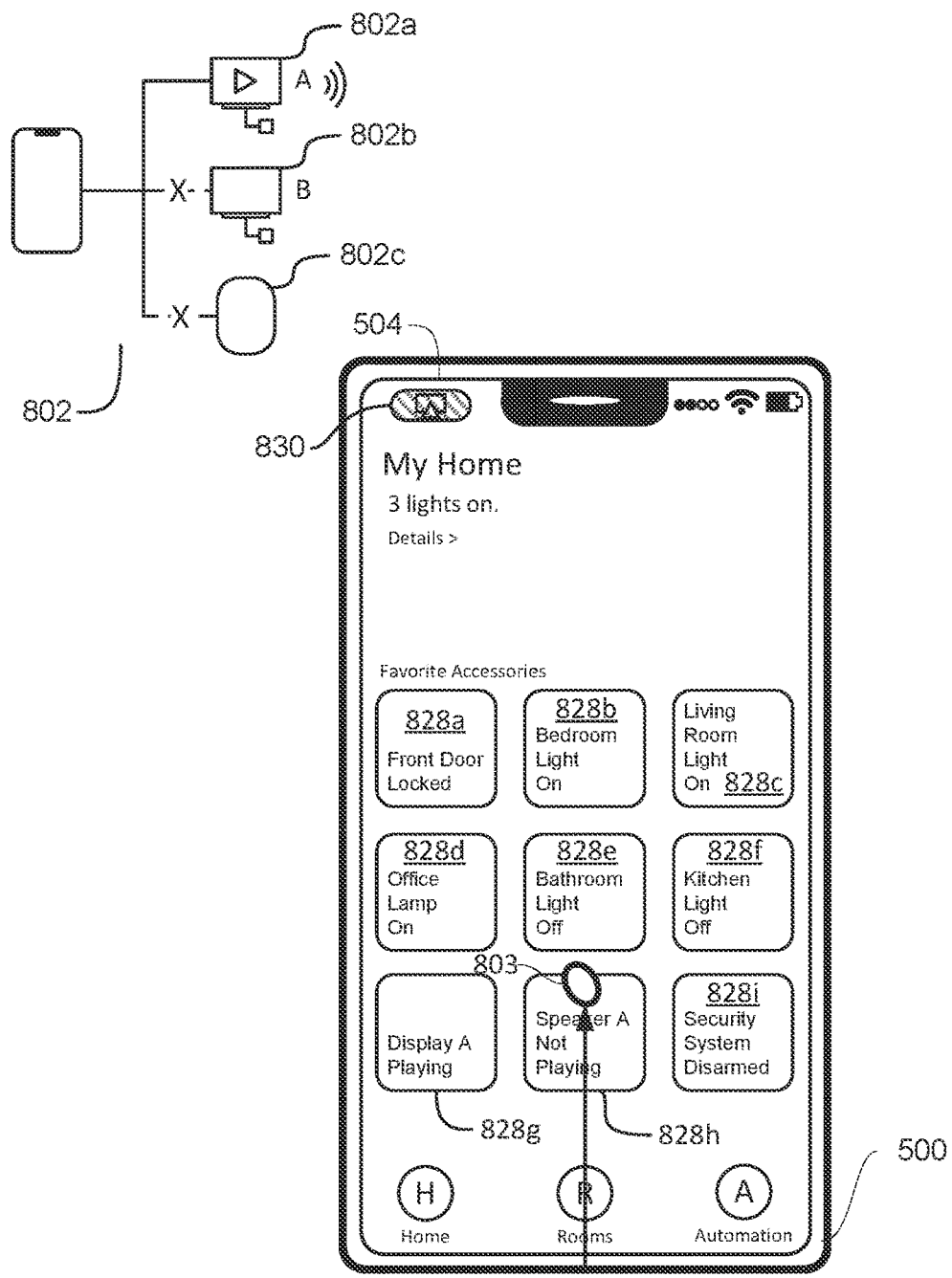
Figure 8M:
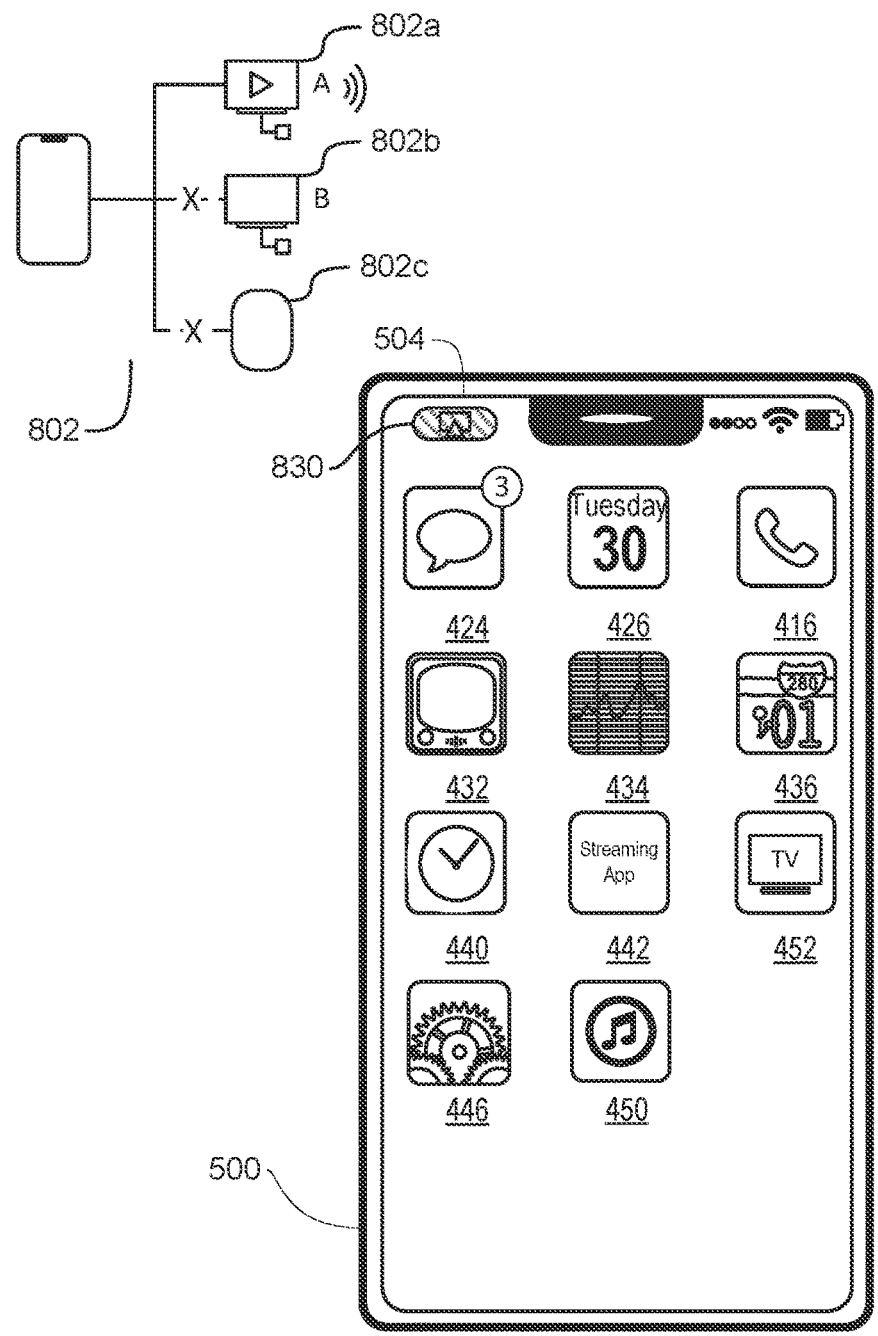
Figure 8N:
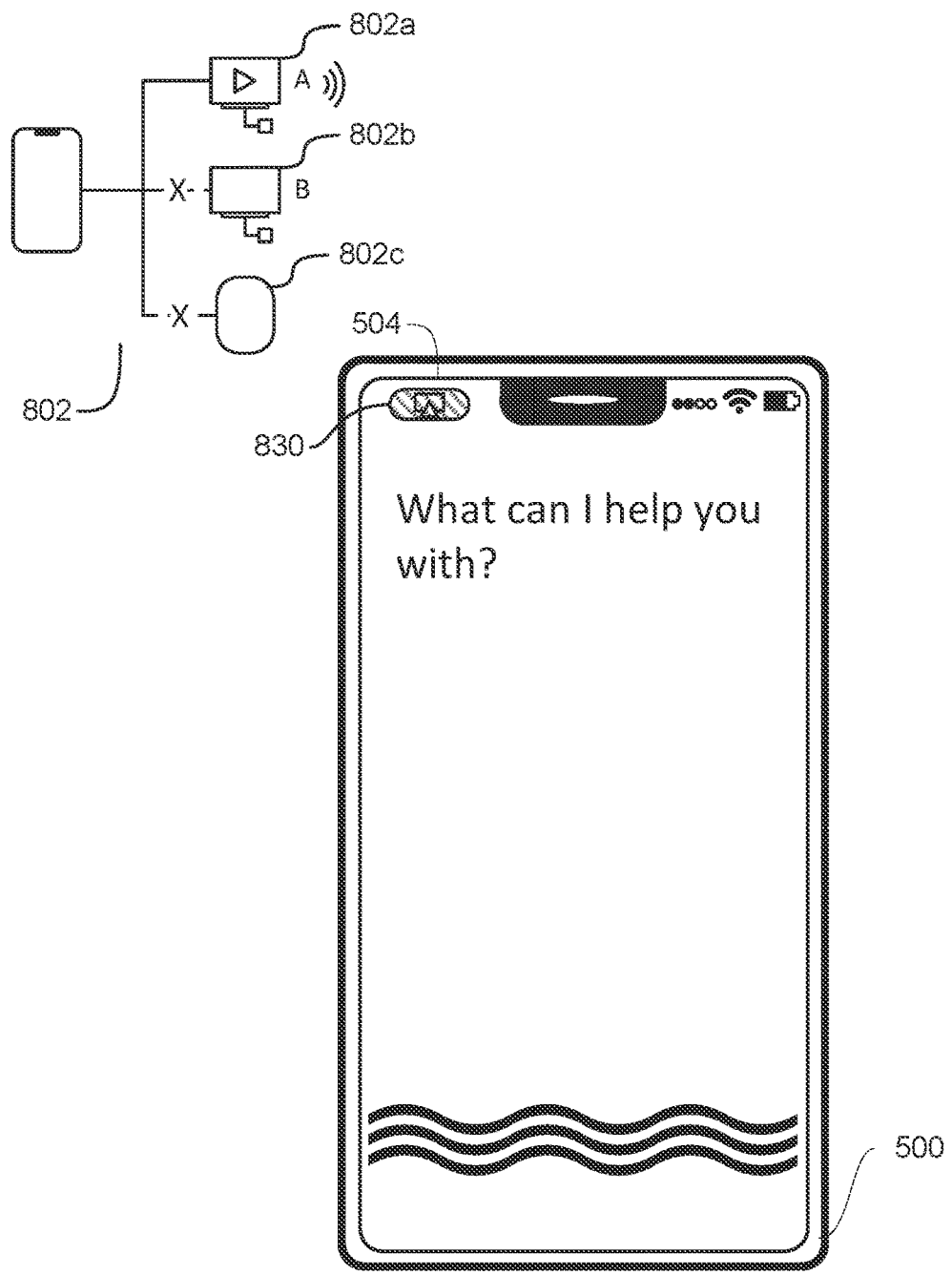
Figure 8O:
Figure 8P:
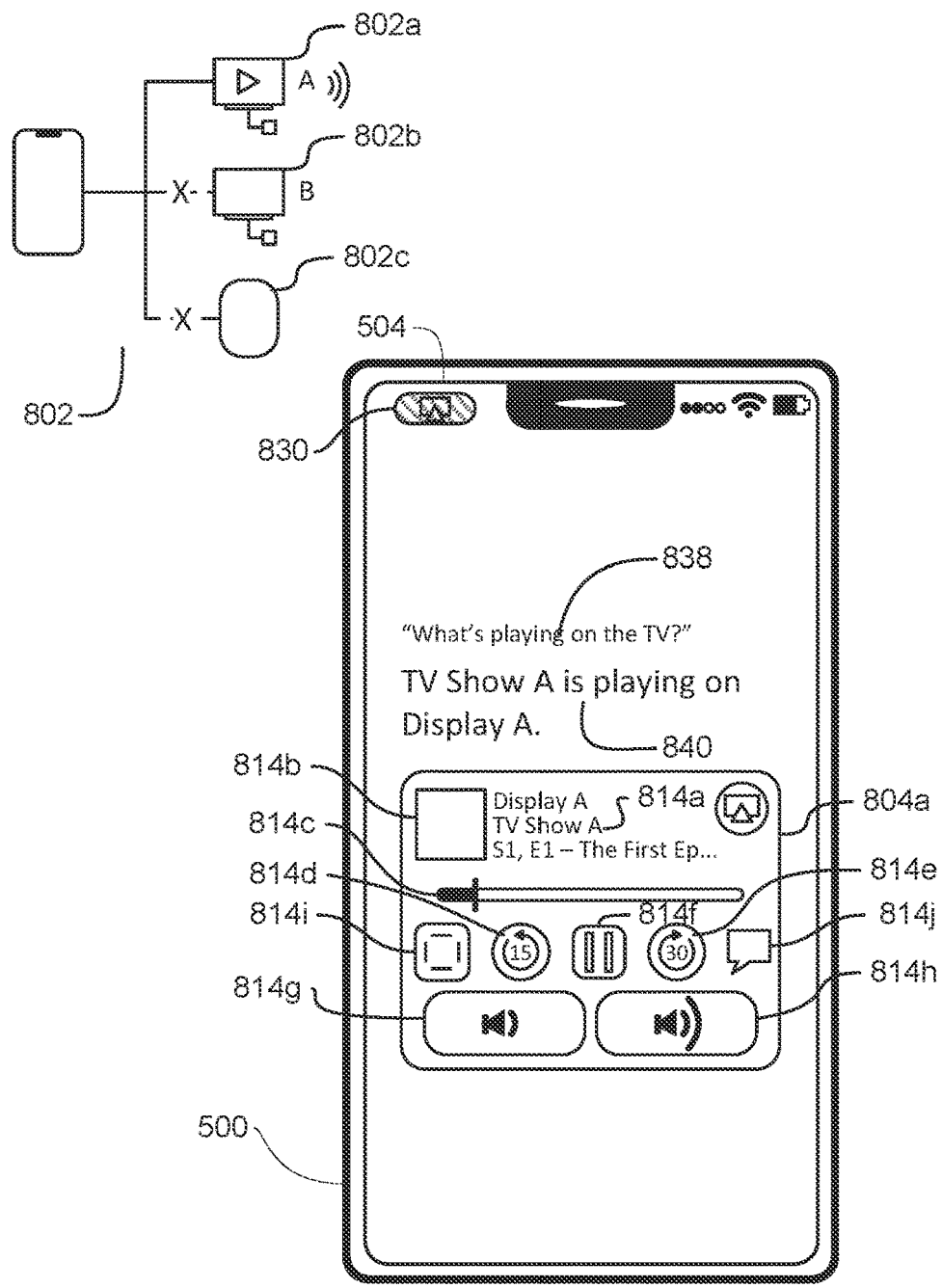
Figure 8Q:
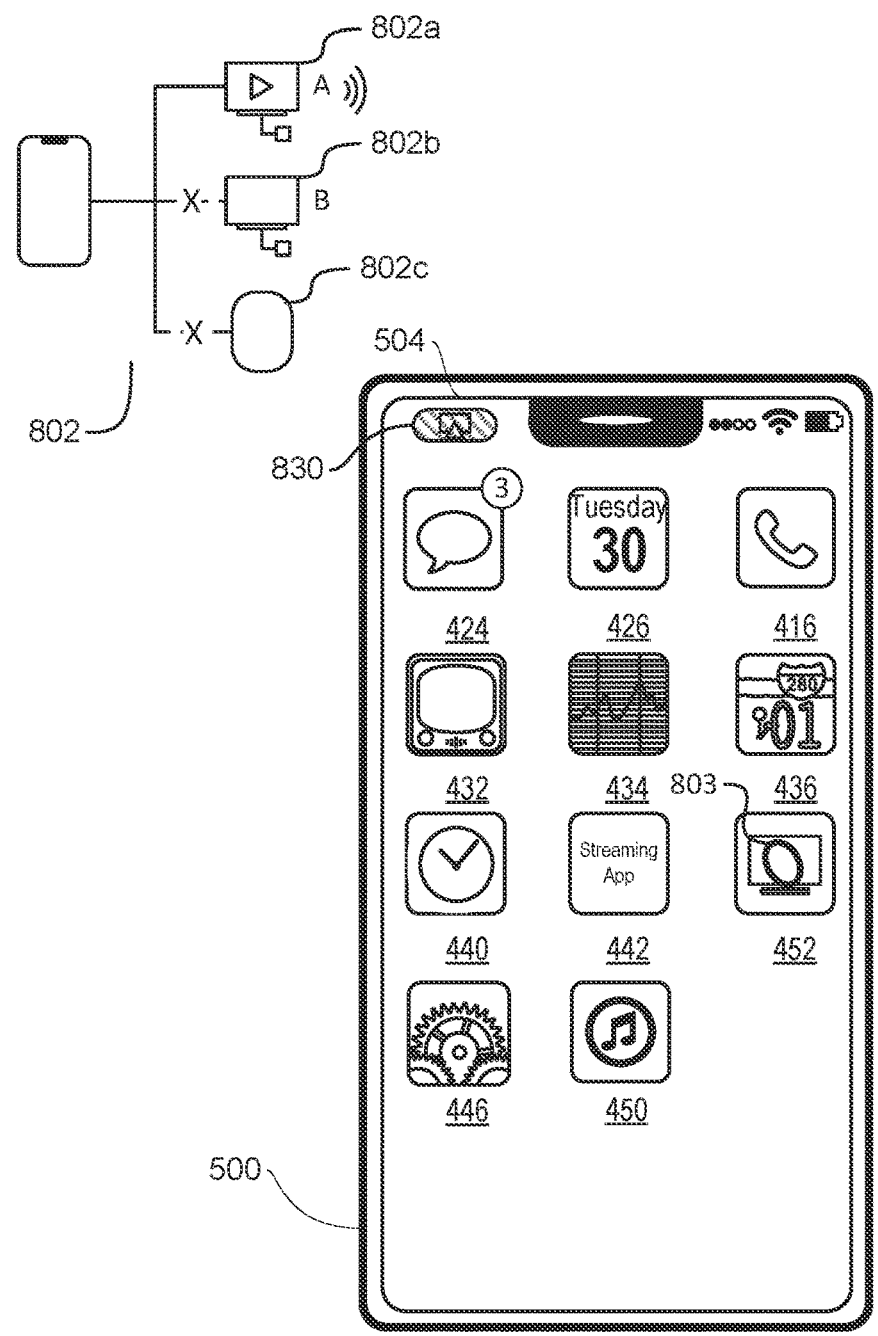
Figure 8R:
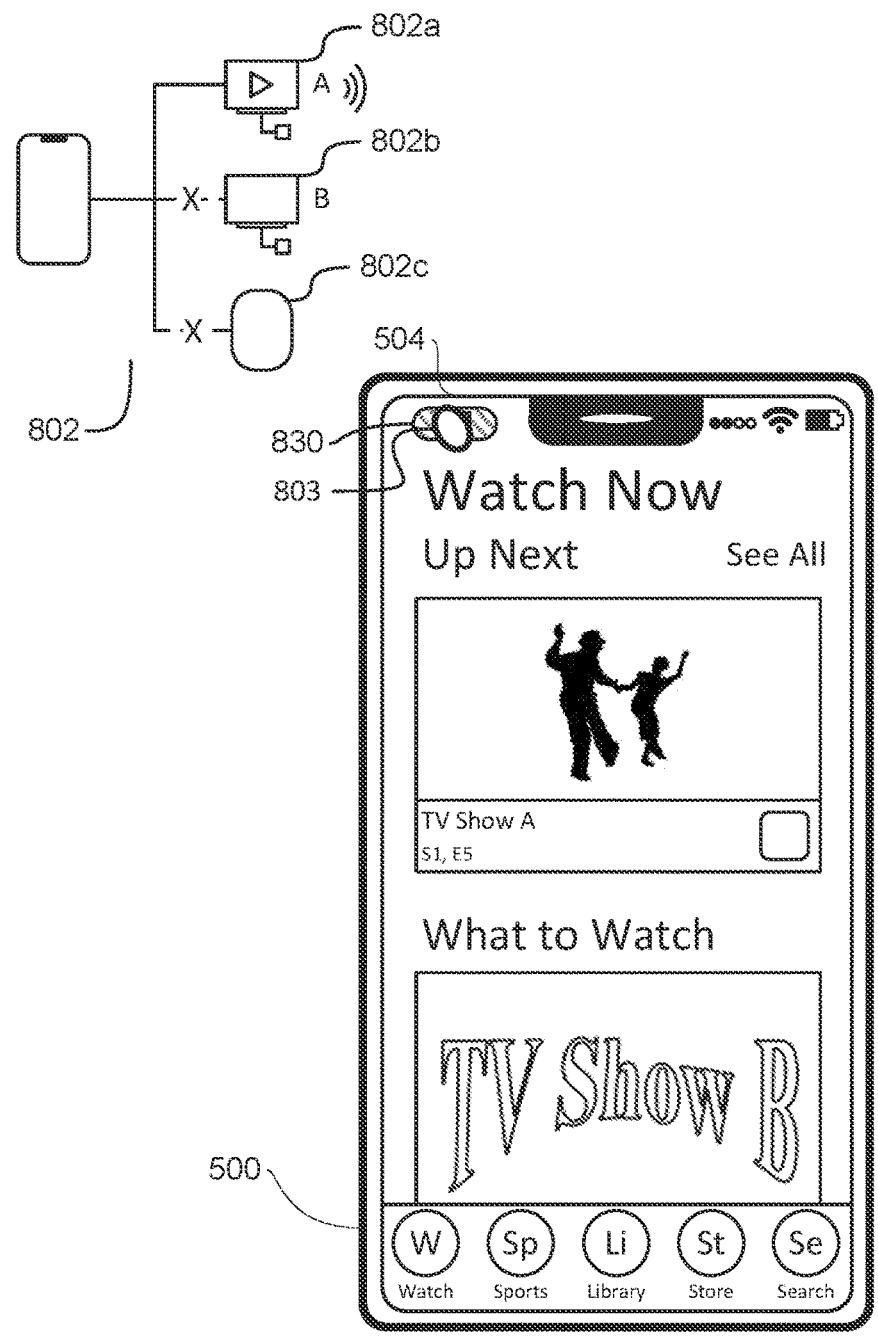
Figure 8S:
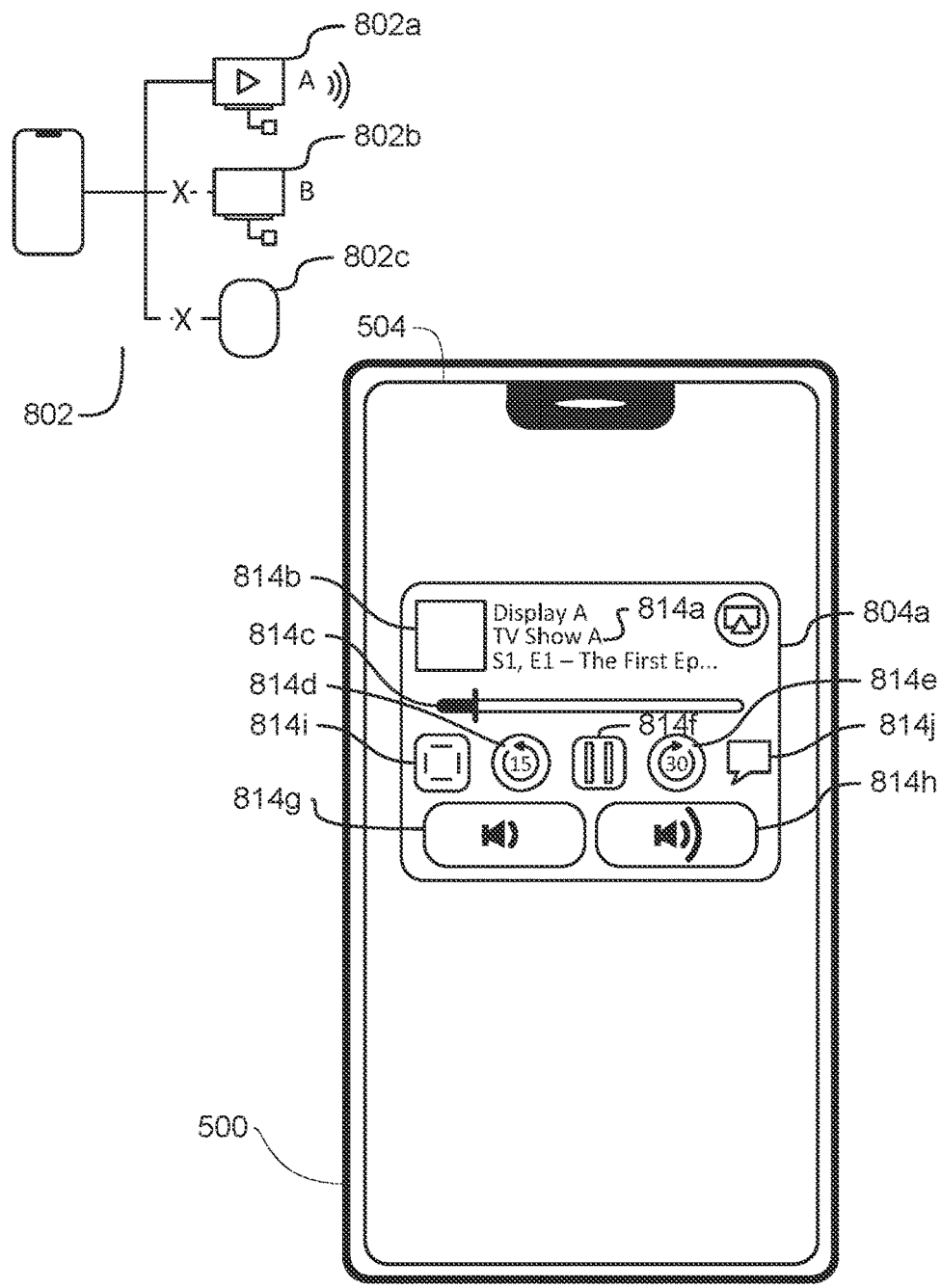
Figure 9A:
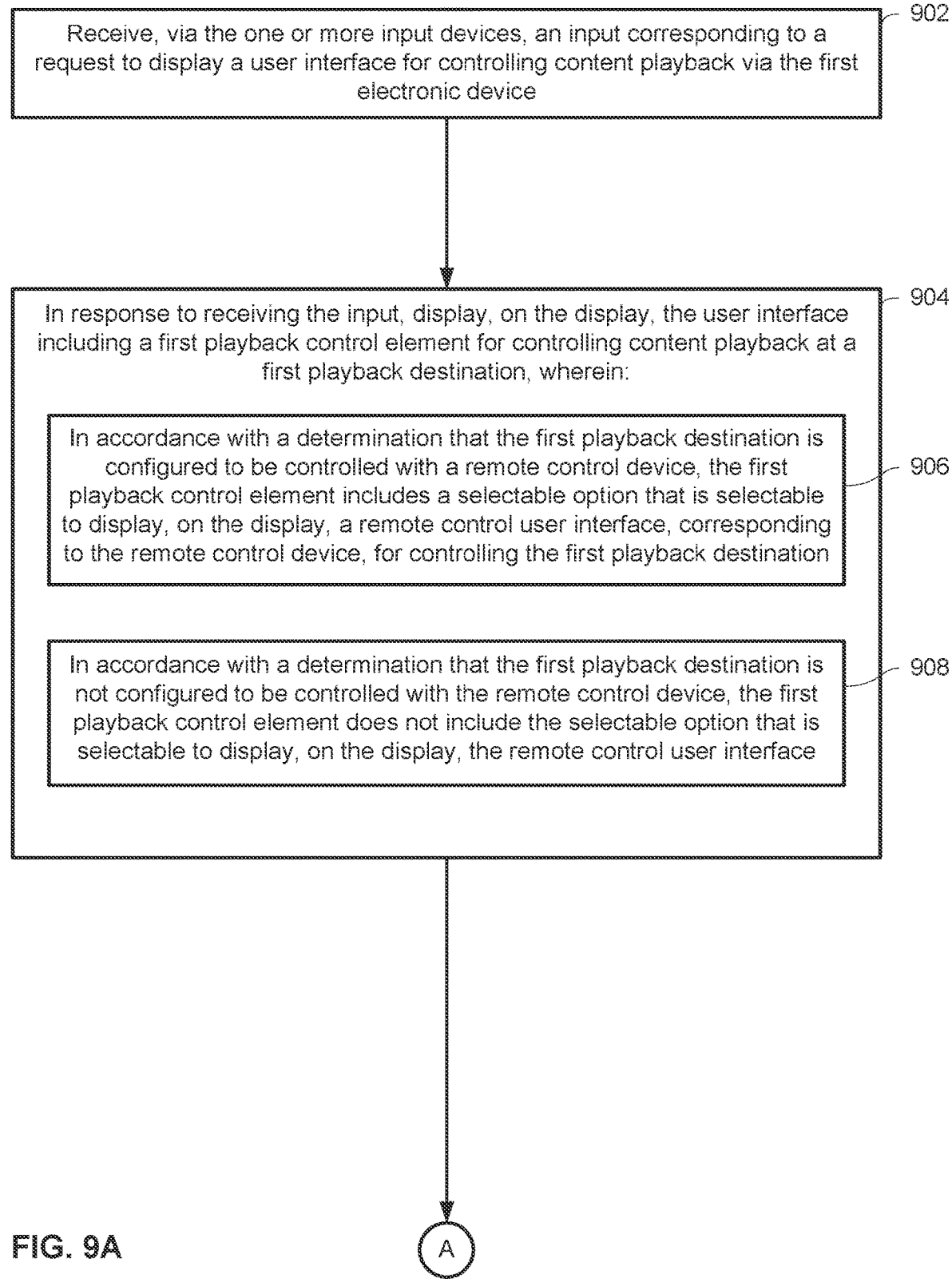
FIGS. 9A-9F are flow diagrams illustrating a method of presenting selectable options to control playback of content on a streaming destination while the electronic device streams content to the streaming destination in accordance with some embodiments.
Figure 9B:
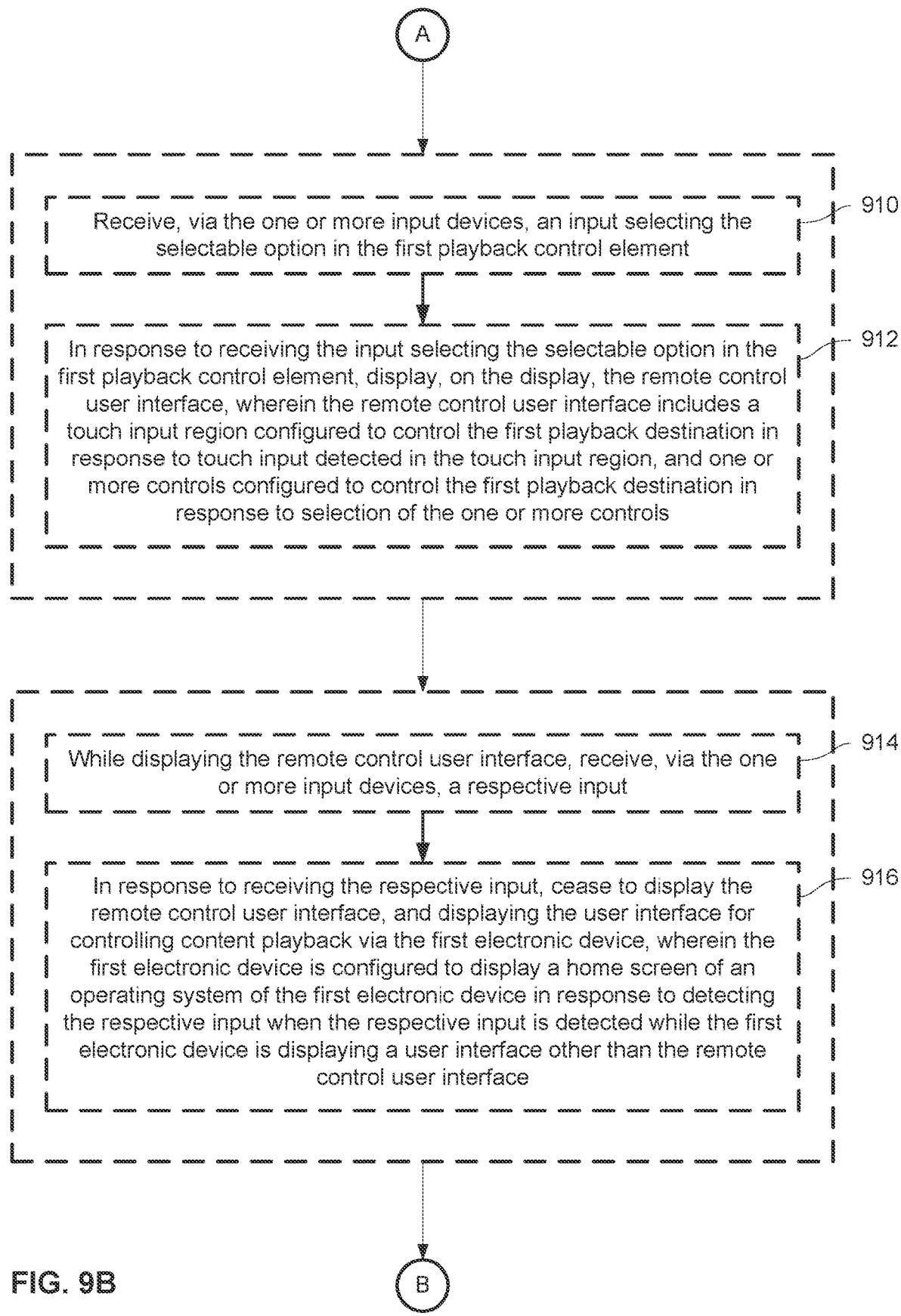
Figure 9C:
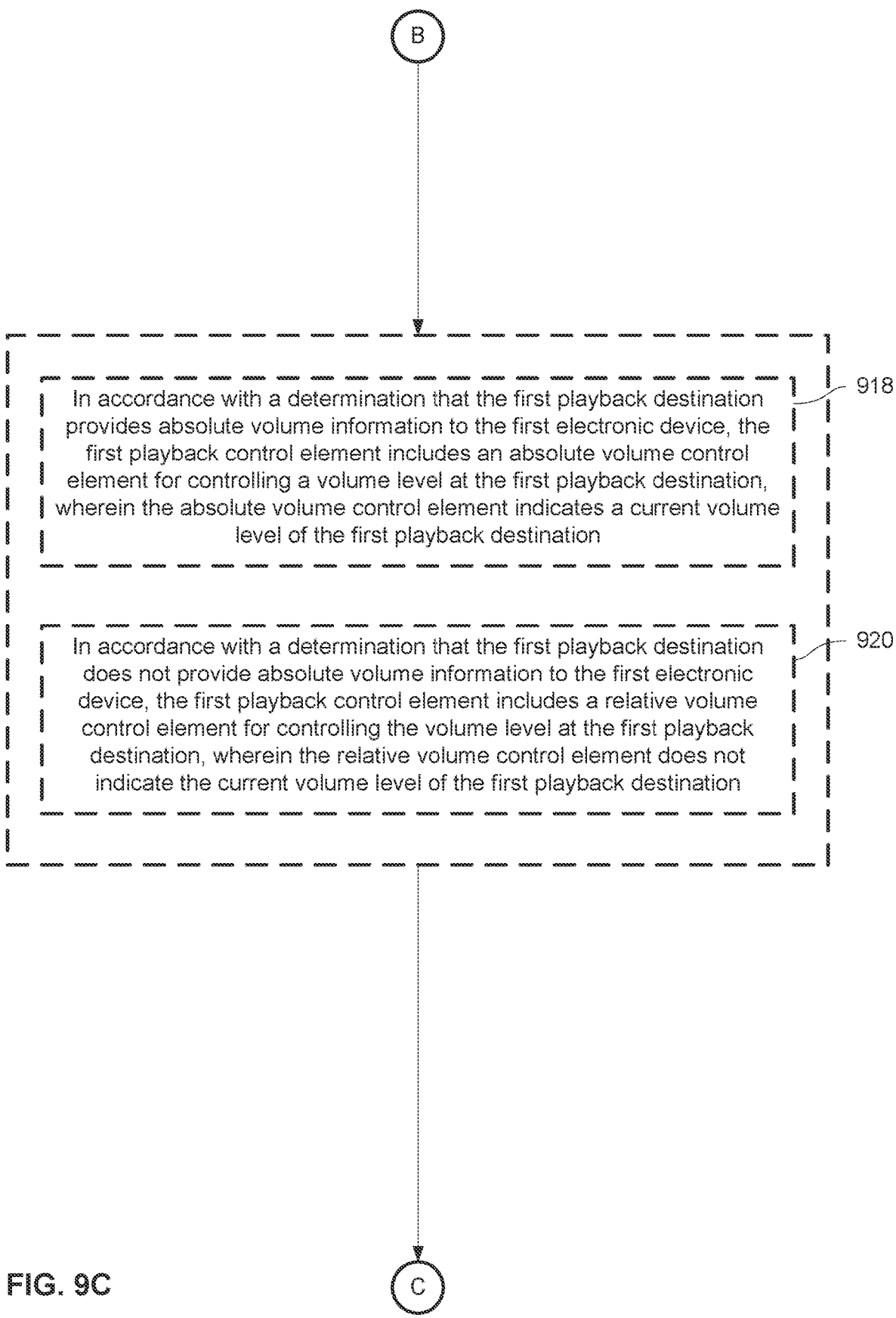
Figure 9D:
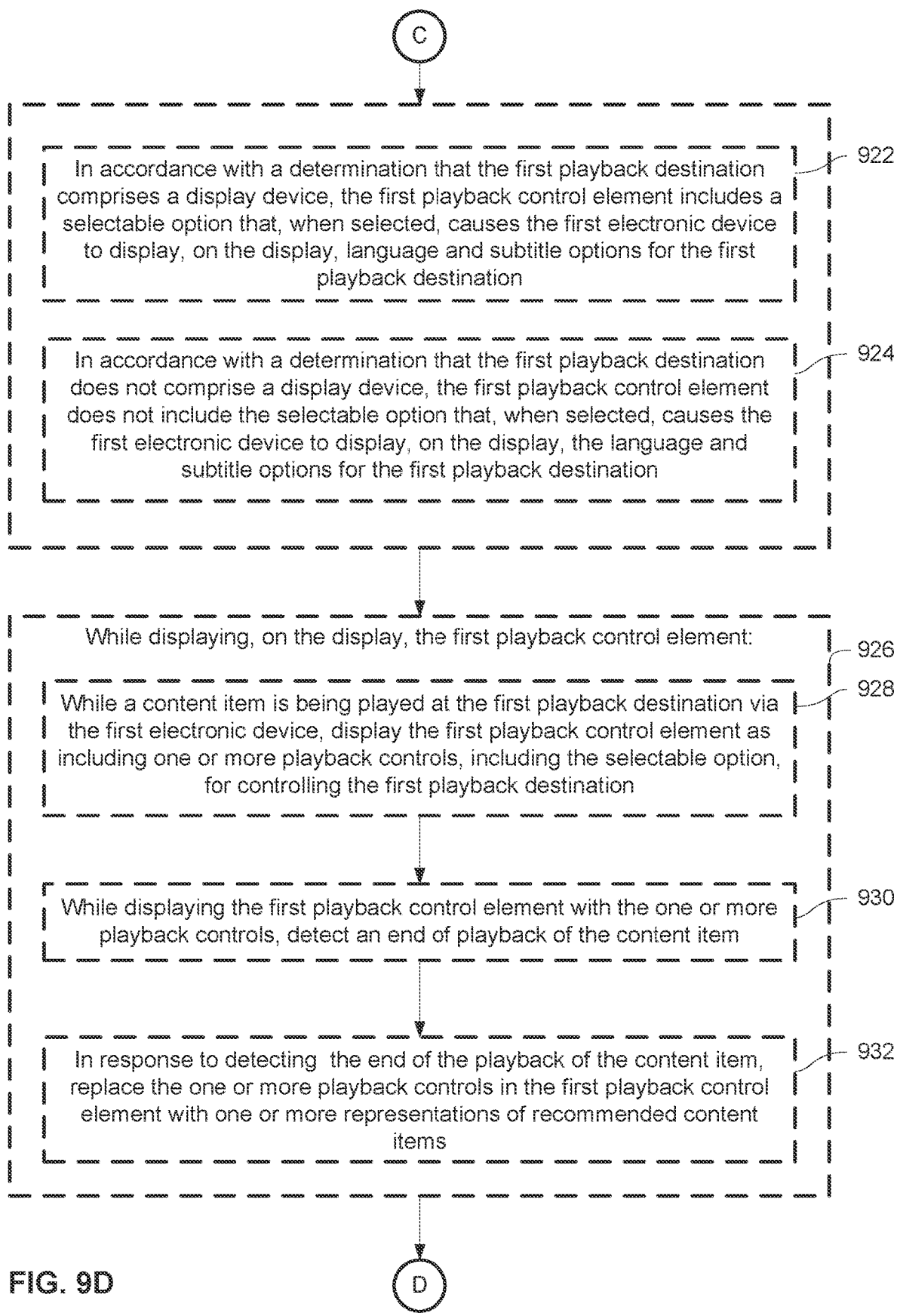
Figure 9E:
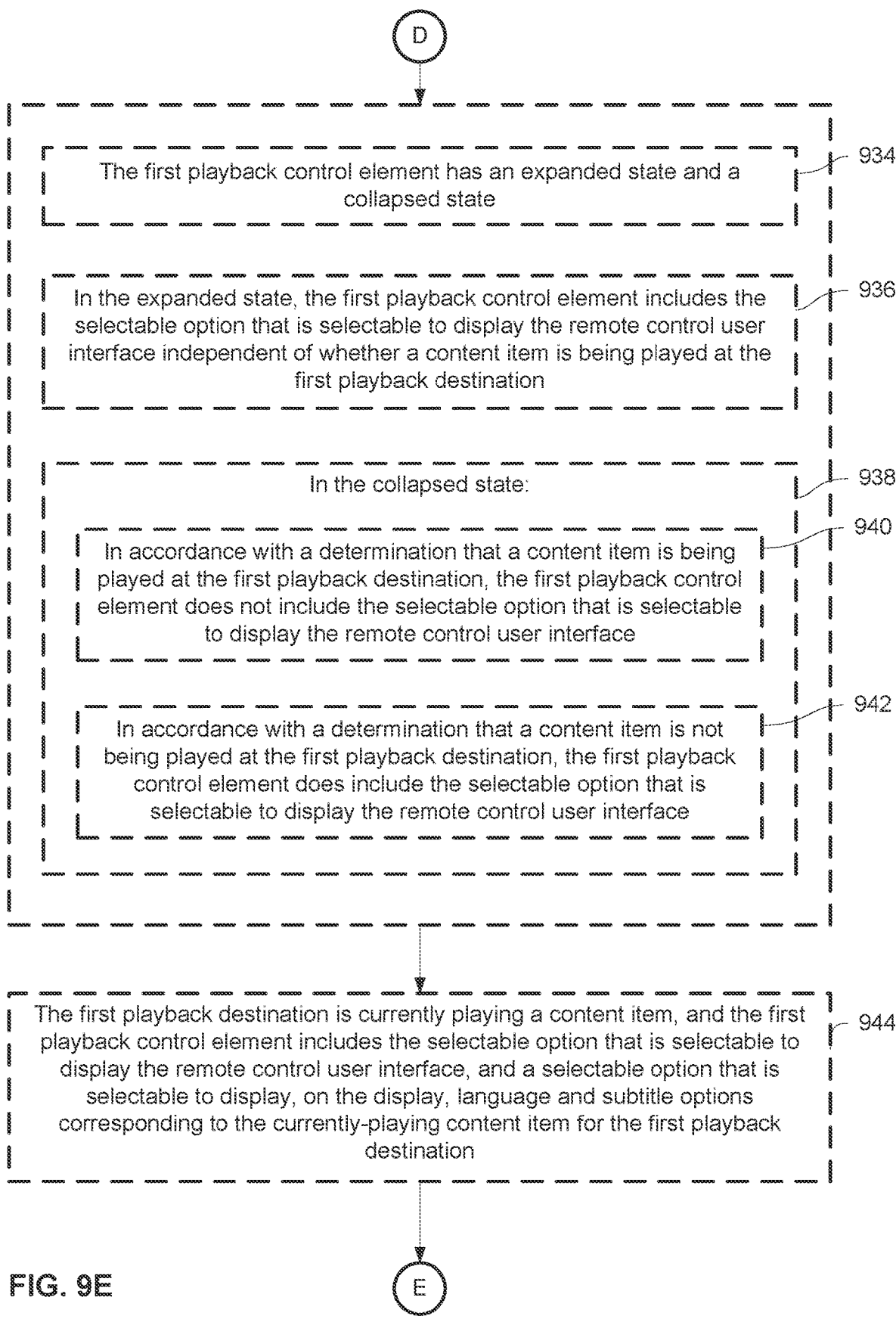
Figure 9F:
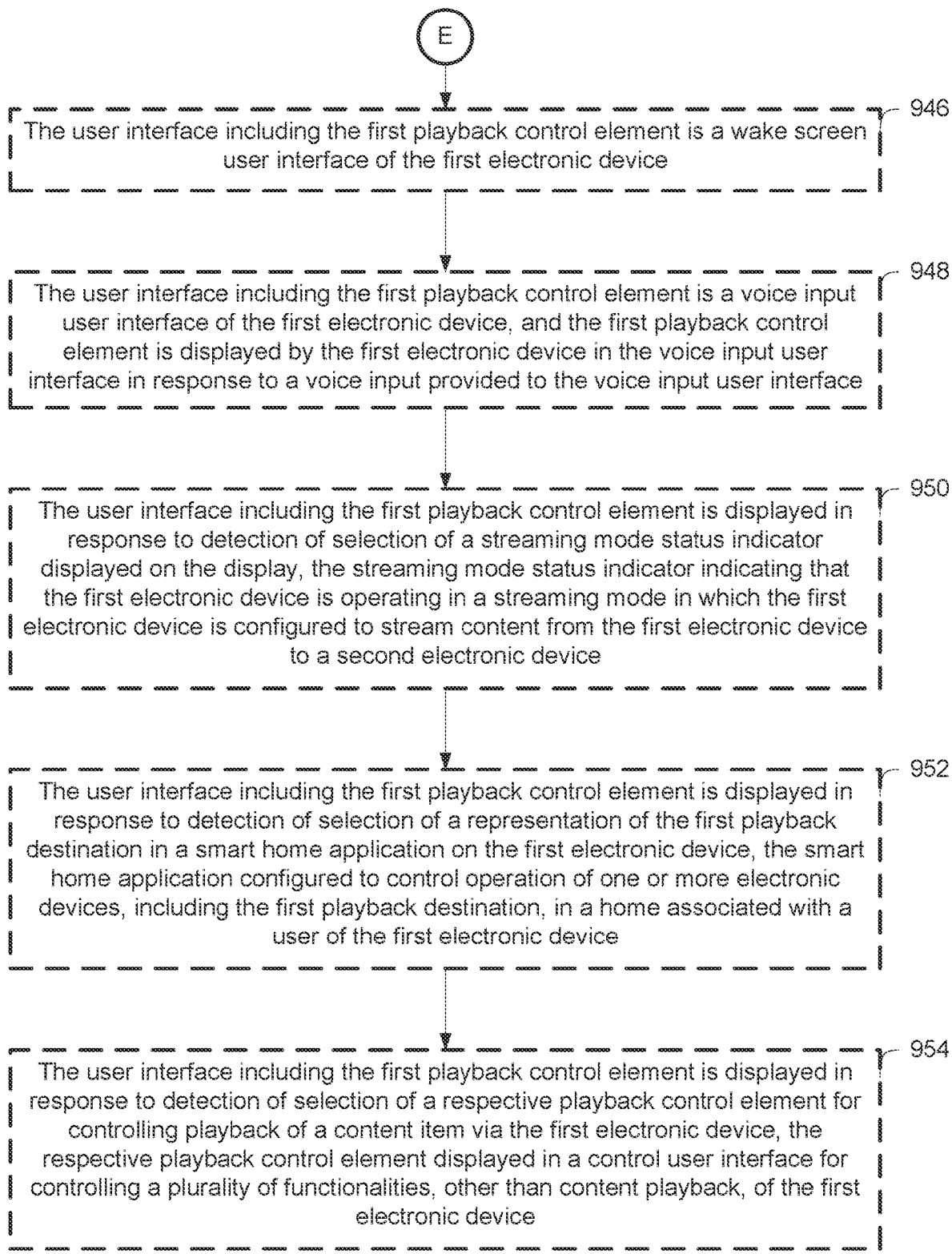

FIGS. 8A-8S illustrate exemplary ways in which an electronic device presents selectable options to control playback of content on a streaming destination while the electronic device streams content to the streaming destination. The embodiments in these figures are used to illustrate the processes described below, including the processes described with reference to FIGS. 9A-9F.

FIG. 8A illustrates an exemplary device 500 that includes touch screen 504. The electronic device is in communication with the other electronic devices indicated in legend 802, including a first display device 802a, a second display device 802b, and a speaker 802c. The communication link between the electronic device 500 and the other electronic devices 802a-c allows the electronic device 500 to enter a streaming mode with respect to one or more of the electronic devices 802a-c to stream content to the respective electronic device with a content application, as will be described herein.

FIG. 8A illustrates the electronic device 500 presenting a wake screen user interface. The wake screen user interface is presented when the first electronic device 500 transitions from a standby mode in which the display is optionally off or not presenting a user interface. The wake screen user interface includes a first playback control element 804a associated with the first display device 802a and a second playback control element 804c associated with the speaker 802c. As indicated by legend 802 of FIG. 8A, the electronic device is not presently streaming content to either the first display device 802a or the second display device 802b, and is currently streaming audio content to the speaker 802c.

Accordingly, the first playback control element 804a associated with the first display device 802a indicates that there is no content currently playing on the first display device. The first playback control element 804a includes a remote option 806 that is selectable to display a remote user interface, as will be described below with reference to FIGS. 8D-8E.

The second playback control element 804c includes a number of selectable options that when selected modify the playback of the content on the speaker 802c in accordance with the user's selection. The second playback control element 804c includes an indication 808a of the name of the content that is playing on the speaker 802c, album artwork 808b associated with the content playing on the speaker, a scrubber bar 808c, a skip back option 808d, a skip ahead option 808e, a pause option 808f, a volume down option 808g, a volume up option 808h, and a volume bar 08i. It should be understood that in some embodiments, the scrubber bar 08c includes text indications of the playback position in the content and the amount of time remaining until the end of the content. The volume bar 808i is provided because the speaker 802c is configured to share its current volume level with the electronic device 500, allowing the electronic device 500 to present the volume level to the user with the volume bar 808i. In some embodiments, volume bar 808i is directly manipulable by the user to change the volume level of speaker 802c (e.g., by dragging a current volume position in the volume bar 808i left/right), in addition to or rather than selection of elements 808g and 808h to change the volume. As shown in FIG. 8A, the playback control element 804c associated with the speaker 802c includes a number of controls and information not included in the playback control element 804a associated with the first display device 802a. The playback control element 804c is in an expanded state and the playback control element 804a is in a collapsed state. If the user were to select the collapsed playback control element 804a, it would become expanded to reveal applicable controls and information to control the first display device 802a and the playback control element 804c would be replaced with a collapsed version that includes fewer controls and/or less information.

FIG. 8B illustrates a controls user interface. The controls user interface is a system user interface that includes one or more selectable options for controlling one or more functions of the first electronic device such as volume, brightness, and/or network connection(s) (e.g., Wi-Fi, Bluetooth, and/or cellular data connections). The controls user interface includes connectivity controls 810a, a screen orientation control 810b, a do not disturb control 810c, a screen mirroring control 810d, a brightness control 810e, a volume control 810f, and a playback control element 810g. As indicated in the legend 802 of FIG. 8B, the electronic device 500 is currently streaming content to the first display device 802a and is not currently streaming content to the second display device 802b or the speaker 802c.

Because the electronic device 500 is streaming content to the first display device 802*a*, the playback control element 810*g* includes information and selectable options associated with playback of content on the first display device 802*a*. The playback control element 810*g* includes an indication 812*a* of the name of the content that is playing on the first electronic device 802*a*, a skip ahead option 812*b*, a skip back option 812*c*, and a pause option 812*d*. As shown in FIG. 8B, the user selects (e.g., with contact 803) the playback control element 810*g*. The contact 803 has one or more of an intensity 846*a* or a time 846*b* that exceeds a predetermined threshold.

As shown in FIG. 8C, in response to the user's selection, the electronic device 500 presents playback control elements 804*a-c* that correspond to the first display device 802*a*, the second display device 802*b*, and the speaker 802*c*. The playback control element 804*c* associated with the speaker 802*c* includes an indication that the speaker is not playing content. The playback control element 804*b* associated with the second display device 802*b* includes an indication that the second display device 802*b* is not playing content and a remote option 816.

The playback control element 804*a* associated with the first display device 802*a* includes an indication 814*a* of the name of the content that is playing on the first display device, artwork 814*b* associated with the content that is playing on the first display device, a scrubber bar 814*c*, a skip backwards option 814*d*, a skip ahead option 814*e*, a pause option 814*f*, a volume down option 814*g*, a volume up option 814*h*, a remote option 814*i*, and a language and subtitles option 814*j*. The playback control element 804*a* associated with the first display device 802*a* includes volume down and volume up options 814*g-h* but does not include a volume bar because the first display device 802*a* optionally does not share its volume level with the electronic device 500. Therefore, the electronic device 500 is optionally unable to present the absolute volume level of the first display device 802*a*. It should be understood that, in some embodiments, the scrubber bar 814*c* includes text indications of the playback position in the content and the time remaining until the end of the content.

As shown in FIG. 8D, the user selects (e.g., with contact 803) the remote option 814*i*. In response to the user's selection, the electronic device 500 presents a remote control user interface as shown in FIG. 8E.

FIG. 8E illustrates the remote control user interface. The remote control user interface includes a touchpad region 818*a*, a play/pause option 818*b*, a menu option 818*c*, a content application option 818*d*, and a voice input option 818*e*. The touchpad region 818*a* allows the user to navigate a user interface presented on the first display device 802*a* with touch input. The play/pause option 818*b* plays paused content and pauses playing content on the first display device 802*a*. The menu option 818*c* causes the user interface presented on the first display device 802*a* to navigate back. The content application 818*d* option presents a content application user interface on the first display device 802*a*. The voice input option 818*e* causes the electronic device 500 to accept a voice input to control the first display device 802*a*.

As shown in FIG. 8E, the user enters an input (e.g., with contact 803 and movement of the contact) to navigate back to the previous user interface with the playback control elements 804*a-c*. In response to the user's input, the electronic device 500 presents the playback control elements 804*a-c*, as shown in FIG. 8F. In some embodiments, the movement of contact 803 corresponds to an upward swipe from the bottom edge of touch screen 504 that in other circumstances optionally causes device 500 to display its home screen, as will be described in more detail later.

FIG. 8F illustrates playback control elements 804*a-c* associated with the first display device 802*a*, the second display device 802*b*, and the speaker 802*c*, respectively. As shown in FIG. 8F, the user selects (e.g., with contact 803) the language and subtitles option 814*j*. In response to the user's selection, the electronic device 500 presents the language and subtitles menu, as illustrated in FIG. 8G.

FIG. 8G illustrates the language and subtitles menu 820. The language and subtitles menu 820 includes a plurality of selectable options 822*a-d* to change the language of the audio content playing on the first display device 802*a* and a plurality of selectable options 824*a-c* to change the language of the subtitles presented with the content playing on the first display device. In response to a selection of one of the options 822*a-d* or 824*a-c*, the first electronic device 500 controls the first display device 802*a* to modify the content in accordance with the user input. The language and subtitles menu 820 further includes a "done" option 826 that, when selected, causes the electronic device to cease displaying the language and subtitles menu. As shown in FIG. 8G, the user selects (e.g., with contact 803) the "done" option 826. In response to the user's selection, the electronic device 500 ceases displaying the language and subtitles menu 820 and displays the playback control elements 804*a-c*, as shown in FIG. 8H.

FIG. 8H illustrates the playback control elements 804*a-c* associated with the first display device 802*a*, the second display device 802*b*, and the speaker 802*c*. As indicated by the legend 802 of FIG. 8H, the electronic device 500 streams content to the first display device 802*a*. The second display device 802*b* is also playing content (e.g., content streamed from electronic device 500, content streamed from a different electronic device, or content playing natively on the second display device 802*b*). The playback control platter 804*b* associated with the second display device 802*b* is currently in its collapsed state and includes an indication 817 of the title of the content that is playing on the second display device 802*b*. The playback control element 804*b* does not include a selectable option for presenting a remote control user interface because there is content playing on the second display device 802*b* and the playback control element 804*b* includes the indication 817 of which content is playing on the second display device 802*b*. The playback control element 804*c* does not include a selectable option for presenting the remote control user interface, either, because, unlike the display devices 802*a-b*, the speaker 802*c* is not controlled with a remote control so it is not controlled with the remote control user interface, either.

FIG. 8I illustrates a smart home application user interface. The smart home application user interface includes a plurality of selectable options 828*a-i* associated with various smart appliances and accessories in the user's home. The options include a front door option 828*a*, a bedroom light option 828*b*, a living room light option 828*c*, an office lamp option 828*d*, a bathroom light option 828*e*, a kitchen light option 828*f*, a first display device 802*a* option 828*g*, a second display device 802*b* option 828*h*, and a speaker 802*c* option 828*i*. The smart home user interface further includes an indication 830 that the electronic device 500 is operating in the streaming mode to stream content. As shown in the legend 802 of FIG. 8I, the electronic device 500 is streaming content to the first display device 802*a*.

As shown in FIG. 8I, the user selects (e.g., with contact 803) the option 828*g* associated with the first display device

802*a*. The contact 803 has one or more of an intensity 846*a* or a time 846*b* that exceeds a respective predetermined threshold. In response to the user's selection, the electronic device 500 presents a playback control element associated with the first display device 802*a*, as shown in FIG. 8J.

FIG. 8J illustrates a playback control element 804*a* associated with the first display device 802*a*. The playback control element 804*a* associated with the first display device 802*a* includes an indication 814*a* of the name of the content that is playing on the first display device. artwork 814*b* associated with the content that is playing on the first display device, a scrubber bar 814*c*, a skip backwards option 814*d*, a skip ahead option 814*e*, a pause option 814*f*, a volume down option 814*g*, a volume up option 814*h*, a remote option 814*i*, and a language and subtitles option 814*j*. It should be understood that, in some embodiments, the scrubber bar 814*c* includes text indications of the playback position in the content and the time remaining until the end of the content.

While displaying the playback control element 804*a* associated with the first display device 802*a*, the electronic device 500 also presents an indication 832 of the name and device type of the first display device and a setting option 834 that is selectable to present an options menu associated with the first display device 802*a*. As indicated by the scrubber bar 814*c*, the playback position within the content that is playing on the first display device 802*a* is close to the end of the content.

FIG. 8K illustrates the playback control element 804*a* once the item of content reaches the end. As indicated by legend 802 of FIG. 8K, the electronic device 500 is configured to stream content to the first display device 802*a*, but the first display device 802*a* is not currently playing content. The playback control element 804*a* includes selectable options that when selected cause the electronic device 500 to stream content associated with the selected option to the first display device 802*a* because the content that was playing has ended, so it is possible the user is interested in watching something else next. The options include an option 836*a* to play the next episode in the TV series of the content that just finished playing and an option 836*b* to play extra content associated with the content that just finished playing. Other types of content options are possible.

In response to a user input to dismiss the playback control element 804*a* illustrated in FIG. 8K, the electronic device 500 presents the smart home application user interface, as shown in FIG. 8L. As indicated by legend 802 of FIG. 8L, the electronic device 500 is streaming content to the first display device 802*a*. While displaying the smart home application user interface, the electronic device 500 receives a user input (e.g., contact 803 and movement of the contact) for dismissing the smart home user interface and presenting the home screen user interface, as shown in FIG. 8M. The user input illustrated in FIG. 8L for navigating to the home screen user interface is the same input gesture for dismissing the remote application to display the playback control elements 804*a-c* as shown in FIGS. 8E-8F.

FIG. 8M illustrates the home screen user interface shown in response to the user input detected in FIG. 8L. The electronic device presents the indication 830 of the streaming mode while presenting the home screen user interface. While presenting the home screen user interface, the electronic device 500 detects a user input for presenting a voice assistant user interface. In response to the input, the electronic device 500 presents the voice assistant user interface, as shown in FIG. 8N.

FIG. 8N illustrates the voice assistant user interface. While presenting the voice assistant user interface, the electronic device 500 optionally presents the indication 830 of the streaming mode. In some embodiments, however, the indication 830 of the streaming mode is not presented and the clock or another system indicator icon is presented in its place. The electronic device 500 detects a voice input saying "What's playing on the TV?" In response to detecting the voice input, the electronic device updates the voice assistant user interface to include the text of the detected voice input, as shown in FIG. 8O.

FIG. 8O illustrates the voice assistant user interface. Although FIG. 8O illustrates the voice assistant user interface as including the indication 830 of the streaming mode, in some embodiments, the indication 830 of the streaming mode is not presented and the clock or another system indicator icon is presented in its place. The voice assistant user interface includes an indication 838 of the detected voice input, "What's playing on the TV?" In response to the voice input, the electronic device presents and speaks the title of the content playing on the first display device 802*a* and a playback control element 804*a* associated with the first display device 802*a*, as shown in FIG. 8P.

FIG. 8P illustrates the voice assistant user interface including the playback control element 804*a* associated with the first display device 802*a*. Although FIG. 8P illustrates the voice assistant user interface as including the indication 830 of the streaming mode, in some embodiments, the indication 830 of the streaming mode is not presented and the clock or another system indicator icon is presented in its place. The voice assistant user interface further includes an indication 840 of the content that is playing on the first display device 802*a*. The electronic device 500 plays audio stating "TV Show A is playing on Display A" while it displays the indication 840 and the playback control element 804*a*. If, instead of asking "What's playing on the TV?" the user asks about content playing on another electronic device (e.g., the speaker 802*c*), the voice assistant user interface illustrated in FIG. 8P would include the playback control element associated with the other electronic device (e.g., playback control element 804*c* associated with speaker 802*c*).

FIG. 8Q illustrates the home screen user interface. As indicated by legend 802 of FIG. 8Q, the electronic device 500 is streaming content to the first display device 802*a*. While presenting the home screen user interface, the electronic device 500 presents the indication 830 that the electronic device is operating in the streaming mode. The user selects (e.g., with contact 803) the option 452 to present a content application, as shown in FIG. 8R.

FIG. 8R illustrates the content application user interface. While presenting the content application user interface, the electronic device 500 presents the visual indication 830 of the streaming mode. As shown in FIG. 8R, the user selects (e.g., with contact 803) the indication 830 of the streaming mode. In response to the user's selection, the electronic device 500 presents the playback control element 804*a* associated with the first display device 802*a*. In some embodiments, one or more playback control platters 804*a-c* shown in various user interfaces (e.g., the wake screen, the controls user interface, the smart home application, the voice assistant user interface, in response to selecting the visual indication of the streaming mode) share some or all characteristics and/or features. That is, the same playback control elements can be presented in multiple different user interfaces or situations.

FIGS. 9A-9F are flow diagrams illustrating a method 900 of presenting selectable options to control playback of content on a streaming destination while the electronic device streams content to the streaming destination. The method 900 is optionally performed at an electronic device such as device 100, device 300, device 500, device 501, device 510, and device 591 as described above with reference to FIGS. 1A-1B, 2-3, 4A-4B and 5A-5J. Some operations in method 900 are, optionally combined and/or order of some operations is, optionally, changed.

As described below, the method 900 provides ways to present selectable options to control playback of content on a streaming destination while the electronic device streams content to the streaming destination. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device (e.g., electronic device 500, a smartphone, media player or wearable device including a touch screen, a personal computer including or in communication with one or more input devices such as a keyboard, trackpad, or touch screen, or a set-top box in communication with a display, such as a television, a speaker, and a remote that includes a touch panel or touch screen) with one or more processors and memory receives (902), via the one or more input devices, an input corresponding to a request to display a user interface for controlling content playback via the first electronic device, such as the wake screen user interface illustrated in FIG. 8A.

In some embodiments, the electronic device presents a selectable option that when activated causes the electronic device to present one or more content playback controls. For example, the selectable option is optionally a selectable representation of a playback destination. In some embodiments, the playback destination is currently playing content while operatively coupled to the first electronic device so that the first electronic device is able to be used to control the playback (e.g., the first electronic device is streaming content accessible on the first electronic device (e.g., stored locally on the first electronic device or streamed to the first electronic device from a streaming content server) from the first electronic device to the playback destination). In some embodiments, the playback destination is not currently playing content from the first electronic device but is operatively coupled to the first electronic device such that the first electronic device is able to initiate and control content playback on the playback destination. The selectable option is optionally presented in a system user interface such as a control user interface including information and controls related to several operations performed at the first electronic device (e.g., wireless connection information and controls, screen orientation information and controls, volume information and controls, display brightness information and controls, shortcuts to various applications such as flashlight, timer, calculator, and camera, etc. and media playback information and controls), a lock or wake screen of the electronic device (e.g., a user interface that is viewable even when the electronic device has not been authenticated for full use by the user of the electronic device and/or is displayed when the device wakes from a low power state), a home application configured to control various "smart" home devices such as lights, irrigation, locks, climate control, appliances, and media playback devices, or a digital assistant user interface of the electronic device.)

In some embodiments, such as in FIG. 8A, in response to receiving the input, the first electronic device 500 displays (904), on the display, the user interface including a first playback control element 804c for controlling content playback at a first playback destination 802c. In some embodiments, the first playback control element includes one or more of a play/pause option, a skip ahead option, a skip back option, a volume control option, a playback destination selection option, a scrubber bar, a language/subtitles option, and a remote control option. The first playback control element optionally further includes information about the media content that is playing or an indication that no media content is playing and a visual indication identifying the playback destination. In some embodiments, the first playback destination is the first electronic device itself (e.g., the first playback control element is for controlling playback of content on the first electronic device), and in some embodiments, the first playback destination is another electronic device. In some embodiments, the first playback control element is for controlling playback of content delivered from the first electronic device to a second electronic device.

In some embodiments, such as in FIG. 8A, in accordance with a determination that the first playback destination 802a is configured to be controlled with a remote control device, the first playback control element 804a includes a selectable option 806 that is selectable to display, on the display, a remote control user interface, such as remote control user interface illustrated in FIG. 8E, corresponding to the remote control device, for controlling the first playback destination (906).

In some embodiments, the first playback destination is a display device that is controllable with a physical, dedicated remote control, or a set-top box connected to a television, where the set-top box is controllable with a physical, dedicated remote control. In some examples, the remote control user interface optionally includes control elements that are the same as or different from the first playback control element or the physical control mechanisms (e.g., buttons, touch-sensitive surfaces, switches, etc.) included on the dedicated remote control device. For example, the remote control user interface optionally includes a play/pause option, a "menu" option (e.g., that when selected causes the first playback destination to navigate to a menu or up in a menu hierarchy of a menu presented on a display in communication with the first playback destination), a playback destination selection option (e.g., that when selected causes the first electronic device present a user interface for selecting a different playback destination), a voice input option (e.g., that when selected causes the first electronic device to control the first playback destination using voice input from the user detected by a microphone at the first electronic device), and a trackpad region in which the user is able to enter a touch input to provide directional input to the first playback destination (e.g., to change a selection or current focus on the first playback destination). In some embodiments, the remote control user interface is different from the playback control element in that it includes different control elements from the playback control element (e.g., inclusion of the trackpad region, "menu" option, and voice command option and/or exclusion of the language/subtitles option, volume control option, skip ahead option, and/or skip back option, etc.) and/or occupies a different amount of space on the display in communication with the first electronic device. For example, the first playback control element optionally occupies a smaller amount of screen area than the remote control user interface does. In some embodiments, the remote control user interface is displayed overlaid over the user interface that included the first playback control element.

In some embodiments, such as in FIG. 8A, in accordance with a determination that the first playback destination 802c is not configured to be controlled with the remote control device, the first playback control element 804c does not include the selectable option that is selectable to display, on the display, the remote control user interface (908).

In some embodiments, the first playback destination is a smart speaker that is not controllable with a physical, dedicated remote control) (e.g., the first playback control element includes one or more other control elements such as a play/pause option, a skip ahead option, a skip back option, a volume control option, a playback destination selection option, a scrubber bar, and/or a language/subtitles option, without including the option that is selectable to display the remote control user interface.

The above-described manner of presenting a remote control option in response to a determination that the first playback destination is configured to be controlled with a remote control device allows the first electronic device to present a virtual remote control when the first playback destination is compatible with remote controls, which simplifies interactions between the user and the electronic device and enhances the operability of the electronic device (e.g., by presenting multiple user interfaces for controlling the first playback destination such that the user is able to select the control user interface that suits the operation they wish to perform), which, additionally, reduces power and improves battery life of the electronic device by enabling the user to use the electronic device more quickly and efficiently.

In some embodiments, such as in FIGS. 8D-8E, the electronic device receives (910), via the one or more input devices, an input 603 selecting the selectable option 814i in the first playback control element 804a. In some embodiments, the selectable option, when selected, causes the first electronic device to present a remote control user interface. In some embodiments, such as in FIGS. 8D-8E, in response to receiving the input 603 selecting the selectable option 814i in the first playback control element 804a, the electronic device 500 displays (912), on the display 504, the remote control user interface illustrated in FIG. 8E, wherein the remote control user interface includes a touch input region 818a configured to control the first playback destination 802a in response to touch input detected in the touch input region, and one or more controls 802b-e configured to control the first playback destination 802a in response to selection of the one or more controls. In some embodiments, the one or more controls include a play/pause option, a menu option, a voice input option, and a content application option. In some embodiments, in response to detecting selection of the content application option, the first electronic device causes a content application (e.g., an application that presents content for playback) to be displayed on the first playback destination. Touch input received at the touch input region optionally causes the playback destination to move a cursor, change which item of a plurality of items is selected, scroll content presented on the playback destination, or perform other operations. In some embodiments, the remote control user interface will be accessible while the electronic device is locked if the electronic device locks and/or enters a sleep mode.

The above-described manner of presenting selectable options and a touch input region for controlling the playback destination allows the first electronic device to function as a remote control when it is streaming content to the playback destination, which simplifies interactions between the user and the electronic device and enhances the operability of the electronic device (e.g., by presenting controls in a layout that is likely to be familiar to the user), which, additionally, reduces power and improves battery life of the electronic device by enabling the user to use the electronic device more quickly and efficiently.

In some embodiments, such as in FIG. 8E, while displaying the remote control user interface, the first electronic device 500 receives (914), via the one or more input devices, a respective input 803. In some embodiments, an input corresponds to an input for presenting the home screen when the input is received while the first electronic device presents a user interface other than the remote control user interface. In some embodiments, in response to receiving the respective input 803, the first electronic device 500 ceases (916) to display the remote control user interface illustrated in FIG. 8E, and displays the user interface for controlling content playback via the first electronic device 500 such as in FIG. 8F, wherein the first electronic device 500 is configured to display a home screen, such as the home screen illustrated in FIG. 8M, of an operating system of the first electronic device 500 in response to detecting the respective input (e.g., the input 603 illustrated in FIG. 8L) when the respective input is detected while the first electronic device is displaying a user interface other than the remote control user interface, such as the smart home application user interface illustrated in FIG. 8L. In some embodiments, the input comprises a swipe, such as an upward swipe from the bottom edge of the touch screen of the first electronic device. The user interface for controlling the content playback via the first electronic device is optionally different from the remote control user interface. For example, the user interface for controlling the content playback and the remote control user interface optionally include different selectable options, have a different layout, or have other differences.

The above-described manner of presenting the user interface for controlling the content playback via the first electronic device in response to an input received while the first electronic device presents the remote user interface allows the first electronic device to present playback controls in a variety of different layouts, which simplifies interactions between the user and the electronic device and enhances the operability of the electronic device (e.g., by allowing the user to choose the playback control layout that is best suited to the inputs they wish to enter), which, additionally, reduces power and improves battery life of the electronic device by enabling the user to use the electronic device more quickly and efficiently.

In some embodiments, such as in FIG. 8A, in accordance with a determination that the first playback destination 802c provides absolute volume information to the first electronic device 500, the first playback control element 804c includes an absolute volume control element 808i for controlling a volume level at the first playback destination, wherein the absolute volume control element indicates a current volume level of the first playback destination (918). In some embodiments, the playback control element includes a bar representing the range of possible playback volumes from minimum to maximum with the current volume marked, or a similar visual indication of volume. In some embodiments the indication of the current volume is presented proximate to the selectable options for raising and lowering the playback volume. In some embodiments, such as in FIG. 8C, in accordance with a determination that the first playback destination 802a does not provide absolute volume information to the first electronic device, the first playback control element 804a includes a relative volume control element 814g-h for controlling the volume level at the first playback destination, wherein the relative volume control element does not indicate the current volume level of the first playback destination (920). In some examples, the first electronic device optionally does not indicate the playback volume of the playback destination. In some embodiments, the playback control element includes selectable options for raising and lowering the playback volume without an indication of the current playback volume level. In some embodiments, the volume controls are presented in a detailed playback control element, but not in a top-level playback control element. The volume controls are optionally not displayed when nothing is playing on the playback destination.

The above-described manner of presenting an indication of the current playback volume when the playback destination provides absolute volume information to the first electronic device allows the first electronic device to inform the user what the current playback volume is when that information is available, which simplifies interactions between the user and the electronic device and enhances the operability of the electronic device, which, additionally, reduces power and improves battery life of the electronic device by enabling the user to use the electronic device more quickly and efficiently.

In some embodiments, such as in FIGS. 8F-G, in accordance with a determination that the first playback destination 802a comprises a display device, the first playback control element 804a includes a selectable option 814j that, when selected, causes the first electronic device 500 to display, on the display 504, language and subtitle options 820 for the first playback destination (922). In some examples, the language and subtitle options are optionally presented in a playback control element that includes multiple selectable options for controlling playback on the first playback destination while there is content playing on the first playback destination. In response to detecting selection of the language and subtitles option, the first electronic device optionally presents one or more selectable options for changing the language of the audio content of the content and/or changing the language of subtitles presented with the content, including an option to turn off the subtitles. In some embodiments, the language and subtitle option is not presented in a collapsed playback control element that is presented while the first electronic device presents a detailed playback control element for a different playback destination or while there is no content playing on the first playback destination. In some embodiments, such as in FIG. 8A in accordance with a determination that the first playback destination 802c does not comprise a display device, the first playback control element 804c does not include the selectable option that, when selected, causes the first electronic device 500 to display, on the display 504, the language and subtitle options for the first playback destination (924). In some examples, when the first playback destination is a speaker or another electronic device that does not include a display, the playback control element optionally does not include the language/subtitle option.

The above-described manner of presenting the language and subtitle option when displaying the first playback control element for a display device allows the first electronic device to present to the user the ability to modify a playback language and/or subtitle option when the playback destination and/or the content support these options, which simplifies interactions between the user and the electronic device and enhances the operability of the electronic device (e.g., by providing the language and subtitle option when applicable to the user without requiring additional input to access the controls and by conserving screen space when the language and subtitle option is not relevant), which, additionally, reduces power and improves battery life of the electronic device by enabling the user to use the electronic device more quickly and efficiently.

In some embodiments, while displaying, on the display, the first playback control element (926), while a content item is being played at the first playback destination via the first electronic device, the first electronic device displays (928) the first playback control element as including one or more playback controls, including the selectable option, for controlling the first playback destination. In some embodiments, the first playback control element includes selectable options including play/pause, skip ahead, skip backwards, volume control, and a selectable option for changing the streaming destination for the content that is currently playing. In some embodiments, the first playback control element further includes a subtitles and language option and a selectable option that, when selected, causes the first electronic device to display a remote control user interface. In some embodiments, such as in FIGS. 8J-K, while displaying the first playback control element 804a with the one or more playback controls 814c-j, the electronic device detects (930) an end of playback of the content item. In some embodiments, the content item is played through to the end of the content item. In some embodiments, such as in FIG. 8K, in response to detecting the end of the playback of the content item, the first electronic device 500 replaces (932) the one or more playback controls 814c-j in the first playback control element 804a with one or more representations 836a-b of recommended content items. In some examples, the representations of recommended content items optionally include representations of content that is included in a collection that includes the content item (e.g., the next episode in a TV series) or content that is related (e.g., same genre, provider, creators, artists, or recommended based on content consumption history at the first electronic device. In some embodiments, the representations of recommended content items are selectable to present the respective item of content on the playback destination.

The above-described manner of presenting representations of recommended content when the item of content is played through allows the first electronic device to suggest items of content for the user to consume after the item of content is finished, which simplifies interactions between the user and the electronic device and enhances the operability of the electronic device (e.g., by presenting the user with selectable options for presenting more content without requiring the user to navigate the content application to find representations of content they wish to consume), which, additionally, reduces power and improves battery life of the electronic device by enabling the user to use the electronic device more quickly and efficiently.

In some embodiments, the first playback control element has an expanded state and a collapsed state (934). In some embodiments, the expanded state includes more options for controlling playback on the streaming destination than the collapsed state does. In some embodiments, the first electronic device is able to present multiple collapsed playback control elements for various playback destinations in communication with the first electronic device while presenting one expanded playback control element at a time. In some embodiments, such as in FIG. 8J, in the expanded state, the first playback control element 804*a* includes the selectable option 814*i* that is selectable to display the remote control user interface independent of whether a content item is being played at the first playback destination 802*a* (936). In some examples, the remote control user interface is optionally a user interface that includes selectable options for controlling playback on the playback destination and a touch input area. In some embodiments, the remote control user interface and the playback control element are different in layout, the number of selectable options for controlling playback, and which selectable options for controlling playback are included. In some embodiments, such as in FIG. 8H, in the collapsed state (938), in accordance with a determination that a content item is being played at the first playback destination 802*b*, the first playback control element 804*b* does not include the selectable option that is selectable to display the remote control user interface (940). In some examples, instead of presenting the selectable option for displaying the remote control user interface, the first electronic device optionally presents information about the content that is playing on the playback destination, such as the content title and/or an image associated with the content. In some embodiments, such as in FIG. 8F, in accordance with a determination that a content item is not being played at the first playback destination 802*b*, the first playback control element 804*b* does include the selectable option 816 that is selectable to display the remote control user interface (942). In some examples, the first playback control element optionally includes the selectable option for presenting the remote control user interface and optionally does not present information about content that is currently playing on the playback destination because there is no content playing on the playback destination.

The above-described manner of presenting a selectable option for presenting the remote control user interface when there is no content playing on the first playback destination allows the first electronic device to provide a shortcut to the user to present the remote control user interface, which simplifies interactions between the user and the electronic device and enhances the operability of the electronic device (e.g., by making it easier for the user to select content to play on the playback destination using the remote control user interface when there is currently no content playing on the playback destination), which, additionally, reduces power and improves battery life of the electronic device by enabling the user to use the electronic device more quickly and efficiently.

In some embodiments, such as in FIG. 8F, the first playback destination 802*a* is currently playing a content item, and the first playback control element 804*a* includes the selectable option 814*i* that is selectable to display the remote control user interface, and a selectable option 814*j* that is selectable to display, on the display 504, language and subtitle options corresponding to the currently-playing content item for the first playback destination (944). In some examples, the first playback control element is optionally presented concurrently with additional control elements for controlling other operations using the electronic device. For example, a controls user interface optionally includes the first playback control element and one or more control elements for controlling functionality of the first electronic device, such as volume and brightness of the first electronic device and one or more network connections of the first electronic device (e.g., cellular connections, Wi-Fi, Bluetooth). As another example, a smart home control user interface optionally includes the first playback control element and control elements for controlling smart home appliances such as lights, sprinklers, kitchen appliances, thermostats, and home security systems. As another example, a wake screen optionally includes the playback control element and one or more representations of notifications that, when selected, cause the electronic device to present a user interface associated with the notification.

The above-described manner of presenting the remote control option and the language and subtitle option in the playback control element for controlling content that is currently playing on the playback destination allows the first electronic device to provide the user with options for controlling the currently-playing content, which simplifies interactions between the user and the electronic device and enhances the operability of the electronic device (e.g., by providing the user with selectable options for controlling the playback of the currently-playing content without requiring the user to enter additional inputs to do so), which, additionally, reduces power and improves battery life of the electronic device by enabling the user to use the electronic device more quickly and efficiently.

In some embodiments, such as in FIG. 8A, the user interface including the first playback control element 804*c* is a wake screen user interface of the first electronic device 500 (946). In some examples, the wake screen user interface is optionally presented when the first electronic device transitions from a standby mode in which the display is optionally off or not presenting a user interface. In some embodiments, the wake screen includes representations of notifications received at the first electronic device, a clock, or other information. In some embodiments, the wake screen user interface is visible without entering authentication (e.g., biometric information, a password, a passcode) for authenticating and "unlocking" the first electronic device.

The above-described manner of presenting the first playback control element on the wake screen allows the first electronic device to provide the user with access to the playback element immediately upon transitioning the first electronic device out of a sleep mode, which simplifies interactions between the user and the electronic device and enhances the operability of the electronic device (e.g., by presenting the playback control element without requiring device authentication or navigation to a different user interface that includes the playback control element), which, additionally, reduces power and improves battery life of the electronic device by enabling the user to use the electronic device more quickly and efficiently.

In some embodiments, such as in FIG. 8P, the user interface including the first playback control element 804*a* is a voice input user interface of the first electronic device 500, and the first playback control element is displayed by the first electronic device in the voice input user interface in response to a voice input provided to the voice input user interface (948). In some examples, the first electronic device optionally presents the playback control element in the voice assistant user interface in response to a voice input related to the content that is currently playing (e.g., "What's playing on the speaker?"). In some embodiments, the voice assistant responds to the voice input (e.g., by providing information about what is playing on the speaker) and concurrently presents the first playback element.

The above-described manner of presenting the playback control element in the voice assistant user interface allows the first electronic device to present the user with the ability to control the content playback after performing an action with respect to the content with the voice assistant, which simplifies interactions between the user and the electronic device and enhances the operability of the electronic device (e.g., by presenting controls the user is likely to want to use without requiring further input for presenting the controls), which, additionally, reduces power and improves battery life of the electronic device by enabling the user to use the electronic device more quickly and efficiently.

In some embodiments, such as in FIGS. 8R-8S, the user interface including the first playback control element 804*a* is displayed in response to detection of selection of a streaming mode status indicator 830 displayed on the display 504, the streaming mode status indicator indicating that the first electronic device 500 is operating in a streaming mode in which the first electronic device is configured to stream content from the first electronic device to a second electronic device 802*a* (950). In some examples, the streaming mode status indicator is optionally displayed in a system indicator region of the display that includes one or more other visual indicators of one or more statuses of the first electronic device. In some embodiments, the first electronic device presents the streaming mode status indicator according to one or more steps of method 1100. In some embodiments, the first electronic device presents the playback control element in response to detecting selection of the streaming mode status indicator only when there is content being streamed from the first electronic device to the playback destination. When the first electronic device is not streaming content the playback destination, in response to detecting selection of the streaming mode status indicator, the first electronic device presents a plurality of selectable options corresponding to one or more playback destinations that the user can select to change the playback destination for subsequent streaming or to select no playback destination (e.g., and play content on the first electronic device itself instead).

The above-described manner of presenting the playback control element in response to selection of the streaming mode status indicator allows the first electronic device to provide a shortcut for presenting the playback control element while presenting one or more other user interfaces at the first electronic device, which simplifies interactions between the user and the electronic device and enhances the operability of the electronic device (e.g., by reducing the number of inputs required to cause the first electronic device to present the playback control element), which, additionally, reduces power and improves battery life of the electronic device by enabling the user to use the electronic device more quickly and efficiently.

In some embodiments, such as in FIGS. 8I-8J, the user interface including the first playback control element 804*a* is displayed in response to detection of selection 803 of a representation 828*g* of the first playback destination 802*a* in a smart home application on the first electronic device 500, the smart home application configured to control operation of one or more electronic devices, including the first playback destination, in a home associated with a user of the first electronic device (952). In some examples, the smart home application optionally includes additional control elements for controlling smart home appliances, such as lights, thermostats, kitchen appliances, home security systems, sprinkler systems, and the like, in addition to the representation of the first playback destination and/or the first playback control element.

The above-described manner of presenting the playback control element in the smart home application allows the first electronic device to present, to the user, elements for controlling multiple aspects of a smart home, including one more playback destinations, which simplifies interactions between the user and the electronic device and enhances the operability of the electronic device (e.g., by concurrently presenting playback control elements that may be used together), which, additionally, reduces power and improves battery life of the electronic device by enabling the user to use the electronic device more quickly and efficiently.

In some embodiments, such as in FIGS. 8B-8C, the user interface including the first playback control element 804*a* is displayed in response to detection of selection 803 of a respective playback control element 810*g* for controlling playback of a content item via the first electronic device 500, the respective playback control element 810*g* displayed in a control user interface for controlling a plurality of functionalities, other than content playback, of the first electronic device (954). In some examples, the control user interface optionally includes one or more control elements for controlling one or more settings of the first electronic device. For example, the control user interface includes volume control, brightness control, and one or more network connection controls (e.g., Wi-Fi, cellular data, and Bluetooth). In some embodiments, the controls user interface includes a selectable option that, when selected, causes the first electronic device to present the playback control element. The selectable option optionally includes a representation of the content that is currently playing on the playback destination (e.g., title, associated artwork, etc.).

The above-described manner of presenting the playback control element in the control user interface allows the first electronic device to concurrently present controls for controlling multiple aspects of the first electronic device, including media playback, which simplifies interactions between the user and the electronic device and enhances the operability of the electronic device (e.g., by presenting commonly-used controls in the same user interface including an option to present the playback control element), which, additionally, reduces power and improves battery life of the electronic device by enabling the user to use the electronic device more quickly and efficiently.

It should be understood that the particular order in which the operations in FIGS. 9A-9F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, and 1500) are also applicable in an analogous manner to method 900 described above with respect to FIGS. 9A-9F. For example, the presentation of playback control options described above with reference to method 900 optionally has one or more of the characteristics of the streaming mode operation and presentation of visual indications of the streaming mode, etc., described herein with reference to other methods described herein (e.g., methods 700, 1100, 1300, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 9A-9F are, optionally, implemented by components depicted in FIGS. 1A-1B. For example, displaying operations 904, 912, 914, 916, 922, 924, 928, 948, 950, 952, and 954 and receiving operations 902, 910, and 914 are, optionally, implemented by event sorter 170, event recognizer 180, and event handler 190.

When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Streaming Mode Visual Indicators

Users interact with electronic devices in many different manners, including using an electronic device to present content, such as audio or video content. In some embodiments, a first electronic device is able to stream content to a second electronic device to present the content using the second electronic device. The embodiments described below provide ways in which a first electronic device presents a visual indication that it is operating in a streaming mode to stream content to a second electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
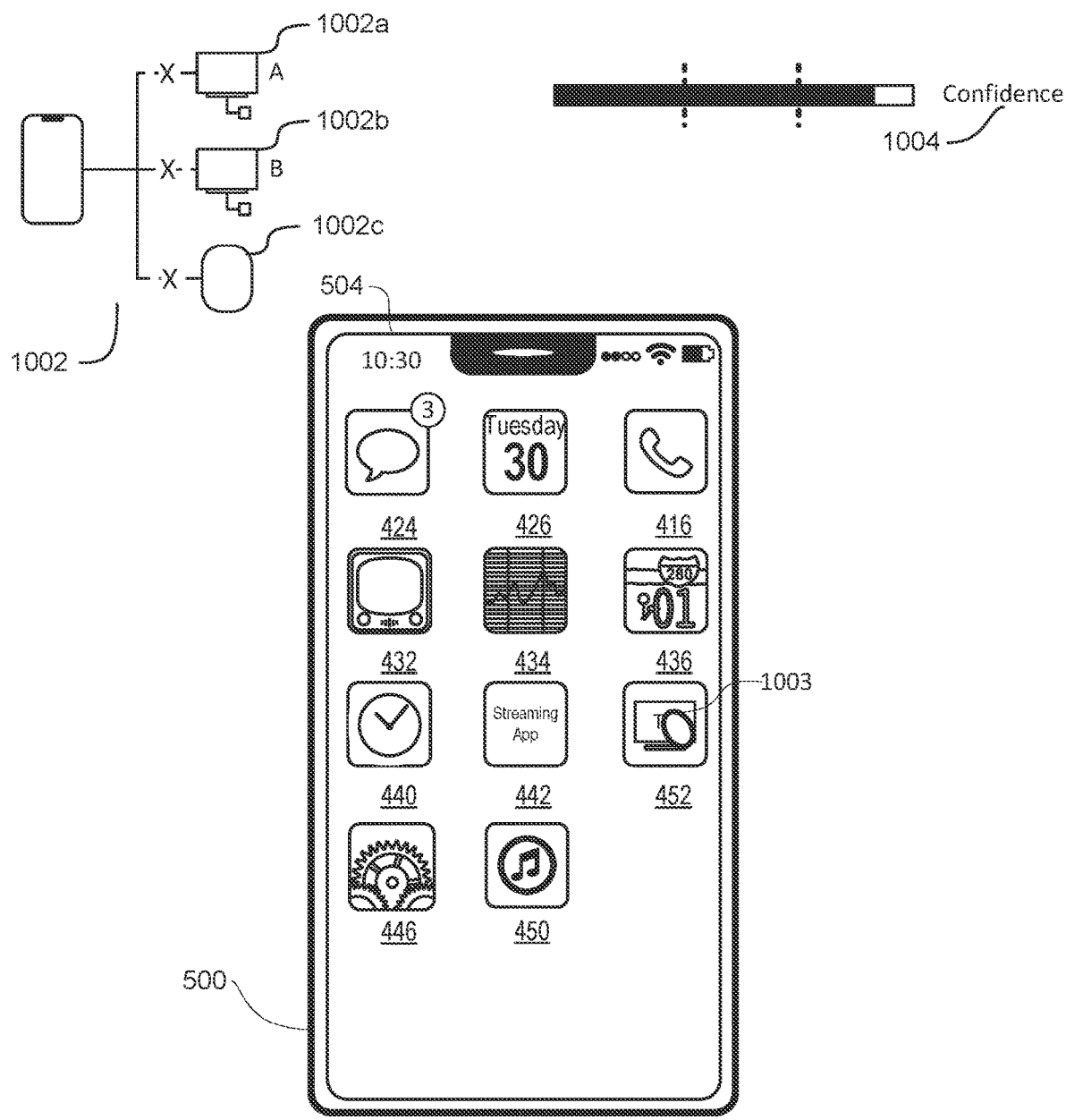
FIGS. 10A-10O illustrate exemplary ways in which an electronic device presents visual indications that the electronic device is operating in a streaming mode to stream content to a playback destination in accordance with some embodiments.
Figure 10B:
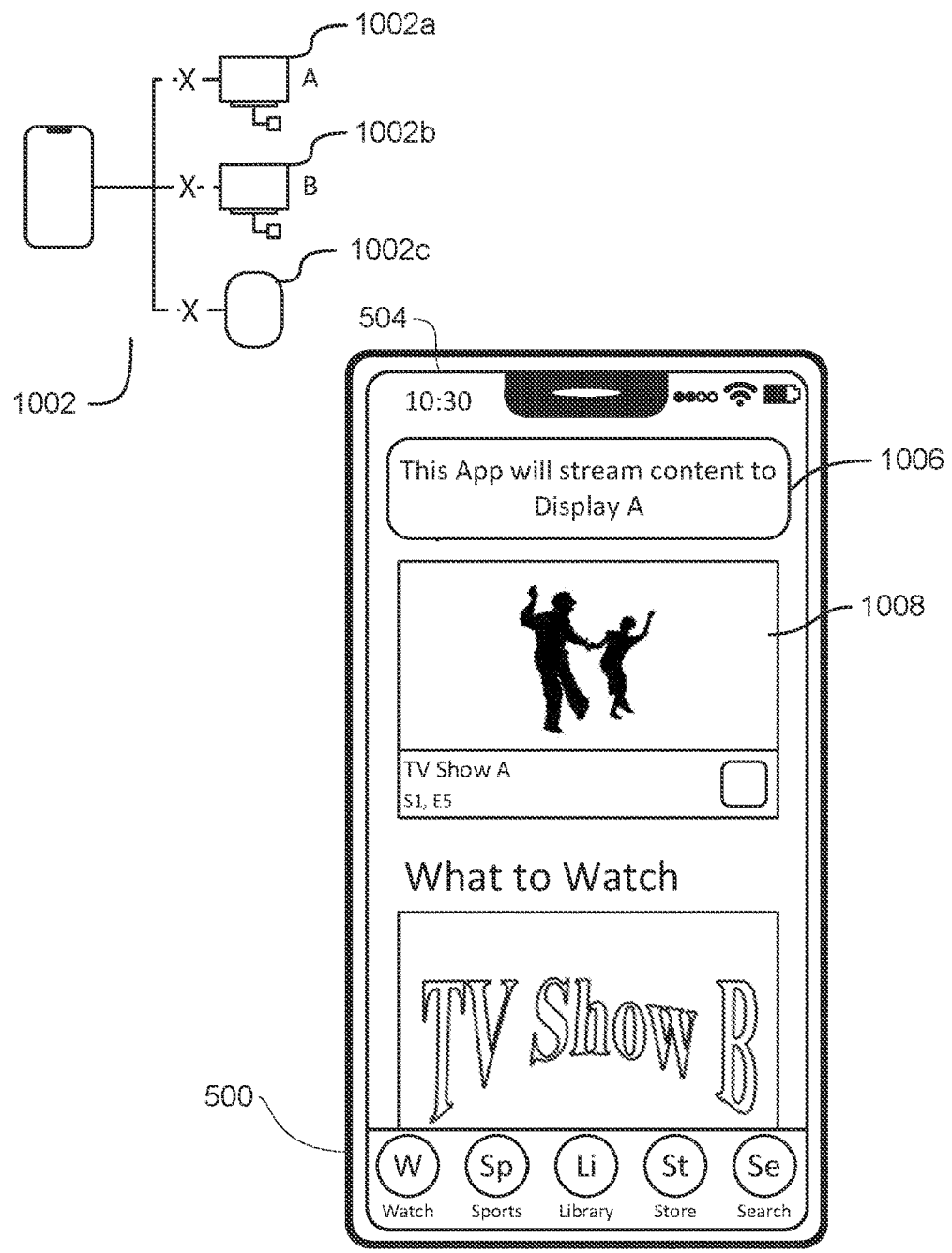
Figure 10C:
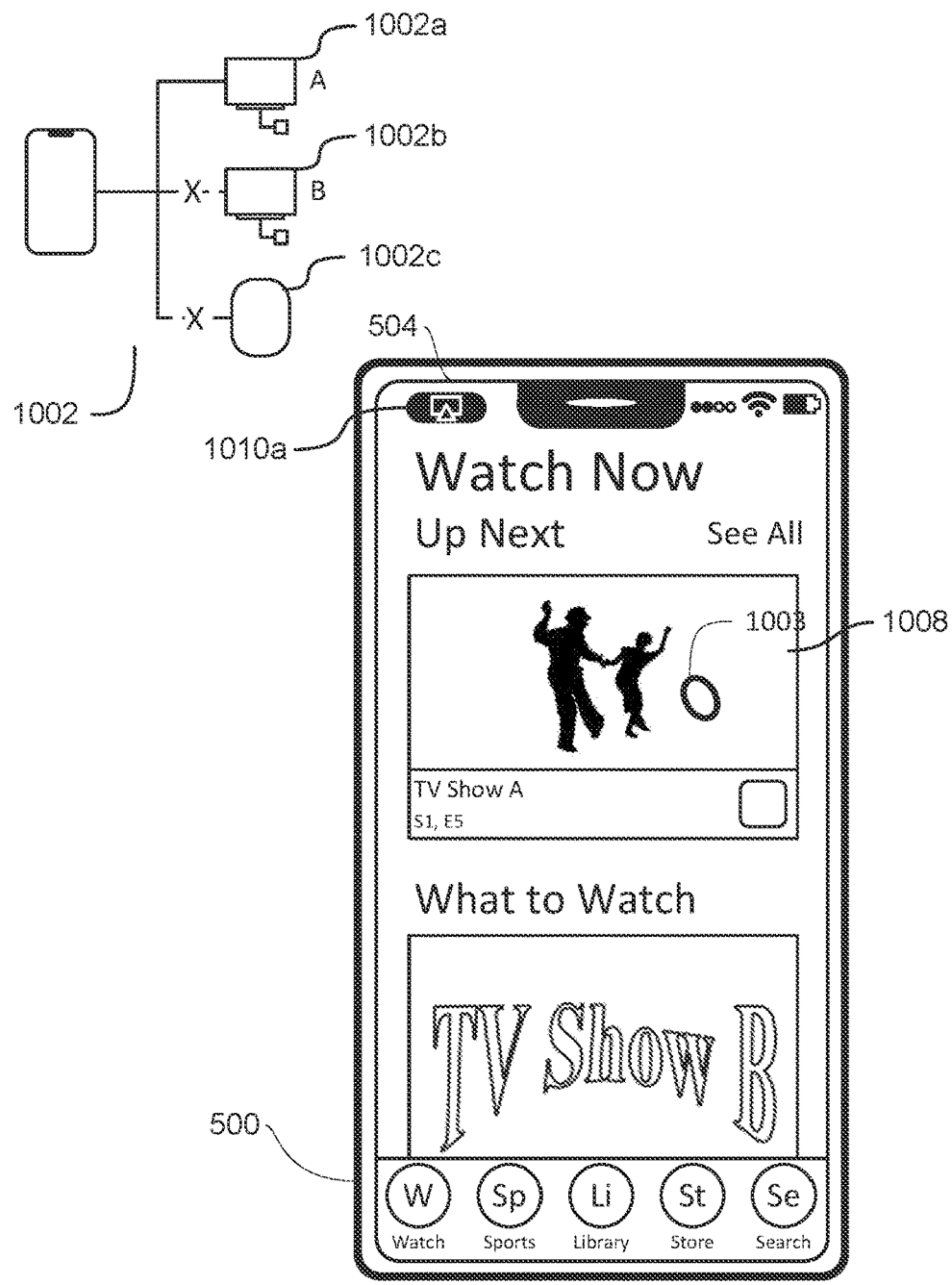
Figure 10D:
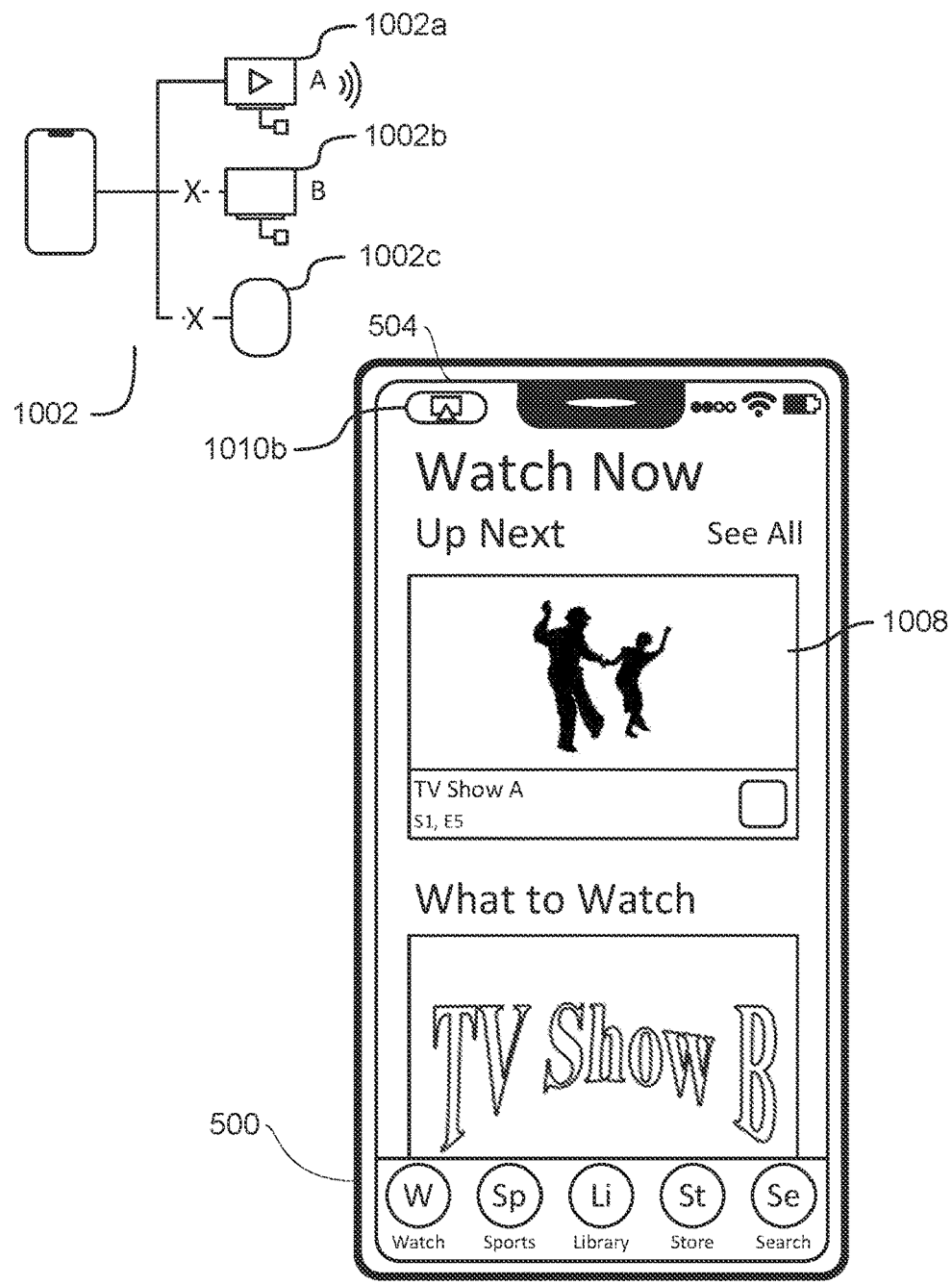
Figure 10E:
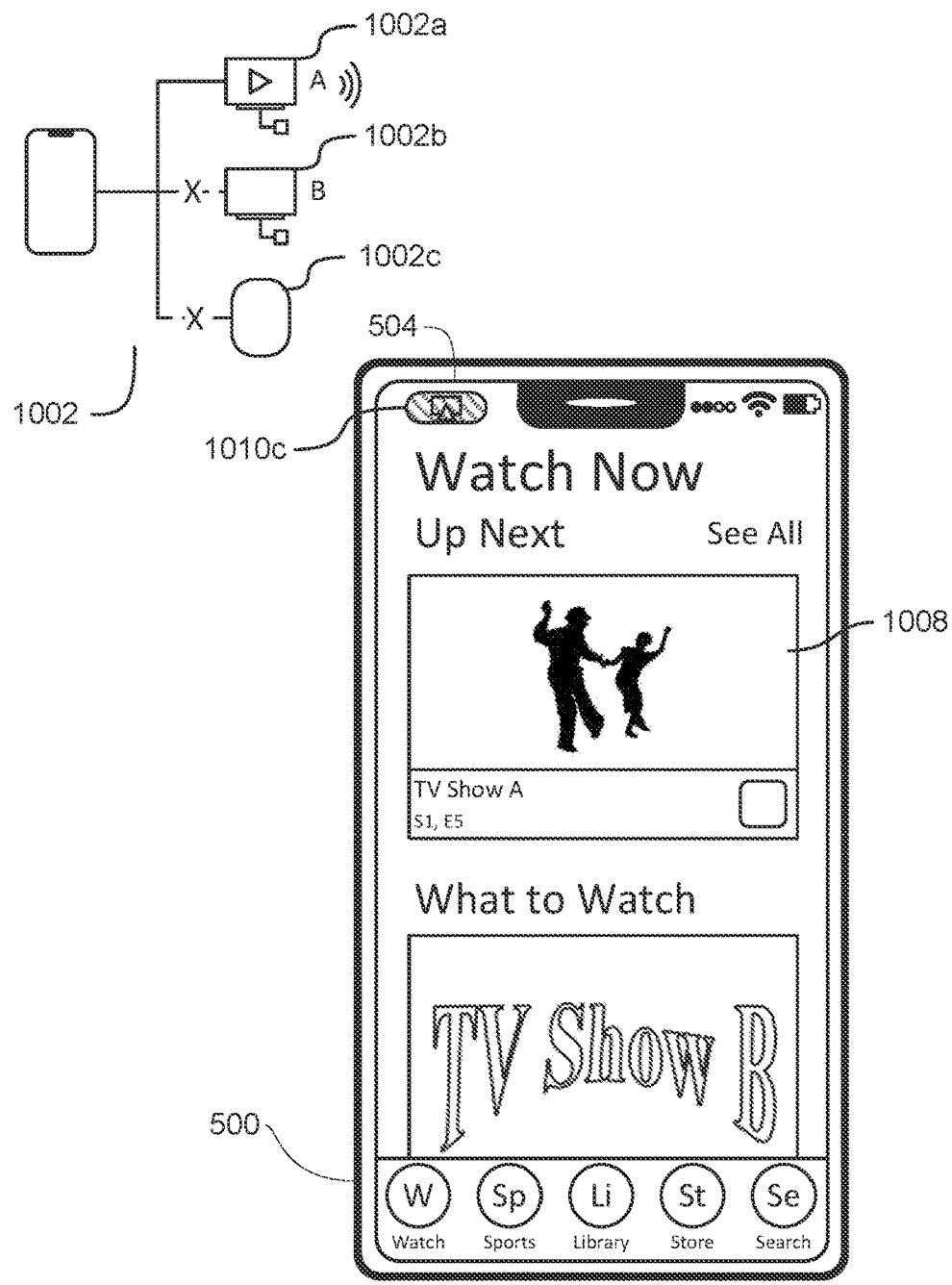
Figure 10F:
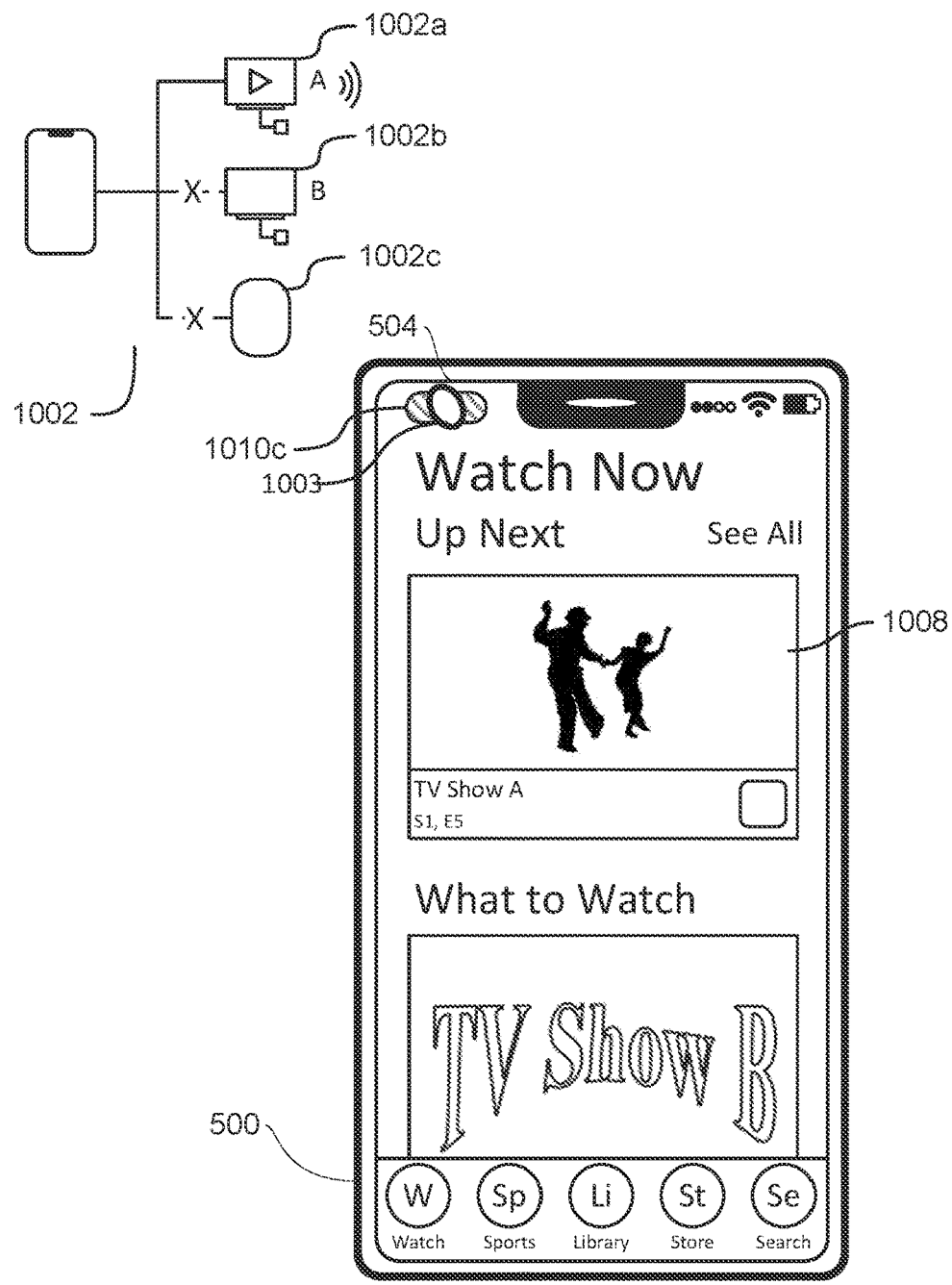
Figure 10G:
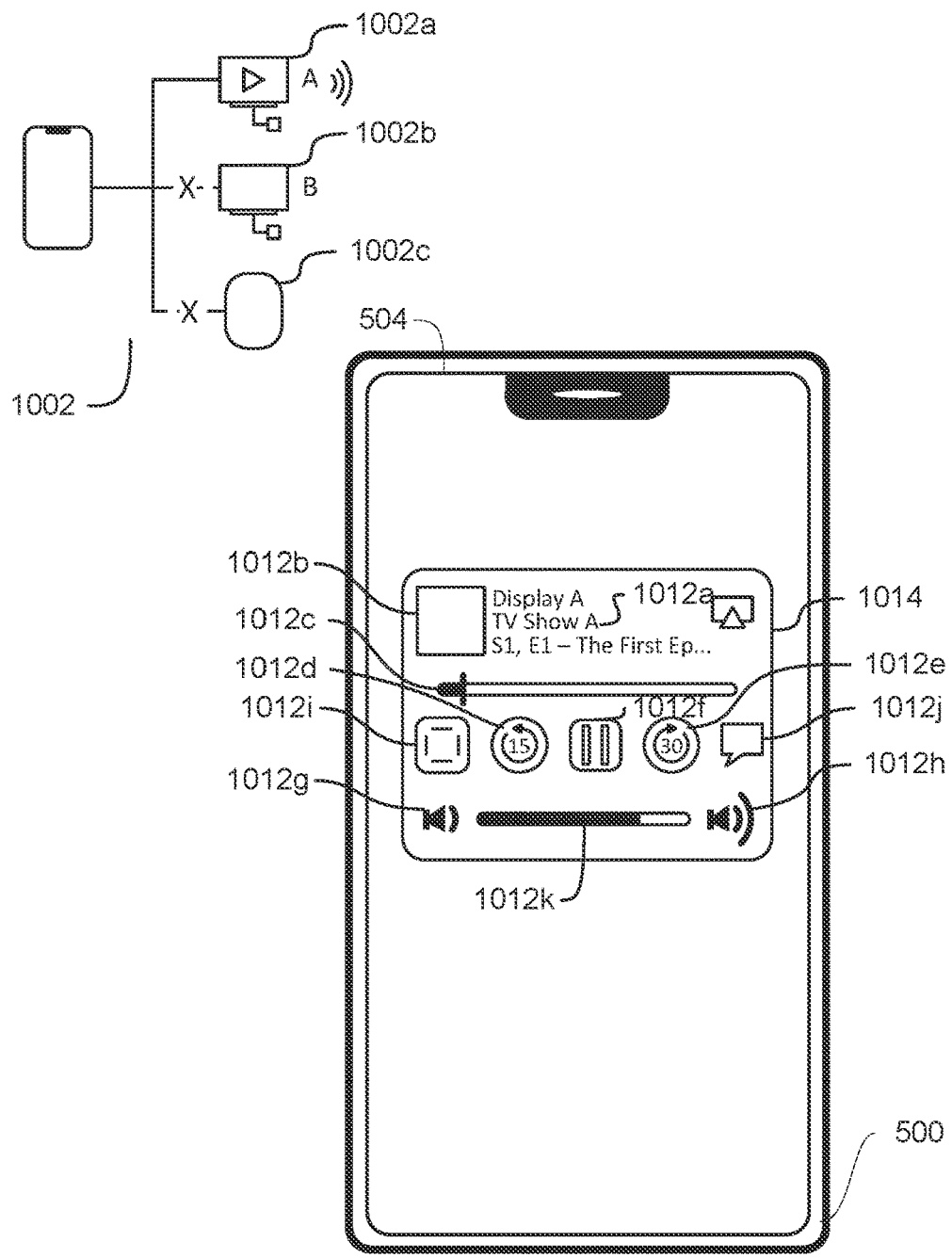
Figure 10H:
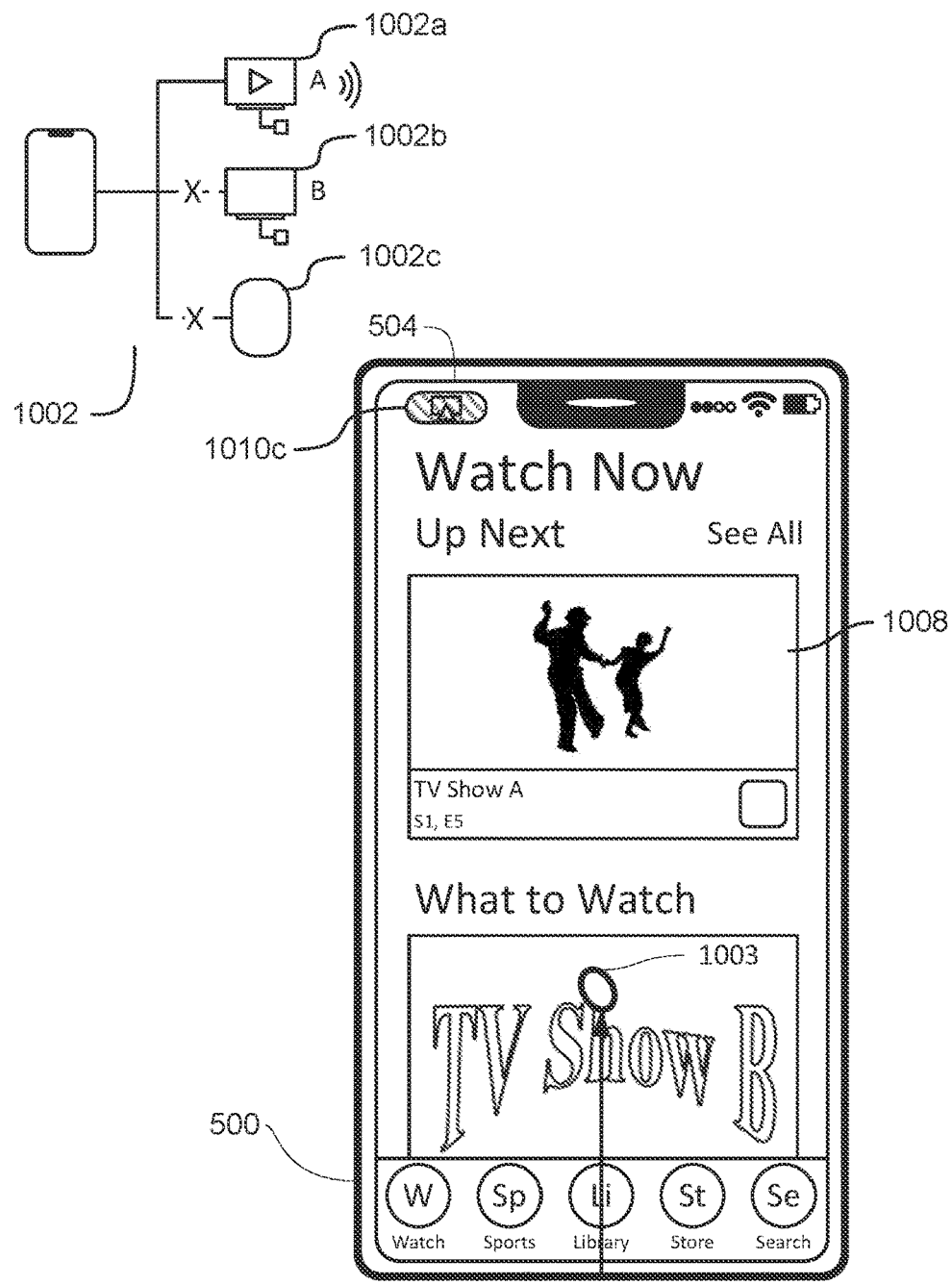
Figure 10I:
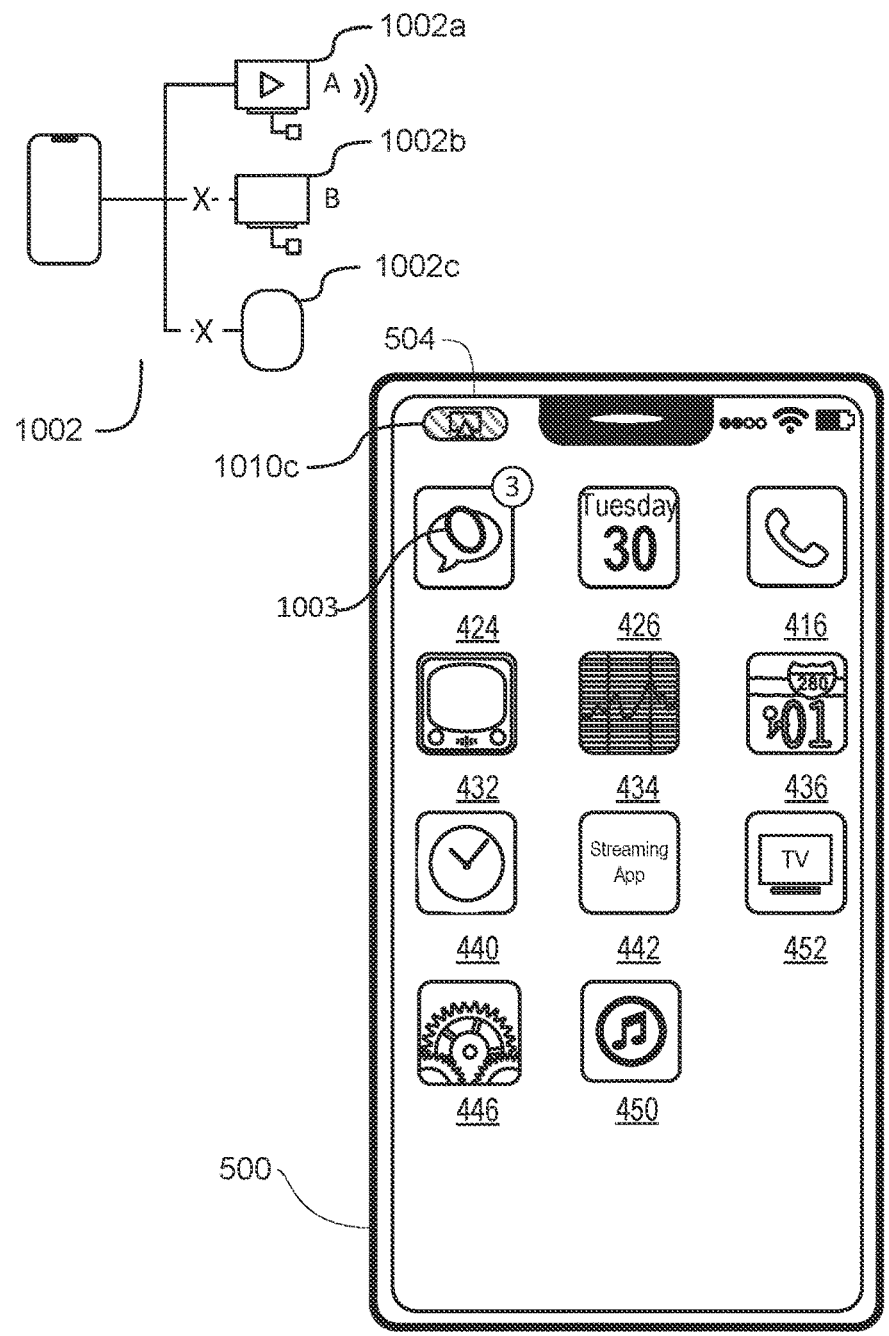
Figure 10J:
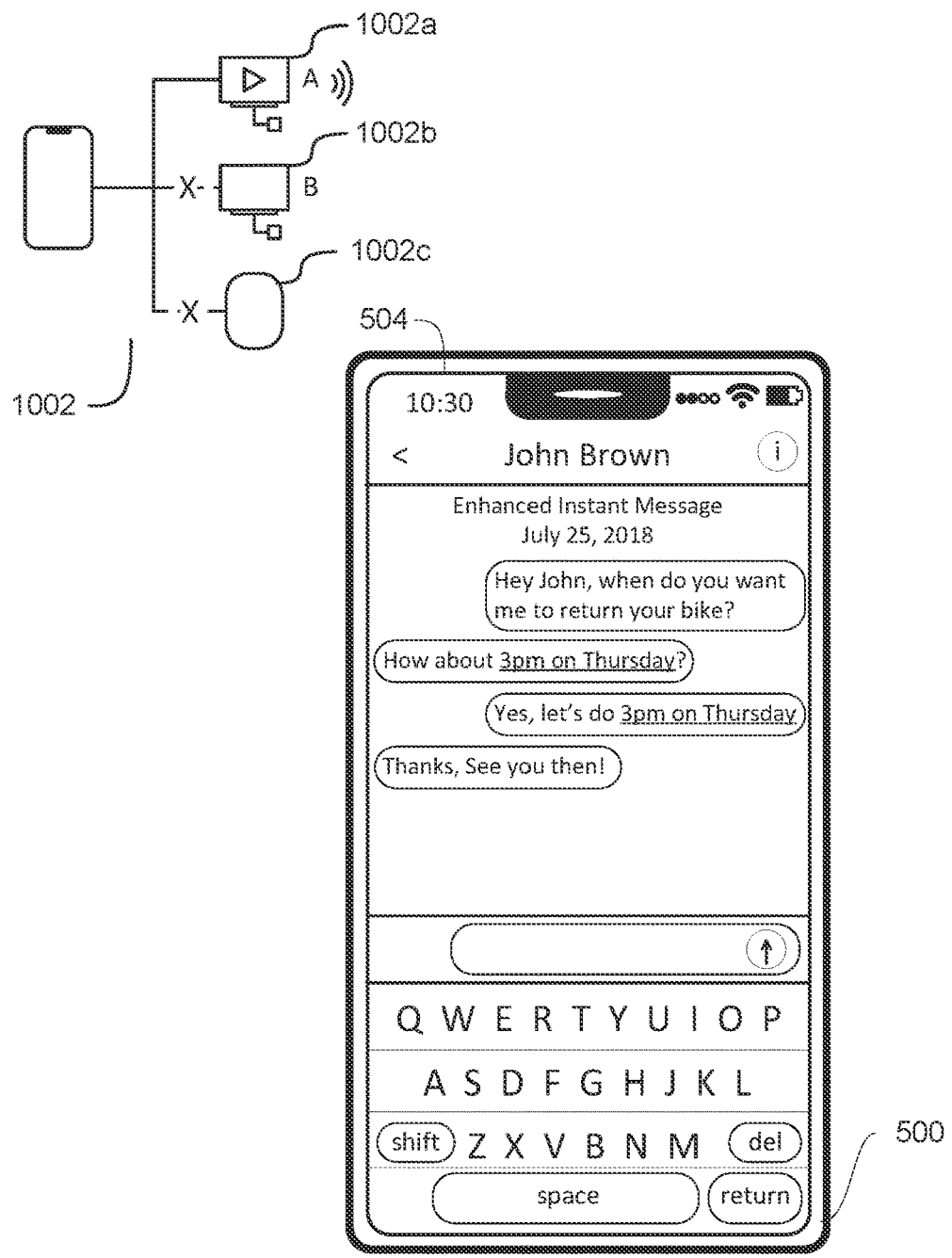
Figure 10K:
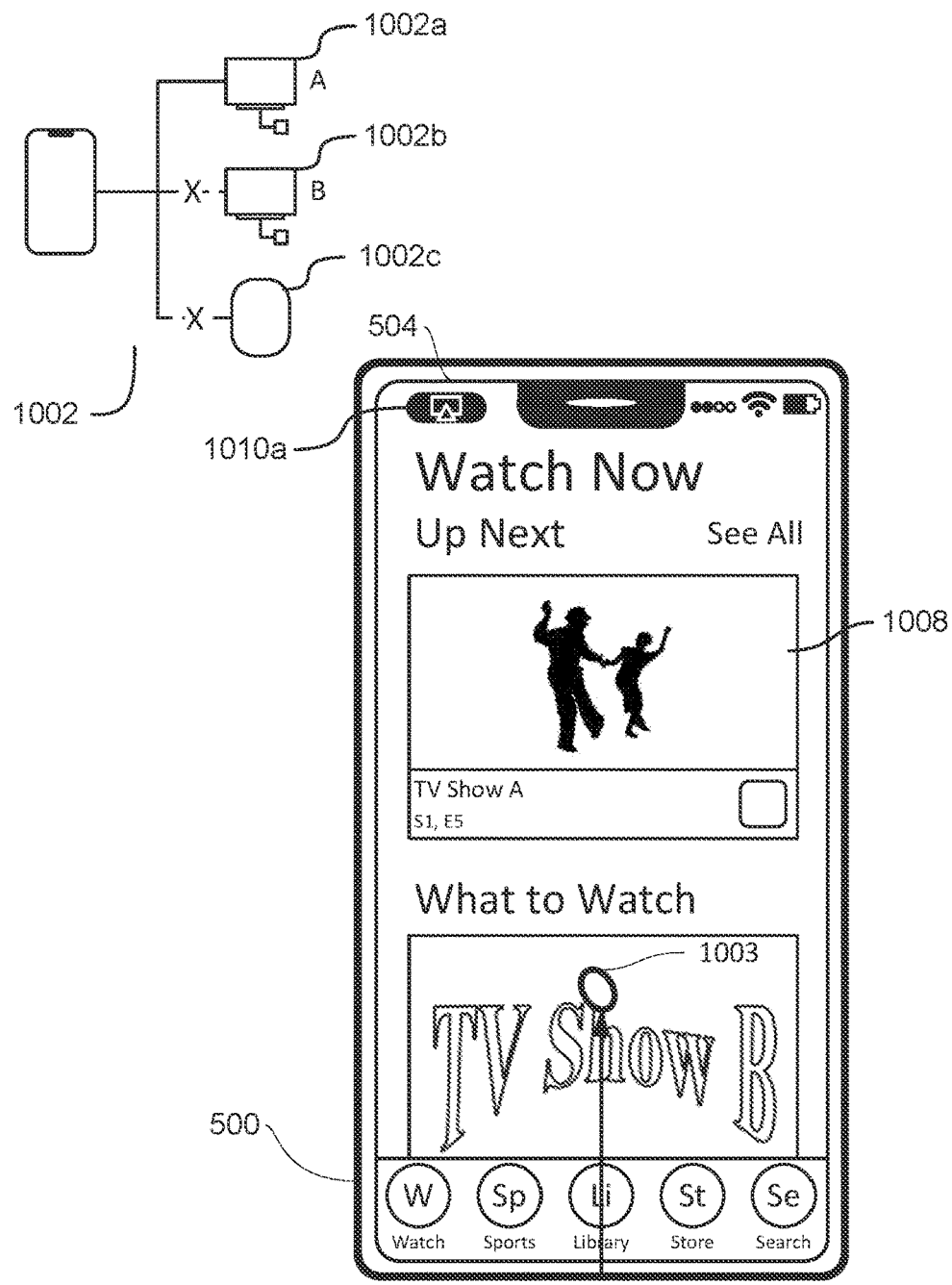
Figure 10L:
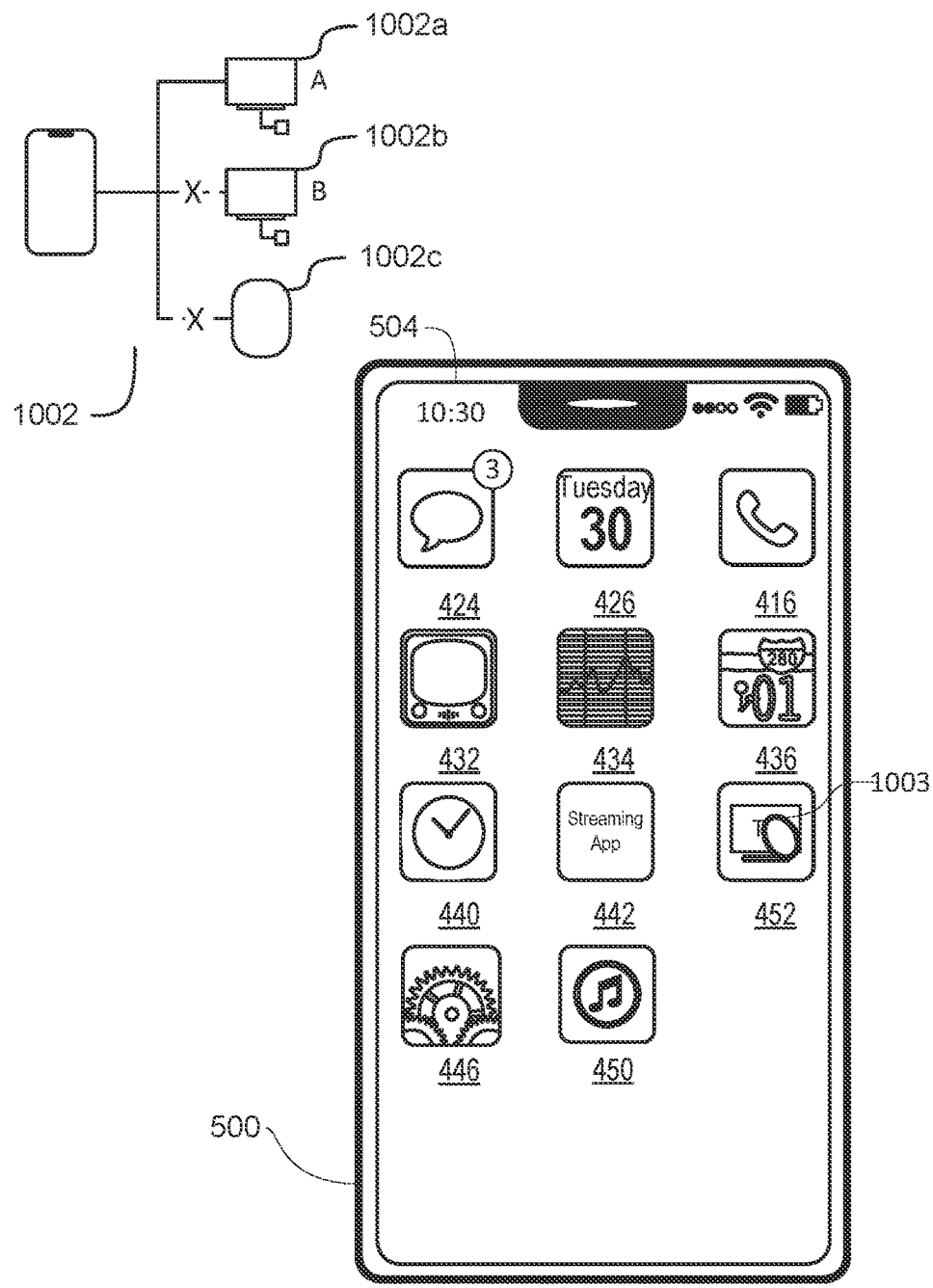
Figure 10M:
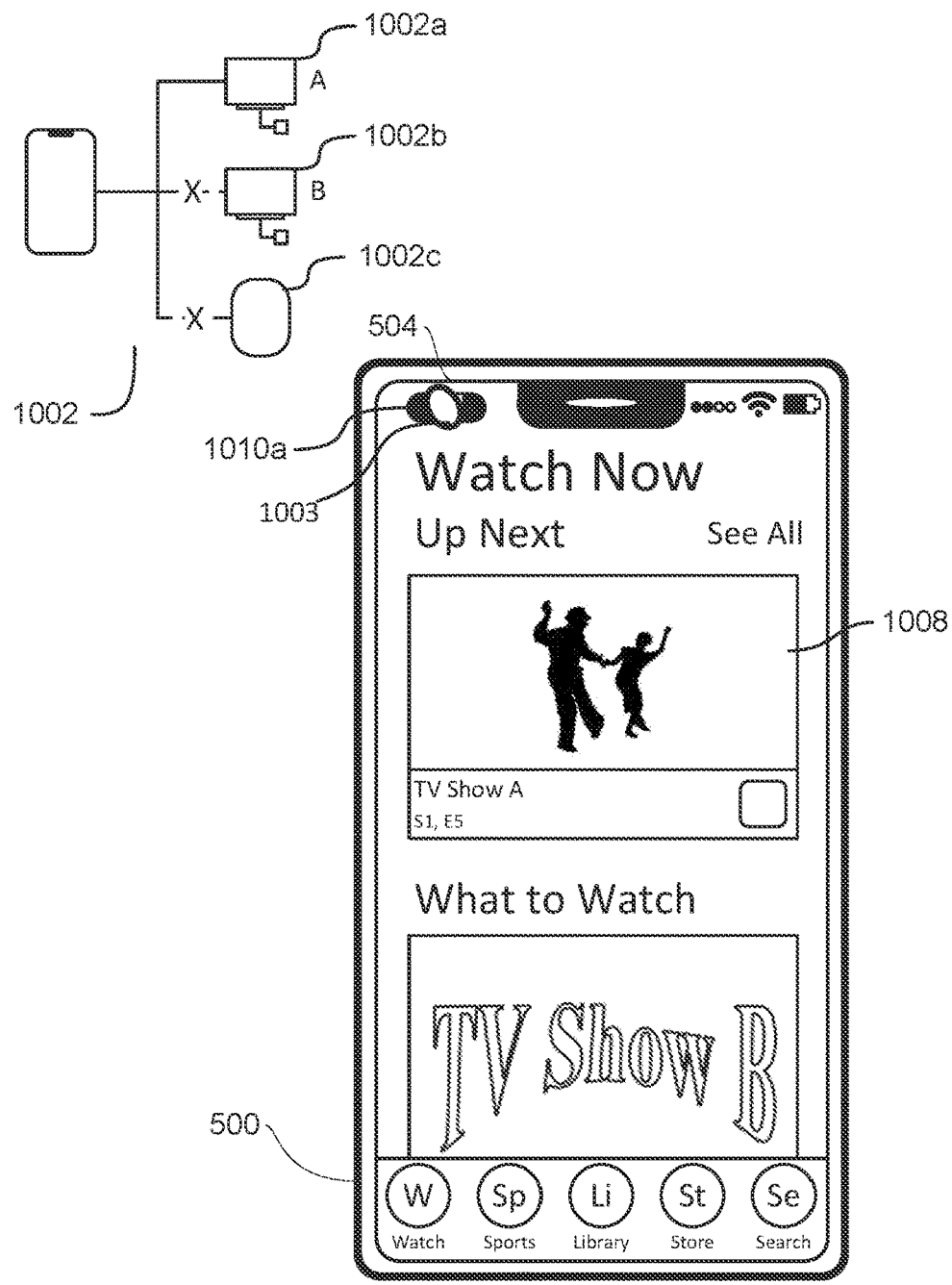
Figure 10N:
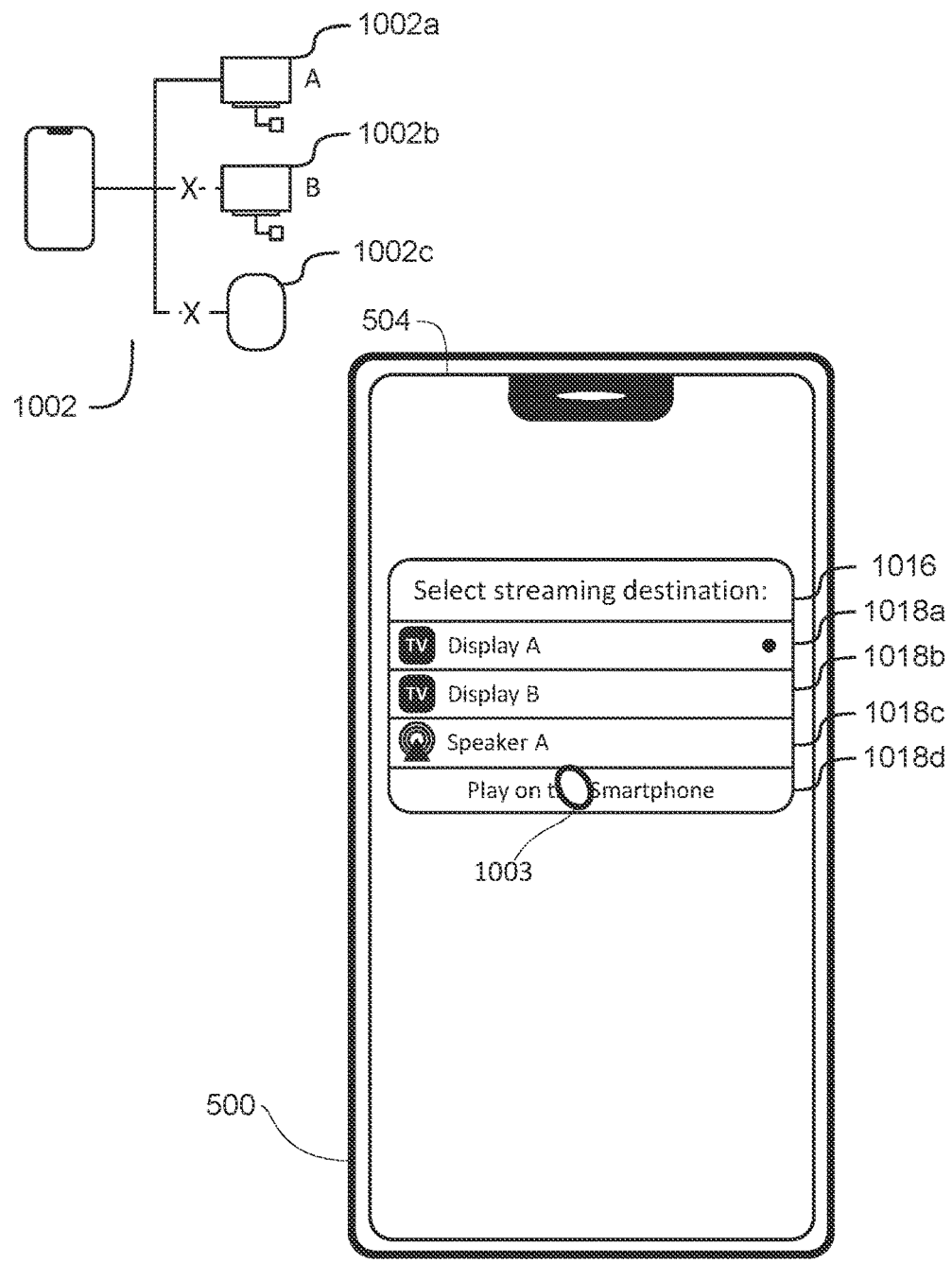
Figure 10O:
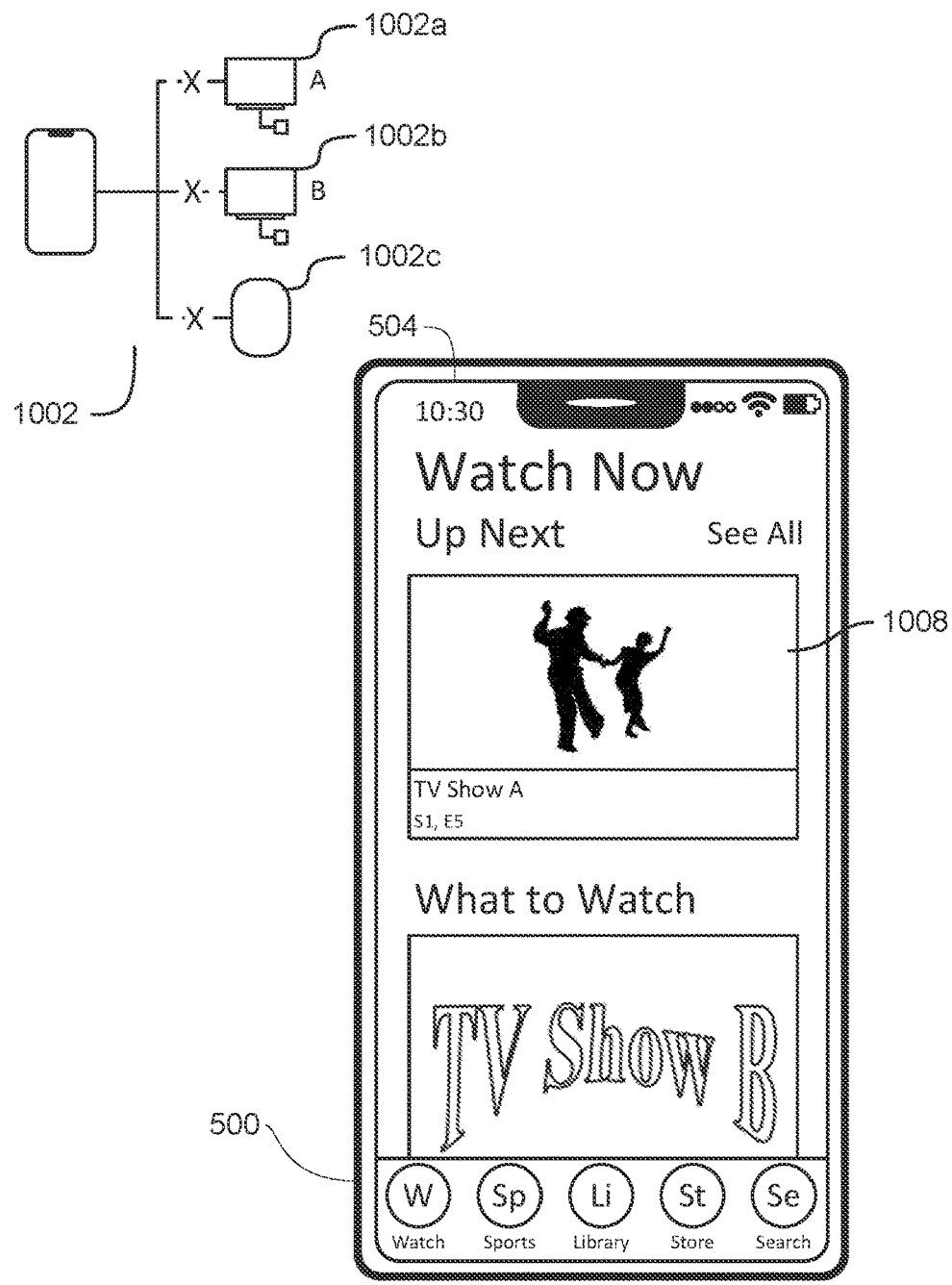
Figure 11A:
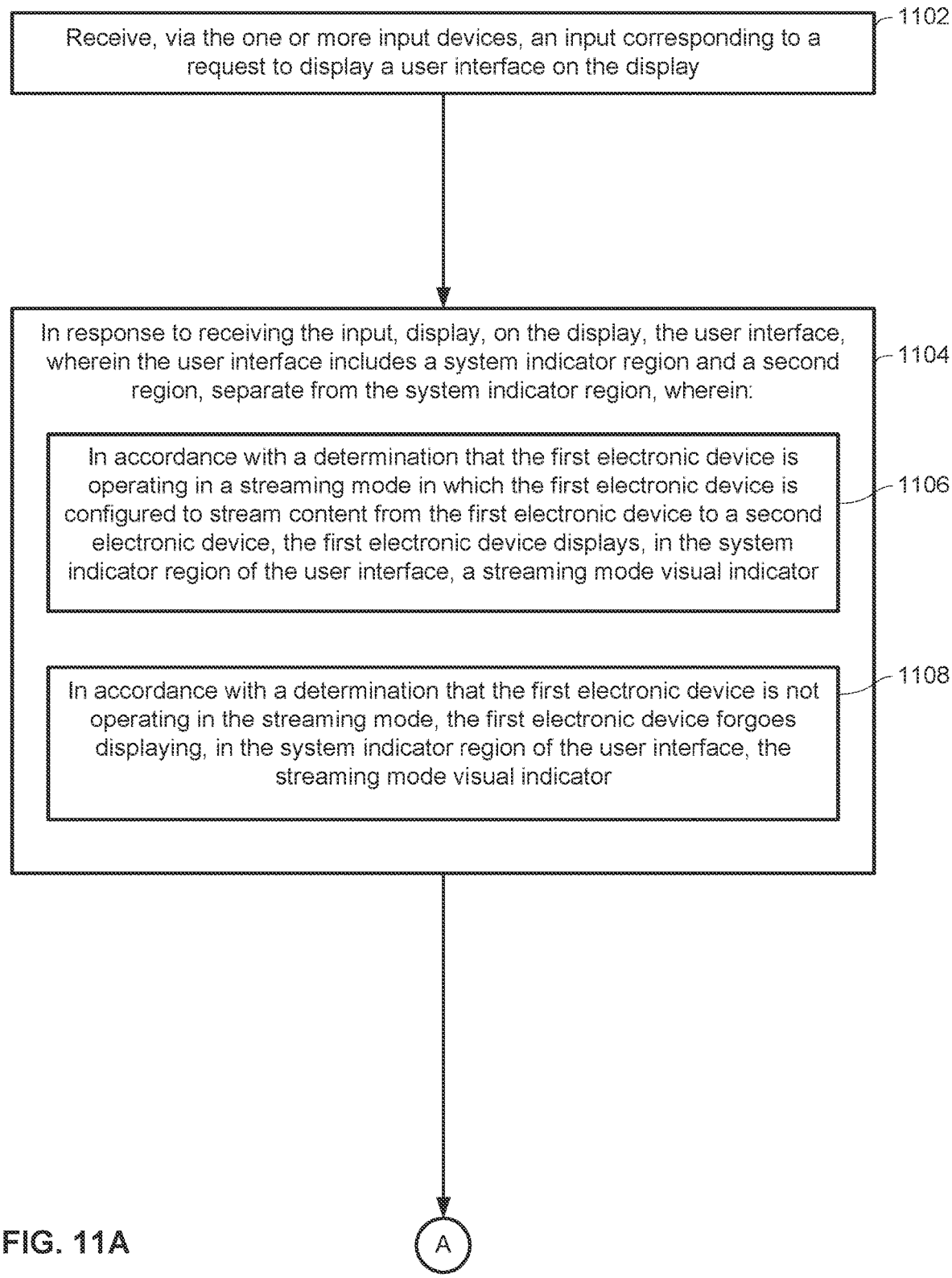
FIGS. 11A-11G are flow diagrams illustrating a method of presenting visual indications on an electronic device that the electronic device is operating in a streaming mode to stream content to a playback destination in accordance with some embodiments.
Figure 11B:
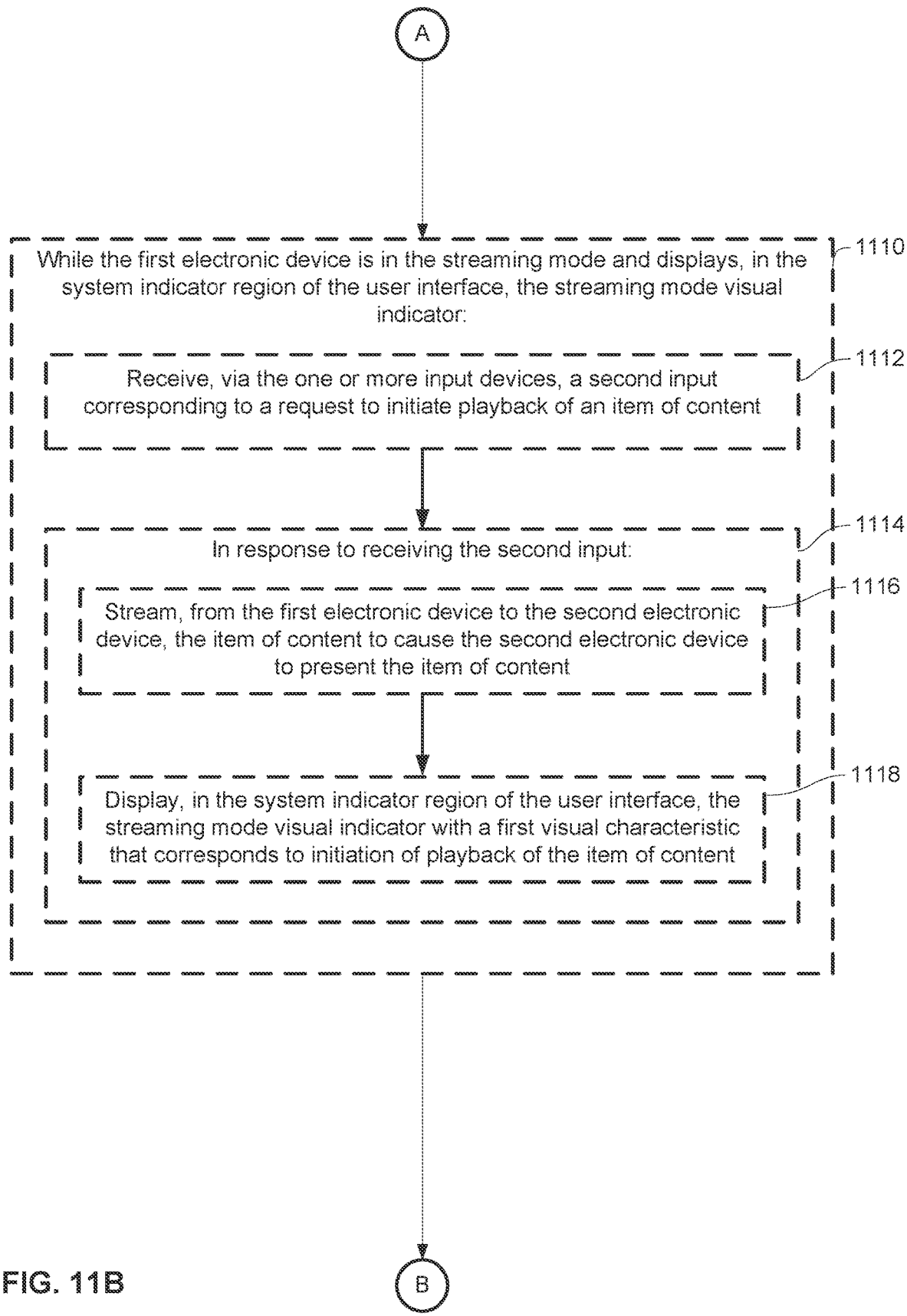
Figure 11C:
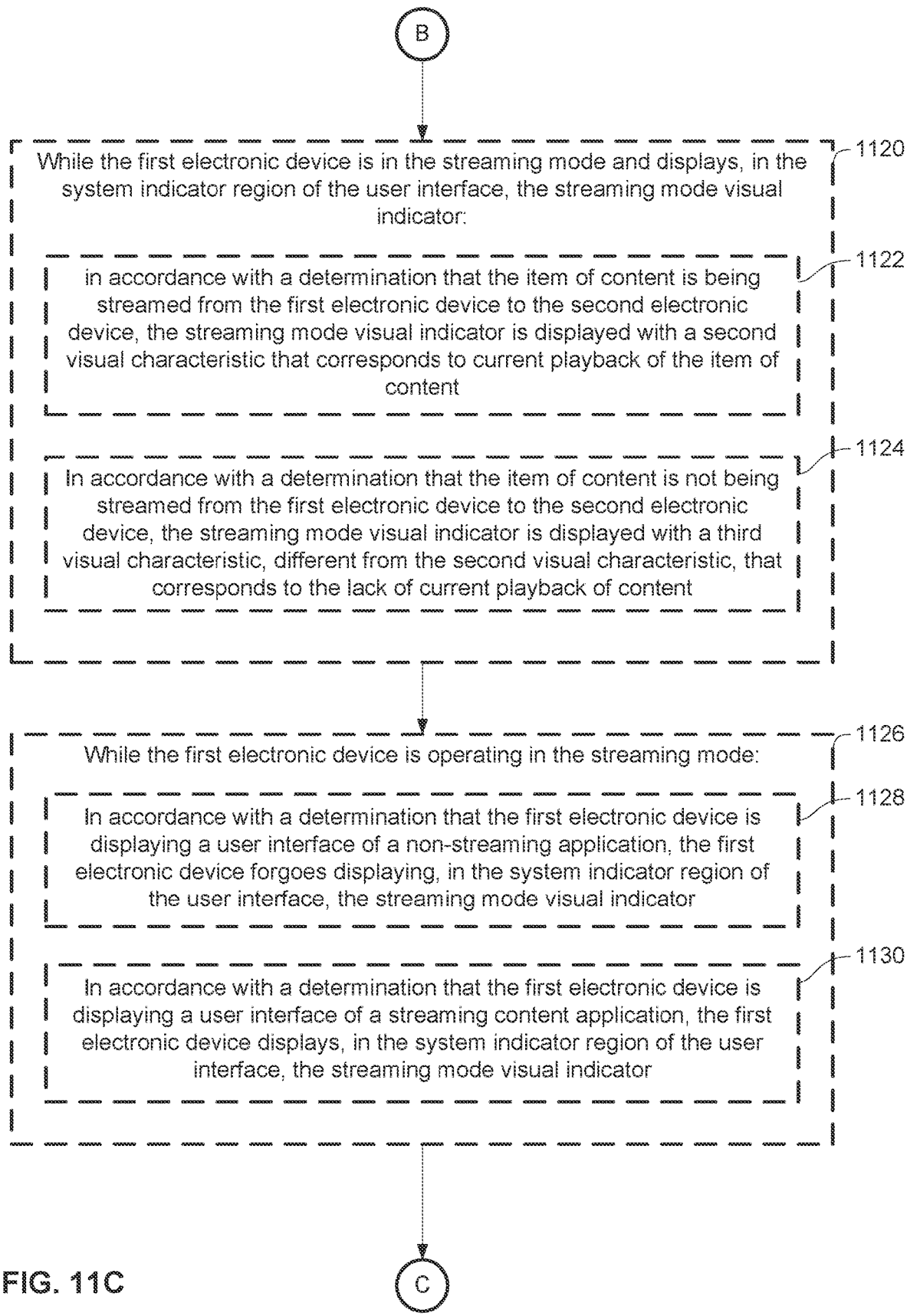
Figure 11D:
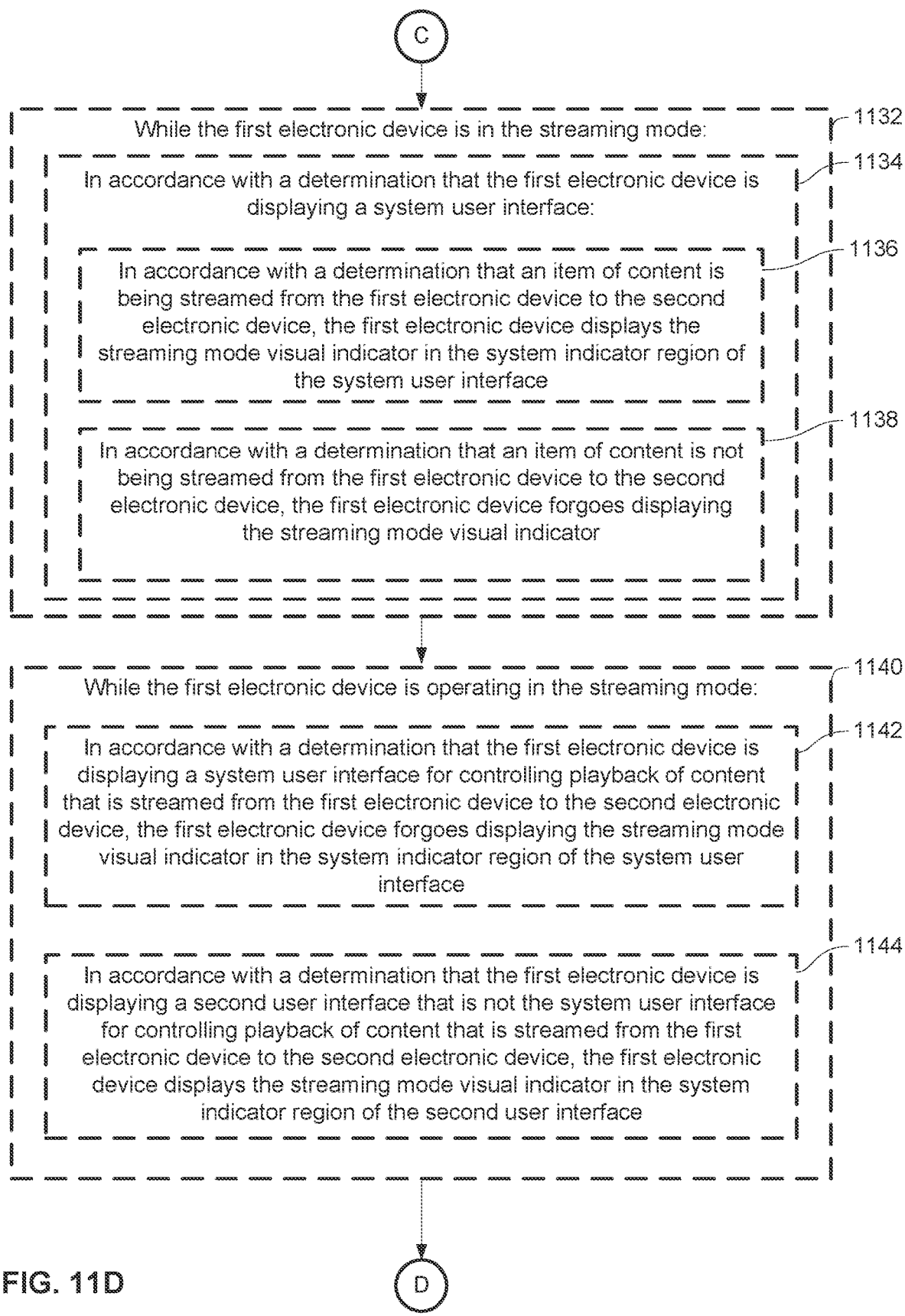
Figure 11E:
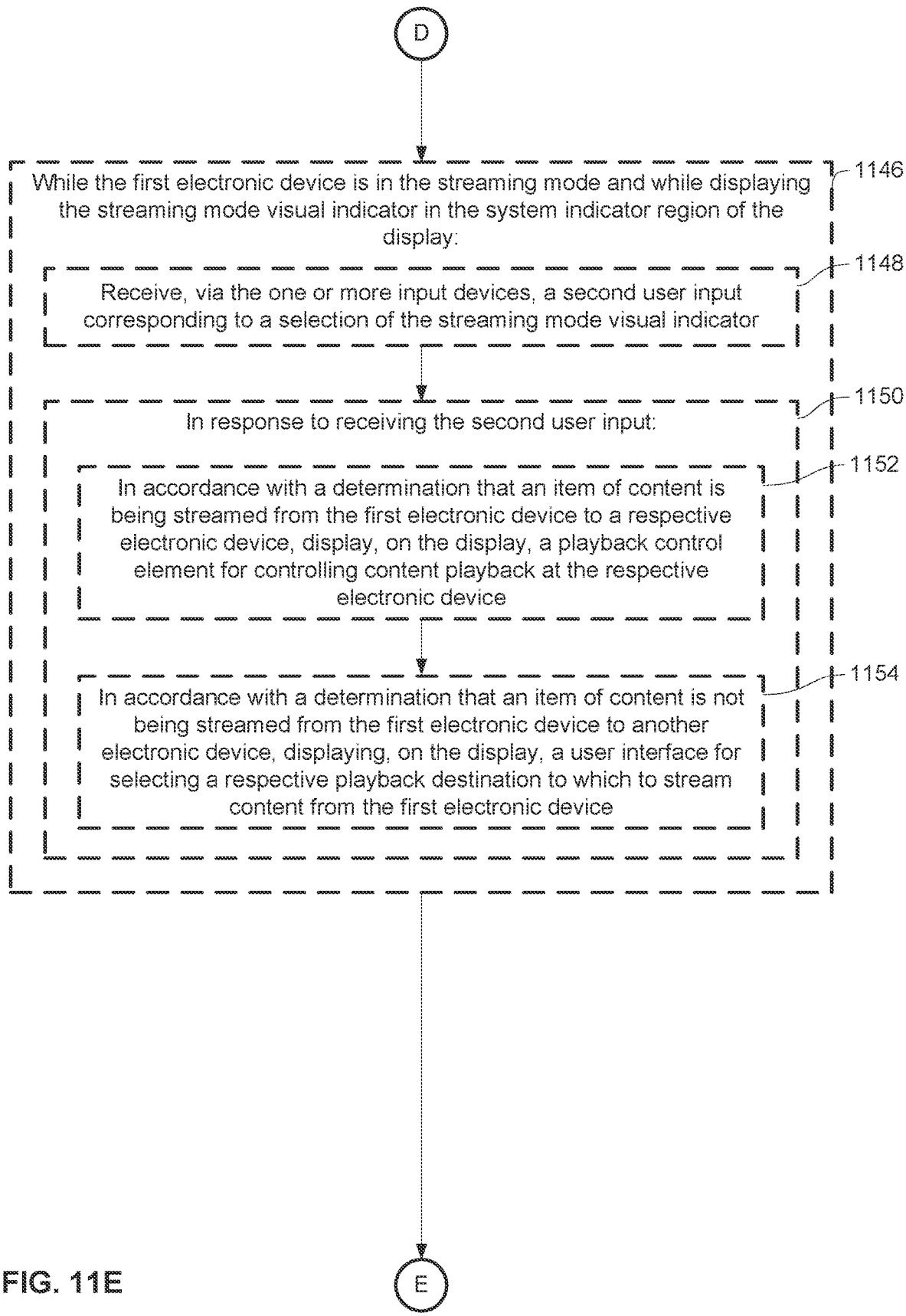
Figure 11F:
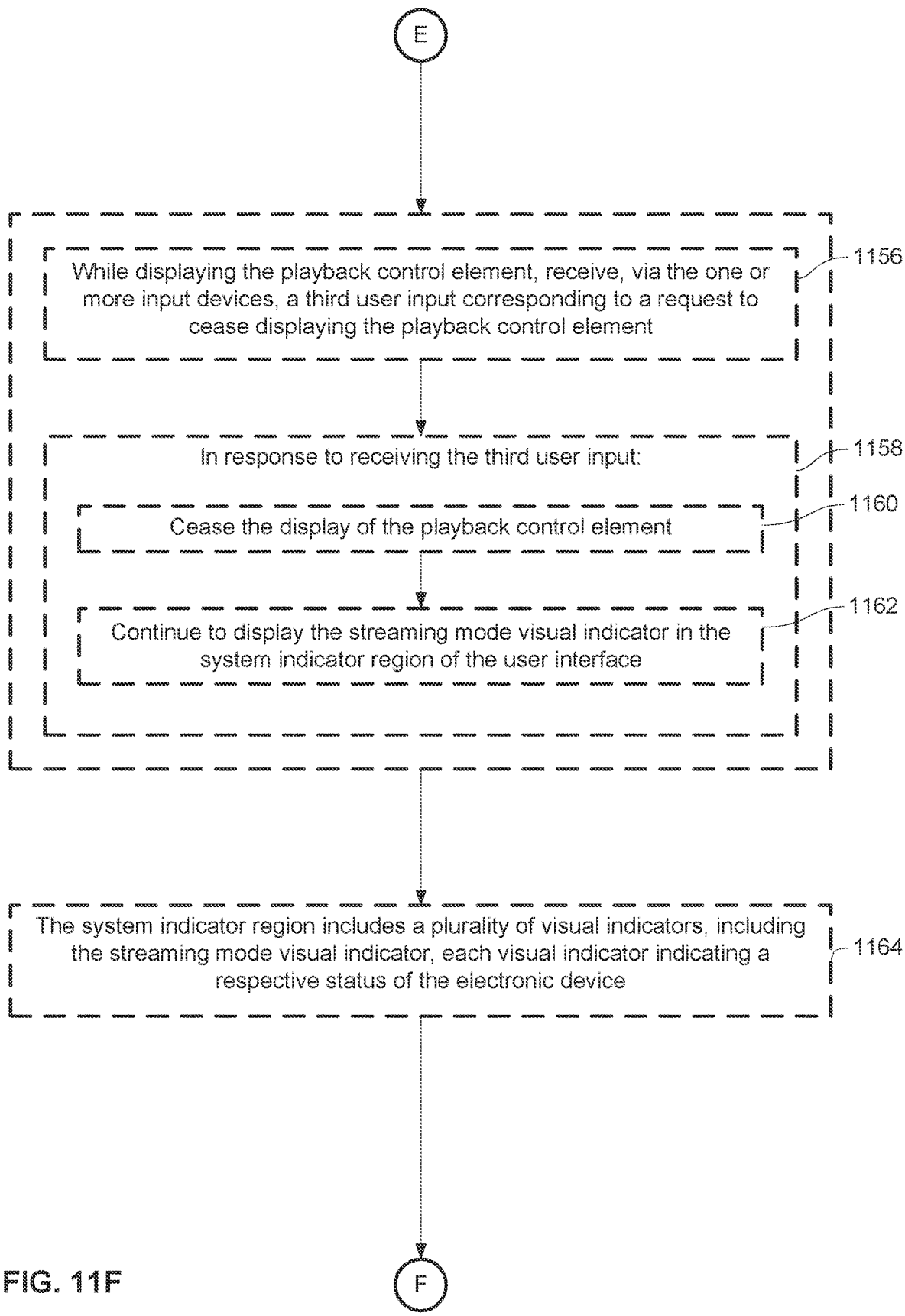
Figure 11G:
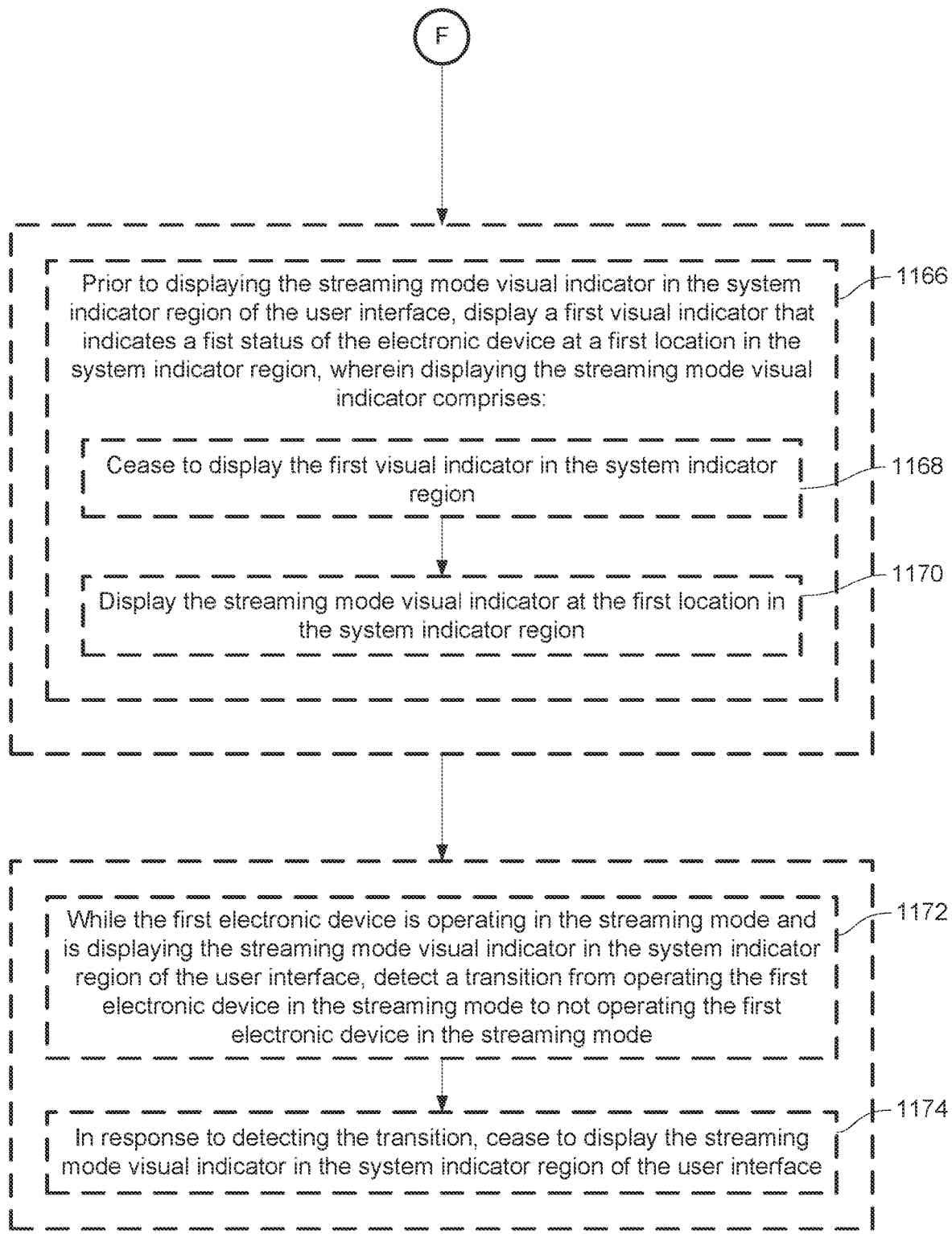

FIGS. 10A-10O illustrate exemplary ways in which an electronic device presents visual indications that the electronic device is operating in a streaming mode to stream content to a playback destination. The embodiments in these figures are used to illustrate the processes described below, including the processes described with reference to FIGS. 11A-11G.

FIG. 10A illustrates an exemplary device 500 that includes touch screen 504. The electronic device is in communication with the other electronic devices indicated in legend 1002, including a first display device 1002a, a second display device 1002b, and a speaker 1002c. The communication link between the electronic device 500 and the other electronic devices 1002a-c allows the electronic device 500 to enter a streaming mode with respect to one or more of the electronic devices 1002a-c to stream content to the respective electronic device with a content application, as will be described herein.

FIG. 10A illustrates a home screen user interface. The home screen user interface includes a number of selectable options 424-450 that, when selected, cause the electronic device to present the user interface of the application associated with the selected option. The home screen user interface includes a system indicator region at the top of the display that includes a clock and a number of indication icons. As shown in FIG. 10A, the user selects (e.g., with contact 1003) an option to present a content application user interface. When the user selects the content application, the electronic device 500 determines that the confidence 1004 that the electronic device should enter the streaming mode to stream content to the first display device 1002a with the content application exceeds a second predetermined threshold. The confidences and other details of entering the streaming mode are described above with reference to FIGS. 6A-7J.

In response to the user's selection, the electronic device 500 presents the content application user interface, as illustrated in FIG. 10B. The content application includes a representation of an item of content 1008 and an indication 1006 that the electronic device is entering the streaming mode to stream content to the first display device 1002a with the content application.

As shown in FIG. 10C, once the electronic device 500 enters the streaming mode to stream content to the first display device 1002a with the content application, the electronic device 500 presents the content application user interface with a visual indication 1010a that the electronic device 500 is operating in the streaming mode. The visual indication 1010a appears in the system indicator region in the location in which the clock was previously displayed, as shown in FIGS. 10A-10B. As indicated by legend 1002 of FIG. 10C, the electronic device 500 is configured to stream content to the first display device 1002a, but content is not yet playing on the first display device. As shown in FIG. 10C, the user selects (e.g., with contact 1003) the representation 1008 of the item of content. In response to the user's selection, the electronic device streams the content to the first display device 1002a, as illustrated in FIG. 10D.

As shown in the legend 1002 of FIG. 10D, the electronic device 500 streams content to the first display device 1002a. The visual indication 1010b of the streaming mode is updated to have a visual characteristic that is different from the visual indication 1010a that was presented when content was not being streamed. For example, the visual characteristic is a pattern of flashing, a "bounce" effect, or a particular color. The visual indication 1010b indicates that playback of content has been initiated on the first display device 1002a.

FIG. 10E illustrates the content application user interface as the content continues to be played on the first display device 1002a. The content application user interface includes a visual indication 1010c that the electronic device 500 is in the streaming mode and is currently playing content. The visual indication 1010c has a different visual characteristic from visual indication 1010a or visual indication 1010b. For example, the visual indication 1010c can have a different color, animation, or flashing pattern than the other indications 1010a or 1010b.

As shown in FIG. 10F, the user selects (e.g., with contact 1003) the visual indication 1010c of the streaming mode while device 500 is streaming content to display device 1002a. In response to the user's selection, the electronic device 500 presents a playback control element 1014 associated with the first display device 1002a, as shown in FIG. 10G.

FIG. 10G illustrates a playback control element 1014 associated with the first display device 1002a. The playback control element 1014 associated with the first display device 1002a includes an indication 1014a of the name of the content that is playing on the first display device, artwork 1014b associated with the content that is playing on the first display device, a scrubber bar 1014c, a skip backwards option 1014d, a skip ahead option 1014e, a pause option 1014f, a volume down option 1014g, a volume up option 1014h, a remote option 1014i, a language and subtitles option 1014j, and a volume bar 1012k. Playback control elements are described in more detail above with reference to FIGS. 8A-9F. The playback control element 1014 associated with the first display device 1002a includes volume down and volume up options 1014g-h and a volume bar 1012k because the first display device 1002a shares its volume level with the electronic device 500, allowing the electronic device 500 to indicate the volume level of the first display device 1002a. It should be understood that, in some embodiments, the scrubber bar 1014c includes text indications of the playback position in the content and the time remaining until the end of the content.

FIG. 10H illustrates the content application user interface. While presenting the content application user interface, the electronic device 500 detects an input (e.g., contact 1003 and movement of the contact) to cease displaying the content user interface and to display the home screen user interface. The movement of contact 1003 is the same as the input illustrated in FIGS. 8E and 8L. In response to the user input, the electronic device 500 ceases displaying the content application user interface and displays the home screen user interface, as illustrated in FIG. 10I.

FIG. 10I illustrates the home screen user interface. As indicated in the legend 1002 of FIG. 10I, the electronic device 500 is streaming content to the first display device 1002a. While displaying the home screen user interface, the electronic device 500 displays the visual indication 1010c of the streaming mode because device 500 is currently streaming content to the first display device 1002a in the streaming mode. The user selects (e.g., with contact 1003) an option 424 to present a messaging application user interface. In response to the user's selection, the electronic device 500 presents the messaging application user interface, as illustrated in FIG. 10J.

FIG. 10J illustrates the messaging application user interface. As indicated by legend 1002 of FIG. 10J, the electronic device 500 is operating in the streaming mode to stream content to the first display device 1002a. Although the electronic device 500 is streaming content in the streaming mode, the visual indication of the streaming mode is not presented in the messaging application user interface because the messaging application is optionally not a content application and optionally cannot be used to stream content to a playback destination, such as the first display device 1002a.

FIG. 10K illustrates the content application user interface. As indicated by legend 1002 of FIG. 10K, the electronic device 500 is operating in the streaming mode to stream content to the first display device 1002a, but there is no content currently playing on the first display device 1002a. The electronic device 500 presents the visual indication 1010a that the electronic device is operating in the streaming mode. The electronic device 500 detects an input (e.g., contact 1003 and movement of the content) for ceasing the display of the content application and displaying the home screen user interface. The movement of contact 1003 is the same as the input illustrated in FIGS. 8E, 8L, and 10H. In response to the user's input, the electronic device 500 ceases displaying the content application user interface and displays the home screen user interface, as shown in FIG. 10L.

As shown in FIG. 10L, the electronic device 500 presents the home screen user interface. As indicated by legend 1002 of FIG. 10L, the electronic device 500 is operating in the streaming mode to stream content to the first display device 1002a, but there is no content currently playing on the first display device 1002a. The electronic device 500 does not present a visual indication of the streaming mode because content is not currently being streamed to a playback destination. As shown in FIG. 10L, the user selects (e.g., with contact 1003) the option 452 to present the content application user interface. In response to the user's selection, the electronic device 500 presents the content application user interface, as shown in FIG. 10M.

FIG. 10M illustrates the content application user interface. As indicated by legend 1002 of FIG. 10M, the electronic device 500 is still operating in the streaming mode to stream content to the first display device 1002a, but there is no content currently playing on the first display device 1002a. The user selects (e.g., with contact 1003) the visual indication 1010a of the streaming mode. In response the user's selection, the electronic device 500 presents a streaming destination selection menu 1016, as illustrated in FIG. 10N.

FIG. 10N illustrates the streaming destination selection menu 1016. The streaming destination selection menu 1016 includes a plurality of selectable options 1018a-d for changing the playback destination of the electronic device while it operates in the streaming mode to stream content. The option 1018a associated with the first display device 1002a includes an indication that the first display device is currently configured as the streaming destination. The menu 1016 further includes an option 1018b to configure the second display device 1002b as the streaming destination, an option 1018c to configure the speaker 1002c as the streaming destination, and an option 1018d to exit the streaming mode, and to instead play content back on the electronic device 500 itself. As shown in FIG. 10N, the user selects (e.g., with contact 1003) the option 1018d to exit the streaming mode. In response to the user's selection, the electronic device 500 exits the streaming mode.

FIG. 10O illustrates the content application user interface shown in response to the user's input in FIG. 10N. As indicated by legend 1002, the electronic device 500 is not operating in the streaming mode. Accordingly, the electronic device 500 does not present a visual indication of the streaming mode. If the user were to select the representation 1008 of the item of content, the content would be played on the electronic device 500 itself, rather than on one of the streaming destinations 1002a-c.

FIGS. 11A-11G are flow diagrams illustrating a method 1100 of presenting visual indications on an electronic device that the electronic device is operating in a streaming mode to stream content to a playback destination. The method 1100 is optionally performed at an electronic device such as device 100, device 300, device 500, device 501, device 510, device 591 as described above with reference to FIGS. 1A-1B, 2-3, 4A-4B and 5A-5J. Some operations in method 1100 are, optionally combined and/or order of some operations is, optionally, changed.

As described below, the method 1100 provides ways to present visual indications on an electronic device that the electronic device is operating in a streaming mode to stream content to a playback destination. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 10A, a first electronic device (e.g., electronic device 500, a smartphone, media player or wearable device including a touch screen, a personal computer including or in communication with one or more input devices such as a keyboard, trackpad, or touch screen, or a set-top box in communication with a display, such as a television, a speaker, and a remote that includes a touch panel or touch screen.) with one or more processors and memory receives (1102), via the one or more input devices, an input 1003 corresponding to a request to display a user interface on the display. In some examples, the input is optionally a selection of an option that when activated causes the electronic device to present an application user interface or a system user interface (e.g., the home screen, a settings user interface, a controls user interface, etc.), a gesture performed on a touch screen or touch panel in communication with the first electronic device that corresponds to presenting a system user interface or an application user interface, and/or an authentication or unlocking input or input sequence. For example, the input is optionally selection of an icon for a content playback application that causes the content application to be displayed on the first electronic device.

In some embodiments, such as in FIG. 10B, in response to receiving the input, the first electronic device 500 displays (1104), on the display 504, the user interface, such as the user interface of the content application illustrated in FIG. 10B, wherein the user interface includes a system indicator region and a second region, separate from the system indicator region. In some examples, the system indicator region optionally includes one or more visual indications related to functionality of the electronic device such as one or more wireless connectivity visual indications, a battery level indication, a clock, etc. In some embodiments, the second region is where user interface elements of an application user interface or a system user interface are presented. The second region optionally encompasses a larger area of the display than the system indicator region. In some embodiments, the system indicator region is located at an edge of the display (e.g., the top edge). The system indicator region optionally continues to be presented when the user navigates from one application or system user interface to another (e.g., which, thus, causes the content displayed in the second region to change in accordance with the changed application). In some embodiments, the system indicator region ceases to be displayed when the first electronic device is presenting content in a full-screen view, though in some embodiments this is not the case.

In some embodiments, such as in FIG. 10C, in accordance with a determination that the first electronic device 500 is operating in a streaming mode in which the first electronic device is configured to stream content from the first electronic device to a second electronic device 1002a, the first electronic device displays, in the system indicator region of the user interface, a streaming mode visual indicator 1010a (1106). In some embodiments, the streaming mode enables the first electronic device to transmit content to a playback destination in response to a user input to play content. The playback destination is optionally a second electronic device, such as a display device, a set-top box in communication with a display and/or one or more speakers, or a speaker system. While in the streaming mode, in response to selection of an item of content or an input to start playback of an item of content that is received at the first electronic device, the content is automatically presented on the playback destination (e.g., by being transmitted from the first electronic device to the second electronic device) without further user input specifying that the content should be streamed. For example, once the streaming mode is enabled, the user is able to select an item of content to be presented on the playback destination. While still in the streaming mode, in response to a user input selecting a different item of content or providing input to start playback of the second item of content, the different item of content is presented on the playback destination without the need of the user to, again, specify that the content should be played at the second electronic device/playback destination, rather than being played at the first electronic device. Thus, the streaming mode enables an uninterrupted content streaming and playback user experience. In some embodiments, the streaming mode visual indicator includes text or an image to indicate that the streaming mode is activated. The streaming mode visual indicator optionally replaces one or more visual indicators presented in the system indicator region before the streaming mode was initiated. In some embodiments, the visual indicators that were presented in the system indicator region before the streaming mode was initiated continue to be presented in the system indicator region concurrently with the streaming mode visual indicator.

In some embodiments, such as in FIG. 10O, in accordance with a determination that the first electronic device 500 is not operating in the streaming mode, the first electronic device forgoes displaying, in the system indicator region of the user interface, the streaming mode visual indicator (1108). In some examples, when the first electronic device is not in the streaming mode, a user input for playing an item of content that is received at the first electronic device optionally causes the first electronic device to present the content on the first electronic device itself, rather than presenting the content on a playback destination. In some embodiments, the streaming mode visual indicator is not displayed when the first electronic device is not in the streaming mode, which communicates to the user that content will be played on the first electronic device itself, rather than on a playback destination.

The above-described manner of presenting the visual indication of the streaming mode in the system indicator region of the user interface allows the first electronic device to communicate to the user that the first electronic device is configured to present content on the playback destination in response to a user input for presenting content, which simplifies interactions between the user and the electronic device and enhances the operability of the electronic device (e.g., by preventing the user from inadvertently presenting content on the playback destination and having to correct the error after the content has begun playing), which, additionally, reduces power and improves battery life of the electronic device by enabling the user to use the electronic device more quickly and efficiently by reducing user errors and thus reducing inputs required to correct user error.

In some embodiments, such as in FIG. 10C, while the first electronic device 500 is in the streaming mode and displays, in the system indicator region of the user interface, the streaming mode visual indicator 1010a (1110), the first electronic device receives (1112), via the one or more input devices, a second input 603 corresponding to a request to initiate playback of an item of content 1008. In some embodiments, selection of a representation of the item of content or selection of a selectable option, when selected, causes the item of content to be played. The item of content is optionally audio content or video content. In some embodiments, such as in FIG. 10D, in response to receiving the second input (1114), the first electronic device streams (1116), from the first electronic device 500 to the second electronic device 1002a, the item of content to cause the second electronic device to present the item of content. In some examples, the first electronic device optionally transmits the item of content to the second electronic device. In some embodiments, the first electronic device receives the item of content from a third electronic device (e.g., a server) via a network connection (e.g., an internet connection), though, in some embodiments, the item of content is stored on the first electronic device. In some embodiments, such as in FIG. 10D, the first electronic device 500 displays (1118), in the system indicator region of the user interface, the streaming mode visual indicator 1010b with a first visual characteristic that corresponds to initiation of playback of the item of content. In some embodiments, the first visual characteristic is temporary and is presented in response to receiving the input to being playing the item of content. The streaming mode visual indicator optionally continues to be presented without the first visual characteristic as the item of content continues to be presented. The first visual characteristic is optionally a flashing visual characteristic that is presented when the item of content begins steaming, or a bounce effect in which the visual indicator momentarily is enlarged and then reduced to its original size. Other visual characteristics, such as changing (e.g., momentarily) the color or size of the streaming mode visual indicator are possible.

The above-described manner of altering the appearance of the streaming mode visual indicator in response to detecting the initiation of content playback allows the first electronic device to communicate to the user that content is about to be presented on the second electronic device, which simplifies interactions between the user and the electronic device and enhances the operability of the electronic device (e.g., by confirming that the selected content will be streamed), which, additionally, reduces power and improves battery life of the electronic device by enabling the user to use the electronic device more quickly and efficiently by reducing user errors and thus reducing inputs required to correct user error.

In some embodiments, such as in FIG. 10E, while the first electronic device 500 is in the streaming mode and displays, in the system indicator region of the user interface, the streaming mode visual indicator 1010c (1120), in accordance with a determination that the item of content is being streamed from the first electronic device 500 to the second electronic device 1002a, the streaming mode visual indicator 1010c is displayed with a second visual characteristic that corresponds to current playback of the item of content (1122). In some examples, the second visual characteristic is optionally a flashing or other animation visual characteristic. Other visual characteristics, such as color or size of the streaming mode visual indicator are possible. In some embodiments, the visual characteristic that corresponds to current playback of the item of content is different from the visual characteristic that corresponds to initiating playback of the item of content. In some embodiments, such as in FIG. 10C, in accordance with a determination that the item of content is not being streamed from the first electronic device 500 to the second electronic device 1002a, the streaming mode visual indicator 1010a is displayed with a third visual characteristic, different from the second visual characteristic, that corresponds to the lack of current playback of content (1124). In some examples, the third visual characteristic is optionally a flashing or other animation visual characteristic, or the lack of flashing or animation. Other visual characteristics, such as color or size of the streaming mode visual indicator, are possible. The third visual characteristic that corresponds to the lack of current playback of content is optionally different from the first visual characteristic that corresponds to initiating playback of the content and/or the second visual characteristic that corresponds to current playback of the content.

The above-described manner of altering a visual characteristic of the streaming mode visual indicator in response to detecting that content is being streamed to the second electronic device allows the first electronic device to efficiently convey to the user that the content is playing on the second electronic device rather than on the first electronic device, which simplifies interactions between the user and the electronic device and enhances the operability of the electronic device (e.g., by automatically presenting the status of the streaming mode without requiring additional user inputs to do so), which, additionally, reduces power and improves battery life of the electronic device by enabling the user to use the electronic device more quickly and efficiently.

In some embodiments, such as in FIG. 10J, while the first electronic device 500 is operating in the streaming mode (1126), in accordance with a determination that the first electronic device 500 is displaying a user interface of a non-streaming application, such as the messaging application user interface illustrated in FIG. 10J, the first electronic device 500 forgoes displaying, in the system indicator region of the user interface, the streaming mode visual indicator (1128). In some examples, a non-streaming application is optionally an application with a primary purpose other than presenting media content such as audio content and video content such as TV shows, movies, and the like. For example, messaging applications, social networking applications, game applications, shopping applications, productivity applications, and news applications are non-streaming applications. Other types of applications are optionally included in non-streaming applications. When the electronic device presents a user interface of a non-streaming application, the streaming mode visual indicator is optionally not displayed, optionally even while the electronic device is operating in the streaming mode and optionally even while content is being streamed from the first electronic device to the second electronic device (e.g., via a different application than the one currently being displayed). In some embodiments, such as in FIG. 10H, in accordance with a determination that the first electronic device 500 is displaying a user interface of a streaming content application, such as the content application user interface illustrated in FIG. 10H, the first electronic device 500 displays, in the system indicator region of the user interface, the streaming mode visual indicator 1010c (1130). In some embodiments, a streaming content application is optionally an application with a primary purpose of presenting media content such as audio content and video content such as TV shows, movies, and the like. In some embodiments, the streaming mode visual indicator is presented even when the first electronic device presents the user interface of a first streaming content application while streaming content to the second electronic device using a second streaming content application.

The above-described manner of forgoing presenting the streaming mode visual indicator when the first electronic device is presenting a non-streaming application allows the first electronic device to communicate to the user that the non-streaming mode application user interface is not streaming to the second electronic device, which simplifies interactions between the user and the electronic device and enhances the operability of the electronic device (e.g., by avoiding confusing the user by presenting the streaming mode visual indicator while presenting a user interface from which the user may not wish to stream), which, additionally, reduces power and improves battery life of the electronic device by enabling the user to use the electronic device more quickly and efficiently.

In some embodiments, such as in FIG. 10I, while the first electronic device 500 is in the streaming mode (1132), in accordance with a determination that the first electronic device 500 is displaying a system user interface (1134), such as the home screen user interface illustrated in FIG. 10I, in accordance with a determination that an item of content is being streamed from the first electronic device to the second electronic device 1002a, the first electronic device displays the streaming mode visual indicator 1010c in the system indicator region of the system user interface (1136). In some embodiments, the system user interface is a user interface of the operating system of the electronic device, such as a home screen, a controls user interface, or a settings user interface. In some embodiments, the first electronic device is streaming content to the second electronic device using a streaming content application while presenting the system user interface. In some embodiments, such as in FIG. 10L, in accordance with a determination that an item of content is not being streamed from the first electronic device 500 to the second electronic device 1002a, the first electronic device forgoes displaying the streaming mode visual indicator (1138). In some embodiments, the first electronic device is in the streaming mode but not currently streaming an item of content to the second electronic device. While in streaming mode, if the first electronic device detects an input for playing an item of content, the item of content is optionally streamed to the second electronic device for playback.

The above-described manner of, in a system user interface, presenting the streaming mode visual indicator when content is being streamed and forgoing presenting the streaming mode visual indicator when content is not being streamed allows the first electronic device to confirm that steaming is occurring while presenting the system user interface, which simplifies interactions between the user and the electronic device and enhances the operability of the electronic device (e.g., by forgoing presenting the streaming mode visual indicator when content is not being streamed, the first electronic device avoids implying to the user that the system user interface is being presented on the second electronic device), which, additionally, reduces power and improves battery life of the electronic device by enabling the user to use the electronic device more quickly and efficiently.

In some embodiments, such as in FIG. 10G, while the first electronic device 500 is operating in the streaming mode (1140), in accordance with a determination that the first electronic device 500 is displaying a system user interface for controlling playback of content that is streamed from the first electronic device to the second electronic device, such as in FIG. 10G, the first electronic device 500 forgoes displaying the streaming mode visual indicator in the system indicator region of the system user interface (1142). In some examples, the system user interface for controlling playback of content that is streamed from the first electronic device to the second electronic device is optionally a user interface that includes a playback control element including one or more selectable options that, when selected, control an aspect of playback (e.g., play, pause, volume, fast forward, rewind, etc.), other than a control element shown in the application from which the content is being streamed. In some embodiments, the system user interface includes a playback control element that is presented according to one or more steps of method 900. In some embodiments, such as in FIG. 10I, in accordance with a determination that the first electronic device 500 is displaying a second user interface, such as the home screen illustrated in FIG. 10I, that is not the system user interface for controlling playback of content that is streamed from the first electronic device to the second electronic device, the first electronic device displays the streaming mode visual indicator 1010c in the system indicator region of the second user interface (1144). In some examples, the second user interface is optionally one of a system user interface other than the system user interface for controlling playback of the content, or a content streaming application user interface.

The above-described manner of forgoing displaying the streaming mode visual indicator while presenting the system user interface for controlling playback of content that is being streamed allows the first electronic device to display other information in the space where the streaming mode visual indicator had been displayed, which simplifies interactions between the user and the electronic device and enhances the operability of the electronic device (e.g., by presenting additional information because it is presumed the user understands that the first electronic device is in the streaming mode if they are controlling playback at the playback control user interface), which, additionally, reduces power and improves battery life of the electronic device by enabling the user to use the electronic device more quickly and efficiently.

In some embodiments, such as in FIG. 10M, while the first electronic device 500 is in the streaming mode and while displaying the streaming mode visual indicator 1010a in the system indicator region of the display (1146), the first electronic device receives (1148), via the one or more input devices, a second user input 1003 corresponding to a selection of the streaming mode visual indicator. In some embodiments, the user taps a touchscreen of the first electronic device at the location of the streaming mode visual indicator, selects the streaming mode visual indicator using a cursor controlled by a mouse or trackpad, enters a keyboard shortcut corresponding to the streaming mode visual indicator, or provides a voice command corresponding to selecting the streaming mode visual indicator. In some embodiments, such as in FIG. 10F-G, in response to receiving the second user input 1003 (1150), in accordance with a determination that an item of content is being streamed from the first electronic device 500 to a respective electronic device 1002a, the first electronic device displays (1152), on the display, a playback control element 1014 for controlling content playback at the respective electronic device 1002a. In some examples, the playback control element optionally includes one or more selectable options that, when selected, cause the first electronic device to modify or control an aspect of playback of the streamed content on the second electronic device. In some embodiments, the playback control element includes selectable options such as play/pause, fast forward, rewind, language/subtitle options, volume control, etc. In some embodiments, the first electronic device displays the playback control element according to one or more steps of method 900. In some embodiments, such as in FIG. 10M-10N, in accordance with a determination that an item of content is not being streamed from the first electronic device 500 to another electronic device 1002a, the first electronic device displays (1154), on the display, a user interface for selecting a respective playback destination to which to stream content from the first electronic device, such as the user interface illustrated in FIG. 10N. In some examples, the user interface optionally includes a plurality of selectable options that, when selected, configure the first electronic device to stream content to the selected playback destination. The first electronic device optionally presents a menu of playback destinations according to one or more steps of method 700. In some embodiments, the second electronic device is one of the selectable playback destinations along with other set-top box, display, speaker, or other devices. In some embodiments, the user interface further includes a selectable option that, when selected causes the first electronic device to natively play the content on the first electronic device, rather than streaming the content to a streaming destination.

The above-described manner of presenting a user interface related to streaming content in response to detecting selection of the streaming mode visual indicator allows the first electronic device to provide playback controls when content is being streamed and to provide selectable options for selecting a playback destination when content is not being streamed, which simplifies interactions between the user and the electronic device and enhances the operability of the electronic device (e.g., by providing a shortcut to the relevant streaming-related control depending on whether or not content is being streamed), which, additionally, reduces power and improves battery life of the electronic device by enabling the user to use the electronic device more quickly and efficiently.

In some embodiments, while displaying the playback control element 1014 illustrated in FIG. 10G, the first electronic device 500 receives (1156), via the one or more input devices, a third user input corresponding to a request to cease displaying the playback control element. In some embodiments, the third user input is the same as a user input for navigating to the home screen of the electronic device, such as a swipe up from the bottom of a touchscreen of the first electronic device. In some embodiments, the third user input is the same as a user input for displaying representations of the applications that are currently running on the first electronic device. Other inputs are possible. In some embodiments, such as in FIG. 10H, in response to receiving the third user input (1158), the first electronic device ceases (1160) the display of the playback control element. In some embodiments, the first electronic device presents a controls user interface when display of the playback control element is ceased. The controls user interface is a system user interface that optionally includes one or more selectable options for controlling one or more functions of the first electronic device such as volume, brightness, and/or network connection(s) (e.g., Wi-Fi, Bluetooth, and/or cellular data connections). In some embodiments, such as in FIG. 10H, the first electronic device continues (1162) to display the streaming mode visual indicator 1010c in the system indicator region of the user interface. In some embodiments, while displaying the controls user interface or another user interface, the first electronic device displays the streaming mode visual indicator in the system indicator region.

The above-described manner of continuing to present the streaming mode visual indicator when the playback control element ceases to be displayed allows the first electronic device to confirm that the content is still being streamed after the playback control element has ceased being displayed, which simplifies interactions between the user and the electronic device and enhances the operability of the electronic device (e.g., by confirming that the content is still streaming without requiring additional user inputs to generate the confirmation), which, additionally, reduces power and improves battery life of the electronic device by enabling the user to use the electronic device more quickly and efficiently.

In some embodiments, such as in FIG. 10H, the system indicator region includes a plurality of visual indicators, including the streaming mode visual indicator 1010c, each visual indicator indicating a respective status of the electronic device (1164). In some examples, the system indicator region is optionally located at an edge of the display. In some embodiments, the visual indicators include a network connection indicator (e.g., cellular, Wi-Fi, or Bluetooth connection indicator), a battery indicator, and a clock.

The above-described manner of presenting the streaming mode visual indicator in the system indicator region of the display allows the first electronic device to present the streaming mode visual indicator while presenting a user interface of an application, such as a streaming content application user interface or a system user interface, which simplifies interactions between the user and the electronic device and enhances the operability of the electronic device (e.g., by providing continuous confirmation of the streaming mode), which, additionally, reduces power and improves battery life of the electronic device by enabling the user to use the electronic device more quickly and efficiently.

In some embodiments, such as in FIGS. 10B-10C, prior to displaying the streaming mode visual indicator 1010a in the system indicator region of the user interface, the first electronic device displays (1166) a first visual indicator that indicates a first status of the electronic device at a first location in the system indicator region (e.g., the clock illustrated in FIG. 10B), wherein displaying the streaming mode visual indicator comprises: ceasing to display the first visual indicator in the system indicator region (1168); and displaying the streaming mode visual indicator at the first location in the system indicator region (1170). In some embodiments, the first visual indicator is one of a network connection visual indicator, a battery visual indicator, a clock, or another visual indicator. In some embodiments, the streaming mode visual indicator replaces one of the other visual indicators that were displayed in the system indicator region. In some embodiments, however, the streaming mode visual indicator does not replace a visual indicator of the system indicator region and instead is displayed along with all of the other system indicator region visual indicators.

The above-described manner of replacing the first visual indicator with the streaming mode visual indicator allows the first electronic device to conserve display space, which simplifies interactions between the user and the electronic device and enhances the operability of the electronic device (e.g., by allocating display space for other displayed content, such as a streaming content application user interface or a system user interface), which, additionally, reduces power and improves battery life of the electronic device by enabling the user to use the electronic device more quickly and efficiently.

In some embodiments, while the first electronic device is operating in the streaming mode and is displaying the streaming mode visual indicator 1010a in the system indicator region of the user interface, such as in FIG. 10M, the first electronic device detects (1172) a transition from operating the first electronic device in the streaming mode to not operating the first electronic device in the streaming mode, such as selection (e.g., with contact 1003) of option 1018d illustrated in FIG. 10N. In some embodiments, the first electronic device exits the streaming mode. While not operating in the streaming mode, in response to a user input for playing an item of content, the first electronic device plays the content natively on the first electronic device itself, rather than streaming the content to a streaming destination, such as the second electronic device. In some embodiments, the streaming mode is exited in response to a user input selecting an option to exit the streaming mode or to select the first electronic device itself as the playback destination for content. In some embodiments, such as in FIG. 10O, in response to detecting the transition, the first electronic device ceases (1174) to display the streaming mode visual indicator in the system indicator region of the user interface. In some embodiments, the streaming mode visual indicator is not displayed when the first electronic device is not in the streaming mode, regardless of what type of user interface is being presented on the first electronic device.

The above-described manner of ceasing to display the streaming mode visual indicator when the first electronic device exits the streaming mode allows the first electronic device to communicate to the user when the first electronic device is not in the streaming mode and when the first electronic device is not in the streaming mode, which simplifies interactions between the user and the electronic device and enhances the operability of the electronic device (e.g., by making it clear whether or not selected content will be streamed if it is played), which, additionally, reduces power and improves battery life of the electronic device by enabling the user to use the electronic device more quickly and efficiently by reducing user errors and thus reducing inputs required to correct user error.

It should be understood that the particular order in which the operations in FIGS. 11A-11G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, and 1500) are also applicable in an analogous manner to method 1100 described above with respect to FIGS. 11A-11G. For example, the indications of the streaming mode described above with reference to method 1100 optionally have one or more of the characteristics of the streaming mode operation and presentation of playback control options, etc., described herein with reference to other methods described herein (e.g., methods 700, 900, 1300, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 11A-11G are, optionally, implemented by components depicted in FIGS. 1A-1B. For example, displaying operations 1104, 1106, 1108, 1118, 1122, 1124, 1128, 1130, 1136, 1138, 1142, 1144, 1152 and 1154 receiving operations 1102, 1112, 1148, and 1156 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Device Specific Remote Control

Users interact with electronic devices in many different manners, including using an electronic device to present content, such as audio or video content. In some embodiments, a first electronic device is able to remotely control a second electronic device. In some embodiments, the first electronic device is able to remotely control different types of electronic devices using the same user interface. The embodiments described below provide ways in which a first electronic device presents control elements including selectable options to control another electronic device. In some embodiments, the control elements are device specific and different options can be presented to the user based on the type of device being controlled. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12FF illustrate exemplary ways in which an electronic device presents selectable options to control another electronic device. The embodiments in these figures are used to illustrate the processes described below, including the processes described with reference to FIGS. 13A-13H.

Figure 12A:
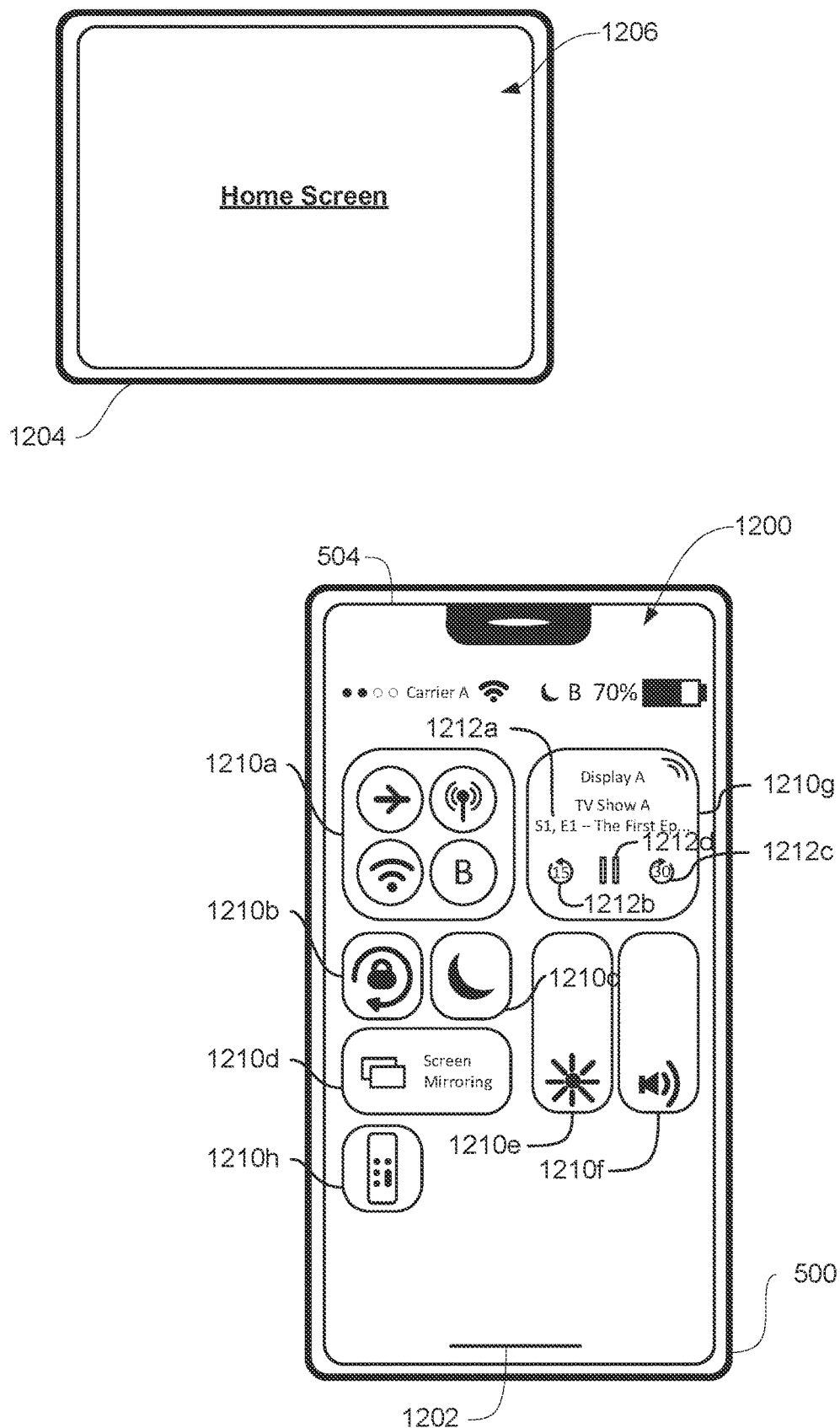
FIGS. 12A-12FF illustrate exemplary ways in which an electronic device presents selectable options to control another electronic device in accordance with some embodiments.

FIG. 12A illustrates an exemplary electronic device 500 that includes touch screen 504. In some embodiments, the electronic device 500 is in communication with other electronic devices, such as electronic device 1204. In some embodiments, electronic device 500 is in communication with multiple electronic devices including multiple display devices (e.g., smart televisions) and/or multiple speakers. In some embodiments, electronic device 1204 comprises a set-top box in communication with a display (e.g., such as device 580). The communication link between the electronic device 500 and the other electronic devices allows the electronic device 500 to remotely control one or more of the electronic devices, as will be described herein. In some embodiments, the communication link additionally or alternatively allows electronic device 500 to stream content to the respective electronic device as was described above with respect to FIG. 8A. For case of description, the below description will begin by assuming that electronic device 500 is in communication with a second electronic device, unless otherwise stated. It is understood that the second electronic device represents any or all of the electronic devices capable of being in communication with electronic device 500 described above.

FIG. 12A illustrates the electronic device 500 presenting a controls user interface 1200 on touch screen 504. The controls user interface 1200 is a system user interface (e.g., not a user interface from a discrete application installed on electronic device 500), similar to that described in FIG. 8B, that includes one or more selectable options for controlling one or more functions of electronic device 500 such as volume, brightness, and/or network connection(s) (e.g., Wi-Fi, Bluetooth, and/or cellular data connections). The controls user interface 1200 includes connectivity controls 1210*a*, a screen orientation control 1210*b*, a do not disturb control 1210*c*, a screen mirroring control 1210*d*, a brightness control 1210*e*, a volume control 1210*f*, and a playback control element 1210*g*. As indicated in the FIG. 12A, the electronic device labeled as "Display A" (e.g., another electronic device (not shown), different from electronic device 1204) that is connected (or otherwise in communication with) electronic device 500 is currently playing "TV Show A." As described above, "Display A" is optionally a set-top box in communication with a display (e.g., integrated display or external display), a standalone display, a smart display device (e.g., smart TV), or any other type of display-capable electronic device.

In some embodiments, when "Display A" electronic device is displaying content, the playback control element 1210*g* includes information and selectable options associated with playback of content "TV Show A". The playback control element 1210*g* includes an indication 1212*a* of the name of the content that is playing on "Display A", a skip ahead option 1212*b*, a skip back option 1212*c*, and a pause option 1212*d*. As shown in FIG. 12A, the controls user interface 1200 optionally includes a remote control selectable option 1210*h* (e.g., affordance and/or virtual button). In some embodiments, selection of remote control selectable option 1210*h* causes display of a user interface for remotely controlling the second electronic device (e.g., such as the electronic devices described above with which electronic device 500 is in communication).

In some embodiments, the second electronic device can be a device to which content can be streamed from electronic device 500. In some embodiments, the second electronic device receives content from a third party for display and/or displays content stored on local memory. In some embodiments, the second electronic device is a set-top box that is in communication with a display (e.g., in some embodiments, the display is integrated with the set-top box device). In some embodiments, the second electronic device is electronic device 1204 and is displaying a home screen user interface 1206. In some embodiments, regardless of whether the second electronic device is receiving content from the electronic device 500, receiving content from a third party, or not receiving any content, the electronic device 500 is able to remotely control the second electronic device via a remote control user interface, as will be described in further detail below.

Figure 12B:
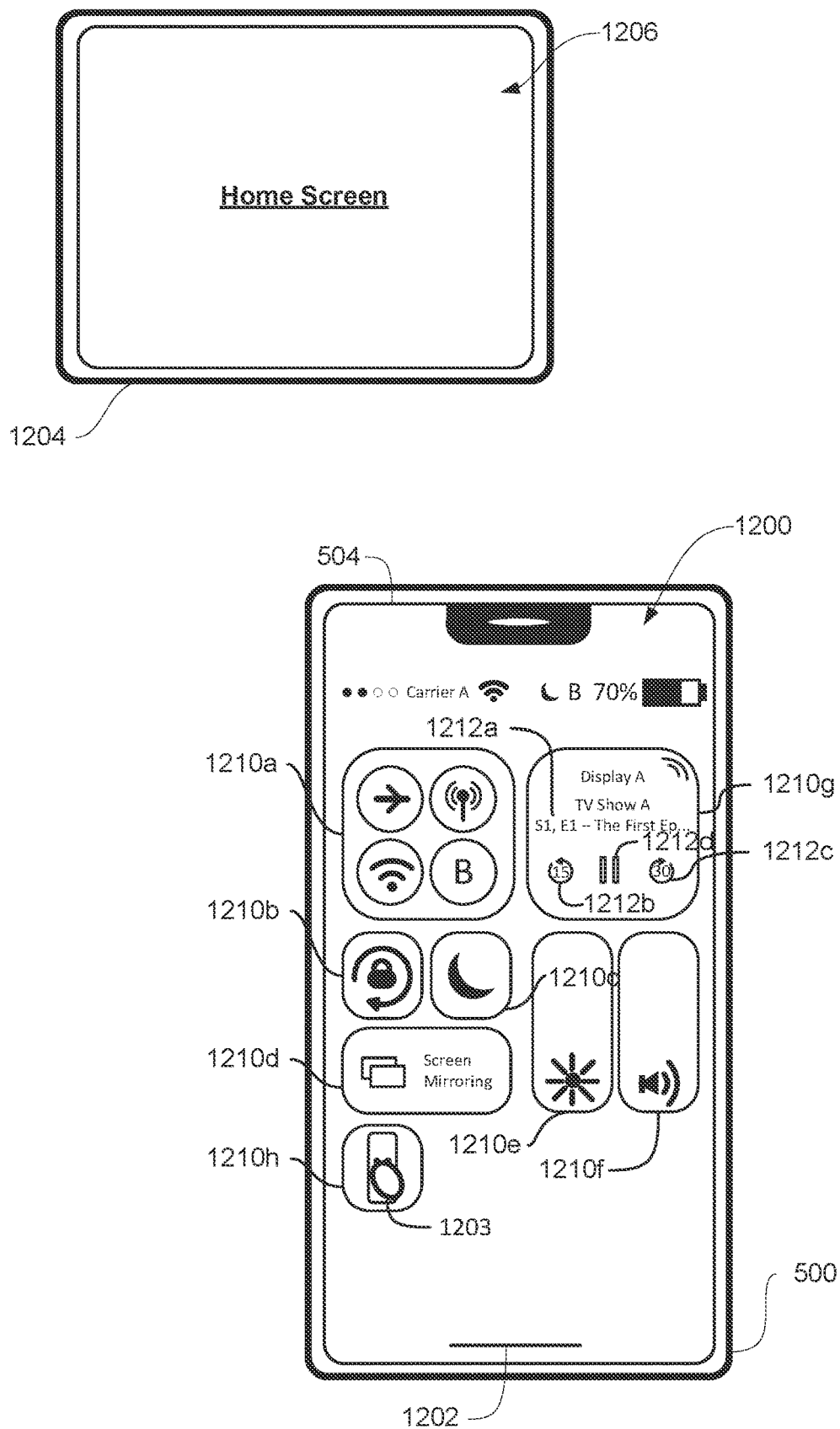
Figure 12C:
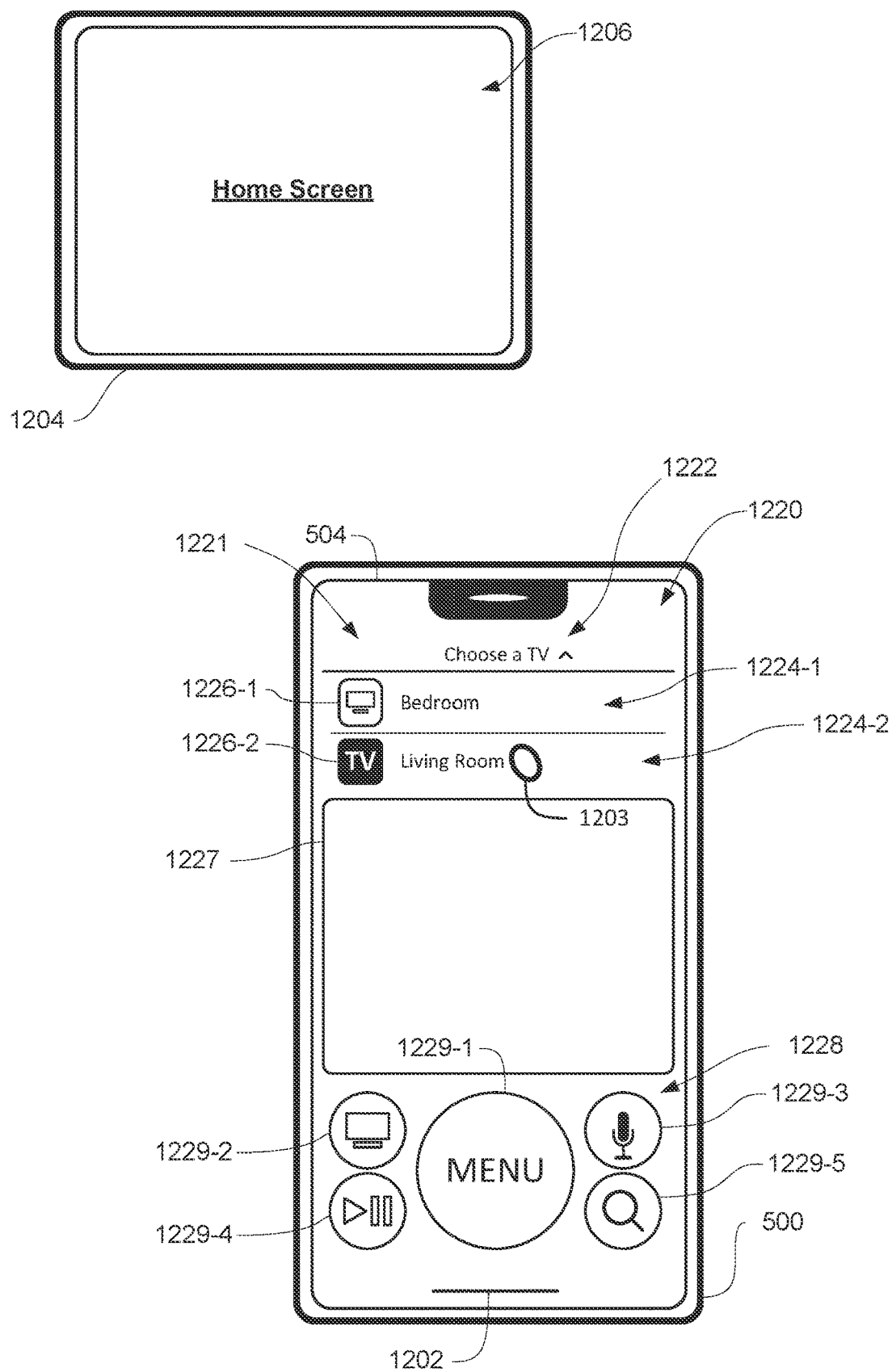

In FIG. 12B, electronic device 500 receives a user input 1203 selecting the remote control selectable option 1210*h*. In some embodiments, the user input is a tap, long press, or a contact with an intensity greater than an intensity threshold. As shown in FIG. 12C, in response to receiving the user input selecting the remote control selectable option 1210*h*, electronic device 500 displays a remote control user interface 1220 on touch screen 504. In some embodiments, the remote control user interface 1220 includes a virtual touch pad region 1227 and a control options region 1228. In some embodiments, remote control user interface 1220 includes a device selection user interface 1221.

In some embodiments, the virtual touch pad region 1227 is a rectangular region on the remote control user interface 1220 in which user inputs on the touch screen 504 are acceptable to send or transmit the user input to the electronic device that is being controlled by the remote control user interface (e.g., the second electronic device). In some embodiments, the virtual touch pad region 1227 simulates a physical touch pad on a physical remote control device (e.g., remote 590) or other type of device for controlling the second electronic device. For example, a tap input in the virtual touch pad region 1227 can cause a transmission of a tap command to the second electronic device. In some embodiments, a swipe gesture can cause a transmission of a swipe command to the second electronic device. In some embodiments, instead of transmitting the raw touch input data (e.g., tap or swipe), electronic device 500 interprets the user input, translates the user input into commands (e.g., navigation commands, selection commands, etc.), and transmits the translated commands to the second electronic device. For example, a tap input in the virtual touch pad region 1227 is optionally interpreted by electronic device 500 as a selection input and a selection command is optionally transmitted to the second electronic device. In some embodiments, the virtual touch pad region 1227 supports multiple different types of inputs and gestures, as will be described in further detail below.

In some embodiments, the control options region 1228 include one or more selectable options (e.g., affordances and/or virtual buttons) for performing (or otherwise causing) actions on the second electronic device. In some embodiments, the functions that are performed by the buttons in the control options region 1228 are functions that are better suited to a shortcut button rather than with a virtual touchpad (e.g., menu buttons, search buttons, etc.). In some embodiments, the functions performed by the options in the control options region 1228 are the most commonly used functions. In some embodiments, control options region 1228 includes five selectable control options 1229-1, 1229-2, 1229-3, 1229-4, and 1229-5. In some embodiments, control option 1229-1 is selectable to display a menu on the second electronic device, control option 1229-2 is selectable to display a unified media browsing application (e.g., if one exists on the controlled device), control option 1229-3 is selectable to initiate a voice assistant (similar to the voice assistant described with respect to FIG. 8N-8O), control option 1229-4 is selectable to pause or play the playback of content currently displayed on the second electronic device, and control option 1229-5 is selectable to cause a search functionality on the controlled device. In some embodiments, control option 1229-1 alternatively causes display of a previously displayed user interface, a previously displayed content item, or a previous menu option (e.g., performing a "back" functionality). In some embodiments, control option 1229-1 performs either a "menu" action or a "back" function based on the context of second electronic device. In some embodiments, the selectable options displayed in the control options region 1228 mimic the physical buttons available on a physical remote control device for the second electronic device (e.g., remote 590).

In some embodiments, receiving a user input selecting a control option in the control options region 1228 causes a haptic feedback. In some embodiments, the haptic feedback is a vibrational mechanism provided to the user upon touch-down of the option. In some embodiments, the haptic is provided when the user lifts off from the option. In some embodiments, a different feedback is provided for liftoff and touchdown (e.g., in frequency, intensity, etc.). In some embodiments, other feedback mechanisms are possible such as audio or visual feedback. For example, an audible tone is optionally provided as feedback. In some embodiments, visual feedback can consist of the selected button optionally moving, popping, bouncing, expanding, contracting, or otherwise changing. In some embodiments, the visual feedback includes a visual effect of momentarily expanding and subsequently changing the color of the selected button. In some embodiments, the momentary expansion of the selected button optionally expands based on the force of the input (e.g., as the user provides more force onto the button, the large the button becomes). In some embodiments, the color of the selected button persists if the selectable button is associated with a toggle-able function or action. It is understood that the feedback mechanisms discussed above is also available in response to user inputs interacting with virtual touchpad region 1227 (e.g., haptic feedback upon touchdown and/or liftoff and/or audio feedback and/or visual effects).

In some embodiments, when the remote control user interface 1220 is displayed for the first time, remote control user interface 1220 optionally includes a device selection user interface 1221 and instructs the user to select a device to control (e.g., "Choose a TV" text label). In some embodiments, the device selection user interface 1221 includes a drop-down list of available devices to select. In some embodiments, the device selection user interface 1221 is populated with all devices that are controllable within the vicinity of electronic device 500. In some embodiments, the devices include those that are on the same Wi-Fi network as electronic device 500. In some embodiments, the device includes those that are connected to the electronic device 500 via Bluetooth. In some embodiments, other wireless communication protocols can cause devices to be controllable and listed in the device selection user interface 1221. In some embodiments, remote control user interface 1220 optionally automatically selects a device from the list of controllable devices based on previous usage (e.g., more recently controlled devices are preferred over less recently controlled devices), vicinity to electronic device 500, or preference for certain types of devices over other types of devices (e.g., if the controllable devices are different types of devices. In some embodiments, set-top boxes are preferred over other types of devices, or devices that support more remote control features are more preferred over devices that support fewer remote control features). In some embodiments, the devices listed in the device selection user interface 1221 are discovered at the time when the device selection user interface 1221 is displayed. In some embodiments, the devices in the device selection user interface 1221 are taken from a list of devices that the electronic device 500 continually updates by continually monitoring for controllable devices. It is understood that "continually" includes polling for controllable devices at a certain frequency.

In FIG. 12C, device selection user interface 1221 includes two devices. In some embodiments, the first controllable device 1224-1 is a device labeled as "Bedroom" (e.g., labeled by the user and/or automatically determined by the system based on the location of controllable device 1224-1, and/or a label associated with device 1224-1). In some embodiments, controllable device 1224-1 is a first type of controllable device as indicated by icon 1226-1. For example, icon 1226-1 displays a representation of a television indicating that controllable device 1224-1 is a television (e.g., smart TV). In some embodiments, the second controllable device 1224-2 is a second type of device labeled as "Living Room," such as a set-top box. In some embodiments, icon 1226-2 associated with controllable device 1224-2 displays a representation of a set-top box. In some embodiments, icons 1226-1 and 1226-2 optionally illustrate a picture or photograph of the respective device (i.e., instead of displaying an icon that represents the type of device).

Figure 12D:
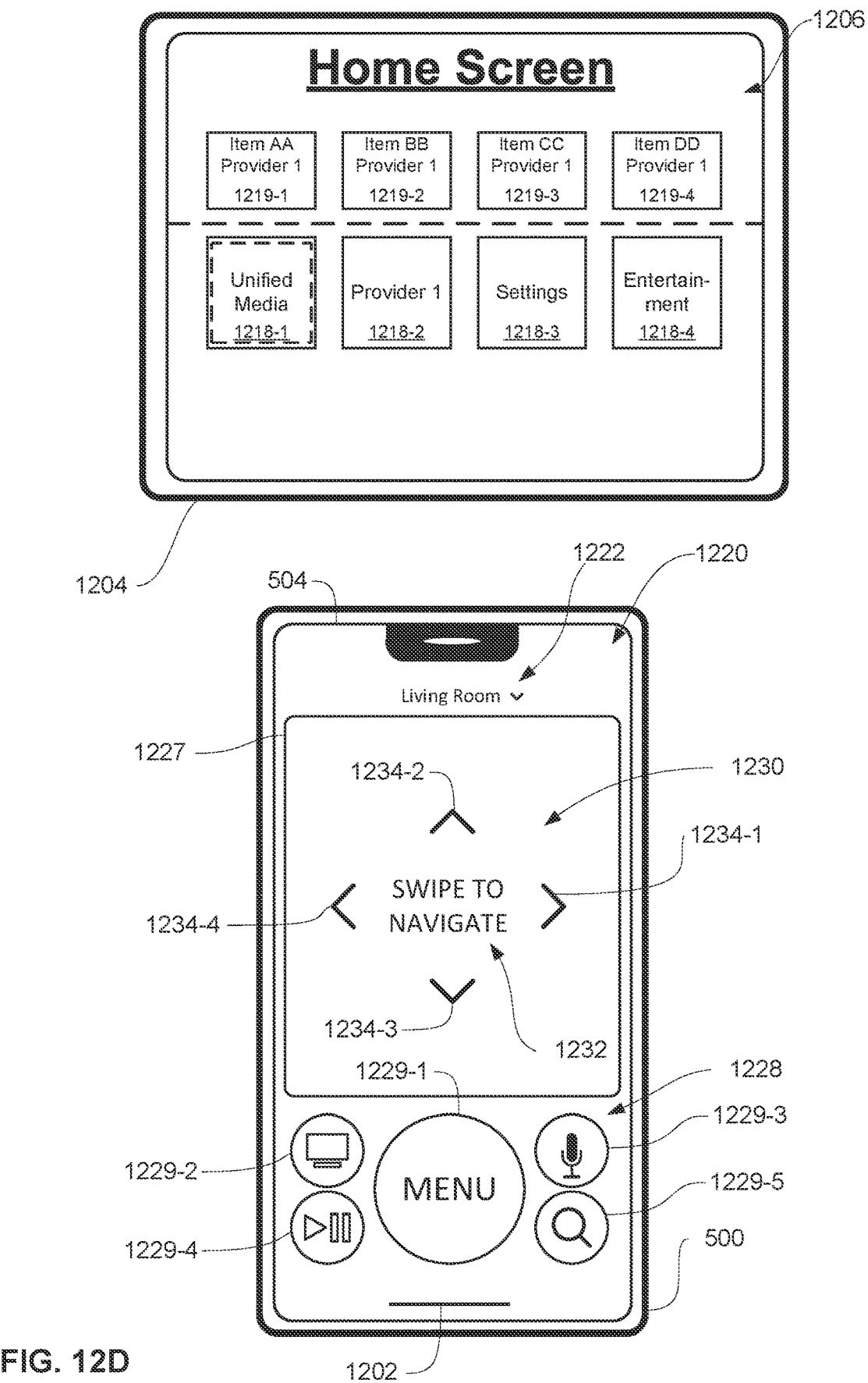

In some embodiments electronic device 500 receives a user input 1203 (e.g., tap input) selecting controllable device 1224-2 from the drop-down list of controllable devices on the device selection user interface 1221. In response to the user input 1203 selecting controllable device 1224-2 from the drop-down list of controllable devices, the remote control user interface 1220 optionally is reconfigured to control controllable device 1224-2, as shown in FIG. 12D. For case of description, controllable device 1224-2 is electronic device 1204 described above.

In some embodiments, in response to receiving the user input 1203 selecting controllable device 1224-2, device selection user interface 1221 contracts and no longer displays the drop-down list of controllable devices and displays only the device that is being controlled by remote control user interface 1220 (e.g., electronic device 1204). In some embodiments, a selectable label 1222 indicates the device that is currently being controlled. In some embodiments, selecting selectable label 1222 displays the full device selection user interface 1221 and provides the user with the list of devices to select as will be described in further detail below. In some embodiments, reconfiguring the remote control user interface 1220 can include changing the selectable options in the control options region 1228 to the options that are supported by the controlled device, as will be described in more detail below.

In some embodiments, virtual touchpad region 1220 can display usage hints 1230. In some embodiments, usage hints 1230 are not selectable options, but rather a watermark displayed in virtual touchpad region 1220 to indicate to the user (e.g., provide hints to the user) the different functions that are supported by virtual touchpad region 1220. For example, electronic device 1204 optionally supports discrete commands and/or gestural commands such as taps and swipes (e.g., because electronic device 1204 is a first type of device). Thus, in some embodiments, the usage hints that are displayed are related to the type of device being controlled and the commands that are supported by the given type of device. In some embodiments, when electronic device 1204 is a first type of device, usage hints 1230 optionally displays a "swipe to navigate" text hint 1232 to inform the user that swipes in the virtual touchpad region 1220 are acceptable to cause navigation on electronic device 1204. For example, depending on the length and speed of the swipe gesture, a variable length navigation command in the direction of the swipe is sent to electronic device 1204 (e.g., a short swipe causes a navigation by one unit whereas a long swipe causes a navigation by two or more units). In some embodiments, usage hints 1230 include carets, arrows, or triangles such as indicators 1234-1, 1234-2, 1234-3, and 1234-4 to indicate that tap inputs in certain sub-regions of the virtual touchpad region will be interpreted as discrete navigational inputs. For example, a tap in the left sub-region of the virtual touchpad region 1227 optionally causes a single left-navigation command (e.g., to cause a navigation to the left by one unit). In some embodiments, a tap input in the center sub-region of the virtual touchpad region is interpreted as a selection input (e.g., a "click" input).

In some embodiments, usage hints 1230 are displayed in virtual touchpad region 1227 every time remote control user interface 1220 is displayed. In some embodiments, usage hints 1230 stay displayed for a threshold amount of time (e.g., 1 second, 1.5 seconds, 2 seconds) before disappearing. In some embodiments, usage hints 1230 are displayed any time a new device is selected to be controlled by remote control user interface 1220. In some embodiments, usage hints 1230 are displayed any time a new type of device is selected to be controlled by remote control user interface 1220 (e.g., when the user selects to control a different device, but the difference device is the same type of device that was previously being controlled, usage hints 1230 are optionally not displayed). In some embodiments, usage hints 1230 are displayed in virtual touchpad region 1227 until electronic device 500 receives a user input on the virtual touchpad region 1227. In some embodiments, usage hints 1230 are displayed in virtual touchpad region 1227 until electronic device 500 receives a valid user input on the virtual touchpad region 1227 (e.g., an input corresponding to one of the supported functions or corresponding to one of the displayed hints). In some embodiments, usage hints 1230 are displayed once every device use session. In some embodiments, a device use session is defined as a time after which the user has unlocked the device and before the device re-locks. In some embodiments, a device use session is defined as a time between each shutdown or restart of the device (e.g., a new session begins when electronic device 500 boots up). In some embodiments, a device use session is defined as the time while a respective content is playing on the electronic device 1204 (and before the content ends). In some embodiments, a device use session is defined as the time while electronic device 1204 is powered on (e.g., a new session begins when electronic device 1204 boots up). In some embodiments, a device use session is a time beginning with when the user first initiates display of the remote control user interface 1220 and ends after a threshold amount of time when the user has not performed any further user input. In some embodiments, usage hints 1230 are displayed only once per device. In some embodiments, a system flag or setting is used to determine whether usage hints 1230 have already been displayed. In some embodiments, a system or factory reset of electronic device 500 can cause usage hints 1230 to be displayed again upon the next display of remote control user interface 1220.

In some embodiments, an invisible rectangle the length and width of half of the length and width of virtual touchpad region 1227 defines the center sub-region of the virtual touchpad region (e.g., input in which is interpreted as a selection input). In some embodiments, invisible demarcations radiating out from the corners of the rectangle to the corners of the virtual touchpad region 1227 defines the top, bottom, left, and right sub-regions of the virtual touchpad region 1227 (e.g., a tap which is interpreted as an up, down, left, and right navigation, respectively). In some embodiments, the sub-regions have different sizes (e.g., the center rectangle can be a third of the length and width of the virtual touchpad region instead of half of the length and width of the virtual touchpad region) or can be sub-divided in different ways. In some embodiments, despite electronic device 1204 supporting discrete commands and/or gestural commands, virtual touchpad region 1227 optionally supports only discrete commands (e.g., such that gestural commands are ignored or interpreted as discrete commands at the starting or ending location of the gesture), only gestural commands (e.g., such that taps in any location are interpreted as selection inputs), or supports both types of commands.

Figure 12E:
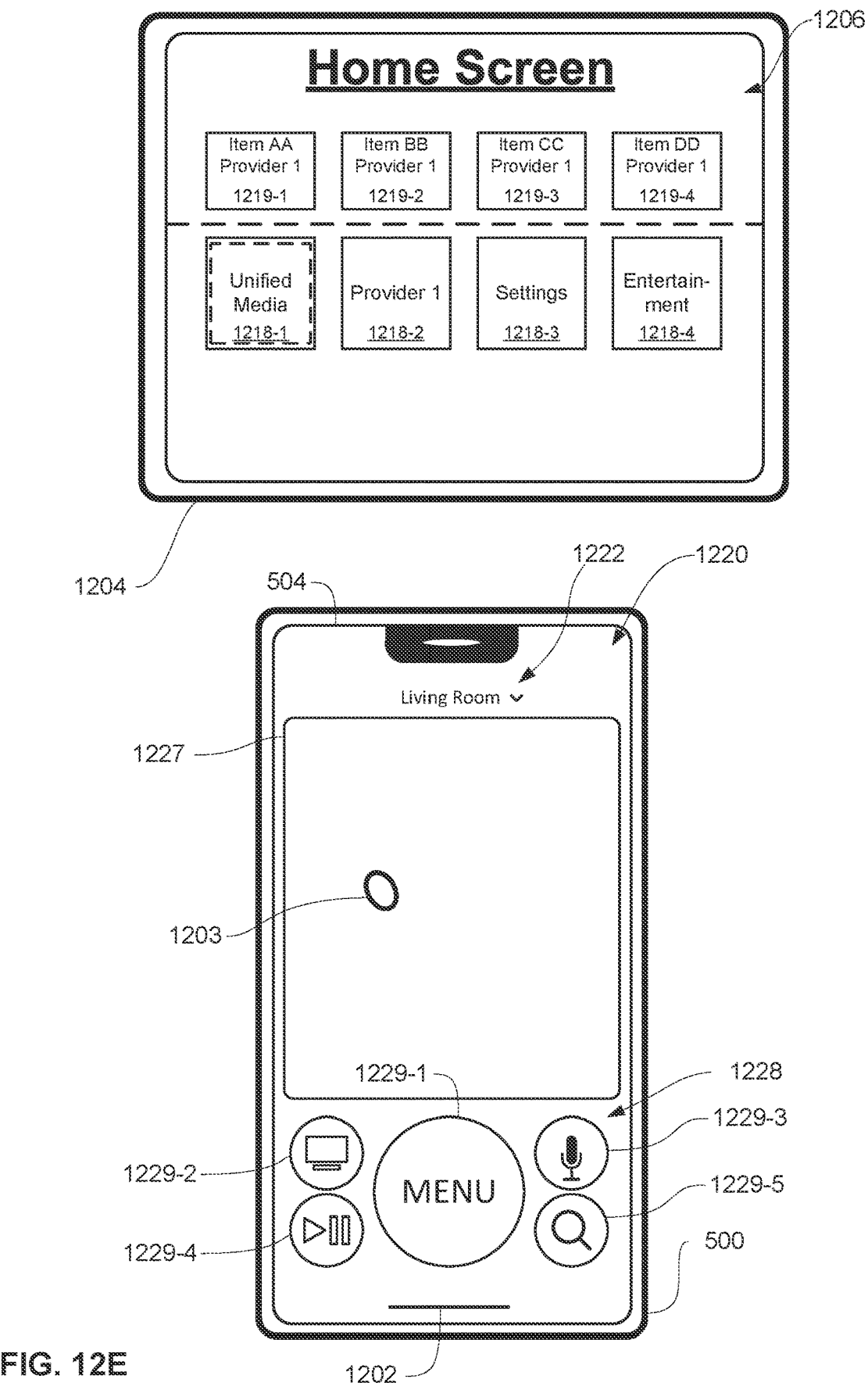
Figure 12F:
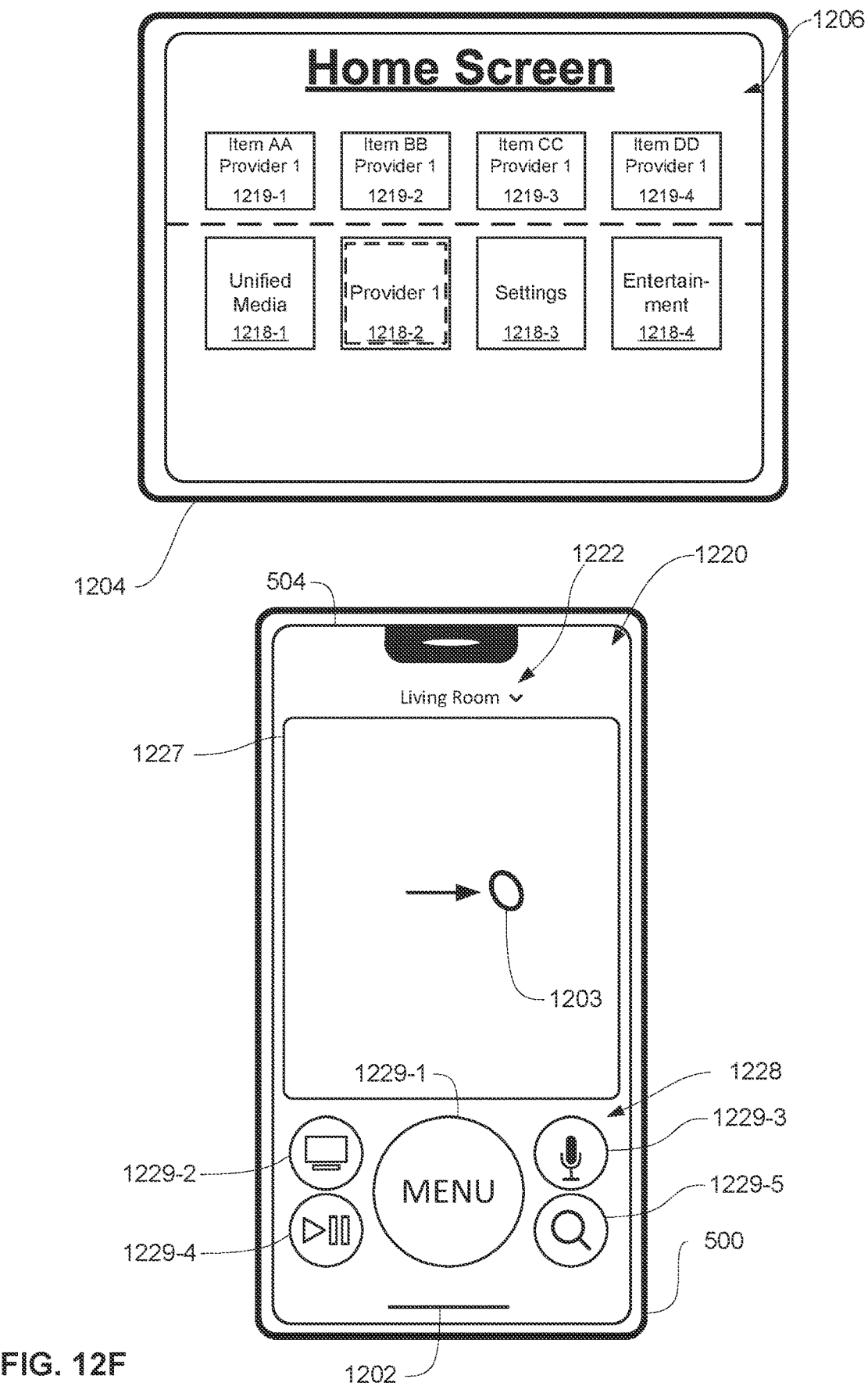

In FIG. 12E, electronic device 500 detects an initial touch-down of contact 1203 in the virtual touchpad region 1227. In some embodiments, electronic device 1204 is displaying a home screen user interface 1206. In some embodiments, a representation (e.g., application icon) of application 1218-1 (i.e., a unified media browsing application) is currently in focus (e.g., highlighted or otherwise tentatively selected). In FIG. 12F, electronic device 500 detects a rightward movement of contact 1203 while contact 1203 is in continuous contact with touchscreen 504 and interprets the gesture as a rightward swipe. In some embodiments, in response to detecting the swipe input, electronic device 500 transmits a rightward swipe command or a rightward navigation command to electronic device 1204. In some embodiments, in response to receiving the command, electronic device 1204 performs a rightward navigation, thus shifting the focus to the right. In some embodiments, the focus then shifts from application 1218-1 (i.e., the unified media browsing application) to the application 1218-2 (i.e., a provider 1 application). It is understood that when the rightward navigation corresponds to a fast or long swipe gesture, then the rightward navigation optionally moves the focus by more than one unit (e.g., to application 1218-3). It is also understood that although only a rightward swipe is shown, a leftward, upward, and downward swipe are also possible to cause leftward, upward, and downward navigation on electronic device 1204.

Figure 12G:
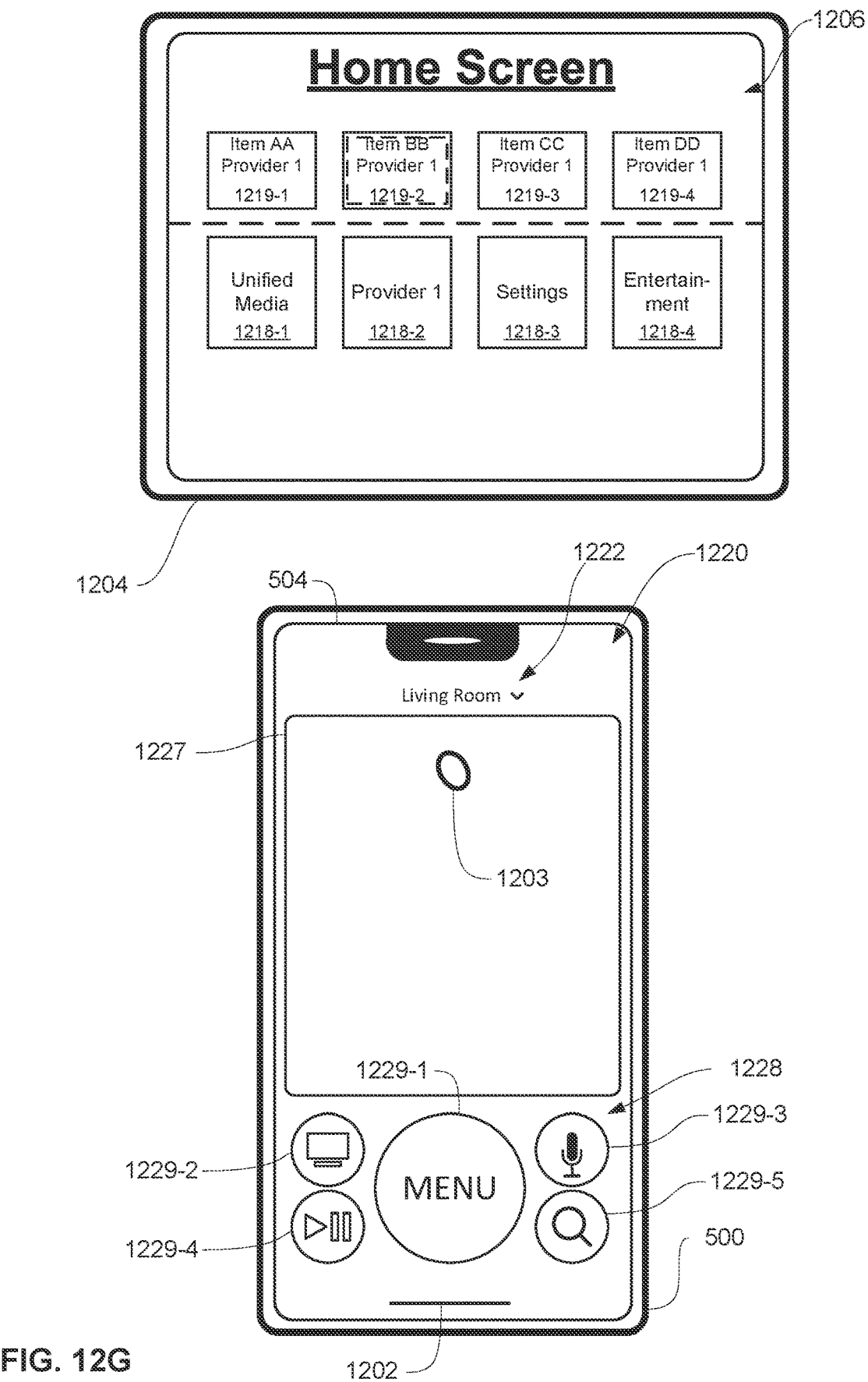

In FIG. 12G, electronic device 500 detects a tap input 1203 in the upper sub-region of virtual touchpad region 1227. In some embodiments, tap input 1203 in the upper sub-region is interpreted as an upward navigation and a respective command is sent to electronic device 1204. In some embodiments, in response to receiving the upward navigation command, the focus shifts from application 1218-2 (i.e., a provider 1 application) to content item 826-2 (i.e., Item BB). It is understood that although only a tap input in the upper sub-region is shown, a tap input in the left sub-region, lower sub-region, and right sub-region are also possible to cause leftward, upward, and downward navigation on electronic device 1204.

Figure 12H:
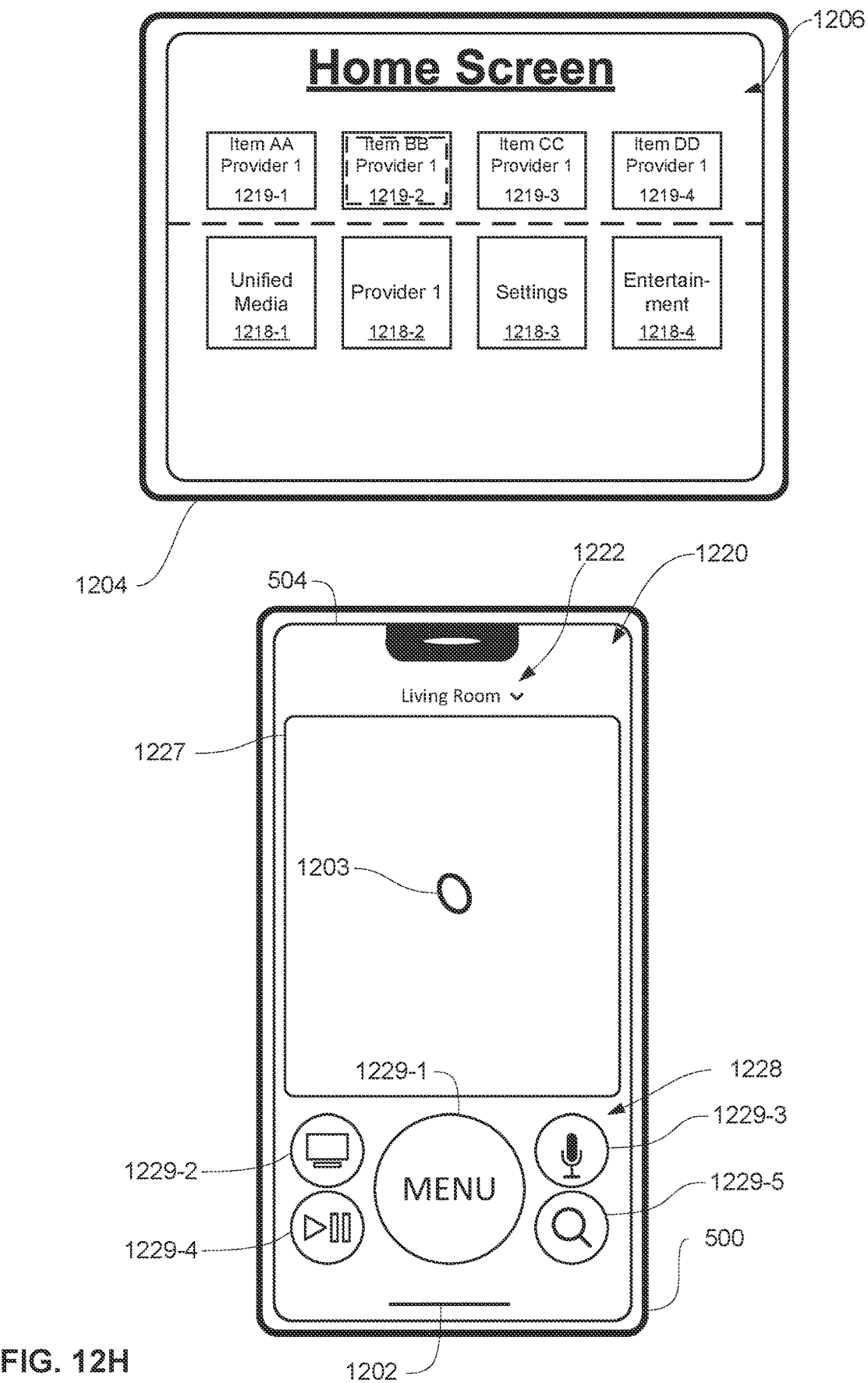
Figure 12I:
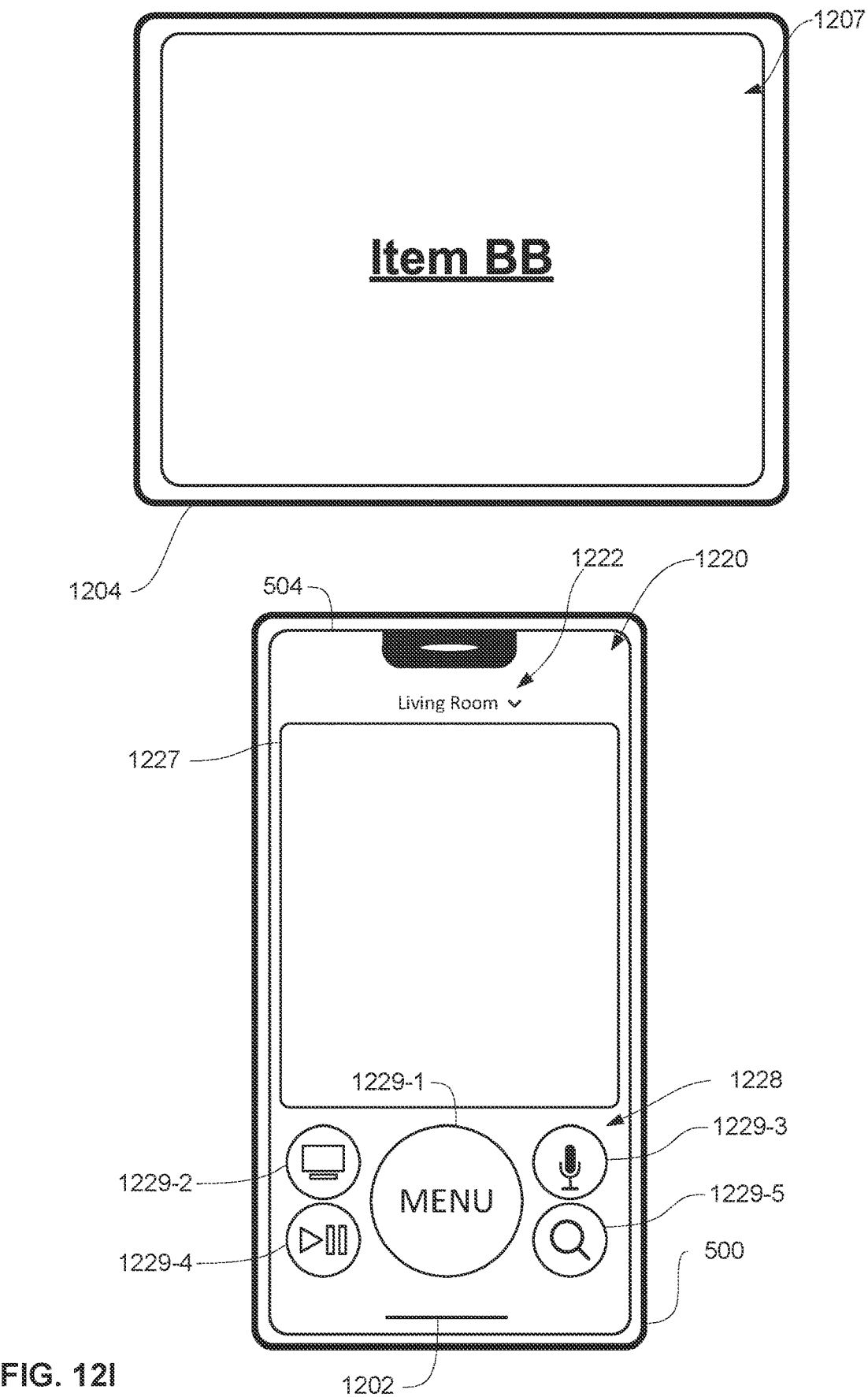

In FIG. 12H, electronic device 500 detects tap input 1203 in the center sub-region of virtual touchpad region 1227. In some embodiments, the tap input in the center sub-region is interpreted as a selection input and a respective command is sent to the set-top box being controlled. In some embodiments, in response to receiving the selection input, the set-top box begins or otherwise causes playback of content item 1219-2 (e.g., the currently highlighted option), as shown in FIG. 12I. For example, FIG. 12I illustrates electronic device 1204 displaying content item 1219-2 (i.e. "Item BB") on a media playback user interface 1207.

Figure 12J:
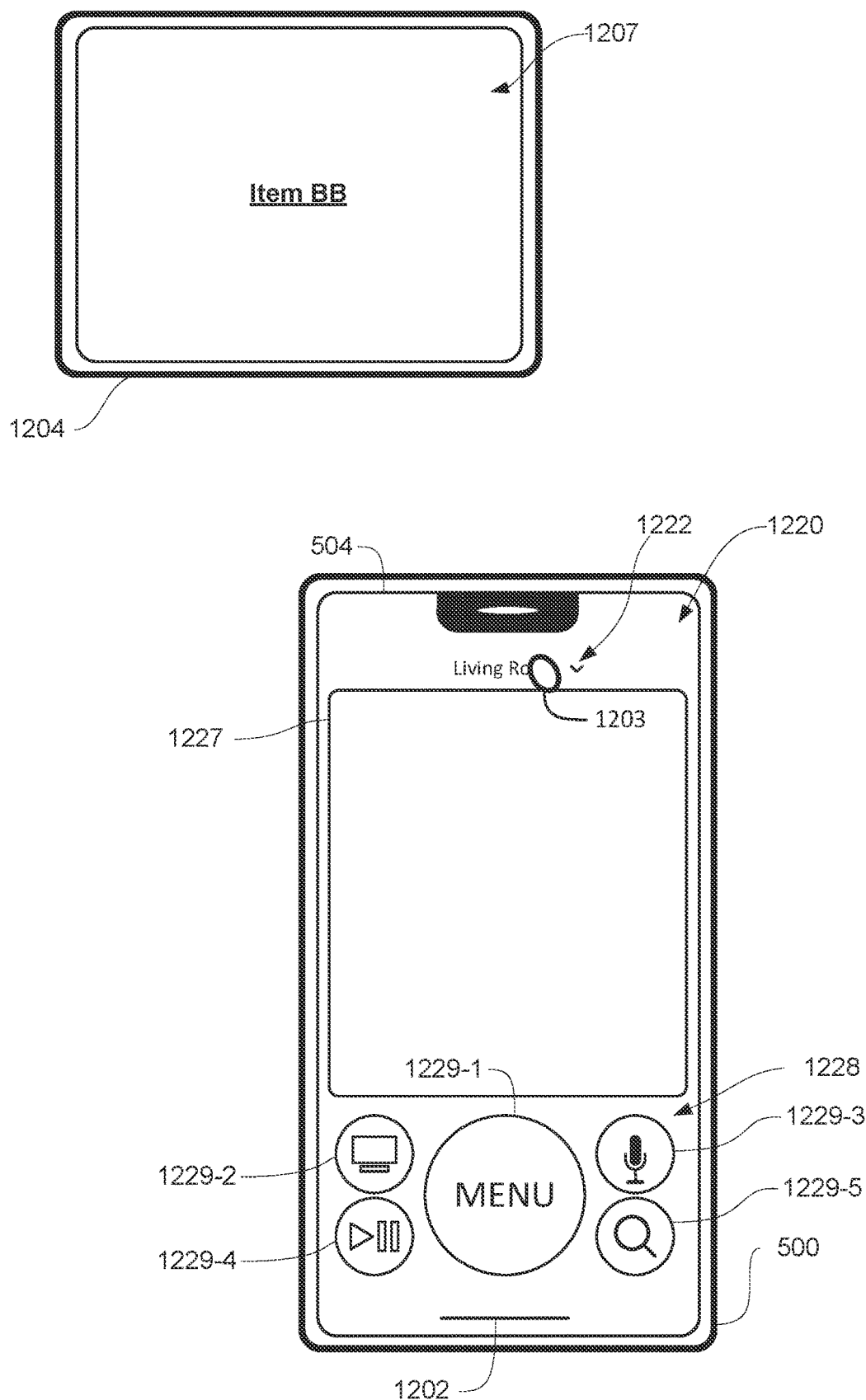
Figure 12K:
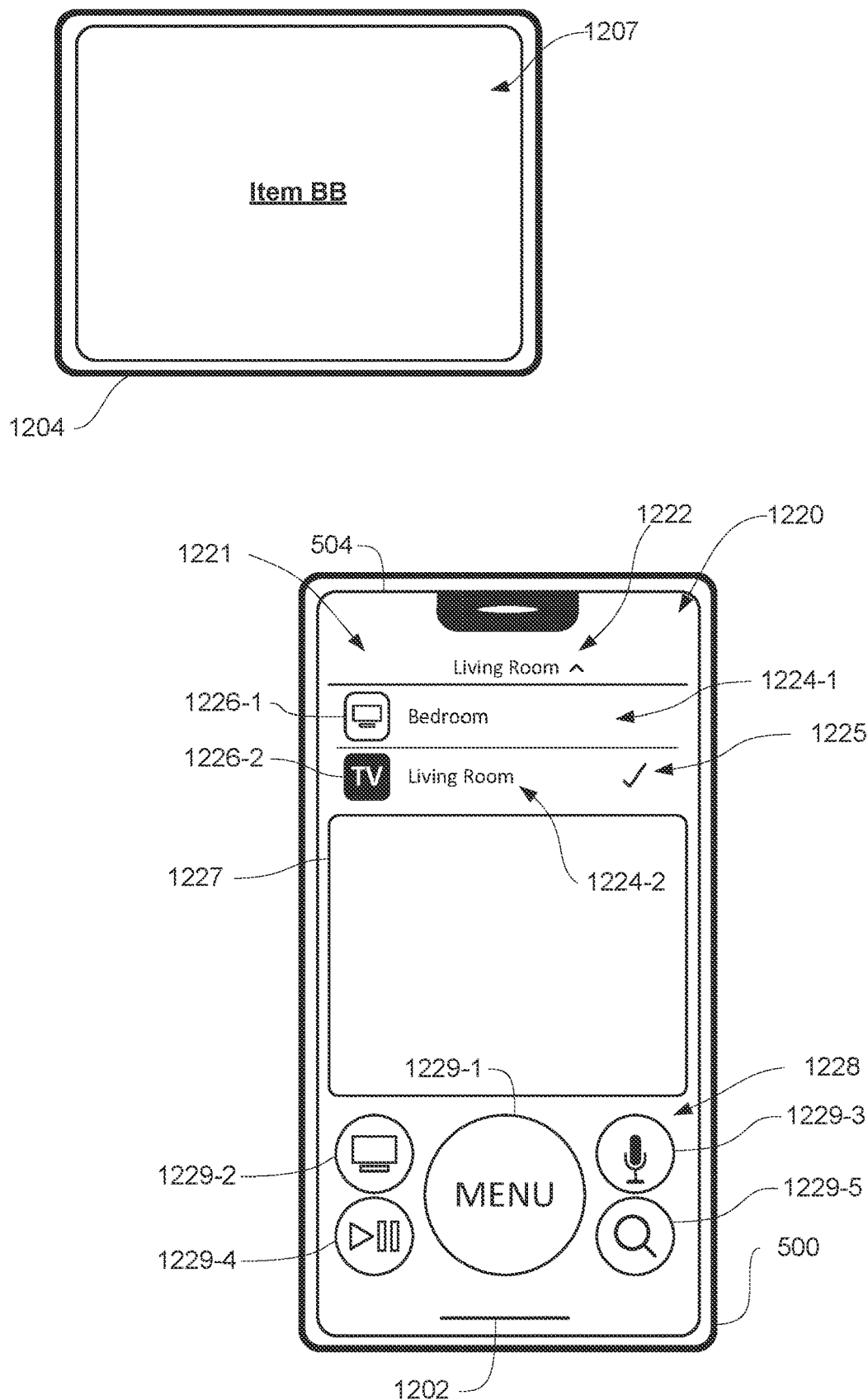

In FIG. 12J, the electronic device 500 detects a user input 1203 selecting selectable label 1222. In some embodiments, selecting selectable label 122 indicates the user's desire to display a list of controllable devices (e.g., to choose another device to control or to view all potential controllable devices). In some embodiments, as described above selectable label 1222 displays the name of the device currently being controlled (i.e., "Living Room" associated with electronic device 1204). In response to user input 1203 selecting selectable label 1222, device selection user interface 1221 is displayed, as shown in FIG. 12K. In some embodiments, device selection user interface 1221 includes a drop-down list of controllable devices. In some embodiments, the device currently selected for control by the remote control user interface is accompanied by an indicator (e.g., a check mark or any other visual indicator) to indicate that the respective device is currently selected. For example, controllable device 1224-2 (e.g., associated with electronic device 1204) is accompanied by a check mark indicator 1225 to indicate that remote control user interface 1220 is currently configured to control controllable device 1224-2. In some embodiments, as described above, each device in the list of controllable devices is accompanied by an icon or other representation to indicate the type of device for the respective device. For example, icon 1226-1 (e.g., a television icon) associated with controllable device 1224-1 indicates that device 1224-1 is a first type of device (e.g., television) that is controllable using remote control user interface 1220. In some embodiments, icon 1226-2 (e.g., a set-top box icon or logo) associated with device 1224-2 indicates that device 1224-2 is a second type of device (e.g., set-top box) that is controllable using the remote control user interface 1220.

In some embodiments, the size of the virtual touchpad region 1227 contracts in response to the display or expansion of device selection user interface 1221. In some embodiments, virtual touchpad region 1227 continues to accept user input to control electronic device 1204 despite virtual touchpad region 1227 having a reduced size and the device selection user interface 1221 being displayed. In some embodiments, performing a user input on the virtual touchpad region 1227 does not cause the device selection user interface 1221 to retract or cease displaying. In some embodiments, performing a user input on the virtual touchpad region 1227 does cause the device selection user interface 1221 to cease displaying and the virtual touchpad region 1227 to expand back to its original and/or maximum size.

Figure 12L:
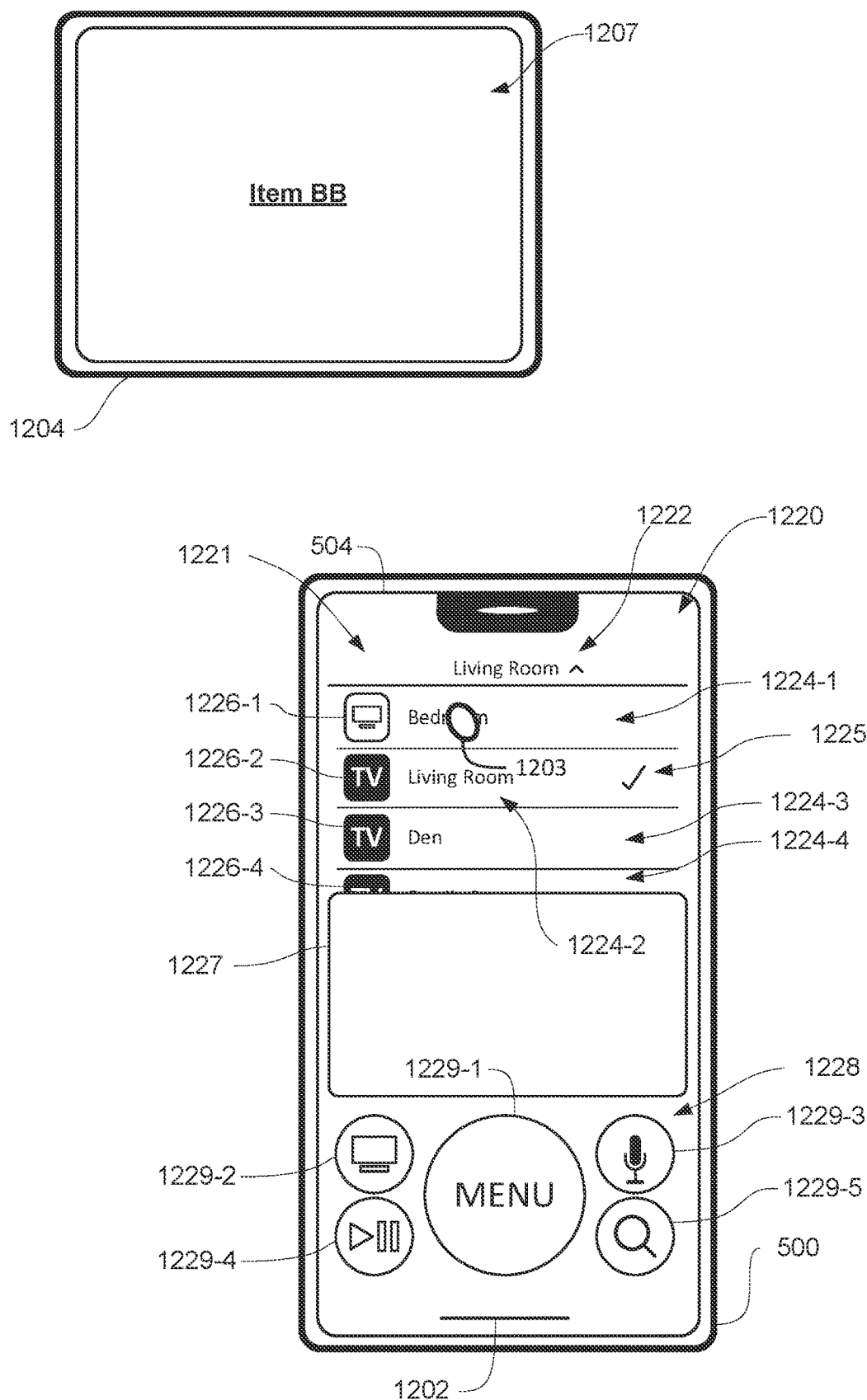

In some embodiments, the virtual touchpad region only contracts to a certain minimum size, as shown in FIG. 12L. For example, if the device selection user interface 1221 includes a large number of controllable devices such that the size of selection user interface 1221 is larger than when the device selection user interface 1221 only includes a small number of controllable devices, then the virtual touchpad region 1227 is optionally reduced to its minimum size. In some embodiments, the minimum size of virtual touchpad region 1227 is a certain ratio or percentage of the original size. For example, the virtual touchpad region 1227 optionally will not reduce below 50% (½), 66% (⅔), or 75% (¾) of its original size and/or height. In some embodiments, the minimum size is a predetermined absolute minimum height. For example, the virtual touchpad region 1227 optionally will not reduce below 1 inch, 1.5 inches, 2 inches, 2.5 inches in size, etc.

FIG. 12L illustrates an embodiment in which the list of controllable devices in device selection user interface 1221 is at least four devices (e.g., 1224-1, 1224-2, 1224-3, and 1224-4). In some embodiments, displaying four or more devices in the device selection user interface 1221 causes the virtual touchpad region 1227 to reduce to its minimum size. As shown in FIG. 12L, when four or more devices are displayed in the device selection user interface 1221, the virtual touchpad region 1227 reduces to half of its original size. In some embodiments, one or more devices in the device selection user interface 1221 "overflows" the maximum size allowable for device selection user interface 1221 (due to the minimum size requirements of virtual touchpad region 1227). In some embodiments, as shown in FIG. 12L, the fourth controllable device 1224-4 is partially hidden behind the virtual touchpad region 1227. In some embodiments, device selection user interface 1221 becomes a scrollable list such that upward swipes cause the list to scroll upwards and reveal controllable devices in the list that are hidden behind the virtual touchpad region 1227.

Figure 12M:
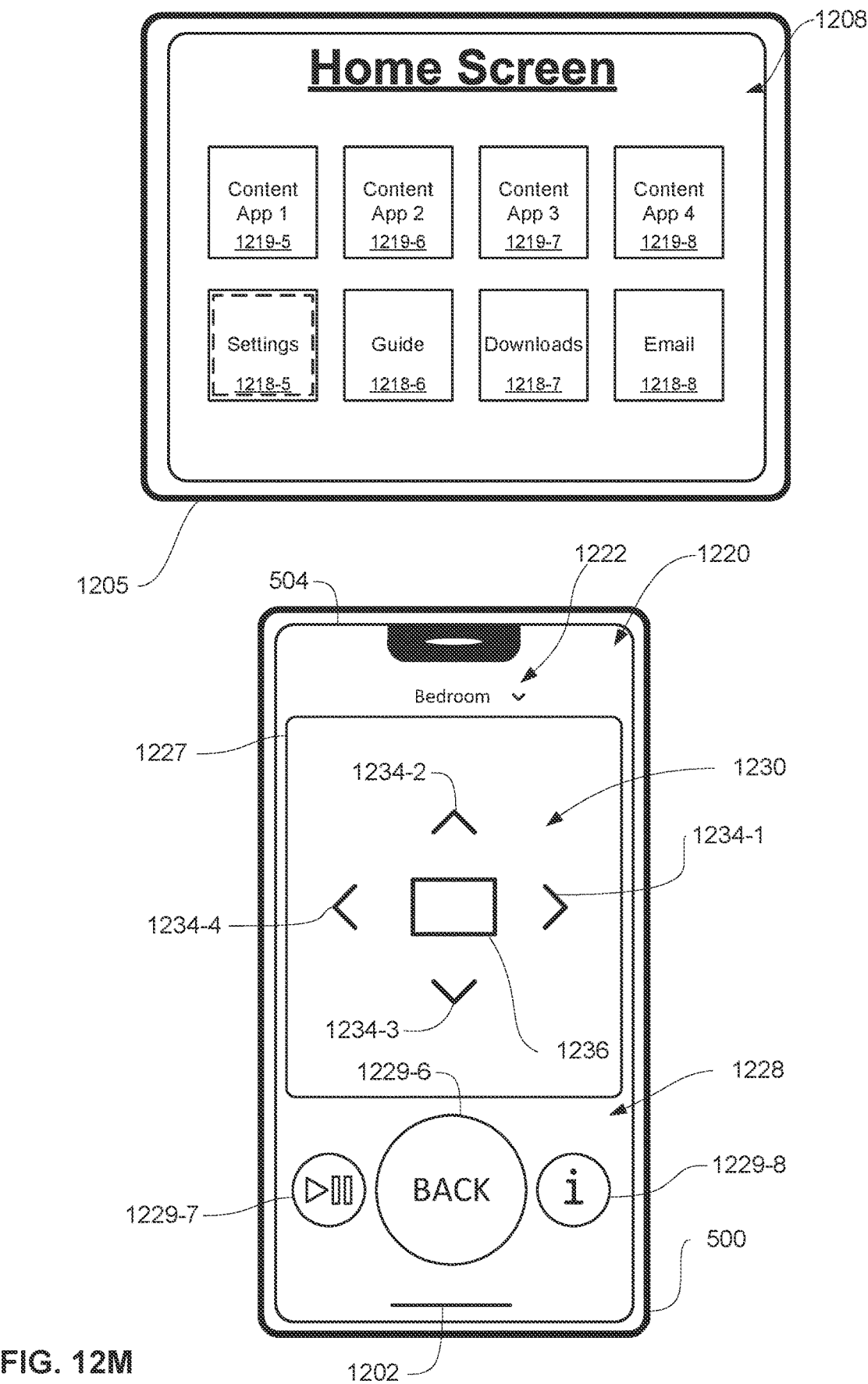

In FIG. 12L, electronic device 500 detects a tap input 1203 selecting controllable device 1224-1. As shown in FIG. 12L, controllable device 1224-1 is a different type of device than controllable device 1224-2. In some embodiments, controllable device 1224-2 is a set-top box while controllable device 1224-1 is a television (e.g., smart television). In some embodiments, in response to detecting the tap input 1203 selecting controllable device 1224-1, remote control user interface 1220 is reconfigured to control controllable device 1224-1 instead of controllable device 1224-2. In some embodiments, reconfiguring the remote control user interface 1220 includes displaying a different set of selectable options in the control options region 1228 and configuring the virtual touchpad region 1227 to accept a different set of inputs to perform a different set of actions and/or functions on the controlled device corresponding to the different kind of device now being controlled, such as shown in FIG. 12M. As shown in FIG. 12M, for ease of description, controllable device 1224-1 is electronic device 1205. In some embodiments, electronic device 1205 is a smart television device and is displaying a home screen interface 1208 that includes selectable options 1218-5, 1218-6, 1218-7, 1218-8, 1219-5, 1219-6, 1219-7 and 1219-8.

FIG. 12M illustrates electronic device 500 reconfigured to control electronic device 1205. In some embodiments, the virtual touchpad interface 1220 displays usage hints 1230. In some embodiments, usage hints 1230 are displayed every time a new device is selected. In some embodiments, usage hints 1230 are displayed every time a new type of device is selected. In some embodiments, the display behavior of usage hints 1230 are similar to the display behavior of usage hints 1230 described above with respect to FIG. 12D. In some embodiments, usage hints 1230 are different from the usage hints 1230 displayed in FIG. 12D (e.g., which were displayed for a different type of controlled device). In some embodiments, electronic device 1205 supports different commands and/or inputs. For example, electronic device 1205 optionally only supports discrete commands and does not support gestural commands. In some embodiments, the usage hints 1230 optionally displays carets, arrows, or triangles such as indicators 1234-1, 1234-2, 1234-3, and 1234-4 to indicate that tap inputs in certain sub-regions of the virtual touchpad region 1227 will be interpreted as discrete navigational inputs (e.g., a tap in the top, left, bottom, and right sub-regions are interpreted as up, down, left, and right navigations, respectively). In some embodiments, the usage hints 1230 include a rectangular box 1236 to delineate the area in which a tap is interpreted as a selection input (e.g., "click" input). In some embodiments, rectangular box 1236 is merely a graphical representation of the center sub-region and the size of the center sub-region is optionally different in shape and size from rectangular box 1236.

In some embodiments, as shown in FIG. 12M, control options region 1228 include one or more selectable options (e.g., affordances) for performing (or otherwise causing) actions on electronic device 1205. In some embodiments, the selectable options provided for controlling electronic device 1205 are different from the selectable options provided for controlling electronic device 1204. In some embodiments, control options region 1228 includes three selectable control options 1229-6, 1229-7, and 1229-8. In some embodiments, control option 1229-6 is selectable to send a "back" command to electronic device 1205 (e.g., to display a previously displayed screen, a previous menu, etc.). In some embodiments, control option 1229-7 pauses or resumes playback of the content currently displayed on electronic device 1205. In some embodiments, control option 1229-8 causes display of an information user interface on electronic device 1205. In some embodiments, the information user interface provides information about the content that is currently displayed on the controlled device. Thus, the selectable control options in control options region 1228 can include a different number of and different types of control options depending on the type of device being controlled by remote control user interface 1220.

Figure 12N:
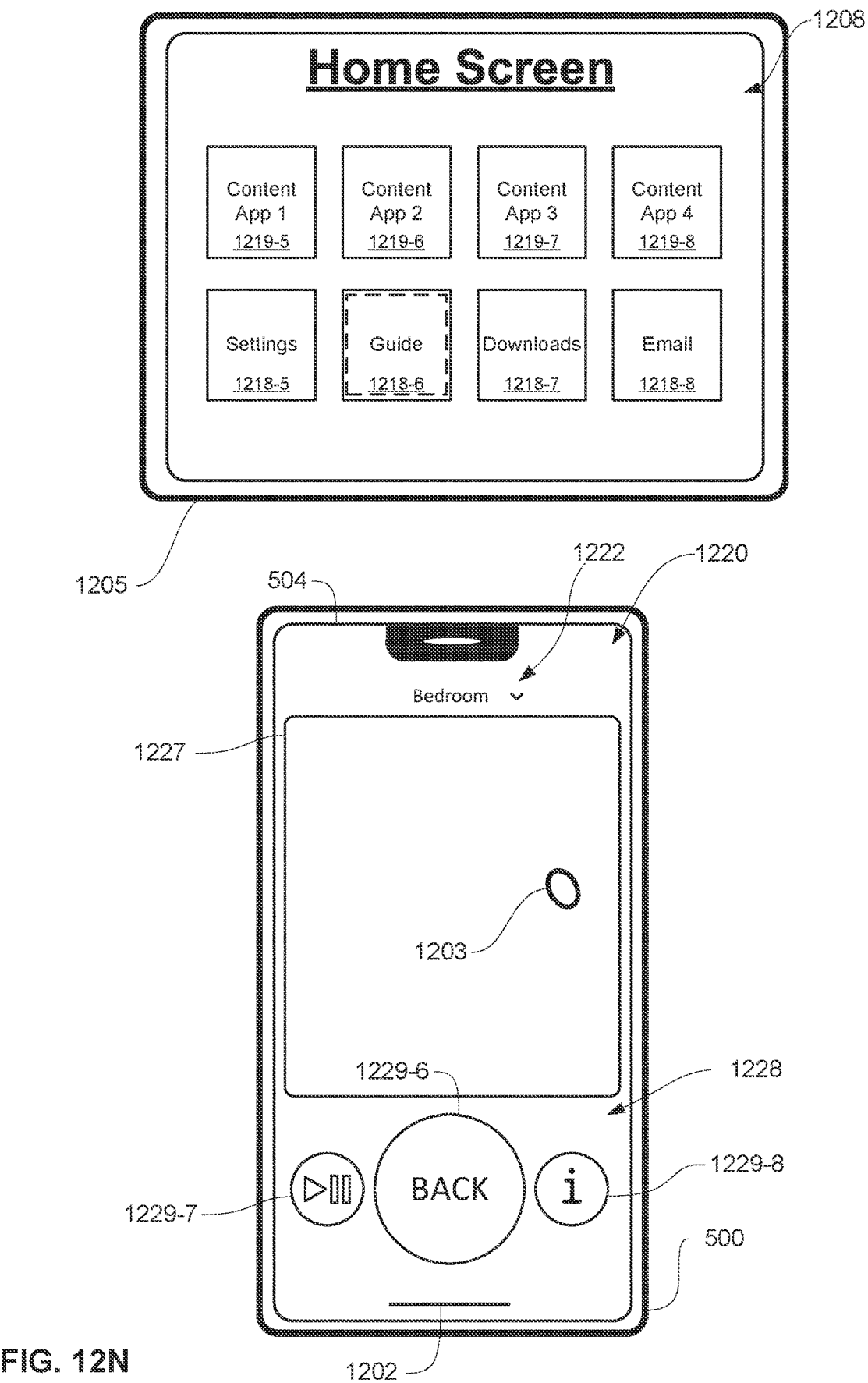

In FIG. 12N, a tap input 1203 is received in the right sub-region of the virtual touchpad region 1227. In some embodiments, the tap input 1203 in the right sub-region is interpreted as a rightward navigation and a rightward navigation command is send to electronic device 1205. In some embodiments, the tap input 1203 in the right sub-region of the virtual touchpad region 1227 causes the focus on electronic device 1205 to shift rightwards from selectable option 1218-5 (i.e., "Settings") to selectable option 1218-6 (i.e., "Guide").

Figure 12O:
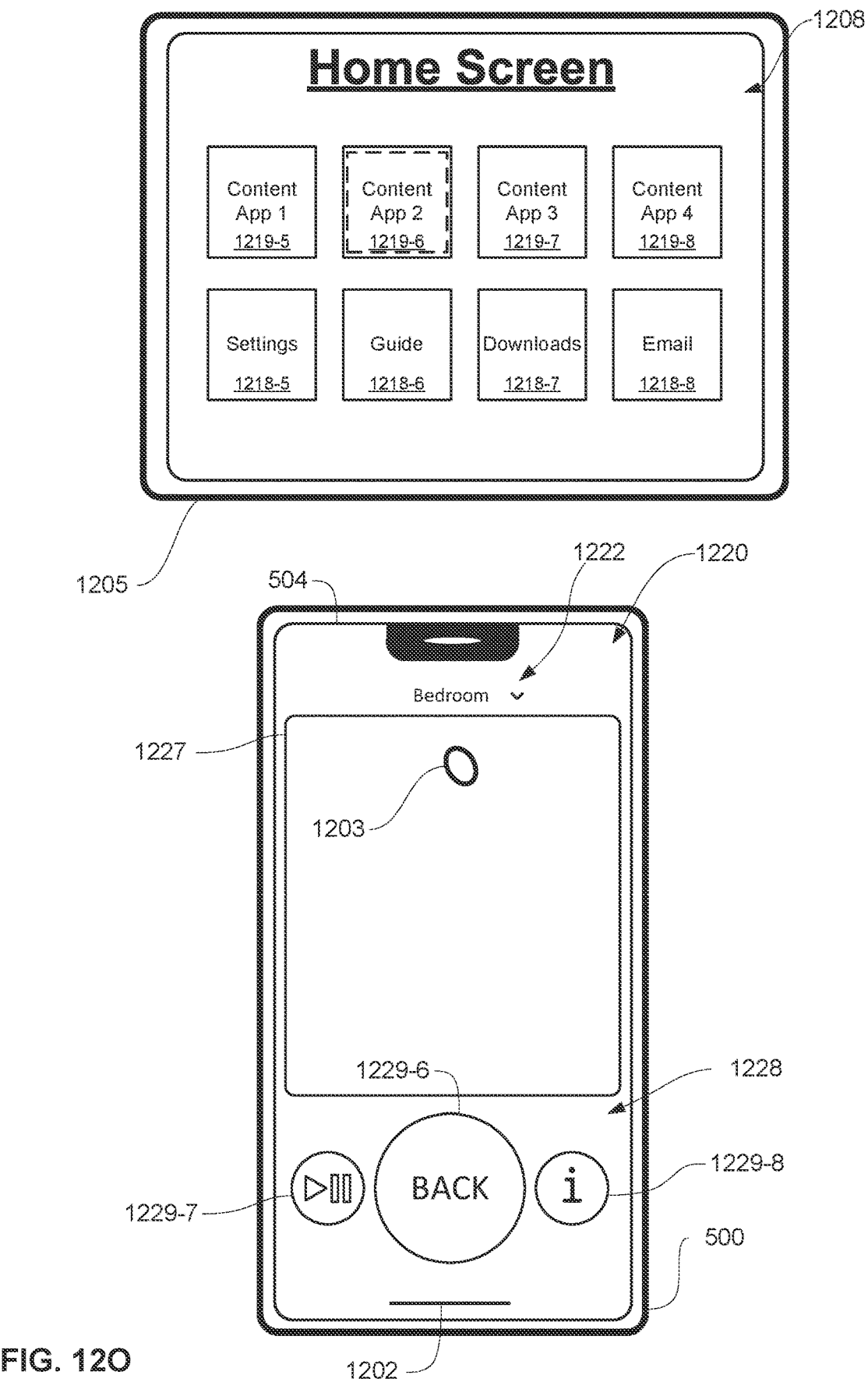

In FIG. 12O, a tap input 1203 is received in the upper sub-region of the virtual touchpad region 1227. In some embodiments, the tap input 1203 is interpreted as an upward navigation and an upward navigation command is sent to electronic device 1205. In some embodiments, the tap input 1203 in the upper sub-region of the virtual touchpad region 1227 causes the focus on electronic device 1205 to shift upwards from selectable option 1218-6 (i.e., "Guide") to selectable option 1219-6 ("Content App 2"). It is understood that although only tap inputs in the right sub-region and upper sub-region are shown, a tap input in the left sub-region and lower sub-region are also possible to cause leftward and downward navigation on electronic device 1205.

Figure 12P:
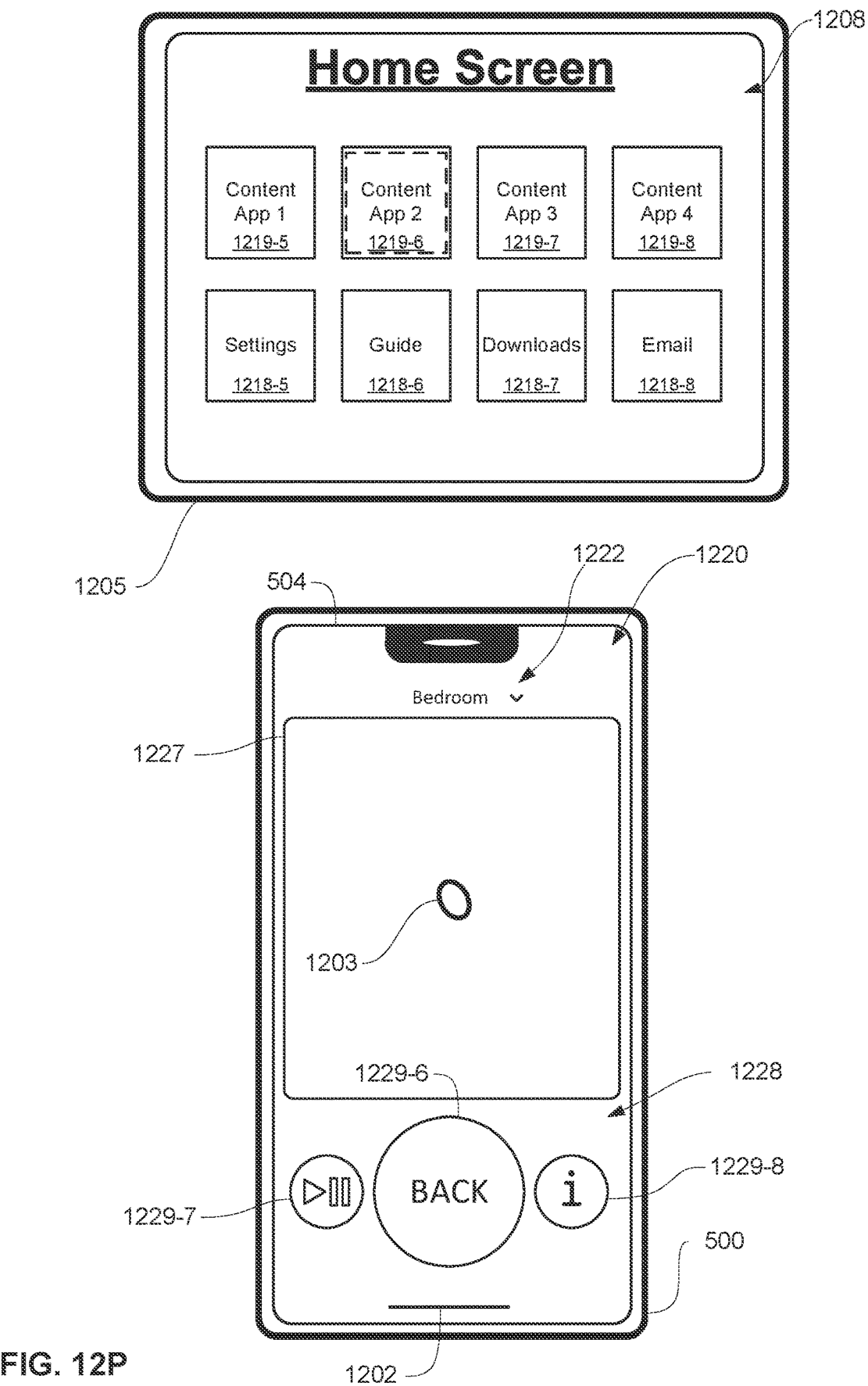
Figure 12Q:
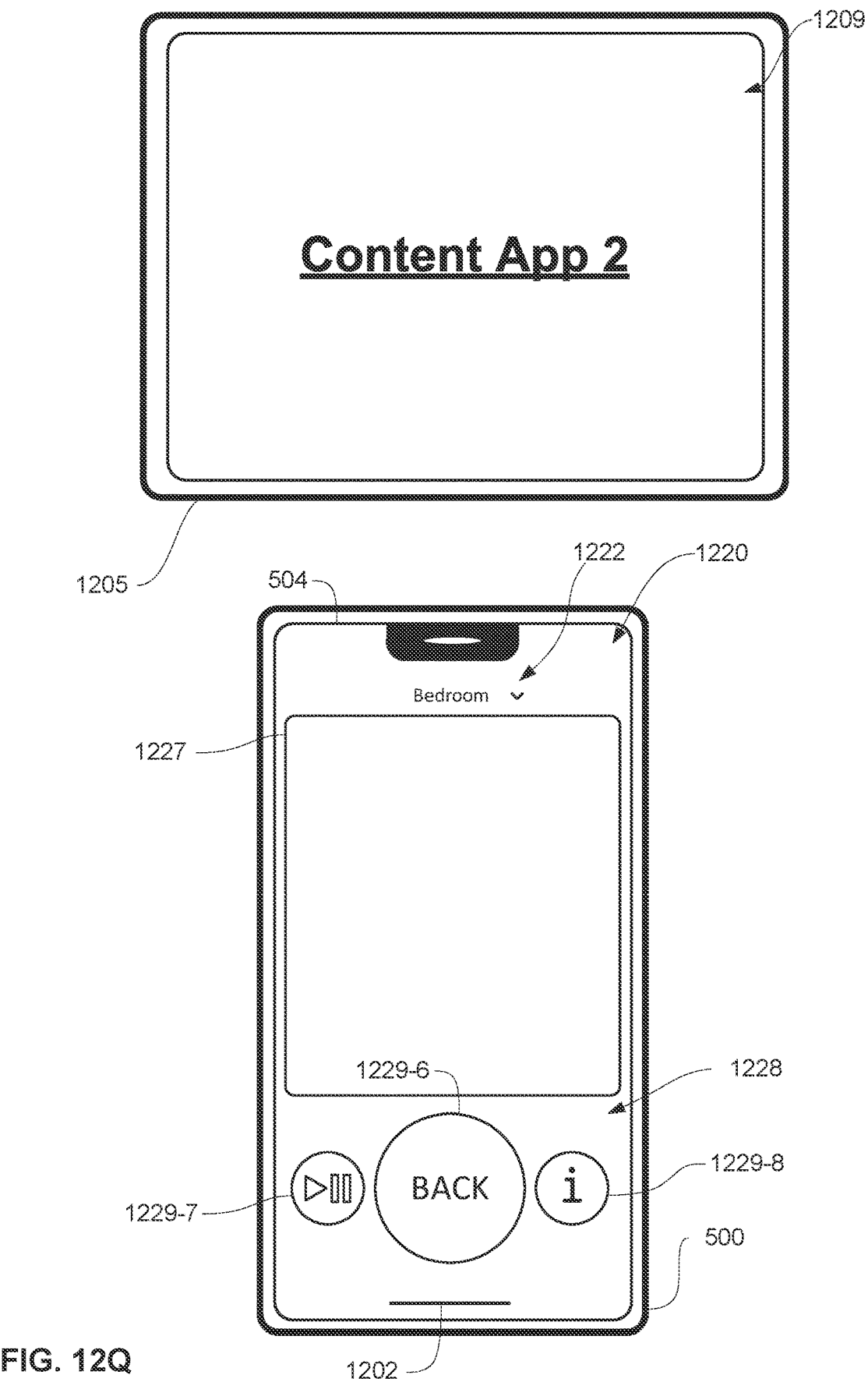

In some embodiments, as shown in FIG. 12P, a tap input 1203 received in the center region of the virtual touchpad region 1227 is interpreted as a selection input. In response to the selection input, electronic device 1205 selects selectable option 1218-6 and optionally causes execution or playback of the content or application associated with selectable option 1218-6 (e.g., "Content App 2"), as shown in FIG. 12Q.

Figure 12R:
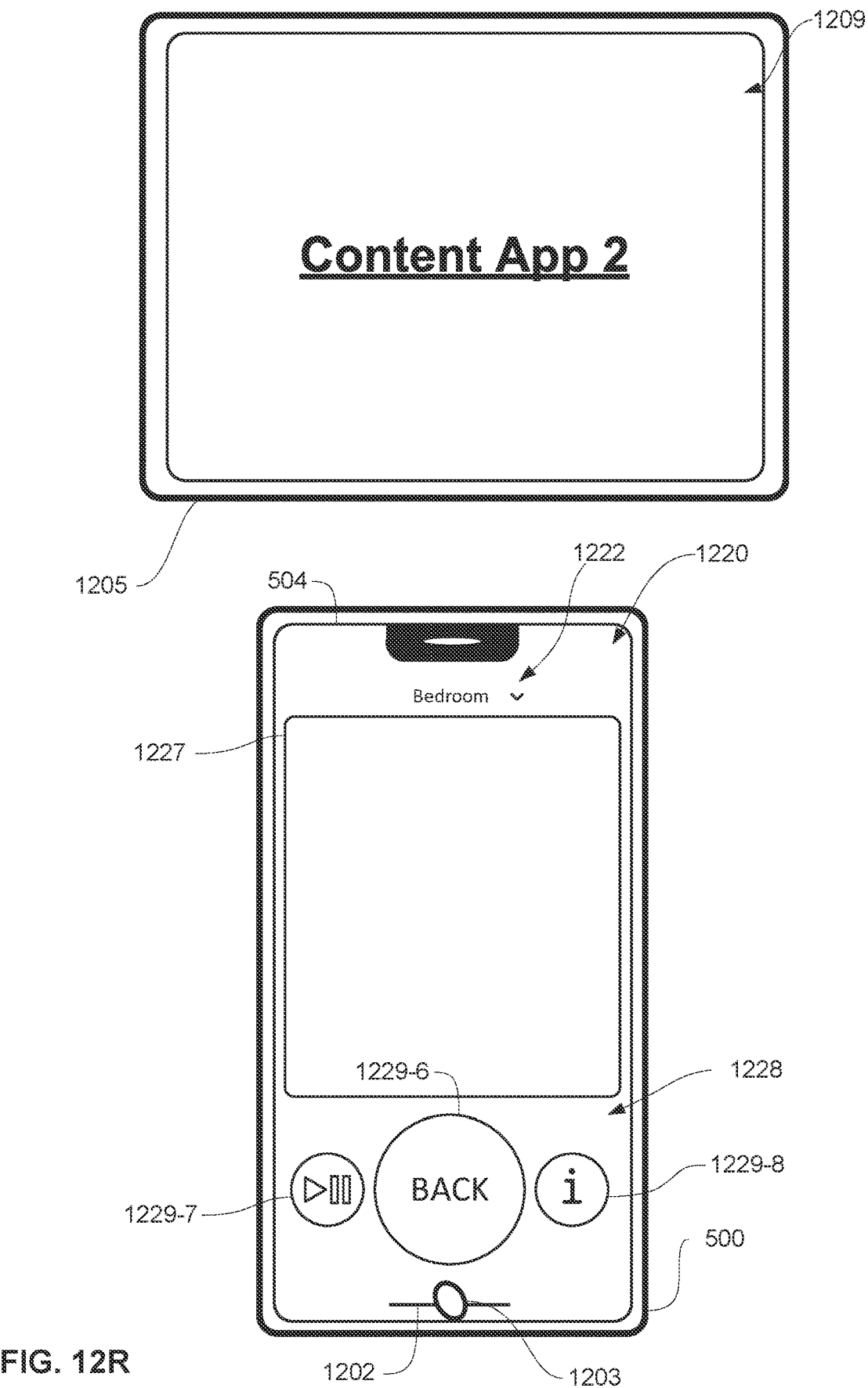

In some embodiments, remote control user interface 1220 includes an application dismissal indicator 1202. In some embodiments, performing a swipe gesture on application dismissal indicator 1202 causes the dismissal of the application currently being displayed on electronic device 500. In some embodiments, an upward swipe starting from application dismissal indicator 1202 causes the dismissal of remote control user interface 1220. As shown in FIG. 12R, an initial touch-down of contact 1203 is detected at the application dismissal indicator 1202.

Figure 12S:
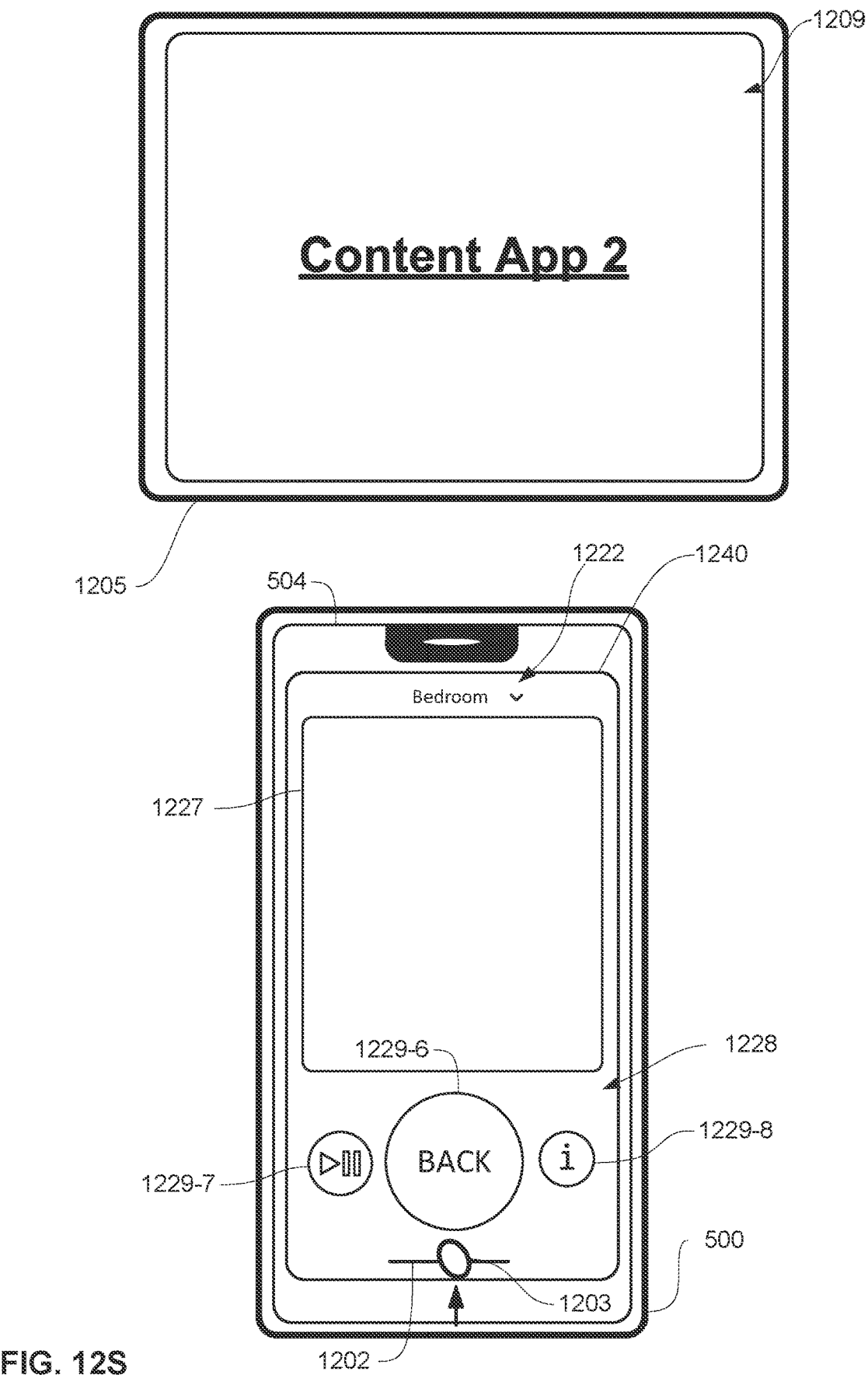

In some embodiments, as shown in FIG. 12S, while continuing contact with touch screen 504, contact 1203 performs a swipe movement upwards. In some embodiments, electronic device 500 displays an application container 1240 which contains the remote control user interface. In some embodiments, application container has a size that is smaller than the original or full size of remote control user interface 1220. In some embodiments, the size of application container 1240 is defined by the swipe gesture of contact 1203. For example, if the swipe gesture is small, the size of application container 1240 is substantially full-screen, whereas if the swipe gesture is large, the size of application container 1240 reduces accordingly. In some embodiments, application dismissal indicator 1202 follows the user's input as the input swipes across touch screen 504. In some embodiments, as the user swipes across touch screen 504, causing application container 1240 to reduce in size, the elements of remote control user interface, such as the virtual touchpad region 1227 and the selectable control options in the control options region 1228, also reduce in size proportionally.

Figure 12T:
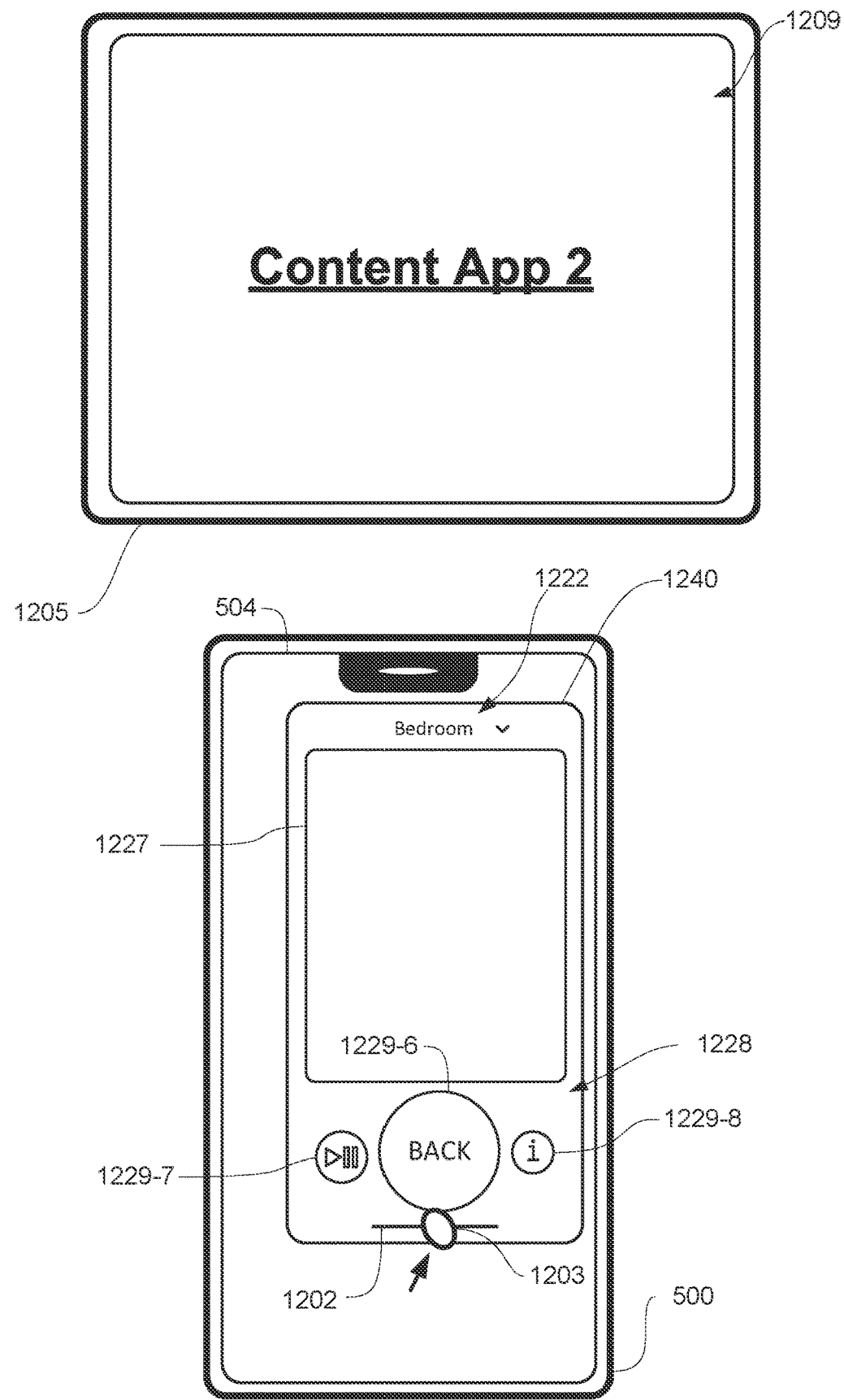

FIG. 12T shows a further swipe movement of contact 1203 while continuing contact with touch screen 504. In some embodiments, the swipe movement is not directly upwards but is optionally diagonal, laterally, or downwards. In some embodiments, application dismissal indicator 1202 (and thus application container 1240) follows contact 1203 as it moves across touch screen 504. For example, in FIG. 12T, contact 1203 moves diagonally in an upper-rightwards direction. In some embodiments, in response to contact 1203 moving diagonally in an upper-rightwards direction, application container 1240 further reduces in size and moves in the same upper-rightwards direction. It is understood that if the swipe movement moved in any other direction, application container 1240 would follow the swipe movement in the respective direction. In some embodiments, movements in the vertical direction change the size of application container 1240 (e.g., upward components of the user input cause application container 1240 to reduce in size and downward components of the user input cause application container 1240 to expand in size) and/or change the vertical location of application container 1240. In some embodiments, movements in the horizontal direction change the horizontal location of application container 1240 but do not change the size of application container 1240 (e.g., horizontal components of the swipe input cause application container 1240 to move horizontally according to the horizontal components of the swipe input). In some embodiments, after contact 1203 has moved beyond a vertical threshold, electronic device 500 causes a complete dismissal of the remote control user interface (and the application container 1240). For example, when the contact moves above the halfway point of touch screen 504, the remote control user interface is dismissed. In some embodiments, the remote control user interface is dismissed in such a manner as if to reduce into the selectable option or icon that originally caused the display of the remote control user interface. For example, after dismissal of the remote control user interface, a controls user interface 1200 is displayed and the remote control user interface appears to minimize into remote control selectable option 1210*h*. In some embodiments, a slow swipe or partial swipe that does not reach the vertical threshold to fully dismiss the remote control user interface optionally displays an application selection user interface.

In some embodiments, instead of the swipe gesture causing application container 1240 to move according to the movement of the swipe gesture, the swipe gesture causes application container 1240 to progress along an animation sequence in which the application container 1240 reduces in size and recedes into the selectable option or icon that originally caused the display of the remote control user interface. For example, in some embodiments, an upward vertical component of a swipe gesture cause application container 1240 to both reduce in size and also move towards the location of the selectable option or icon that originally caused the display of the remote control user interface. When the swipe gesture reaches a certain threshold vertical location, application container 1240 will have minimized to a point that it appears to have disappeared into the selectable option or icon that originally caused the display of the remote control user interface. In some embodiments, downward vertical components of a swipe gesture cause application container 1240 to increase in size and move away from the location of the selectable option or icon that originally caused the display of the remote control user interface. In other words, upward movements of a swipe progress the dismissal animation sequence and downward movements of the swipe reverse the progress of the dismissal animation sequence. In some embodiments, horizontal components of the swipe gesture do not cause any corresponding change in the size or location of application container 1240 and/or do not affect the dismissal animation sequence of application container 1240.

In some embodiments, the remote control user interface described above with respect to FIGS. 12C-12T is displayed in response to selection of a remote control selectable option on a controls user interface, as described above with respect to FIGS. 12A-12B. In some embodiments, the remote control user interface described above with respect to FIGS. 12C-12T is also displayed in response to a user input on other user interfaces requesting display of the remote control user interface, as will be described in further detail below.

Figure 12U:
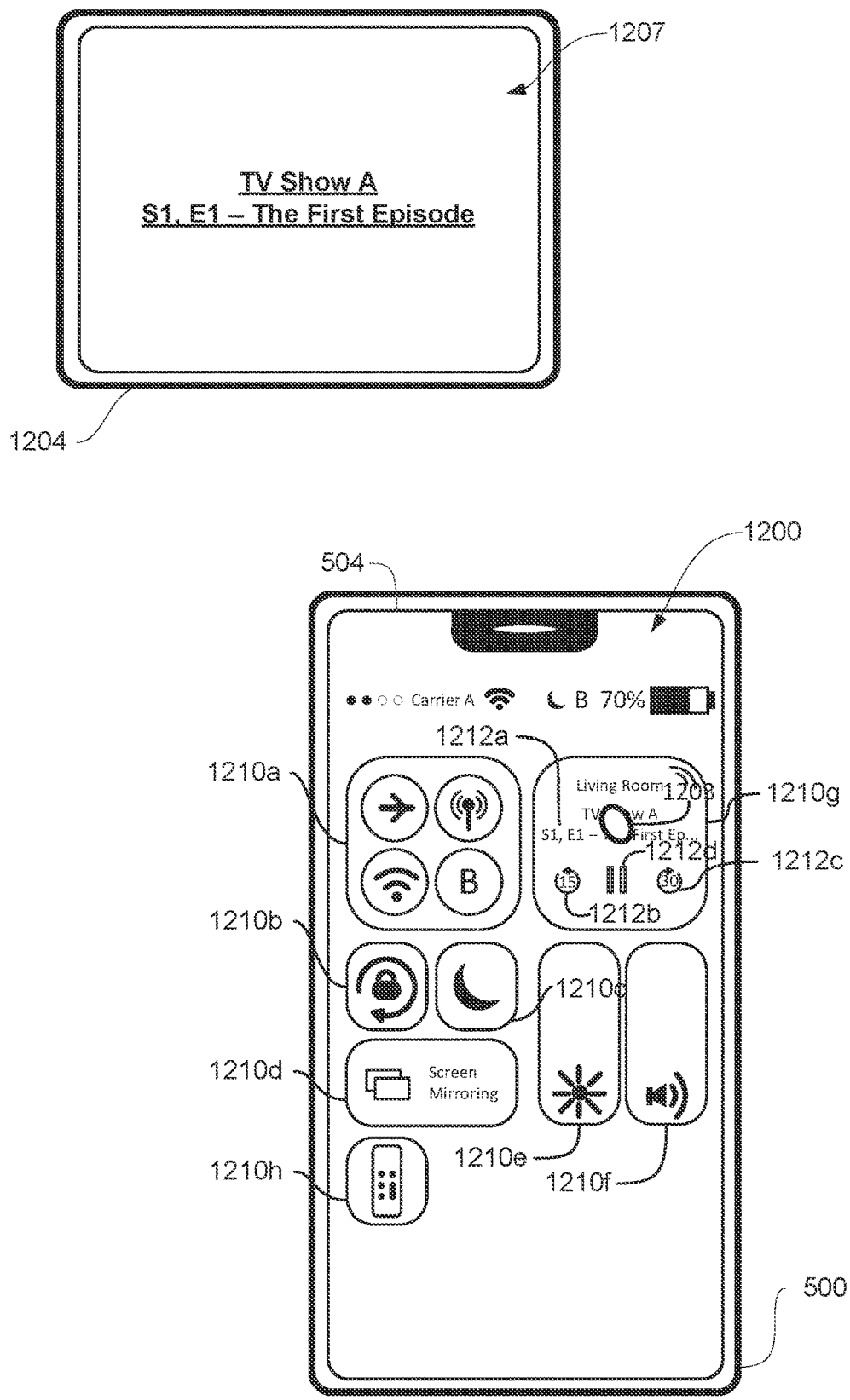
Figure 12V:
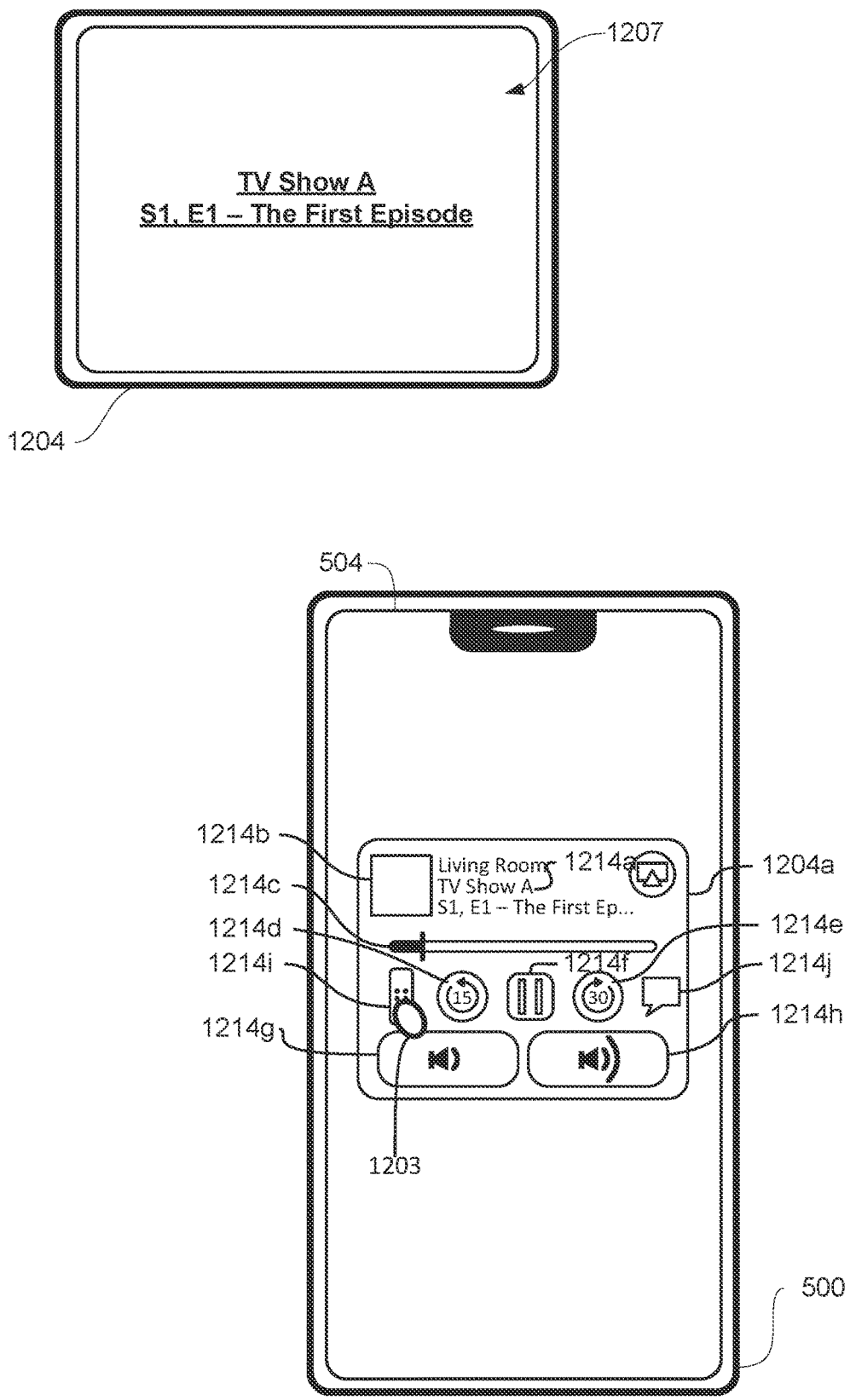

For example, FIG. 12U illustrates a controls user interface 1200. In some embodiments, controls user interface 1200 includes a playback control element 1210*g*. In some embodiments, playback control element 1210*g* is associated with content currently being displayed on electronic device 1204. In some embodiments, electronic device 500 receives a user input 1203 selecting the playback control element 1210*g*. In some embodiments, in response to the user input 1203 selecting the playback control element 1210*g*, electronic device 500 replaces display of the controls user interface 1200 with display of a playback control element 1204*a*, as shown in FIG. 12V. In some embodiment, the playback control element 1204*a* is similar to the playback control element 804*a* described with respect to FIG. 8C. The playback control element 1204*a* associated with electronic device 1204 includes an indication 1214*a* of the name of the content that is playing on electronic device 1204, artwork 1214*b* associated with the content that is playing on electronic device 1204, a scrubber bar 1214*c*, a skip backwards option 1214*d*, a skip ahead option 1214*e*, a pause option 1214*f*, a volume down option 1214*g*, a volume up option 1214*h*, a remote control option 1214*i* (e.g., a remote control selectable option), and a language and subtitles option 1214*j*. The playback control element 1204*a* associated with electronic device 1204 includes volume down and volume up options 1214*g-h* but does not include a volume bar because electronic device 1204 optionally does not share its volume level with the electronic device 500. Therefore, the electronic device 500 is optionally unable to present the absolute volume level of electronic device 1202*a*. It should be understood that, in some embodiments, the scrubber bar 1214*c* includes text indications of the playback position in the content and the time remaining until the end of the content. In some embodiments, when electronic device 500 receives a tap input 1203 on remote option 1214*i*, a remote control user interface, similar to the one described with respect to FIGS. 12C-12T, is displayed.

Figure 12W:
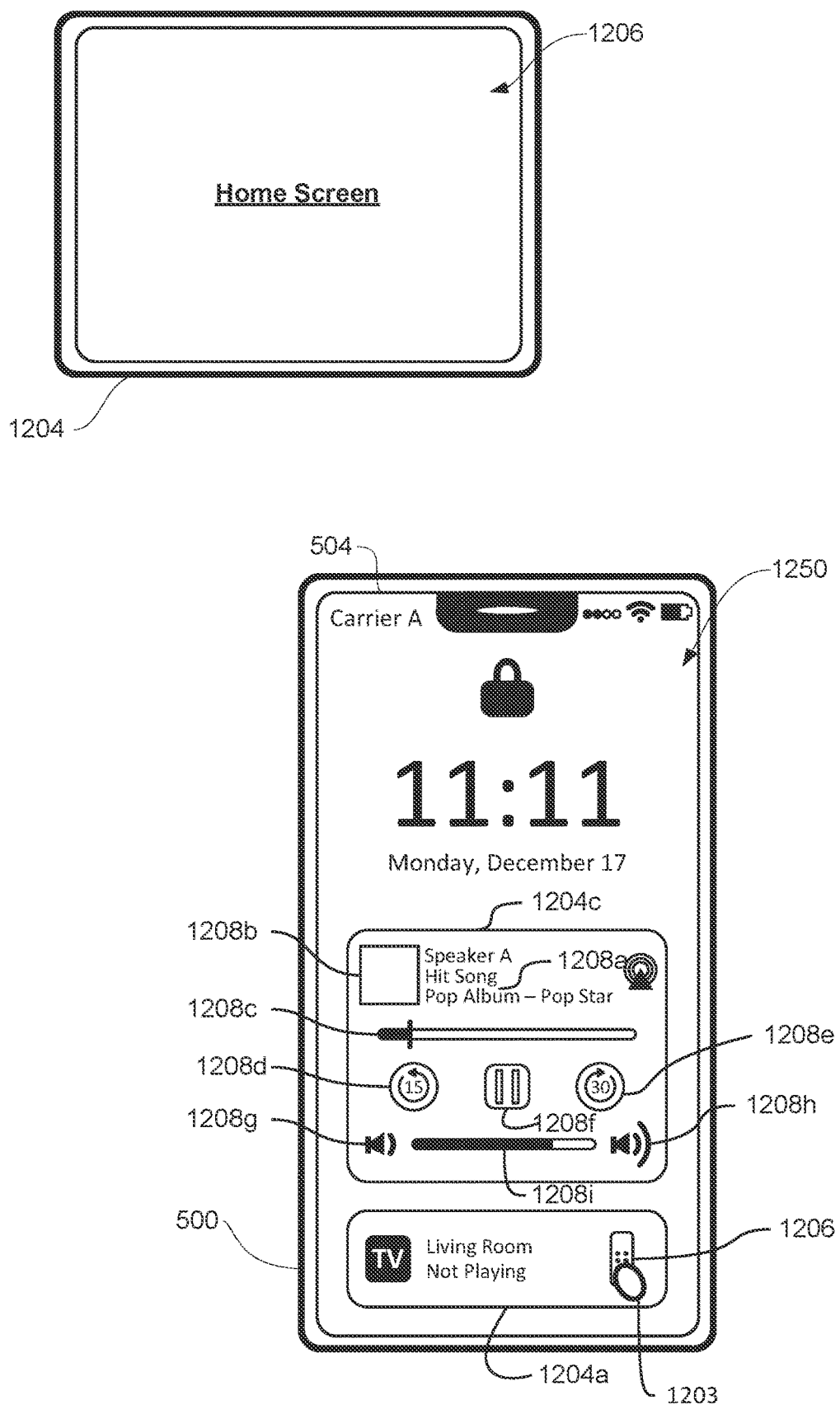

FIG. 12W illustrates another method in which the user can request display of the remote control user interface described above. In particular, FIG. 12W displays a wake screen user interface 1250, similar to the wake screen user interface described with respect to FIG. 8A. In some embodiments, the wake screen user interface 1250 is presented when the electronic device 500 transitions from a standby mode in which the display is optionally off or not presenting a user interface. The wake screen user interface 1250 optionally includes a first playback control element 1204*a* associated with electronic device 1204 and optionally includes a second playback control element 1204*c* associated with another controllable device. As shown in FIG. 12W, the first playback control element 1204*a* associated with electronic device 1204 indicates that there is no content currently playing on electronic device 1204. Despite there being no content currently playing on electronic device 1204, the first playback control element 1204*a* includes a remote control option 1206 (e.g., a remote control selectable option) that is selectable to display a remote user interface, similar to that described above with respect to FIGS. 12C-12T. For example, when electronic device 500 receives a tap input 1203 on remote control option 1206, the electronic device 500 optionally displays the remote control user interface described above.

Figure 12X:
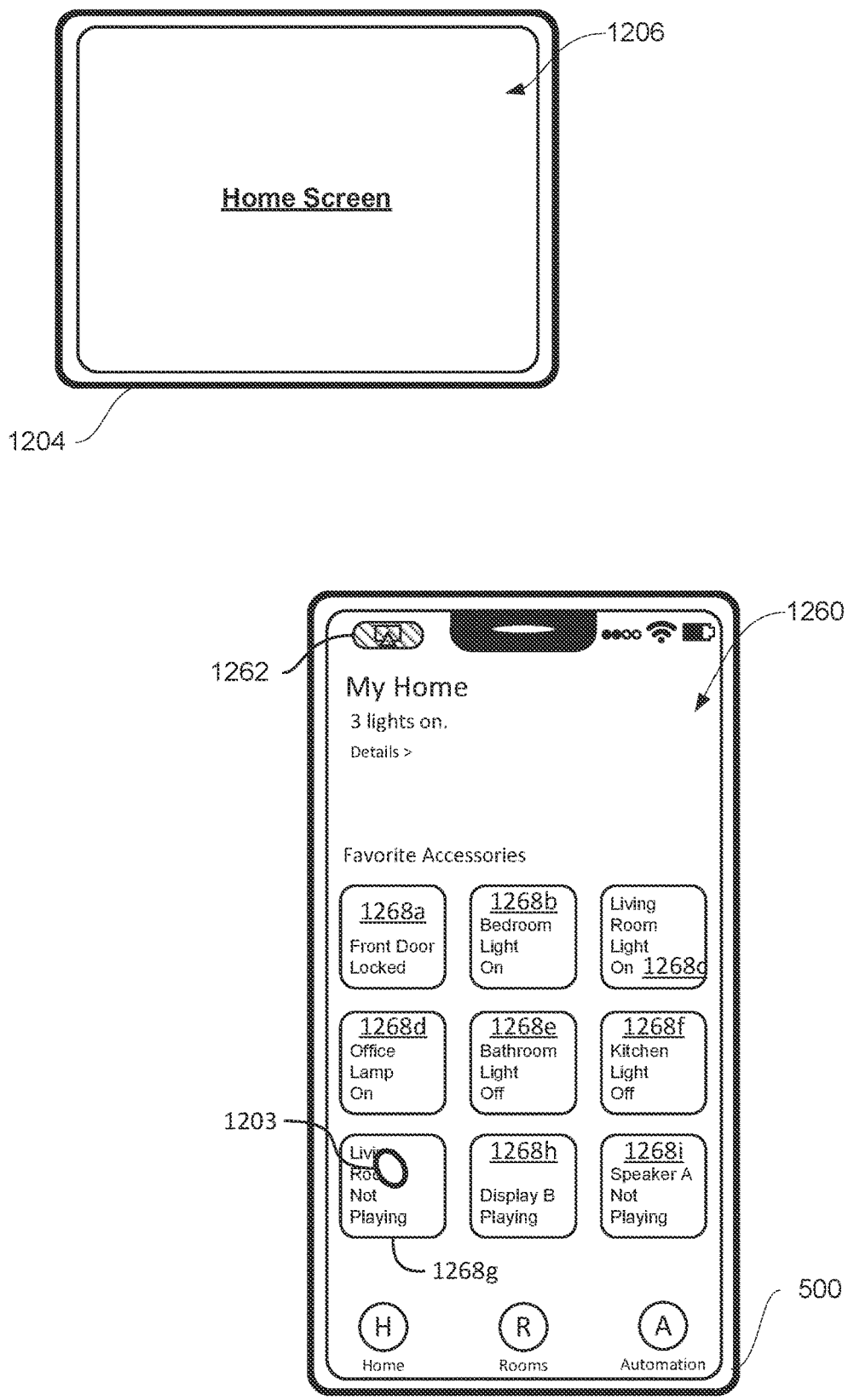
Figure 12Y:
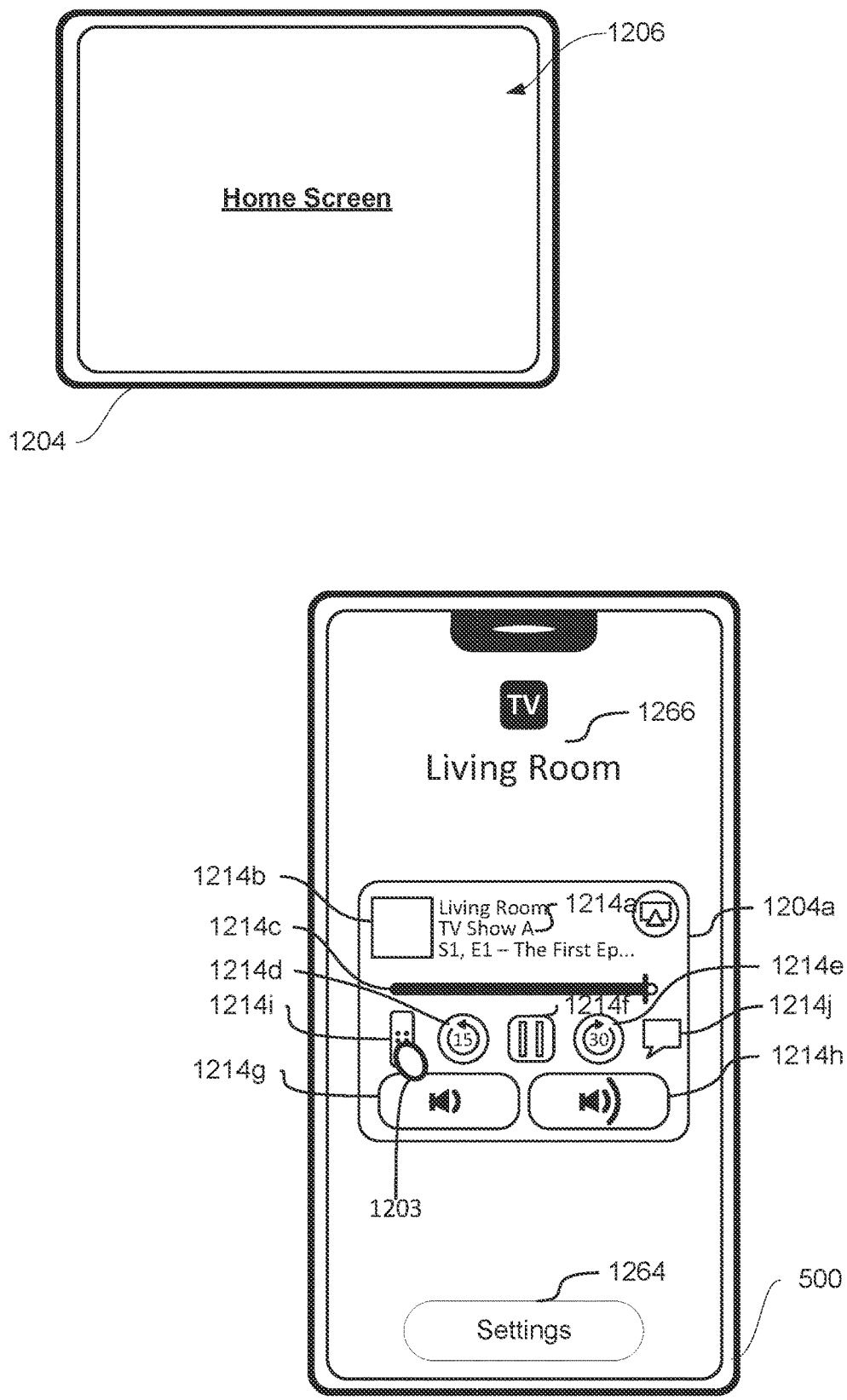

FIGS. 12X-12Y illustrate another exemplary method in which the user can request display of the remote control user interface described above. In particular, FIG. 12X illustrates a smart home application user interface 1260, similar to the smart home application user interface described with respect to FIG. 8I. The smart home application user interface 1260 includes a plurality of selectable options 1268*a-i* associated with various smart appliances and accessories in the user's home. The options include a front door option 1268*a*, a bedroom light option 1268*b*, a living room light option 1268*c*, an office lamp option 1268*d*, a bathroom light option 1268*e*, a kitchen light option 1268*f*, a first display device option 1268*g*, a second display device option 1268*h*, and a speaker option 1268*i* (e.g., options 1268*g*-1268*i* associated with three electronic devices that are in communication with electronic device 500 for the purpose of streaming media, providing remote control functionalities, or status monitoring). In some embodiments, first display device option 1268*g* is associated with electronic device 1204. As shown in FIG. 12X, electronic device 1204 is not currently playing any content and electronic device 500 is displaying a home screen interface 1206. In some embodiments, selection of the first display device option 1268*g* associated with electronic device 1204 causes display of a user interface on electronic device 500 for electronic device 1204, such as the playback control element 1204*a* shown in FIG. 12Y. In some embodiments, playback control element 1204*a* is similar to the playback control element discussed with respect to FIG. 8J and FIG. 12V. In some embodiments, playback control element 1204*a* includes a remote control option 1214*i* (e.g., a remote control selectable option). In some embodiments, when electronic device 500 receives a tap input 1203 on remote control option 1214*i*, a remote control user interface, similar to the one described with respect to FIGS. 12C-12T, is displayed.

Figure 12Z:
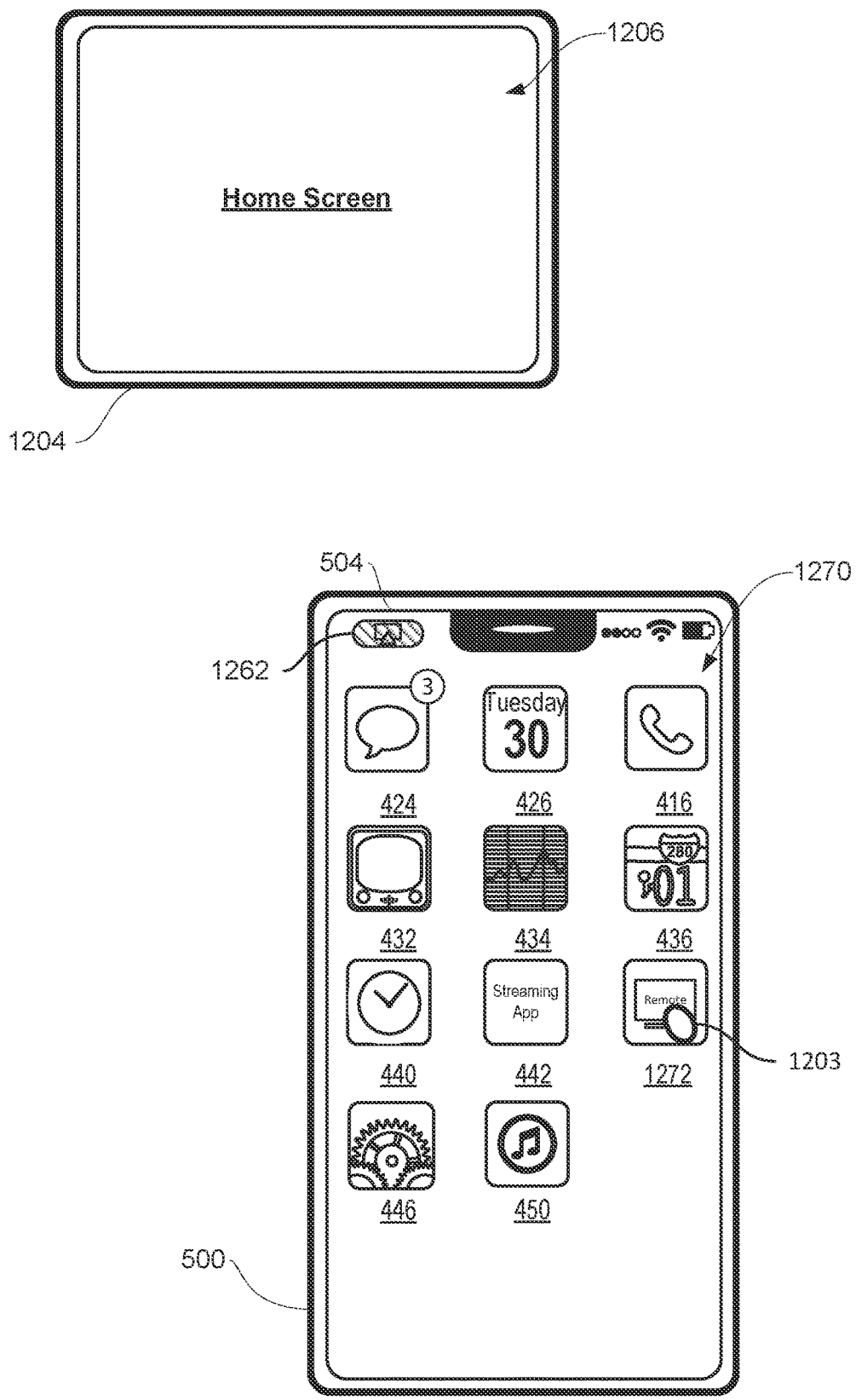
Figure 12A:
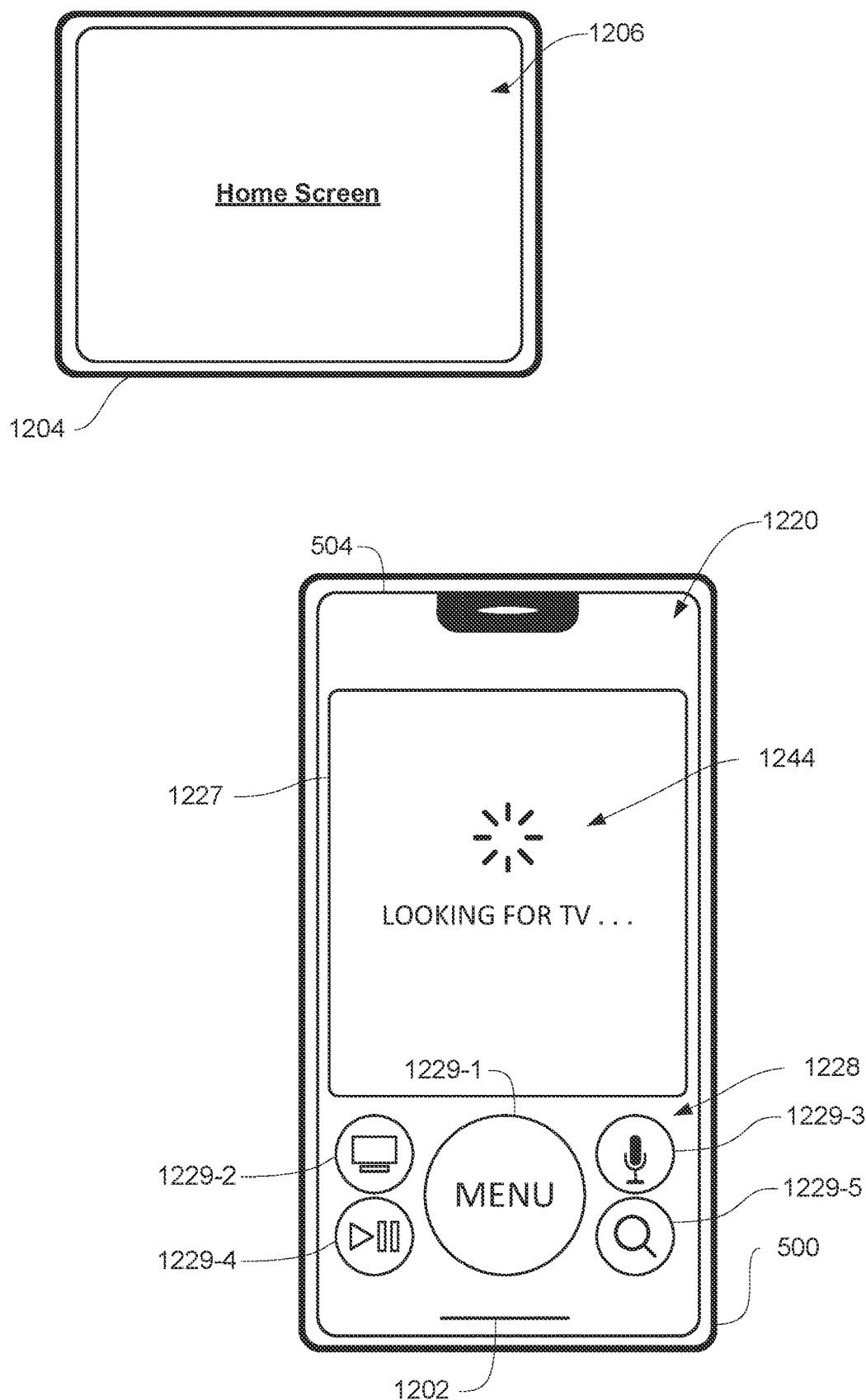
Figure 12B:
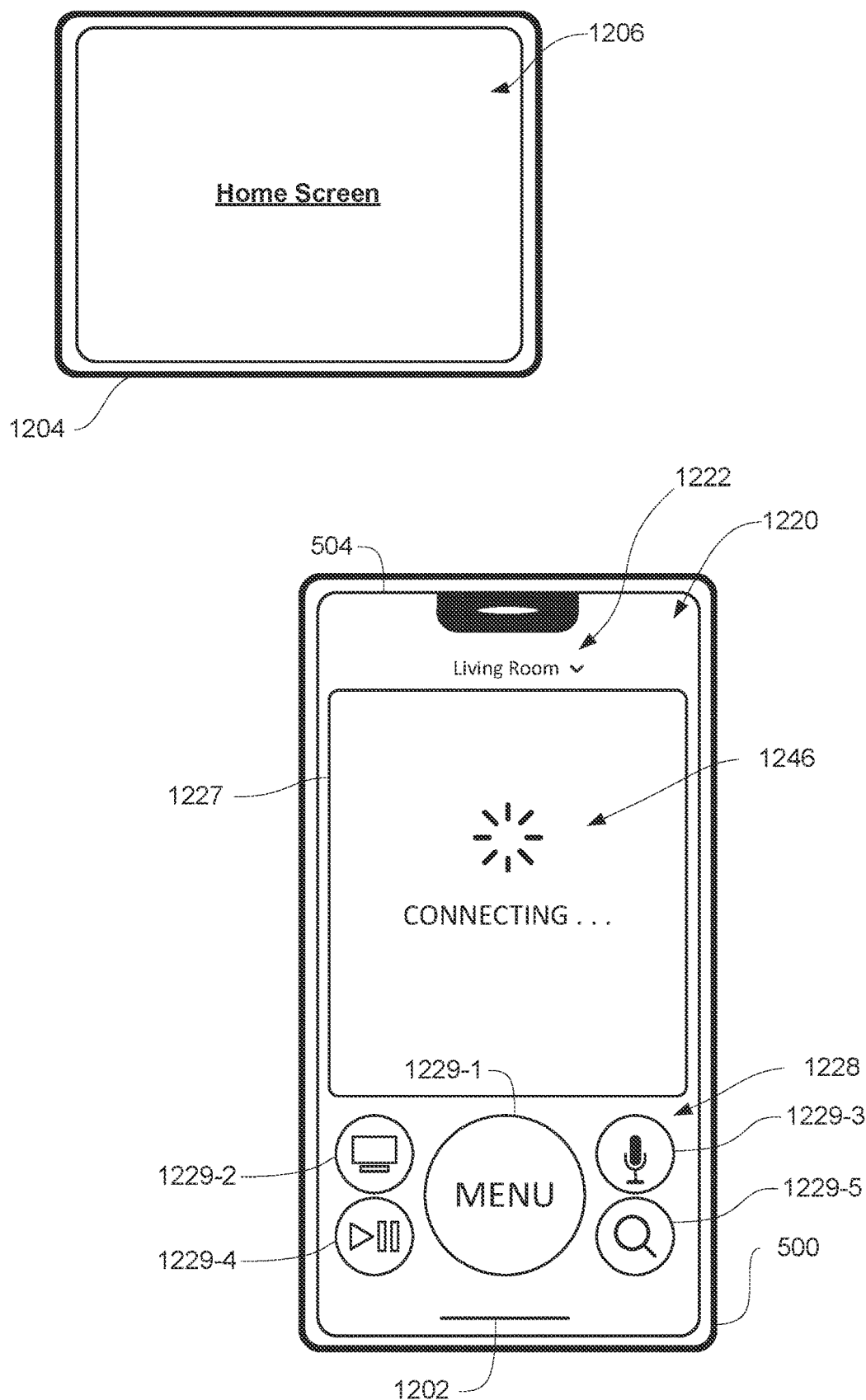
Figure 12C:
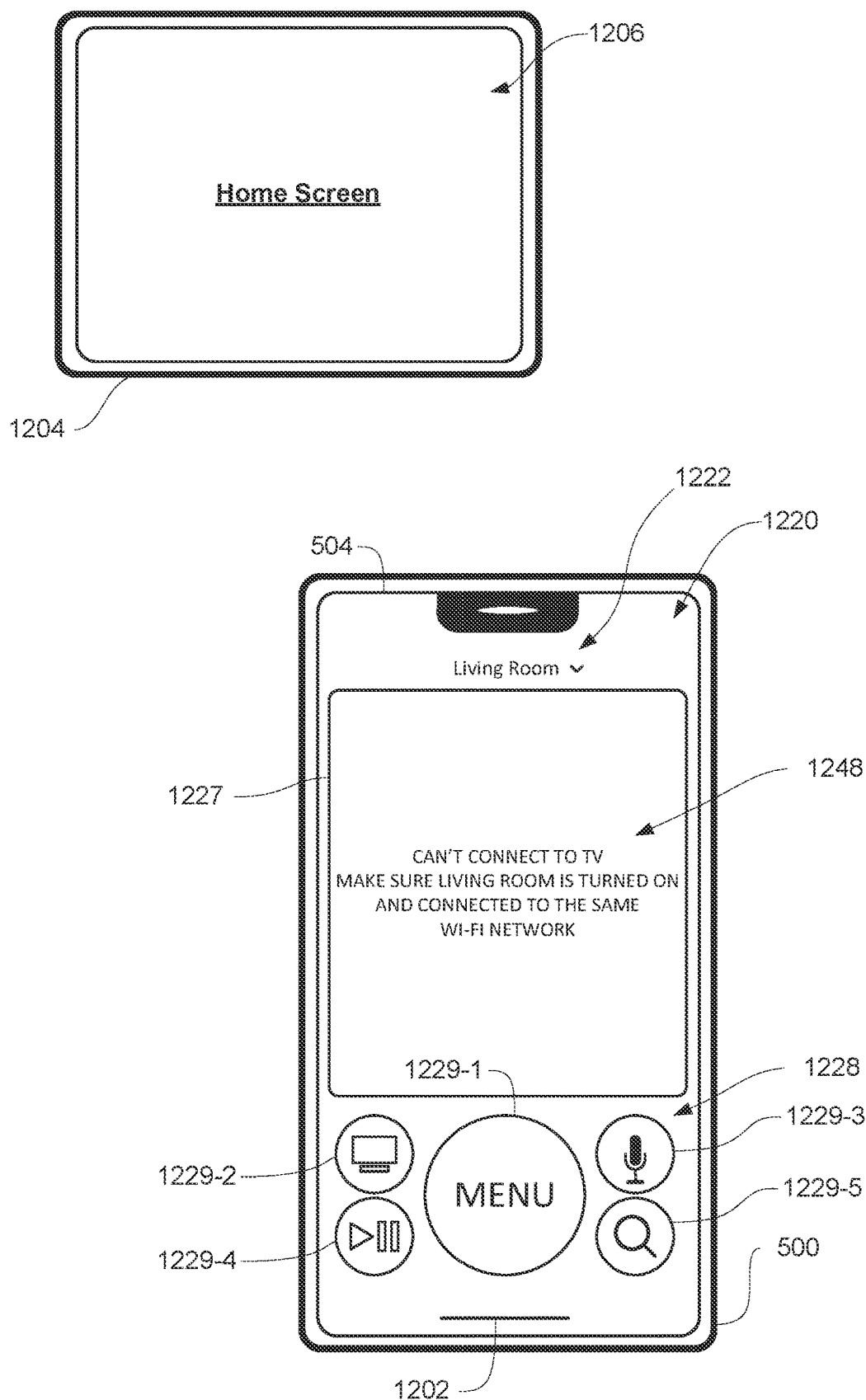
Figure 12D:
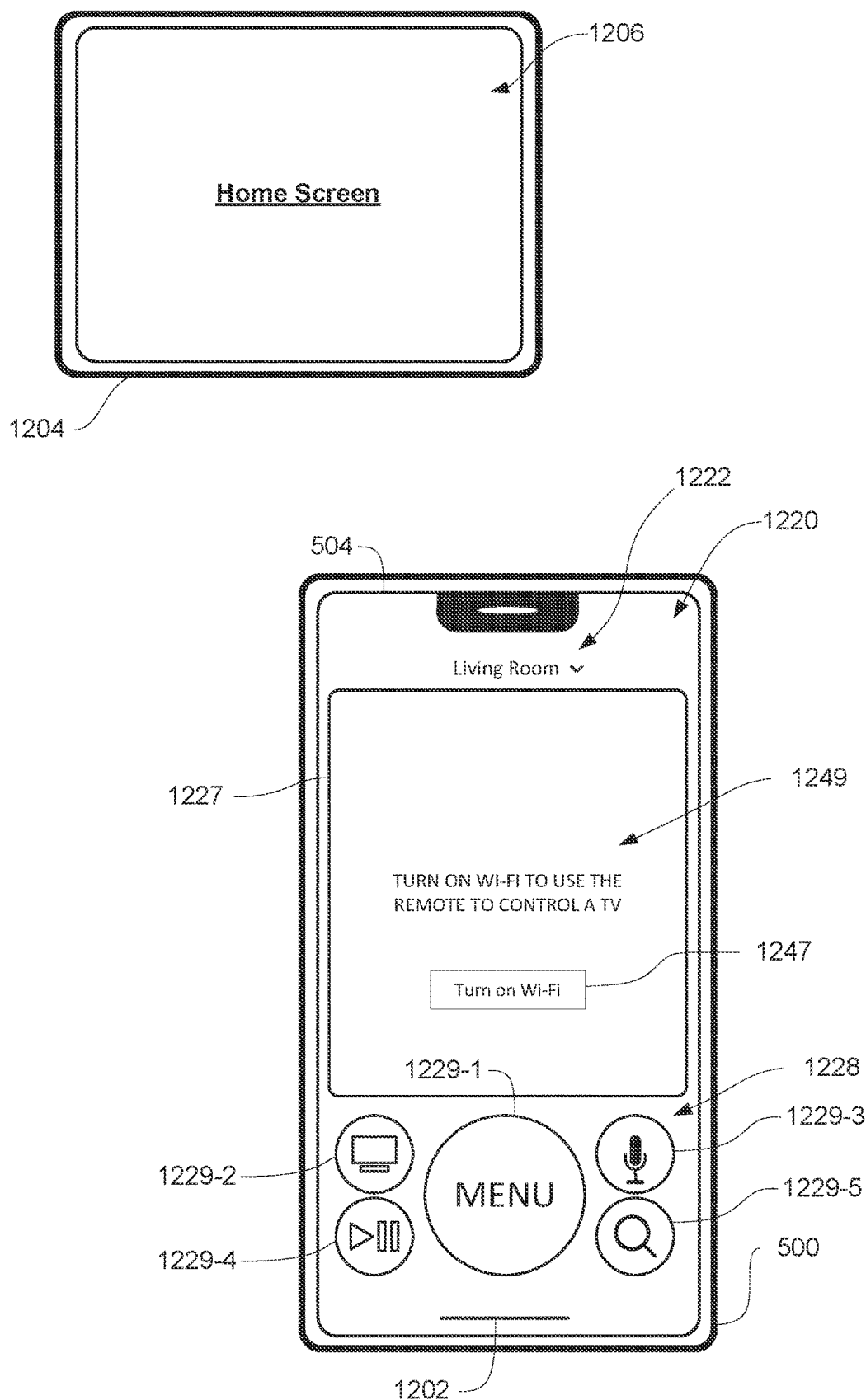
Figure 12E:
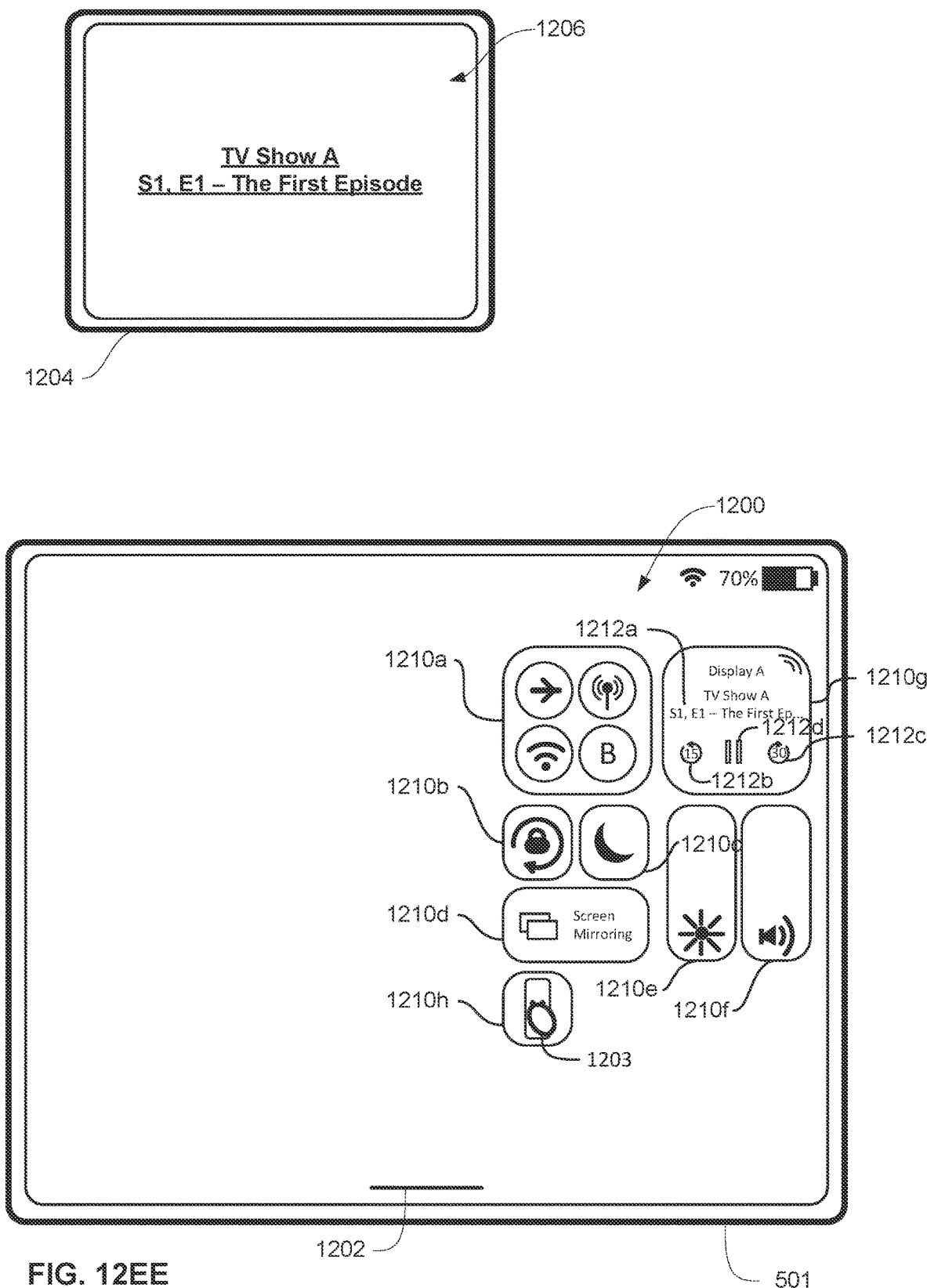
Figure 12F:
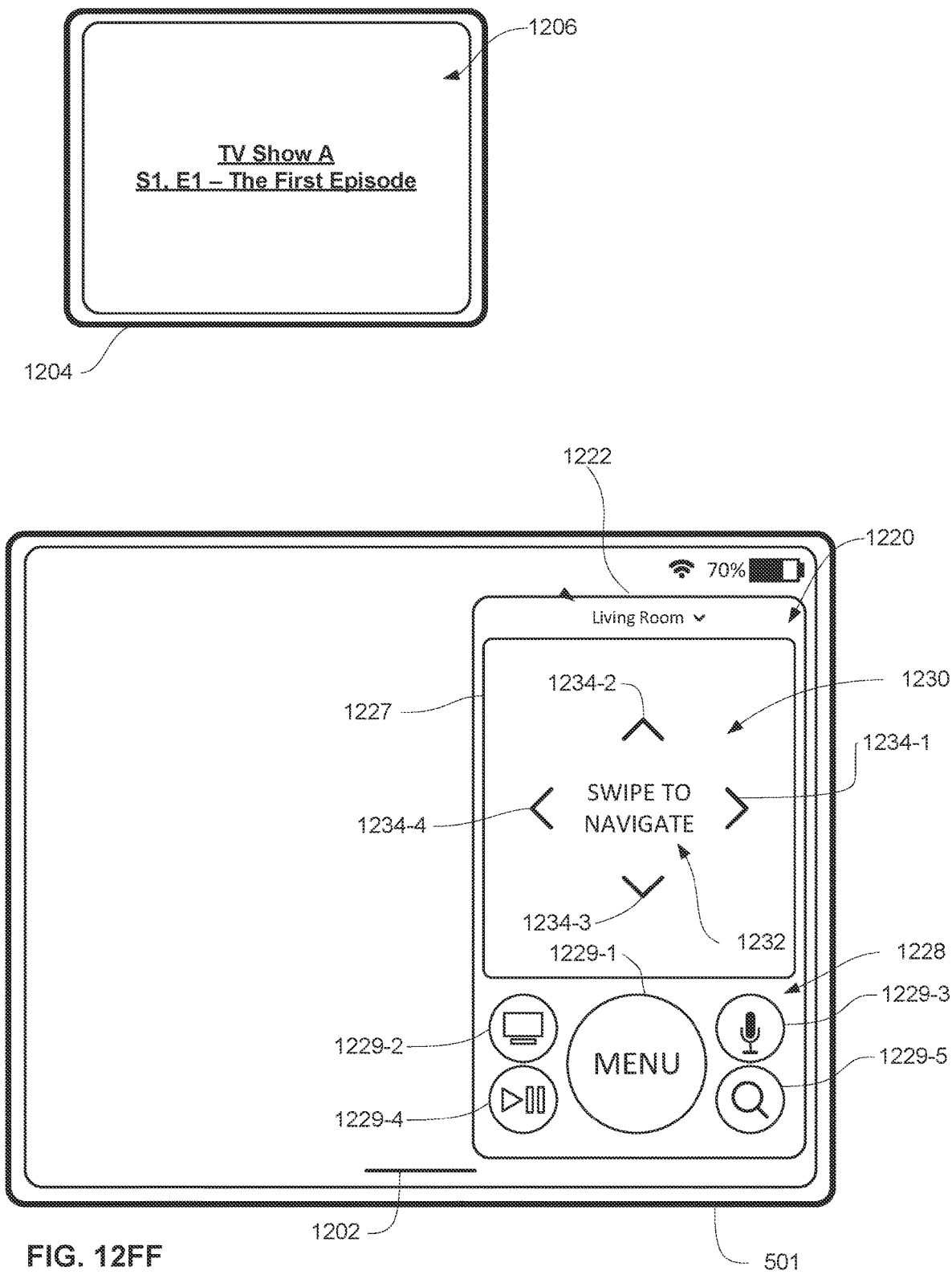

FIG. 12Z illustrates another exemplary method in which the user can request display of the remote control user interface described above. In particular, FIG. 12Z illustrates a home screen user interface 1270, similar to the home screen user interface described above with respect to FIG. 8M. In some embodiments, the home screen user interface 1270 includes a representation (e.g., an icon) of a remote control application 1272. In some embodiments, the remote control application 1272 is an application (e.g., different from a system user interface) for controlling a number of different electronic devices using device 500. In some embodiments, receiving a tap input 1203 on the remote control application 1272 causes display of a remote control user interface, similar to the one described with respect to FIGS. 12C-12T.

FIG. 12AA illustrates a remote control user interface 1220 while electronic device 500 is looking for and/or discovering controllable devices (e.g., to populate the list of controllable devices). In some embodiments, discovering controllable devices includes scanning devices that are connected to the local Wi-Fi network (to which electronic device 500 is also connected) to determine what devices on the network are controllable using electronic device 500. In some embodiments, other wireless communication protocols are possible to discover controllable devices such as Wi-Fi Direct, Bluetooth, NFC, etc. In some embodiments, while electronic device 500 is looking for and/or discovering controllable devices, remote control user interface displays a visual indicator 1244 that electronic device 500 is looking for controllable devices. In some embodiments, while electronic device 500 is looking for controllable devices and before remote control user interface has been configured to control a device, remote control user interface does not include a device selection element (such as selectable label 1222 from FIG. 12D) or a device selection drop-down list (such as device selection user interface 1221 from FIG. 12C) (e.g., because no devices are currently being controlled or selectable to be controllable yet). In some embodiments, the virtual touchpad region 1227 is not responsive to user input. In some embodiments, remote control user interface 1220 includes a control options region 1228 with selectable options. However, in some embodiments, the selectable options are not selectable and user inputs on the selectable options do not cause any respective actions. In some embodiments, the selectable options are greyed out, hashed, or otherwise visually distinguished to indicate that the options are not currently enabled.

FIG. 12BB illustrates a remote control user interface when electronic device 500 has discovered electronic device 1204 to control and is attempting to connect to electronic device 1204. In some embodiments, connecting to electronic device 1204 includes establishing a remote control session with electronic device 1204. In some embodiments, connecting to electronic device 1204 includes authenticating with electronic device 1204 and verifying the type of device and the functions that are supported by electronic device 1204. In some embodiments, when electronic device 500 is connecting with electronic device 1204, remote control user interface 1220 includes a visual indicator 1246 that electronic device 500 is currently connecting to a device. In some embodiments, while electronic device 500 is connecting to electronic device 1204, remote control user interface 1220 includes selectable label 1222 that indicates that the electronic device 500 is currently attempting to connect to electronic device 1204. In some embodiments, the virtual touchpad region 1227 remains not responsive to user input. In some embodiments, remote control user interface 1220 includes a control options region 1228 with selectable options. However, in some embodiments, the selectable options remain not selectable and user inputs on the selectable options do not cause any respective actions on electronic device 1204. In some embodiments, the selectable options are greyed out, hashed, or otherwise visually distinguished to indicate that the options are not enabled. In some embodiments, when connection to electronic device 1204 is successful, remote control user interface 1220 is updated to enable all of the features of remote control user interface 1220. In some embodiments, the updated remote control user interface is similar and/or shares the features of the remote control user interface described above with respect to FIG. 12D or FIG. 12M.

FIG. 12CC illustrates a remote control user interface 1220 when electronic device 500 has failed to connect to electronic device 1204. In some embodiments, connection fails because electronic device 1204 has switched off during the connection sequence or because electronic device 1204 and electronic device 500 are no longer on the same Wi-Fi network. In some embodiments, remote control user interface 1220 displays a visual message 1248 to inform the user that electronic device 500 has failed to connect to electronic device 1204 and to check that electronic device 1204 is turned on and connected to the same Wi-Fi network as electronic device 500. In some embodiments, even though electronic device 500 has failed to connect to electronic device 1204, remote control user interface 1220 includes a selectable label 1222 that indicates that the electronic device 500 was attempting to connect to electronic device 1204 (and may currently still be attempting to connect to electronic device 1204). In some embodiments, the virtual touchpad region 1227 remains not responsive to user input. In some embodiments, remote control user interface 1220 includes a control options region 1228 with selectable options. However, in some embodiments, the selectable options remain not selectable and user inputs on the selectable options do not cause any respective actions on electronic device 1204. In some embodiments, the selectable options are greyed out, hashed, or otherwise visually distinguished to indicate that the options are not enabled.

In some embodiments, while displaying visual message 1248, electronic device 500 continues to attempt to connect to electronic device 1204. In some embodiments, if the connection criteria are satisfied (e.g., electronic device 1204 is powered on and becomes connected to the same Wi-Fi network), and electronic device 500 begins to connect with electronic device 1204, remote control user interface 1220 replaces display of visual message 1248 with display of a visual indicator 1246 that electronic device 500 is currently connecting to a device, similar to the visual indicator described in FIG. 12BB.

FIG. 12DD illustrates a remote control user interface 1220 when electronic device 500 currently does not have Wi-Fi enabled and/or is not connected to a Wi-Fi network. In some embodiments, connection with electronic device 1204 is not possible unless electronic device 500 and electronic device 1204 are on the same Wi-Fi network. In some embodiments, remote control user interface 1220 displays a visual message 1249 to inform the user to enable Wi-Fi on electronic device 500. In some embodiments, remote control user interface 1220 includes a Wi-Fi button 1247, selection of which causes Wi-Fi to be enabled on electronic device 500. In some embodiments, even though electronic device 500 has not connected to electronic device 1204, remote control user interface 1220 includes a selectable label 1222 that indicates that the electronic device 500 intends to connect to electronic device 1204. In some embodiments, the virtual touchpad region 1220 remains not responsive to user input. In some embodiments, remote control user interface 1220 includes a control options region 1228 with selectable options. However, in some embodiments, the selectable options remain not selectable and user inputs on the selectable options do not cause any respective actions on electronic device 1204. In some embodiments, the selectable options are greyed out, hashed, or otherwise visually distinguished to indicate that the options are not enabled. In some embodiments, as soon as the user enables Wi-Fi (or the system otherwise enables Wi-Fi, such as by selecting Wi-Fi button 1247), electronic device 500 resumes attempting to connect with electronic device 1204. In some embodiments, if the connection criteria are satisfied (e.g., electronic device 1204 is powered on and becomes connected to the same Wi-Fi network), and electronic device 500 begins to connect with electronic device 1204, remote control user interface replaces display of visual message 1249 with display of a visual indicator 1246 that electronic device 500 is currently connecting to electronic device 1204, similar to the visual indicator described in FIG. 12BB.

FIG. 12EE-12FF illustrate a method of displaying a remote control user interface on electronic device 501. In some embodiments, electronic device 501 is a different type of electronic device than electronic device 500. In some embodiments, electronic device 501 is a tablet device while electronic device 500 is a smartphone. In some embodiments, electronic device 501 is in communication with a large display. In some embodiments, electronic device 501 includes all the functions and features of electronic device 500. FIG. 12EE illustrates display of a controls user interface similar to the controls user interface 1200 described in FIG. 12A. In some embodiments, when electronic device 501 has a larger display, controls user interface 1200 resides on only a portion of the display. For example, as shown in FIG. 12EE, controls user interface 1200 resides on the right side of the display. In some embodiments, even though controls user interface 1200 resides on the right side of the display, electronic device 501 can display an application dismissal indicator 1202 center-aligned on the display (e.g., in the horizontal center of the display). Thus, in some embodiments, controls user interface 1200 can be dismissed via an upward swipe input on application dismissal indicator 1202. In some embodiments, controls user interface 1200 includes a remote control selectable option 1210$h$.

In some embodiments, as shown in FIG. 12EE, electronic device 501 receives a user input 1203 selecting remote control selectable option 1210$h$. In some embodiments, in response to the user input 1203 selecting remote control selectable option 1210$h$, electronic device 501 displays remote control user interface 1220. In some embodiments, remote control user interface 1220 is similar to the remote control user interface with respect to FIG. 12C. In some embodiments, remote control user interface 1220 is displayed in the same location as controls user interface 1200 (e.g., aligned to the right of the display). In some embodiments, remote control user interface 1220 includes a virtual touchpad region 1227 and a control options region 1228 with selectable options. In some embodiments, remote control user interface 1220 includes selectable label 1222 indicating that device 1204 is being controlled by remote control user interface 1220. In some embodiments, the initial display of remote control user interface 1220 can include display of usage hints 1230. In some embodiments, the usage hints 1230 can be similar to the usage hints described above with respect to FIGS. 12D and 12M and can be different based on the type of device being controlled. In some embodiments, even though remote control user interface 1220 resides on the right side of the display, electronic device 501 can display an application dismissal indicator 1202 center-aligned on the display (e.g., in the horizontal center of the display). Thus, in some embodiments, remote control user interface 1220 can be dismissed via an upward swipe input on application dismissal indicator 1202.

FIGS. 13A-13H are flow diagrams illustrating a method 1300 of presenting a user interface for controlling electronic devices that automatically reconfigures to support different user inputs and issues different commands based on the type of electronic device being controlled by the user interface. The method 1300 is optionally performed at an electronic device such as device 100, device 300, device 500, device 501, device 510, and device 591 as described above with reference to FIGS. 1A-1B, 2-3, 4A-4B and 5A-5J. Some operations in method 1300 are, optionally combined and/or order of some operations is, optionally, changed As described below, the method 1300 provides ways to present a user interface for controlling electronic devices that automatically reconfigures to support different user inputs and issues different commands based on the type of electronic device being controlled by the user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

Figure 13A:
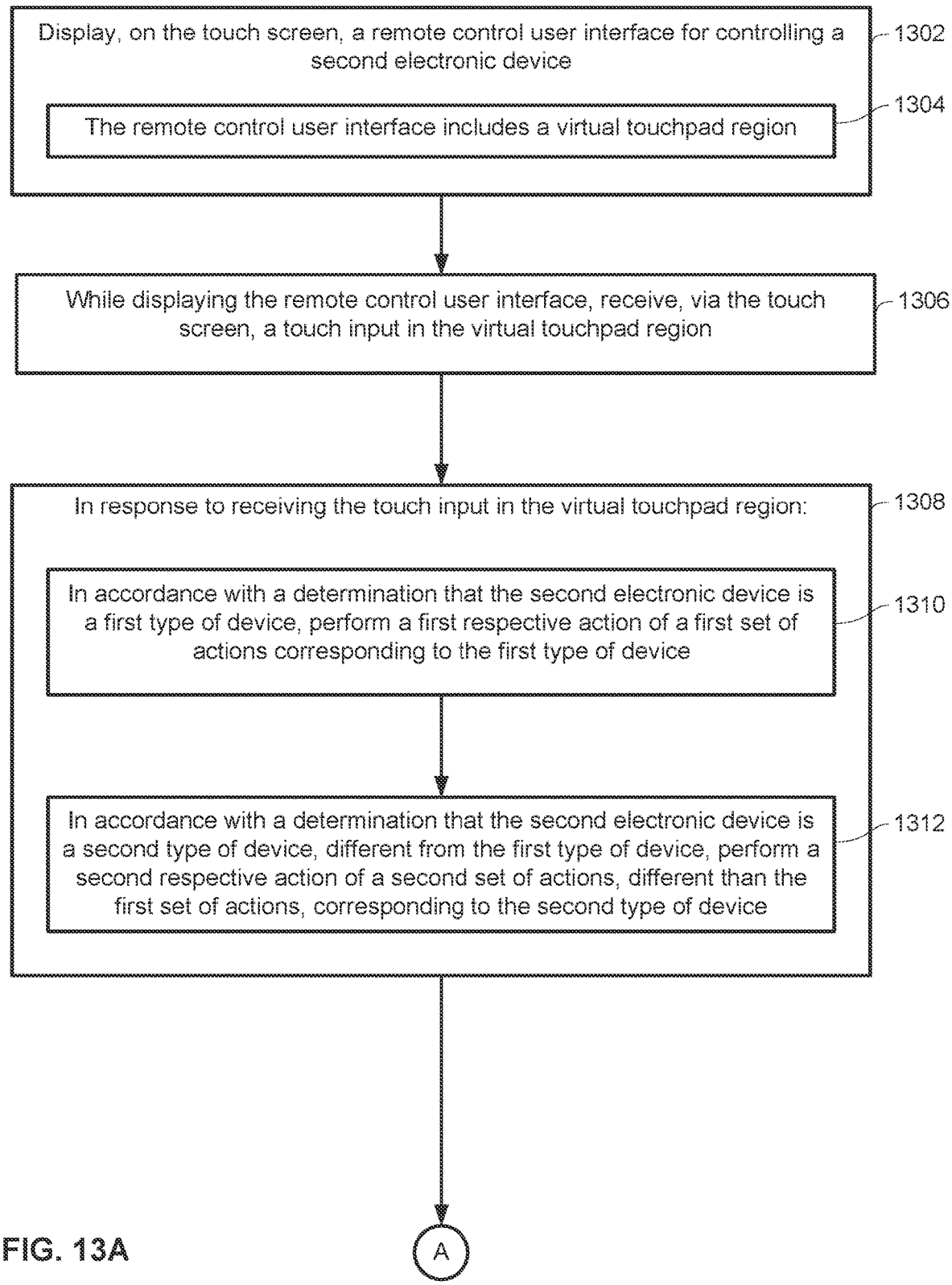
FIGS. 13A-13H are flow diagrams illustrating a method of presenting selectable options to control another electronic device in accordance with some embodiments.
Figure 13B:
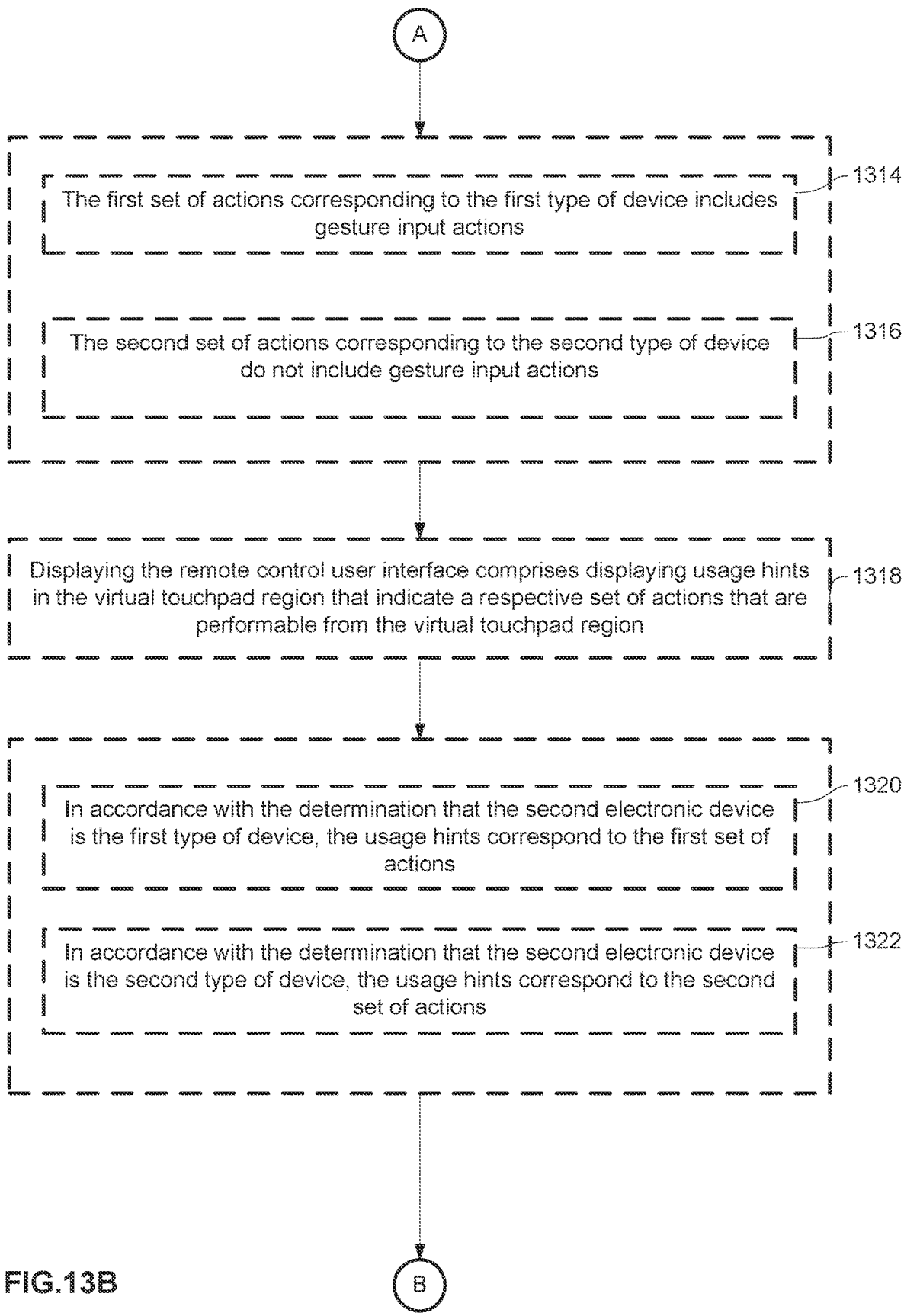
Figure 13C:
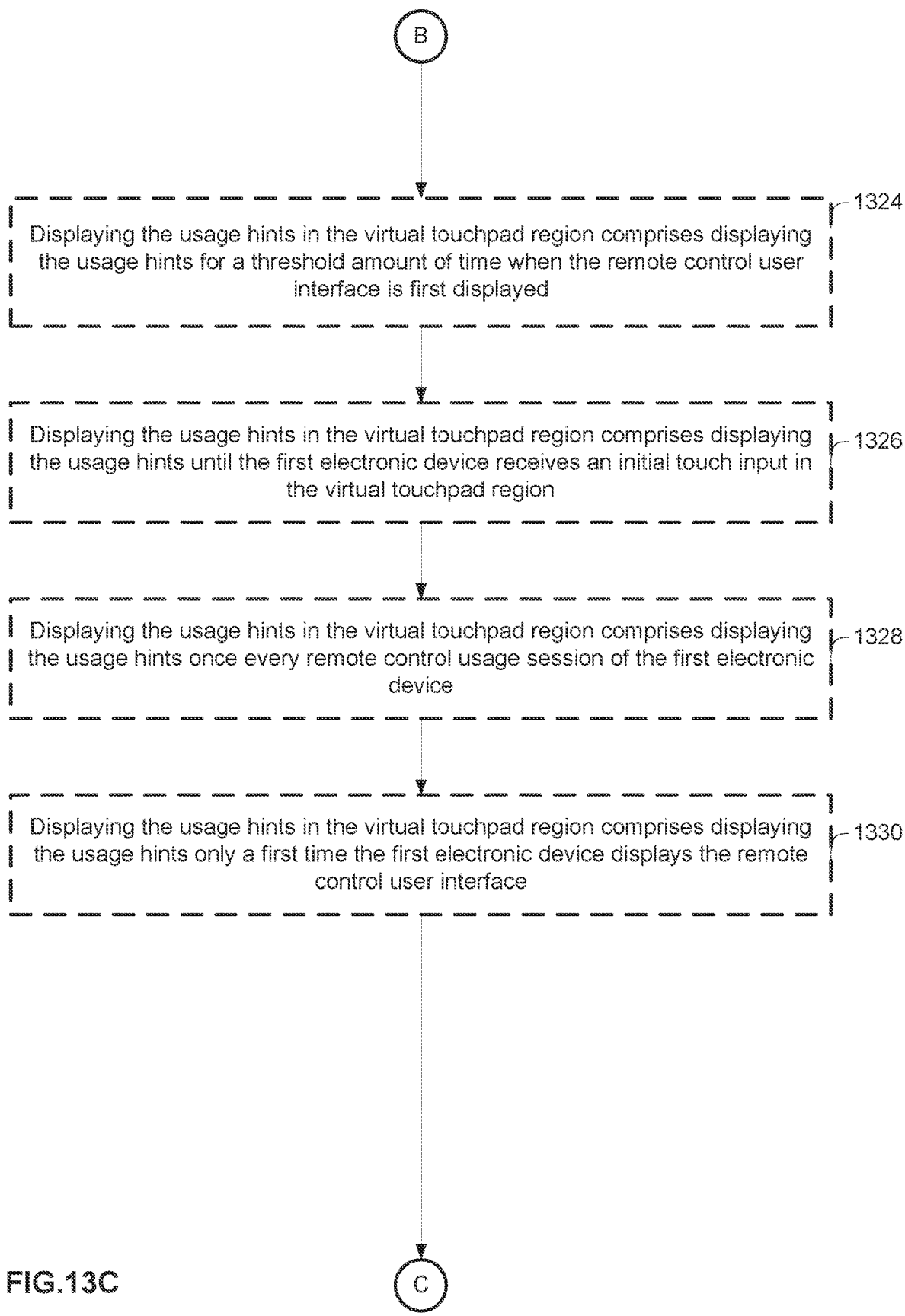
Figure 13D:
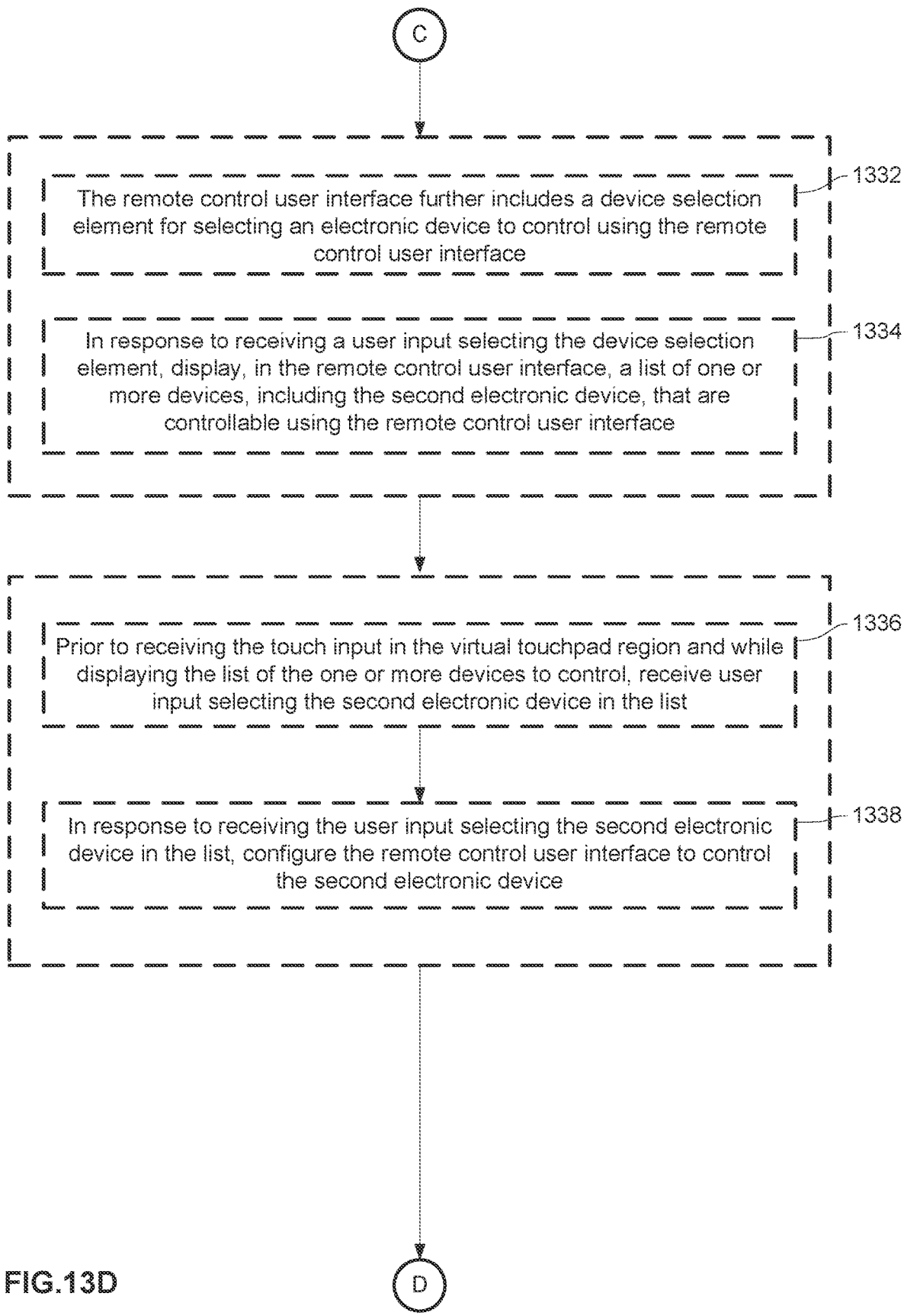
Figure 13E:
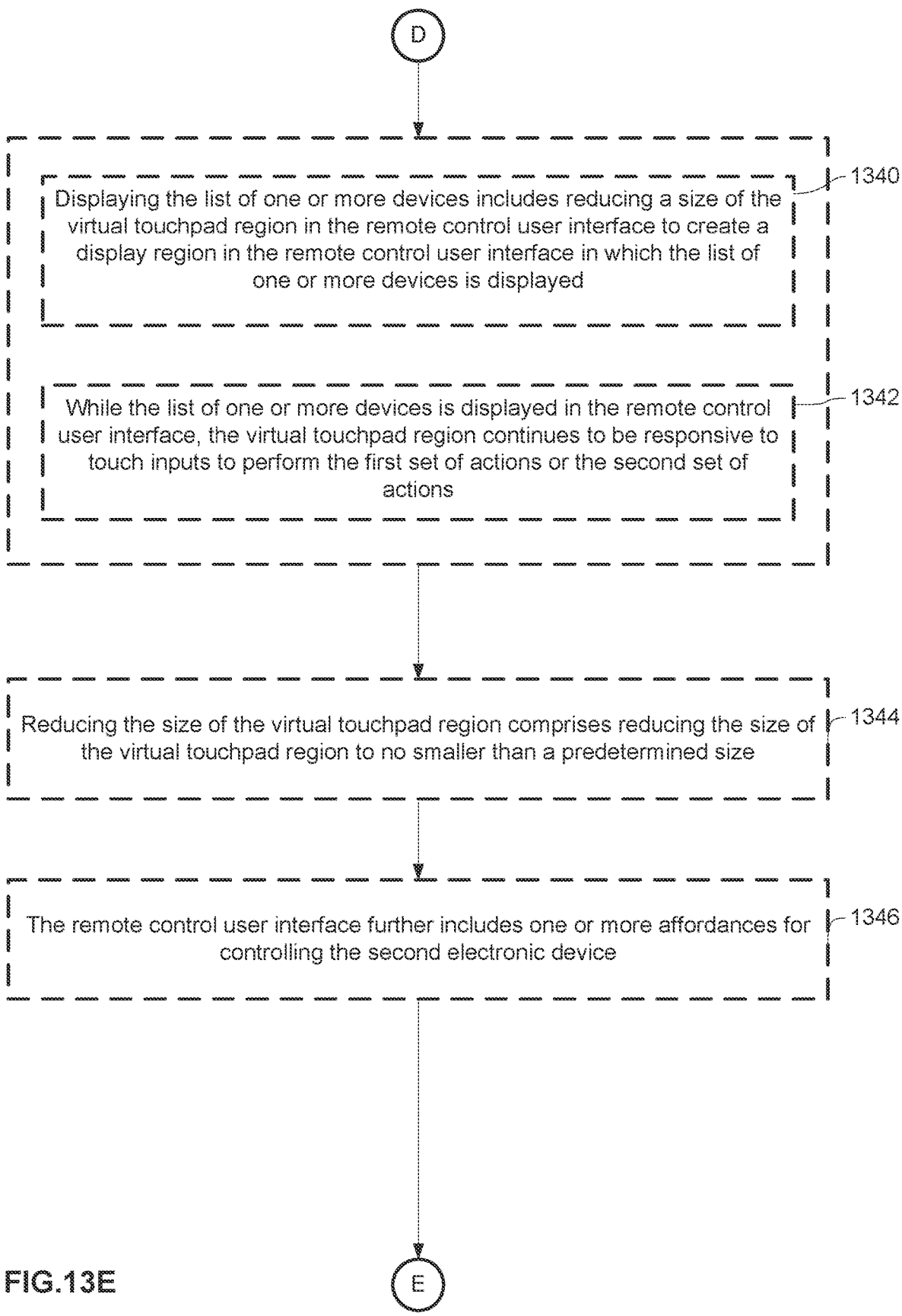
Figure 13F:
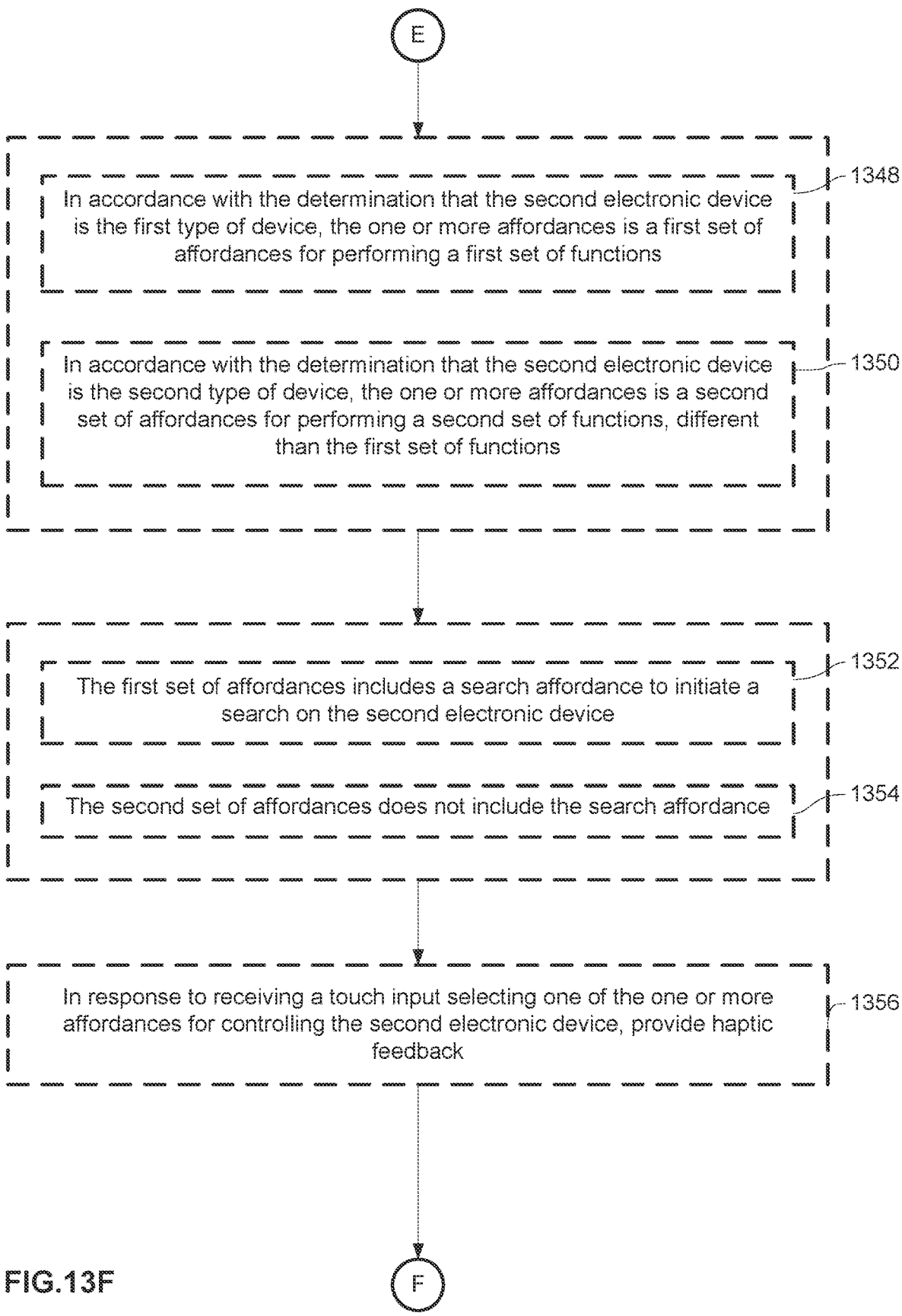
Figure 13G:
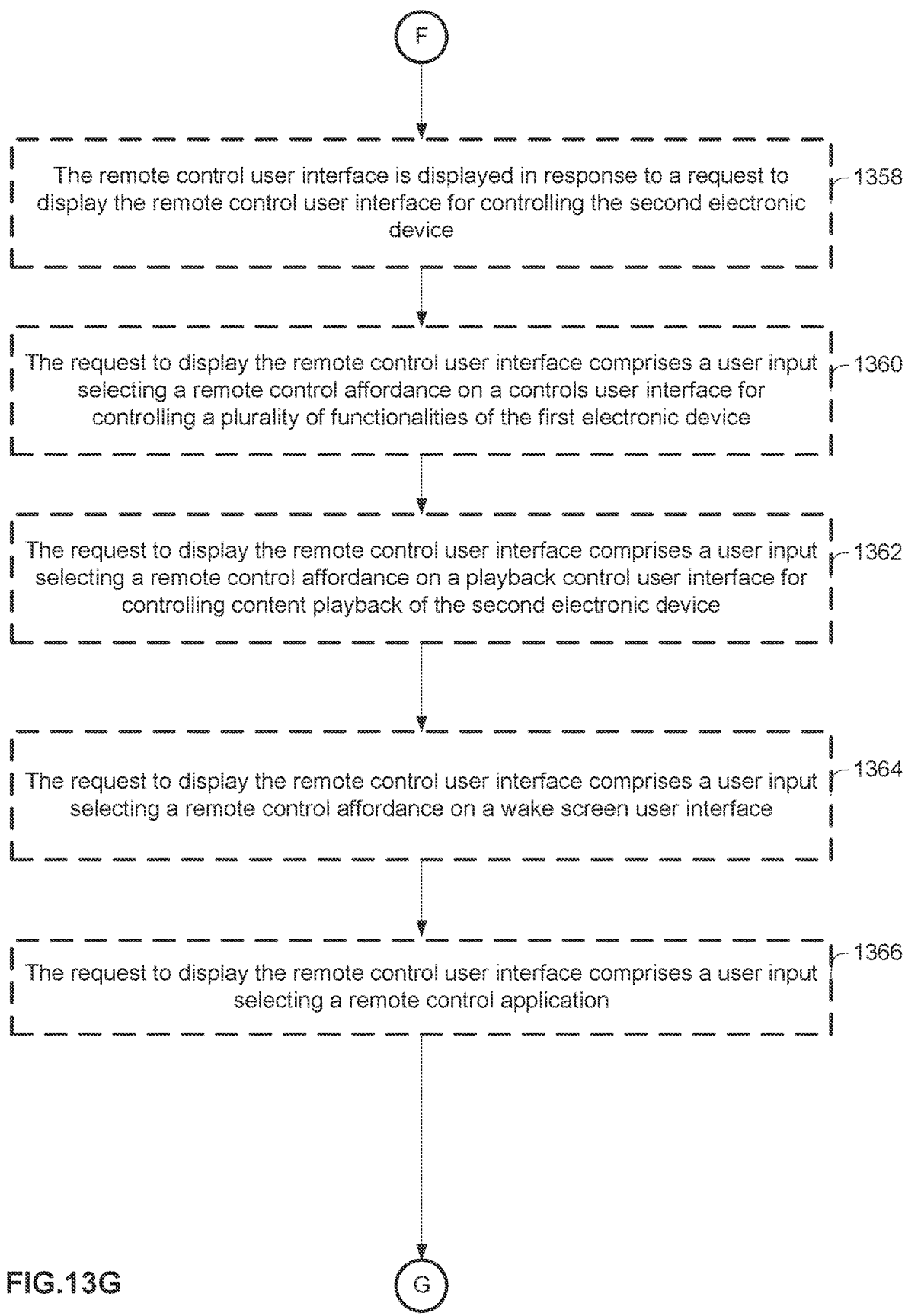
Figure 13H:
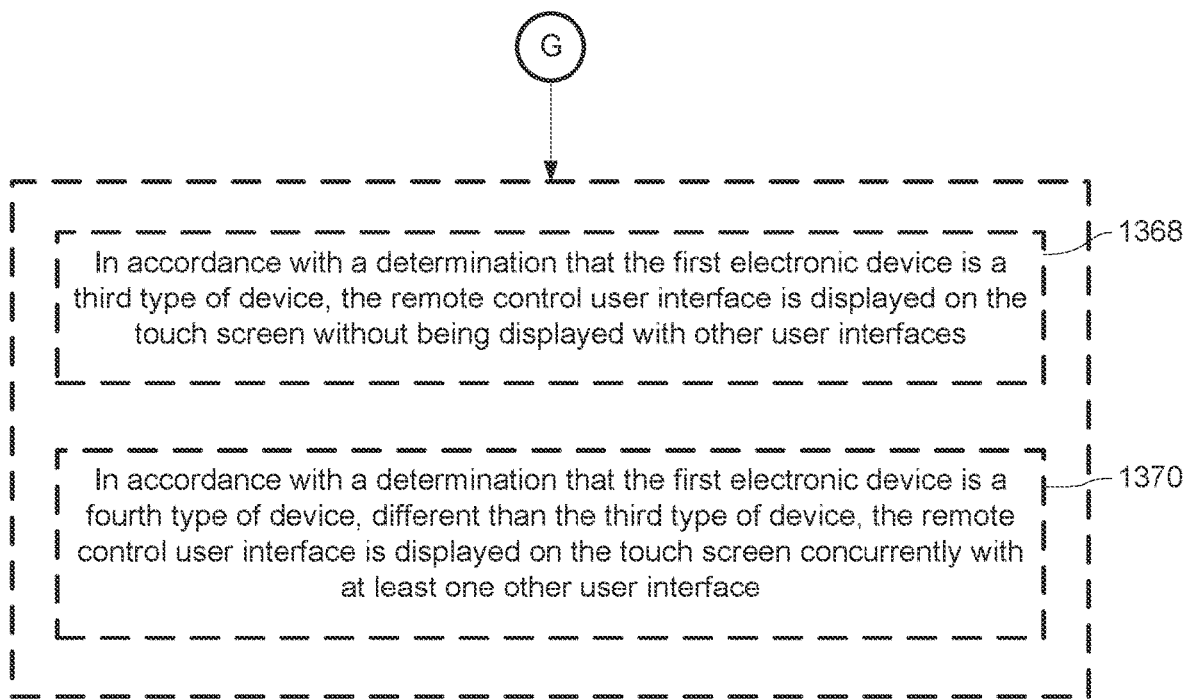

In some embodiments, a first electronic device (e.g., electronic device, a smartphone, a tablet computer, a wearable device, etc. such as device 100, device 300, device 500, device 501, or device 591) in communication with a touch screen (e.g., a touch screen, such as touch screen 112, included in or in communication with the first electronic device) displays (1302), on the touch screen, a remote control user interface (e.g., a user interface that simulates a remote control device such as remote 590) for controlling a second electronic device (e.g., a set top box, a smart television, etc. such as device 580), such as in FIG. 13C, wherein the remote control user interface includes a virtual touchpad region (1304) (e.g., a region on the remote control user interface that simulates a physical touchpad), such as in FIG. 12C.

In some embodiments, a user optionally performs touch interactions on the virtual touchpad region such as swipes and/or taps to cause a respective response on the second electronic device. For example, a swipe on the virtual touchpad optionally is interpreted as a navigational input and a respective navigational signal is optionally sent to the second electronic device (e.g., an upward swipe is optionally interpreted as an upward navigation, etc.). In some embodiments, a tap on the virtual touchpad in sub-regions of the virtual touchpad is optionally interpreted as a navigational input and a respective navigational signal is optionally sent to the second electronic device (e.g., a tap at the top, left, right, or bottom regions of the virtual touchpad region is optionally interpreted as a up, left, right, or down navigation, respectively and a tap at the center region is optionally interpreted as a selection input).

In some embodiments, while displaying the remote control user interface, the first electronic device receives (1306), via the touch screen, a touch input in the virtual touchpad region (e.g., a tap, swipe, or other gesture in the virtual touchpad region).

In some embodiments, in response to receiving the touch input in the virtual touchpad region (1308), such as in FIG. 12E: in accordance with a determination that the second electronic device is a first type of device (e.g., a first type of set-top box or television that is able to receive gestural input from inputs detected in the virtual touchpad region, such as swipes), the first electronic device performs (1310) a first respective action of a first set of actions corresponding to the first type of device, such as in FIG. 12F. For example, the first set of actions is optionally any set of actions supported by the first type of set-top box or television. For example, the first type of set-top box optionally supports a tap in the center of the virtual touchpad as a selection input (e.g., a click), a tap in particular sub-regions as navigational inputs, and directional swipes as navigational inputs or volume control inputs. In some embodiments, performing the first respective action includes transmitting a command to the second electronic device to perform (or otherwise cause the second electronic device to perform) the respective action (e.g., via WiFi, WiFi Direct, Bluetooth, NFC, infrared, RF, or any other wireless communication protocol).

In some embodiments, in accordance with a determination that the second electronic device is a second type of device, different from the first type of device, (e.g., a second type of set-top box or television that is able to receive discrete input from inputs detected in the virtual touchpad region, such as taps), the first electronic device performs (1312) a second respective action of a second set of actions, different than the first set of actions, corresponding to the second type of device, such as in FIG. 12N.

In some embodiments, the second type of set-top box or television is not compatible with gestural inputs such as swipes. In some embodiments, the second type of set-top box or television is a smart TV. In some embodiments, the second type of set-top box or television supports a mobile-device streaming protocol that allows the first electronic device to stream content to the second type of set-top box or television. In some embodiments, streaming content from the first electronic device to the second electronic device causes the first electronic device to enter a streaming mode, such as that described in FIGS. 6A-7J.

For example, the second set of actions is optionally any set of actions supported by the second type of set-top box or television. In some embodiments, the second set of actions includes actions that are included in the first set of actions and/or include actions that are not included in the first set of actions. In some embodiments, the second set of actions includes more or fewer actions than the first set of actions. In some embodiments, the first set of actions includes actions that are included in the second set of actions and/or include actions that are not included in the second set of actions. For example, a smart TV optionally supports a tap in the center of the virtual touchpad as a selection input (e.g., a click) and taps in particular sub-regions as navigational inputs. In some embodiments, the second type of set-top box or television does not support gestural inputs (e.g., directional swipe inputs). In some embodiments, directional swipes are interpreted as an input different from navigational inputs. In some embodiments, more or fewer actions are supported by the second type of set-top box. In some embodiments, performing the second respective action includes transmitting a command to the second electronic device to perform (or otherwise cause the second electronic device to perform) the respective action (e.g., via WiFi, WiFi Direct, Bluetooth, NFC, infrared, RF, or any other wireless communication protocol).

The above-described manner of controlling a second electronic device using a first electronic device (e.g., by displaying a virtual touchpad region, receiving user inputs on the virtual touchpad region and performing a respective action depending on the type of device that is being controlled) allows the first electronic device to provide the user with the ability to efficiently control different types of electronic devices (e.g., using a single user interface on the first electronic device that supports controlling different types of second electronic devices, without requiring the user to navigate to a separate user interface for controlling different types of second electronic devices and without requiring the user to use a dedicated electronic device to control the second electronic device (e.g., a physical remote)), which simplifies the interaction between the user and the first and second electronic devices and enhances the operability of the first and second electronic devices and makes the user-device interface more efficient (e.g., by providing the user with a single user interface by which to control different types of second electronic devices), which additionally reduces power usage and improves battery life of the first and second electronic devices by enabling the user to use the first and second electronic devices more quickly and efficiently. The above-described manner of controlling the second electronic device also reduces errors relating to providing input to the second electronic device, as the first electronic device automatically interprets the inputs that it detects in the virtual touchpad region in accordance with the type of device of the second electronic device, thus detecting and transmitting only compatible commands to the second electronic device.

In some embodiments, the first set of actions corresponding to the first type of device includes gesture input actions (1314), such as in FIG. 12D (e.g., swipes or other gestures in the virtual touchpad region). For example, a swipe on the virtual touchpad is optionally interpreted as a navigational input and a respective navigational signal is optionally sent to the second electronic device (e.g., an upward swipe is optionally interpreted as an upward navigation, etc.). In some embodiments, gesture inputs to the second device are associated with a continuous movement metric rather than a discrete movement metric such that the input is able to have continuous values rather than discrete values (e.g., swiping to the right by 1 cm is associated with half the rightward movement metric as is swiping to the right by 2 cm).

In some embodiments, the second set of actions corresponding to the second type of device do not include gesture input actions (1316), such as in FIG. 12M (e.g., a second type of set-top box or television that is able to receive discrete input from inputs detected in the virtual touchpad region, such as taps). In some embodiments, the second type of set-top box or television does not support gestural inputs (e.g., directional swipe inputs). In some embodiments, a gestural input is interpreted as a discrete input (e.g., a tap input at the initial location of the gesture or at the final location of the gesture).

The above-described manner of including or excluding gesture input actions (e.g., based on whether the second electronic device is a first type or a second time) allows the first electronic device to send only supported or compatible commands to the second electronic device (e.g., by using a single user interface that interprets the users inputs, translating the inputs into actions that are compatible with the device that is being controlled, and transmitting the respective action to the second electronic device without requiring the user to navigate to a separate user interface for controlling different types of second electronic devices and without requiring the user to use a dedicated electronic device to control the second electronic device (e.g., a physical remote)), which simplifies the interaction between the user and the first and second electronic devices and enhances the operability of the first and second electronic devices and makes the user-device interface more efficient (e.g., by providing the user with a single user interface that automatically adjusts to the compatibility of the second electronic device), which additionally reduces power usage and improves battery life of the first and second electronic devices by enabling the user to use the first and second electronic devices more quickly and efficiently.

In some embodiments, displaying the remote control user interface comprises displaying usage hints in the virtual touchpad region that indicate a respective set of actions that are performable from the virtual touchpad region (1318), such as in FIG. 12D. For example, the usage hints are optionally text labels, icons, or symbols that represent supported functions. For example, a text label is optionally displayed to indicate to the user that a swipe gesture is supported to perform a navigation function. In some embodiments, triangles, arrows, or carets are displayed to indicate to the user that tap inputs in sub-regions of the virtual touchpad region are supported to perform navigation functions. In some embodiments, a rectangular icon is displayed to indicate to the user that a tap input in the center of the virtual touchpad region is supposed to perform a click or selection function. In some embodiments, the usage hints are displayed when the remote control user interface is first displayed. In some embodiments, the usage hints are displayed are a threshold amount of delay after the remote control user interface is first displayed (e.g., such as 1 second, 1.5 seconds, 2 seconds, etc.).

The above-described manner of providing usage hints (e.g., displaying usage hints in the virtual touchpad region that represent the functions and inputs that are supported) allows the first electronic device to indicate to the user the functions and actions that are supported by the virtual touchpad region of the remote control user interface (e.g., by displaying select supported actions within the virtual touchpad region), which simplifies the interaction between the user and the first and second electronic devices and enhances the operability of the first and second electronic devices and makes the user-device interface more efficient (e.g., by providing the user with an easy-to-understand and intuitive display of supported functions and inputs, without requiring that the user navigate to another user interface to discover how to operate the remote control user interface or what functions and inputs are supported by the virtual touchpad region), which additionally reduces power usage and improves battery life of the first and second electronic devices by enabling the user to use the first and second electronic devices more quickly and efficiently while reducing errors in usage of the devices.

In some embodiments, in accordance with the determination that the second electronic device is the first type of device, the usage hints correspond to the first set of actions (1320), such as in FIG. 12D. In some embodiments, the usage hints that are displayed are based on the actions that are supported and performable by the virtual touchpad region. For example, the first type of set-top box or television supports taps in particular sub-regions and directional swipes as navigational inputs. In such example, the usage hints displayed include a text label that the user can "swipe to navigate" and directional arrows or carets to indicate that the user can tap in the respective sub-region of the virtual touchpad region to perform navigational inputs.

In some embodiments, in accordance with the determination that the second electronic device is the second type of device, the usage hints correspond to the second set of actions (1322), such as in FIG. 12M. In some embodiments, the second type of set-top box or television supports taps in particular sub-regions as navigational inputs, but not directional swipes. In such example, the usage hints displayed include directional arrows or carets to indicate that the user can tap in the respective sub-region of the virtual touchpad region to perform navigational inputs, but does not include the text label that the user can "swipe to navigate." In some embodiments, a rectangular icon is shown in the center of the virtual touchpad region to indicate to the user that a tap input in the center of the virtual touchpad region can perform a click or selection input.

The above-described manner of providing usage hints (e.g., displaying usage hints in the virtual touchpad region that represent the functions and inputs that are compatible with the first type of device and the second type of device, respectively) allows the first electronic device to indicate to the user the functions and actions on the virtual touchpad region that are supported by the electronic device being controlled (e.g., by displaying usage hints that correspond to the respective set of actions that are supported by the respective type of device of the second electronic device), which simplifies the interaction between the user and the first and second electronic devices and enhances the operability of the first and second electronic devices and makes the user-device interface more efficient (e.g., by providing the user with an easy-to-understand and intuitive display of supported functions and inputs, without requiring that the user navigate to another user interface to discover how to operate the remote control user interface or what functions and inputs are supported on the virtual touchpad region that are supported by the electronic device being controlled), which additionally reduces power usage and improves battery life of the first and second electronic devices by enabling the user to use the first and second electronic devices more quickly and efficiently while reducing errors in usage of the devices.

In some embodiments, displaying the usage hints in the virtual touchpad region comprises displaying the usage hints for a threshold amount of time when the remote control user interface is first displayed (1324), such as in FIG. 12D. In some embodiments, the usage hints are displayed in the virtual touchpad region for 1 second, 3 seconds, 5 seconds. In some embodiments, after the threshold amount of time, the usage hints disappear or otherwise cease displaying.

The above-described manner of displaying usage hints (e.g., displaying usage hints for only a threshold amount of time) allows the first electronic device to indicate to the user the functions and actions on the virtual touchpad region that are supported by the electronic device being controlled without distracting or otherwise interfering with the user's interaction with the remote control user interface, while simultaneously reducing power consumption in processing and displaying the usage hints (and increasing battery life for battery-powered devices) (e.g., by displaying the usage hints for a threshold amount of time, then ceasing display of the usage hints), which simplifies the interaction between the user and the first and second electronic devices and enhances the operability of the first and second electronic devices and makes the user-device interface more efficient (e.g., by providing the user with an easy-to-understand and intuitive display of supported functions and inputs and then ceasing display of the hints so the user can interact with the remote control user interface without the appearance of the hints causing interface with the user's interactions), which additionally reduces power usage and improves battery life of the first and second electronic devices by enabling the user to use the first and second electronic devices more quickly and efficiently.

In some embodiments, displaying the usage hints in the virtual touchpad region comprises displaying the usage hints until the first electronic device receives an initial touch input in the virtual touchpad region (1326), such as in FIG. 12D. In some embodiments, the usage hints are displayed in the virtual touchpad region until the device detects or otherwise receives a touch input in the virtual touchpad region. For example, the usage hints display indefinitely until the user performs a tap input or a gesture.

The above-described manner of displaying usage hints (e.g., displaying usage hints until receiving a user input) allows the first electronic device to indicate to the user the functions and actions on the virtual touchpad region that are supported by the electronic device being controlled without distracting or otherwise interfering with the user's interaction with the remote control user interface and ensuring that the user has seen the usage hints (e.g., by displaying the usage hints until the user interacts with the user interface, indicating the user's understanding of how to interact with the user interface), which simplifies the interaction between the user and the first and second electronic devices and enhances the operability of the first and second electronic devices and makes the user-device interface more efficient (e.g., by providing the user with an easy-to-understand and intuitive display of supported functions and inputs and then ceasing display of the hints so the user can interact with the remote control user interface without the appearance of the hints causing interface with the user's interactions), which additionally reduces power usage and improves battery life of the first and second electronic devices by enabling the user to use the first and second electronic devices more quickly and efficiently while reducing errors in usage of the devices.

In some embodiments, displaying the usage hints in the virtual touchpad region comprises displaying the usage hints once every remote control usage session of the first electronic device (1328), such as in FIG. 12D. In some embodiments, a remote control usage session is a period of time in which a user is controlling or is expected to control the second electronic device using the remote control user interface. For example, a remote control usage session optionally begins when a user requests display of the remote control user interface and automatically ends after a threshold period of time of not receiving any further user inputs. In some embodiments, the remote control usage session ends after the content item being displayed on the second electronic device completes playback. In some embodiments, the remote control usage session ends after the second electronic device is powered off. In some embodiments, if the user dismisses or otherwise closes the remote control user interface, but re-requests display of the remote control user interface within the same session, the usage hints are optionally not shown. In some embodiments, if the user dismisses or otherwise closes the remote control user interface and re-requests display of the remote control user interface after the remote control usage session ends, then the usage hints are optionally redisplayed.

The above-described manner of displaying usage hints (e.g., displaying usage hints once per session) allows the first electronic device to indicate to the user the functions and actions on the virtual touchpad region that are supported by the electronic device being controlled without distracting or otherwise interfering with the user's interaction with the remote control user interface (e.g., by displaying the usage hints once per session so that the user is only prompted the first time the user begins a remote control session or until the supported functions change), which simplifies the interaction between the user and the first and second electronic devices and enhances the operability of the first and second electronic devices and makes the user-device interface more efficient (e.g., by providing the user with an easy-to-understand and intuitive display of supported functions and inputs and not displaying the hints during the same usage session so the user can interact with the remote control user interface without the appearance of the hints causing interface with the user's interactions), which additionally reduces power usage and improves battery life of the first and second electronic devices by enabling the user to use the first and second electronic devices more quickly and efficiently.

In some embodiments, displaying the usage hints in the virtual touchpad region comprises displaying the usage hints only a first time the first electronic device displays the remote control user interface (1330), such as in FIG. 12D. In some embodiments, the usage hints are displayed in the virtual touchpad region only the very first time that the remote control user interface is displayed on the device. In some embodiments, usage hints will not be further displayed on the device after the hints have been displayed the one time. In some embodiments, resetting the remote control user interface or resetting the device optionally allows the usage hints to be re-displayed. In some embodiments, a flag or setting is set to indicate that usage hints have been displayed.

The above-described manner of displaying usage hints (e.g., displaying usage hints only once on the first electronic device) allows the first electronic device to indicate to the user the functions and actions on the virtual touchpad region that are supported by the electronic device being controlled without distracting or otherwise interfering with the user's interaction with the remote control user interface, while simultaneously reducing power consumption required in processing and displaying the usage hints (and increasing battery life for battery-powered devices) (e.g., by displaying the usage hints only one time on the first electronic device), which simplifies the interaction between the user and the first and second electronic devices and enhances the operability of the first and second electronic devices and makes the user-device interface more efficient (e.g., by providing the user with an easy-to-understand and intuitive display of supported functions and inputs and not displaying the hints again so the user can interact with the remote control user interface without the appearance of the hints causing interface with the user's interactions), which additionally reduces power usage and improves battery life of the first and second electronic devices by enabling the user to use the first and second electronic devices more quickly and efficiently.

In some embodiments, the remote control user interface further includes a device selection element for selecting an electronic device to control using the remote control user interface (1332), such as in FIG. 12J (e.g., a drop down menu item that, when not expanded, displays the device that is currently being controlled by the remote control user interface).

In some embodiments, in response to receiving a user input selecting the device selection element, the first electronic device displays (1334), in the remote control user interface, a list of one or more devices, including the second electronic device, that are controllable using the remote control user interface, such as in FIG. 12K. In some embodiments, the drop down menu expands in response to the user input. In some embodiments, the expanded drop down menu displays the list of one or more devices. In some embodiments, the list includes all of the electronic devices that have been determined to be controllable by the remote control user interface. In some embodiments, a device is controllable if it satisfies one or more criteria such as being powered on, being on the same WiFi network as the first electronic device, and supporting a remote control communication protocol used by the first electronic device. In some embodiments, the drop down menu only displays a subset of available electronic devices. In some embodiments, the drop down menu is scrollable to view all the available electronic devices. In some embodiments, the currently selected device is included in the list of devices with an indicator that the currently selected device is currently selected (e.g., with a check mark or other visual indicator). In some embodiments, the list of devices includes representations or icons indicating the type of device associated with the respective device in the list.

The above-described manner of providing a list of controllable devices (e.g., displaying a list of one or more devices) allows the first electronic device to provide the user with a selection of a number of devices to control using the remote control user interface (e.g., by displaying a list of one or more devices that are controllable in response to a user input requesting the list of devices to control), which simplifies the interaction between the user and the first and second electronic devices and enhances the operability of the first and second electronic devices and makes the user-device interface more efficient (e.g., by providing the user with a list of devices that are controllable using the one user interface without requiring the user to navigate to different user interfaces to control different devices and by automatically determining the devices that are controllable without requiring the user to guess and check which devices are compatible with being remotely controlled), which additionally reduces power usage and improves battery life of the first and second electronic devices by enabling the user to use the first and second electronic devices more quickly and efficiently while reducing or eliminating user error and reducing power consumption.

In some embodiments, prior to receiving the touch input in the virtual touchpad region and while displaying the list of the one or more devices to control, the first electronic device receives (1336) user input selecting the second electronic device in the list, such as in FIG. 12C (e.g., receiving a tap input selecting one of the devices in the drop-down menu).

In some embodiments, in response to receiving the user input selecting the second electronic device in the list, the first electronic device configures (1338) the remote control user interface to control the second electronic device, such as in FIG. 12D. In some embodiments, the user-selected device from the drop-down menu becomes the device that is controlled by the remote control user interface. In some embodiments, the remote control user interface is updated based on the type of device of the selected device.

The above-described manner of selecting a device to control (e.g., displaying a list of devices, receiving a user input selecting a device from the list, and configuring the remote control user interface to control the selected device) allows the first electronic device to provide the user with an option of the device to control using the remote control user interface (e.g., by receiving a user input selecting a device from the list of devices and configuring the remote control user interface to control the selected device), which simplifies the interaction between the user and the first and second electronic devices and enhances the operability of the first and second electronic devices and makes the user-device interface more efficient (e.g., by using one single remote control user interface to control a number of different devices including different types of products, without requiring the user to navigate to a different user interface for each different controllable device), which additionally reduces power usage and improves battery life of the first and second electronic devices by enabling the user to use the first and second electronic devices more quickly and efficiently.

In some embodiments, displaying the list of one or more devices includes reducing a size of the virtual touchpad region in the remote control user interface to create a display region in the remote control user interface in which the list of one or more devices is displayed (1340), such as in FIG. 12C. In some embodiments, the drop down menu displaces some of the area occupied by the virtual touchpad region. In some embodiments, the drop-down menu is overlaid over the virtual touchpad region, effectively reducing the active region of the virtual touchpad region. In some embodiments, the size of the virtual touchpad element is reduced to make room for the drop down menu. In some embodiments, the size of the display region for the list of one or more devices adjusts based on the number of devices in the list. In some embodiments, a maximum number of devices are concurrently displayed and any devices over the maximum number of devices is not shown and is optionally displayed in response to the user scrolling through the list.

In some embodiments, while the list of one or more devices is displayed in the remote control user interface, the virtual touchpad region continues to be responsive to touch inputs to perform the first set of actions or the second set of actions (1342), such as in FIG. 12C. In some embodiments, user inputs on the reduced-size virtual touchpad region continue to perform actions according to the user input in the same manner as the non-reduced-size virtual touchpad region (e.g., the first or second set of actions).

The above-described manner of preserving the virtual touchpad region while allowing the user to select a device to control (e.g., displaying a list of devices while concurrently reducing the size of the virtual touchpad region to make room for the list of devices) allows the first electronic device to provide the user with the ability to select what device to control or view what devices are available to be controlled while concurrently allowing the user to continue remote controlling the currently selected device (e.g., by displaying the list of devices that are controllable while maintaining the virtual touchpad region that remains responsive to touch inputs), which simplifies the interaction between the user and the first and second electronic devices and enhances the operability of the first and second electronic devices and makes the user-device interface more efficient (e.g., by using one single remote control user interface to both display a list of devices that are controllable and a virtual touchpad region that is responsive to touch inputs, thus allowing the user to quickly switch between different controlled devices and send quickly send commands to different devices without needing to navigate away from the list of one or more devices to provide touch inputs), which additionally reduces power usage and improves battery life of the first and second electronic devices by enabling the user to use the first and second electronic devices more quickly and efficiently.

In some embodiments, reducing the size of the virtual touchpad region comprises reducing the size of the virtual touchpad region to no smaller than a predetermined size (1344) (e.g., no smaller than a predetermined ratio of an original size of the virtual touchpad region (e.g., no smaller than ½, ⅓, or ¾ of the original size)), such as in FIG. 12L. In some embodiments, if the list of devices includes more than a predetermined number of devices such that the virtual touchpad region is reduced to its minimum size, then the drop-down menu becomes a scrollable list and any devices that "overflow" the drop-down menu are displayed as if behind the virtual touchpad region. In some embodiments, the predetermined size is a percentage or ratio of the original size of the virtual touchpad region, a percentage or ratio of the overall screen size, or a minimum absolute size of the virtual touchpad region.

The above-described manner of maintaining a minimum size of the virtual touchpad region while allowing the user to select a device to control (e.g., by reducing the size of the virtual touchpad region no smaller than a certain size or ratio) allows the first electronic device to preserve the functionality of the virtual touchpad region while simultaneously providing the user with the ability to select what device to control or view what devices are available to be controlled (e.g., by not reducing the size of the virtual touchpad region smaller than a certain size), which simplifies the interaction between the user and the first and second electronic devices and enhances the operability of the first and second electronic devices and makes the user-device interface more efficient (e.g., by maintaining the full operability and functionality of the virtual touchpad region by not allowing the size to be reduced beyond a predetermined amount, while simultaneously providing the user with a functional list from which to choose the device to control), which additionally reduces power usage and improves battery life of the first and second electronic devices by enabling the user to use the first and second electronic devices more quickly and efficiently.

In some embodiments, the remote control user interface further includes one or more affordances for controlling the second electronic device (1346) (e.g., a menu button, a play/pause button for pausing or resuming content being displayed on the second electronic device, a voice input button, a search button, an information button for displaying information on the second electronic device, etc.), such as in FIG. 12C. In some embodiments, the menu button causes display of a menu on the electronic device. In some embodiments, the menu button causes display of a previously-displayed user interface or previous menu option (e.g., performing a "back" functionality).

The above-described manner of further providing options for controlling the second electronic device (e.g., by further including affordances for controlling the second electronic device) allows the first electronic device to provide the user with functionality that is not traditionally associated with touchpad interfaces (e.g., by including buttons that perform different actions and functions that cannot easily be achieved by the touchpad interface), which simplifies the interaction between the user and the first and second electronic devices and enhances the operability of the first and second electronic devices and makes the user-device interface more efficient (e.g., by providing further functions of controlling the second electronic device without requiring the user to use the touchpad to navigate to a separate interface on the second electronic device to perform the desired functions), which additionally reduces power usage and improves battery life of the first and second electronic devices by enabling the user to use the first and second electronic devices more quickly and efficiently.

In some embodiments, in accordance with the determination that the second electronic device is the first type of device, the one or more affordances is a first set of affordances for performing a first set of functions (1348) (e.g., a menu button, a play/pause button for pausing or resuming content being displayed on the second electronic device, a voice input button, a search button, etc.), such as in FIG. 12C. In some embodiments, the menu button causes display of a menu on the electronic device. In some embodiments, the menu button causes display of a previously-displayed user interface or previous menu option (e.g., performing a "back" functionality).

In some embodiments, in accordance with the determination that the second electronic device is the second type of device, the one or more affordances is a second set of affordances for performing a second set of functions, different than the first set of functions (1350) (e.g., a back button for displaying a previously displayed screen, content item, or menu, a play/pause button for pausing or resuming content being displayed on the second electronic device, an information button for displaying information on the second electronic device, etc.), such as in FIG. 12M.

The above-described manner of further providing options for controlling the second electronic device (e.g., by further including affordances specific to controlling the second electronic device) allows the first electronic device to provide the user with functionality that is specific to the electronic device that is being controlled (e.g., by including buttons that that perform actions that are compatible with the type of device being controlled), which simplifies the interaction between the user and the first and second electronic devices and enhances the operability of the first and second electronic devices and makes the user-device interface more efficient (e.g., by automatically only providing functions that are compatible and acceptable to the device being controlled, without providing the user with functions that are not supported without requiring that the user navigate to another user interface to discover how to operate the remote control user interface or what functions are supported by the electronic device being controlled), which additionally reduces power usage and improves battery life of the first and second electronic devices by enabling the user to use the first and second electronic devices more quickly and efficiently while reducing errors in usage of the devices.

In some embodiments, the first set of affordances includes a search affordance to initiate a search on the second electronic device (1352), such as in FIG. 12C. In some embodiments, the first type of device supports a search feature and selection of the search button initiates the search on the second electronic device. In some embodiments, the first type of device is a set-top box in communication with a display (e.g., external or integrated). In some embodiments, initiating a search on the set-top box navigates the set-top box to a search user interface. In some embodiments, selection of the search affordance interrupts any processes being performed on the set-top box (e.g., browsing, content playback, etc.) and navigates to the search user interface. In some embodiments, the search user interface allows the user to search for content residing on the set-top box. In some embodiments, the search user interface allows the user to search for content that is accessible via applications that are installed on the set-top box. In some embodiments, the search user interface is an interface of a unified media browsing application and selecting the search affordance launches the unified media browsing application and displays the search user interface on the unified media browsing application. In some embodiments, the unified media browsing application provides a centralized location for browsing, searching, viewing, or otherwise accessing content on the second electronic device. The unified media browsing application optionally receives content viewing information from multiple content providers and/or applications for viewing content from those content providers that are installed on the second electronic device (e.g., the content providers that have enabled sharing of content viewing information with the unified media browsing application, such as a separate CBS application, a separate Fox application, a separate ESPN application, etc.). In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application allows the user to browse or search the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device).

In some embodiments, the second set of affordances does not include the search affordance (1354), such as in FIG. 12M. In some embodiments, the second type of device does not support a search feature. In some embodiments, the second type of device is a television or a smart television. For example, a television may not include a mechanism to search for content. In such examples, the set of affordances does not include a search button because the function is not supported by the second type of device.

The above-described manner of providing a search option to perform a search on supported devices (e.g., by including a search affordance for a first type of device and not including a search affordance for a second type of device) allows the first electronic device to provide the user with a search functionality that is not easily accessible with a touchpad interface but not providing the functionality if the function is not supported by the controlled device (e.g., by including a search button to initiate a search on the second electronic device only if the functionality is supported by the second electronic device), which simplifies the interaction between the user and the first and second electronic devices and enhances the operability of the first and second electronic devices and makes the user-device interface more efficient (e.g., by providing a search function without requiring the user to use the touchpad to navigate to a separate interface on the second electronic device to perform the search), which additionally reduces power usage and improves battery life of the first and second electronic devices by enabling the user to use the first and second electronic devices more quickly and efficiently.

In some embodiments, in response to receiving a touch input selecting one of the one or more affordances for controlling the second electronic device, the first electronic device provides (1356) haptic feedback (e.g., providing a vibrational feedback mechanism to the user as an indicator that the user has selected one of the buttons), such as in FIG. 12B. In some embodiments, feedback is provided on touchdown and/or liftoff of the touch input. In some embodiments, the feedback provided for touchdown is different from the feedback provided for liftoff (in frequency, intensity, etc.) In some embodiments, other feedback mechanisms are possible such as audio or visual feedback. For example, an audible tone is optionally provided as feedback. In some embodiments, visual feedback can consist of the selected button optionally moving, popping, bouncing, expanding, contracting, or otherwise changing. In some embodiments, the visual feedback includes a visual effect of momentarily expanding and subsequently changing the color of the selected button. In some embodiments, the momentary expansion of the selected button optionally expands based on the force of the input (e.g., as the user provides more force onto the button, the large the button becomes). In some embodiments, the color of the selected button persists if the selectable button is associated with a toggle-able function or action.

The above-described manner of providing a haptic feedback to the user's touch input (e.g., by providing haptic feedback in response to receiving a touch input selecting one of the buttons) allows the first electronic device to provide feedback to the user that the user is properly selecting a button (e.g., by providing a haptic feedback when an input is detected on the button), which simplifies the interaction between the user and the first and second electronic devices and enhances the operability of the first and second electronic devices and makes the user-device interface more efficient (e.g., by allowing the user to interact with the remote control user interface while watching the content on the second electronic device without needing to look at the remote control user interface and providing feedback that the user is actually selecting buttons and not providing input at the wrong location), which additionally reduces power usage and improves battery life of the first and second electronic devices by enabling the user to use the first and second electronic devices more quickly and efficiently while reducing errors in usage of the devices.

In some embodiments, the remote control user interface is displayed in response to a request to display the remote control user interface for controlling the second electronic device (1358), such as in FIG. 12B. In some embodiments, the remote control user interface can be accessed via a plurality of different methods such as via execution of a remote application or selection of a remote control element.

The above-described manner of initiating the remote control user interface (e.g., in response to a request to display the remote control user interface) allows the first electronic device to display the remote control user interface when requested by the user (e.g., by displaying the interface in response to a request from the user), which simplifies the interaction between the user and the first and second electronic devices and enhances the operability of the first and second electronic devices and makes the user-device interface more efficient (e.g., by providing the user with multiple methods of requesting and initiating the remote control user interface), which additionally reduces power usage and improves battery life of the first and second electronic devices by enabling the user to use the first and second electronic devices more quickly and efficiently.

In some embodiments, the request to display the remote control user interface comprises a user input selecting a remote control affordance on a controls user interface for controlling a plurality of functionalities of the first electronic device (1360), such as in FIG. 12B. For example, the controls user interface optionally includes one or more control elements for controlling one or more settings of the first electronic device. For example, the control user interfaces includes volume control, brightness control, and one or more network connection controls (e.g., Wi-Fi, cellular data, and Bluetooth). In some embodiments, the controls user interface includes a selectable option that, when selected, causes the first electronic device to launch or otherwise display the remote control user interface (e.g., launch a remote control application). In some embodiments, the controls user interface has the features of the controls user interface described with respect to FIG. 8B.

The above-described manner of initiating the remote control user interface (e.g., in response to a user input selecting a button on a controls user interface) allows the first electronic device to provide the user with an easy method of accessing the remote control user interface (e.g., by providing a button on a controls user interface which when selected, displays the remote control user interface), which simplifies the interaction between the user and the first and second electronic devices and enhances the operability of the first and second electronic devices and makes the user-device interface more efficient (e.g., by providing the user with an easy method of initiating the remote control user interface without requiring the user to navigate to a different or specific user interface to launch the remote control user interface), which additionally reduces power usage and improves battery life of the first and second electronic devices by enabling the user to use the first and second electronic devices more quickly and efficiently.

In some embodiments, the request to display the remote control user interface comprises a user input selecting a remote control affordance on a playback control user interface for controlling content playback of the second electronic device (1362), such as in FIG. 12V. In some embodiments, the playback control user interface includes one or more selectable options that, when selected, cause the first electronic device to modify or control an aspect of playback of the content on the second electronic device. In some embodiments, the playback control element includes selectable options such as play/pause, fast forward, rewind, language/subtitles options, volume control, etc. In some embodiments, the playback control user interface includes a selectable option that, when selected, causes the first electronic device to launch or otherwise display the remote control user interface (e.g., launch a remote control application). In some embodiments, the playback control user interface is displayed in response to selecting a selectable option on a controls user interface. In some embodiments, the playback control user interface has the features of the playback control user interface described with respect to FIG. 8C. In some embodiments, the playback control user interface is displayed in response to selecting a selectable option on a smart home application user interface. In some embodiments, the smart home application user interface has the features of the smart home application user interface described with respect to FIG. 8I.

The above-described manner of initiating the remote control user interface (e.g., in response to a user input selecting a button on a playback control user interface) allows the first electronic device to provide the user with an easy and intuitive method of accessing the remote control user interface (e.g., by providing a button on a playback control user interface which when selected, displays the remote control user interface), which simplifies the interaction between the user and the first and second electronic devices and enhances the operability of the first and second electronic devices and makes the user-device interface more efficient (e.g., by providing the user with an easy method of initiating the remote control user interface without requiring the user to navigate to a different or specific user interface to launch the remote control user interface), which additionally reduces power usage and improves battery life of the first and second electronic devices by enabling the user to use the first and second electronic devices more quickly and efficiently.

In some embodiments, the request to display the remote control user interface comprises a user input selecting a remote control affordance on a wake screen user interface (1364), such as in FIG. 12W. In some embodiments, the wake screen user interface is presented when the first electronic device transitions from a standby mode in which the display is optionally off or not presenting a user interface. In some embodiments, the wake screen includes representations of notifications received at the first electronic device, a clock, or other information. In some embodiments, the wake screen user interface is visible without entering authentication (e.g., biometric information, a password, a passcode) for authenticating and "unlocking" the first electronic device. In some embodiments, the wake screen user interface a playback control element corresponding to currently playing content on the second electronic device. In some embodiments, the playback control element includes a selectable option that is selectable to display the remote control user interface. In some embodiments, the wake screen user interface has the features of the wake screen user interface described with respect to FIG. 8A.

The above-described manner of initiating the remote control user interface (e.g., in response to a user input selecting a button on a wake screen user interface) allows the first electronic device to provide the user with an easy and intuitive method of accessing the remote control user interface (e.g., by providing a button on a wake screen user interface which when selected, displays the remote control user interface), which simplifies the interaction between the user and the first and second electronic devices and enhances the operability of the first and second electronic devices and makes the user-device interface more efficient (e.g., by providing the user with an easy method of initiating the remote control user interface without needing to unlock or otherwise authenticate the first electronic device and without requiring the user to navigate to a different or specific user interface to launch the remote control user interface), which additionally reduces power usage and improves battery life of the first and second electronic devices by enabling the user to use the first and second electronic devices more quickly and efficiently.

In some embodiments, the request to display the remote control user interface comprises a user input selecting a remote control application (1366) (e.g., an application installed on the first electronic device for remote controlling a second electronic device), such as in FIG. 12Z. In some embodiments, the application is not a system application (e.g., does not display a system user interface). In some embodiments, the remote control user interface displayed after launching the remote control application is the same as the remote control user interface that is displayed in response to selecting a remote control affordance on a system user interface (e.g., wake screen user interface, playback control user interface, controls user interface, etc.).

The above-described manner of initiating the remote control user interface (e.g., in response to a user input executing a remote control application) allows the first electronic device to provide the user with an easy and intuitive method of accessing the remote control user interface (e.g., by selecting the execution of a remote control user interface which when selected, displays the remote control user interface), which simplifies the interaction between the user and the first and second electronic devices and enhances the operability of the first and second electronic devices and makes the user-device interface more efficient (e.g., by providing the user with an easy method of initiating the remote control user interface without requiring the user to navigate to a different or specific user interface to launch the remote control user interface), which additionally reduces power usage and improves battery life of the first and second electronic devices by enabling the user to use the first and second electronic devices more quickly and efficiently.

In some embodiments, in accordance with a determination that the first electronic device is a third type of device, the remote control user interface is displayed on the touch screen without being displayed with other user interfaces (1368), such as in FIG. 12C. In some embodiments, the third type of device is a smartphone or wearable device, or any other device in communication with a display that is less than a certain threshold size. In some embodiments, the size of the display determines whether the device is a third type of device or a fourth type of device. In some embodiments, the remote control user interface is displayed in a "full screen" mode such that the remote control user interface occupies a large portion or substantially all (e.g., 80%, 90%, 95%) of the display. In some embodiments, the remote control user interface is the only user interface displayed on the display.

In some embodiments, in accordance with a determination that the first electronic device is a fourth type of device, different than the third type of device, the remote control user interface is displayed on the touch screen concurrently with at least one other user interface (1370), such as in FIG. 12FF. In some embodiments, the fourth type of device is a tablet, a laptop computer, or any other device in communication with a display that is greater than a certain threshold size. In some embodiments, the remote control user interface is not displayed in a "full screen" mode. In some embodiments, the size of display of the fourth type of device supports displaying the remote control user interface along with other user interfaces without cluttering the display or requiring reduction of the size of any of the user interfaces displayed. In some embodiments, the size of the remote control user interface is the same size as displayed on the third type of device. In some embodiments, the remote control user interface is displayed on the right side of the display. In some embodiments, the remote control user interface is displayed in the same area of the display as a controls user interface would be displayed on the fourth type of device. For example, if a user requests a controls user interface on the fourth type of device, the controls user interface is optionally shown on the right side of the screen. When a user selects the remote control affordance on the controls user interface, the controls user interface is optionally replaced by the remote control user interface.

The above-described manner of displaying the remote control user interface (e.g., in full screen mode on a third type of device and not in full screen mode on a fourth type of device) allows the first electronic device to provide the user with a consistent interface and experience across different types of devices (e.g., by determining whether the type of device supports displaying other user interfaces concurrently with the remote control user interface without interfering with the functionality of the remote control user interface and maintaining a consistent display of the remote control user interface regardless of the type of device upon which the user interface is displayed), which simplifies the interaction between the user and the first and second electronic devices and enhances the operability of the first and second electronic devices and makes the user-device interface more efficient (e.g., by providing a consistent user interface to the user regardless of the type of device upon which the user interface is displayed and automatically determining how to display the remote control user interface without requiring the user to navigate to a different user interface to display the remote control user interface in a manner that is compatible with the type of device), which additionally reduces power usage and improves battery life of the first and second electronic devices by enabling the user to use the first and second electronic devices more quickly and efficiently while reducing errors in usage of the devices.

It should be understood that the particular order in which the operations in FIGS. 13A-13H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and 1500) are also applicable in an analogous manner to method 1300 described above with respect to FIGS. 13A-13H. For example, the indications of remote controlling an electronic device described above with reference to method 1300 optionally have one or more of the characteristics of the streaming mode operation and presentation of playback control options, etc., described herein with reference to other methods described herein (e.g., methods 700, 900, 1100, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 13A-13H are, optionally, implemented by components depicted in FIGS. 1A-1B. For example, displaying operations 1302, 1318, 1324, 1326, 1328, 1330, and 1340 and receiving operations 1306, 1308, 1334, 1336, 1338, and 1356 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Context Specific Remote Control

Users interact with electronic devices in many different manners, including using an electronic device to present content, such as audio or video content. In some embodiments, a first electronic device is able to remotely control a second electronic device. The embodiments described below provide ways in which a first electronic device presents control elements including selectable options to control a second electronic device. In some embodiments, the control elements are content specific and different options can be presented to the user based on the content being displayed by the second electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 14A:
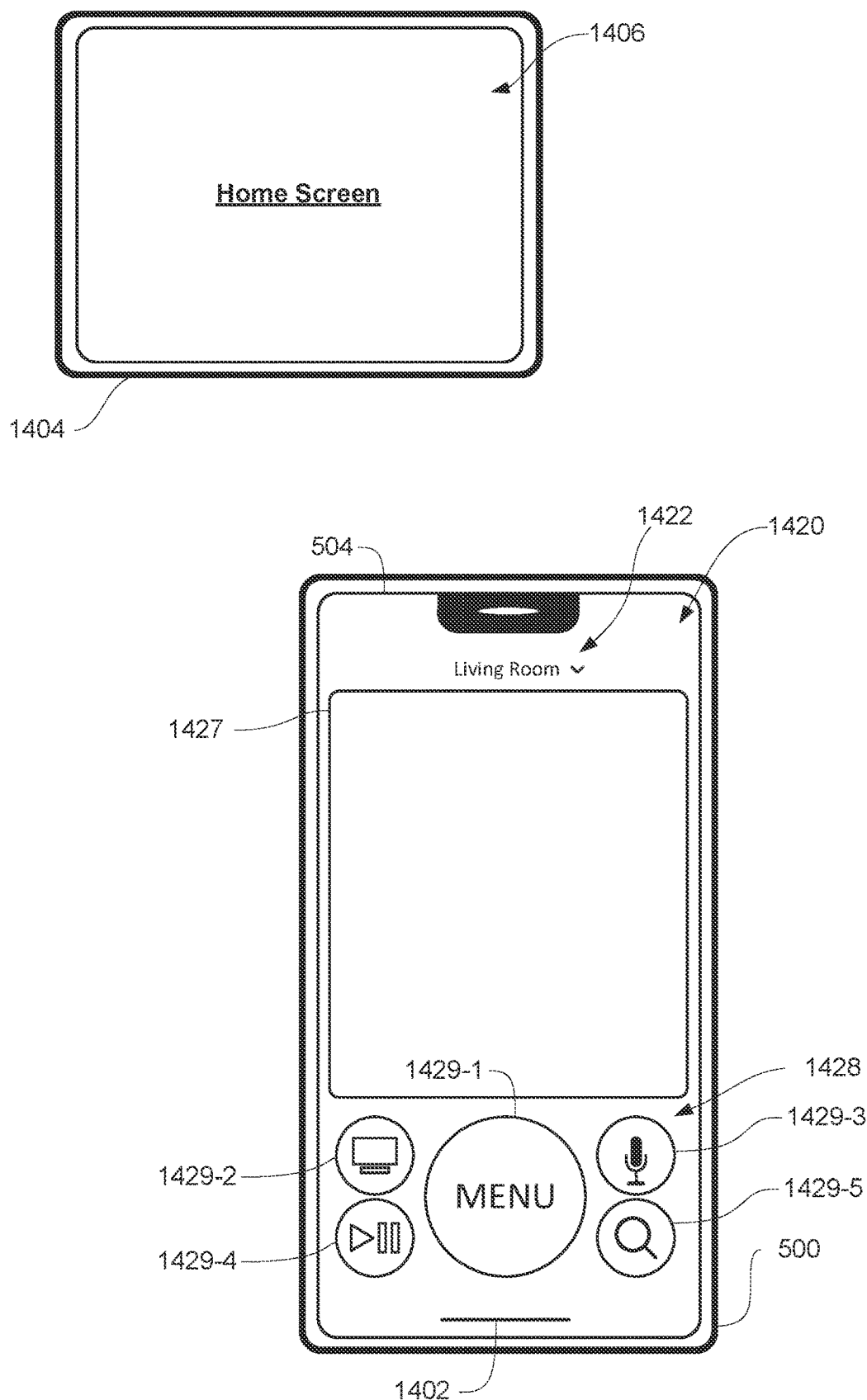
FIGS. 14A-14Q illustrate exemplary ways in which an electronic device presents selectable options to control another electronic device in accordance with some embodiments.
Figure 14B:
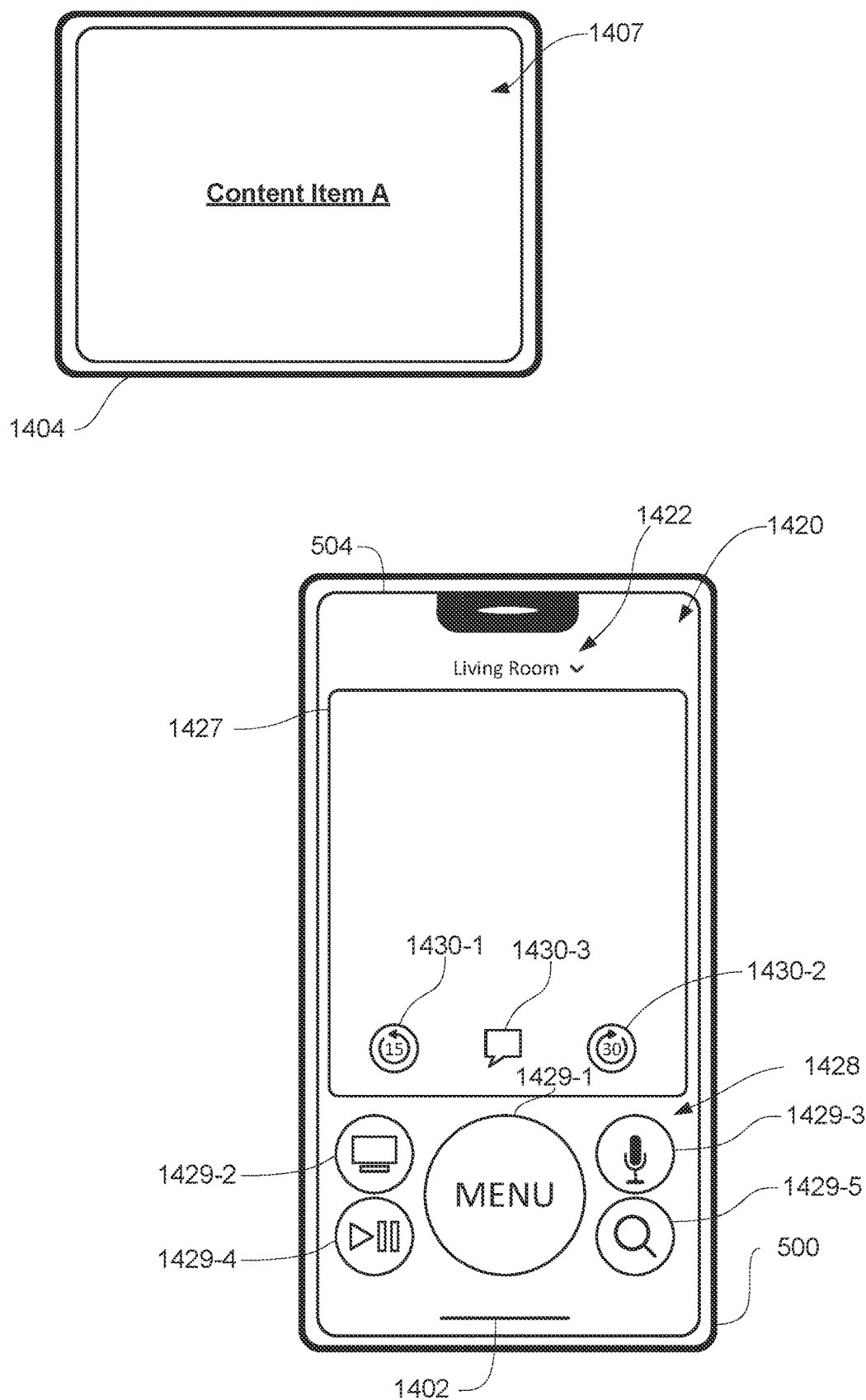
Figure 14C:
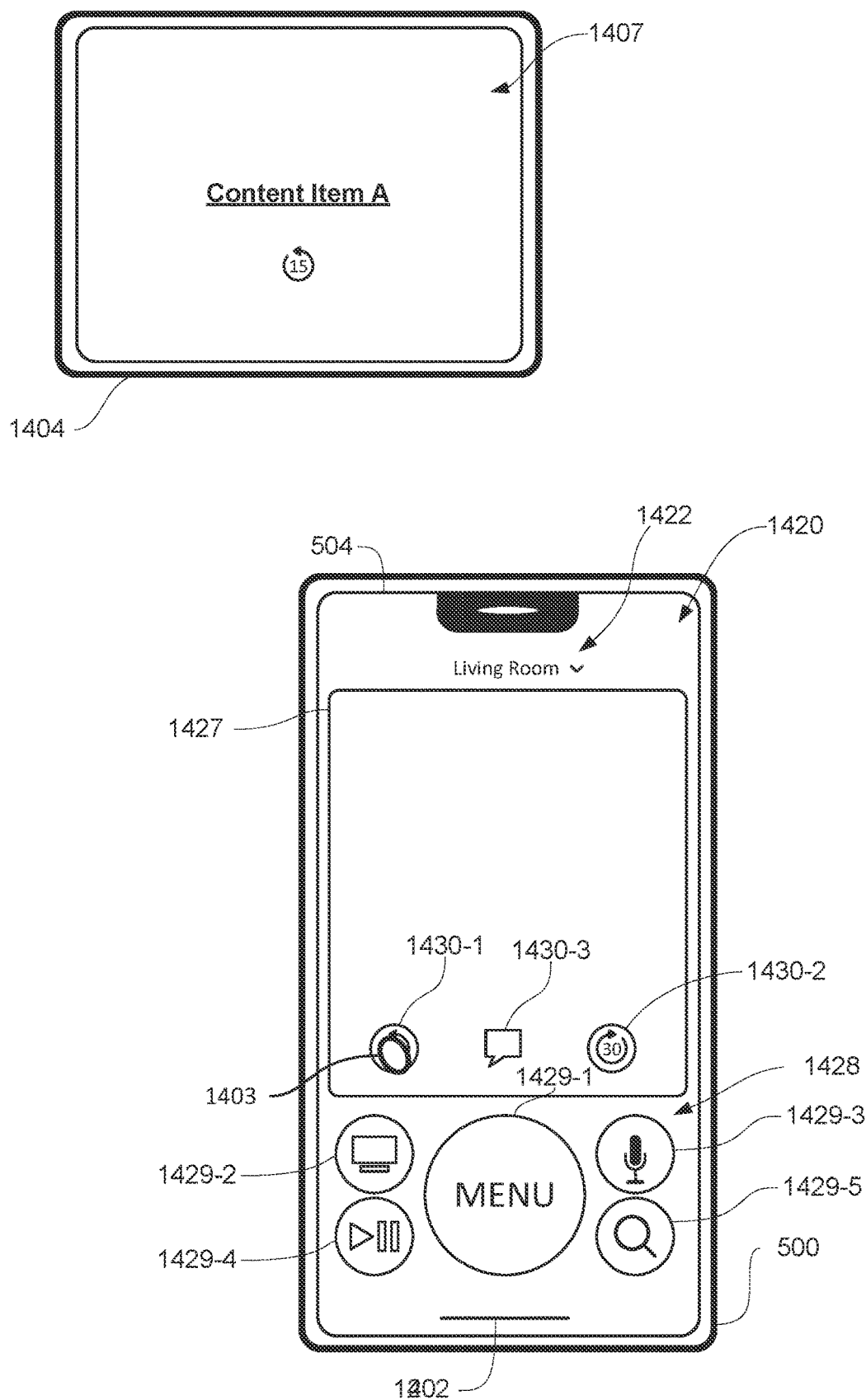
Figure 14D:
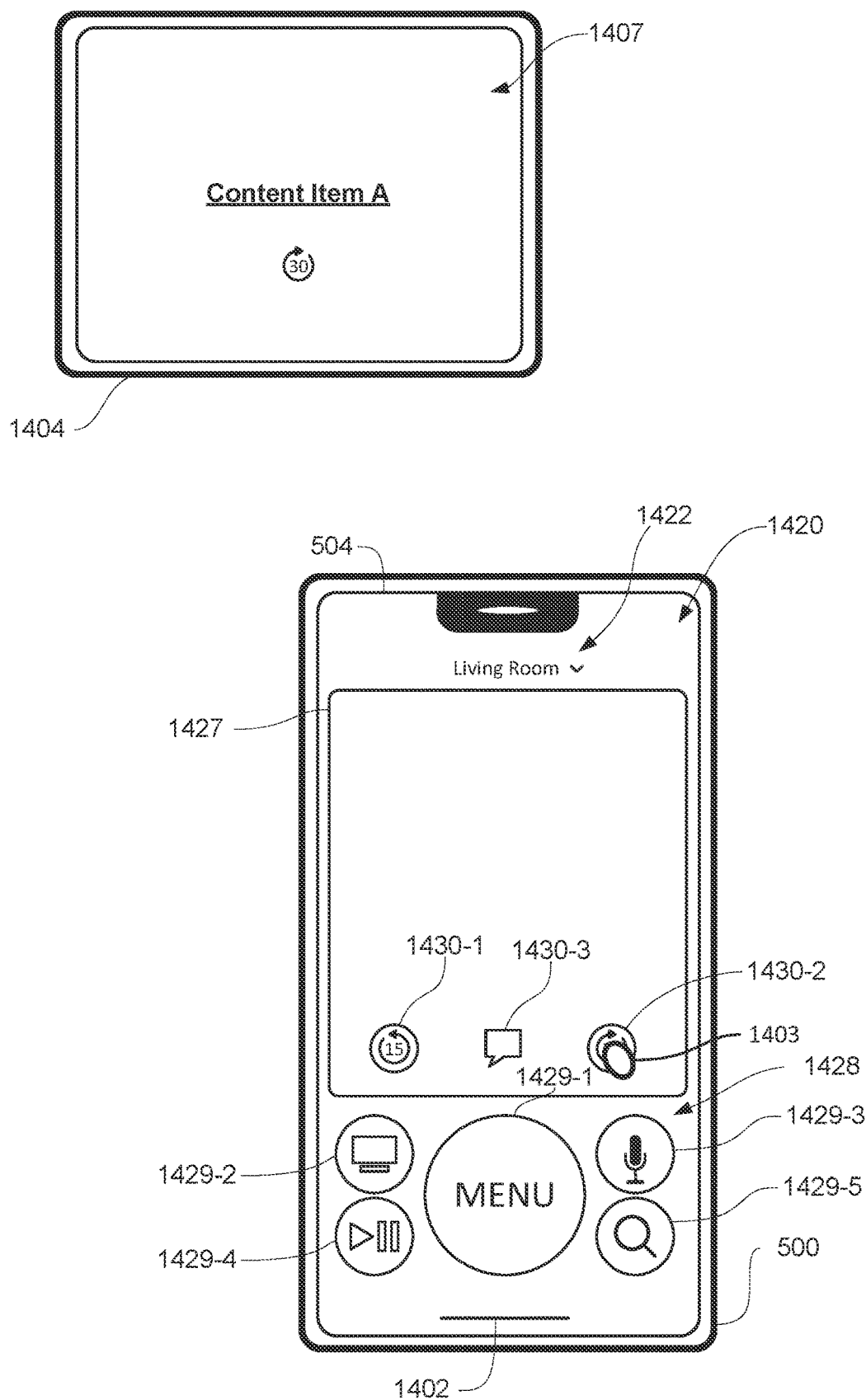
Figure 14E:
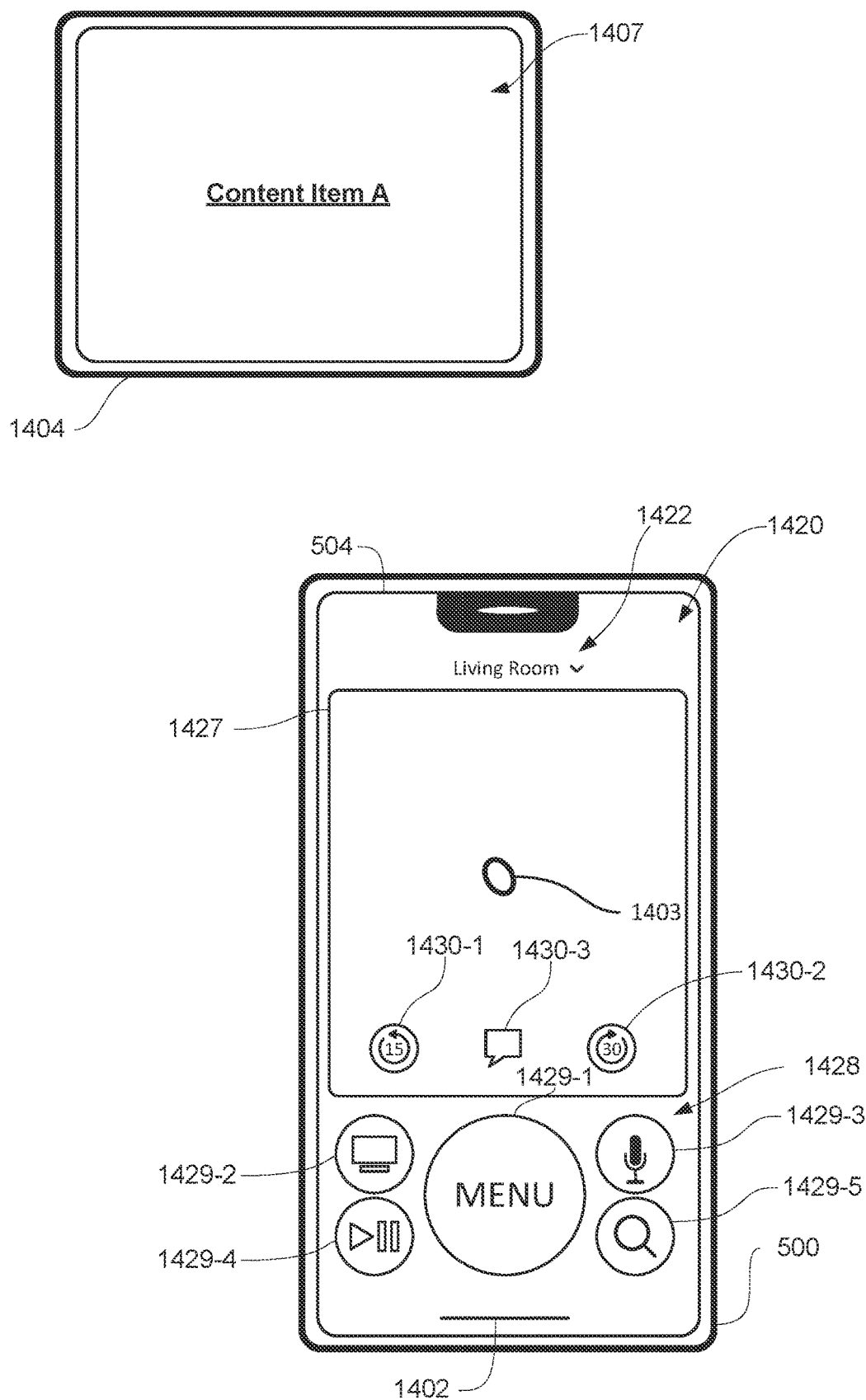
Figure 14F:
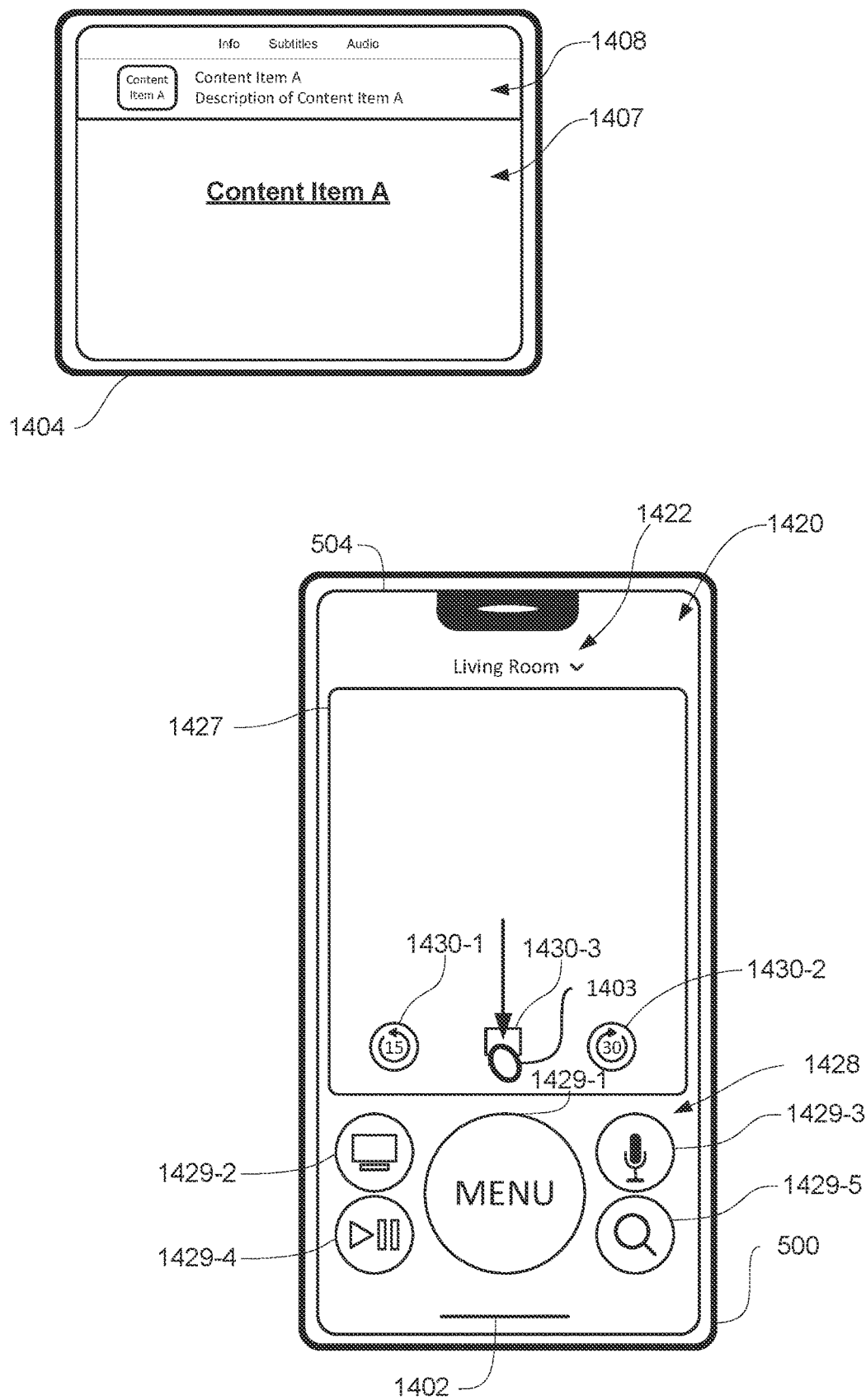
Figure 14G:
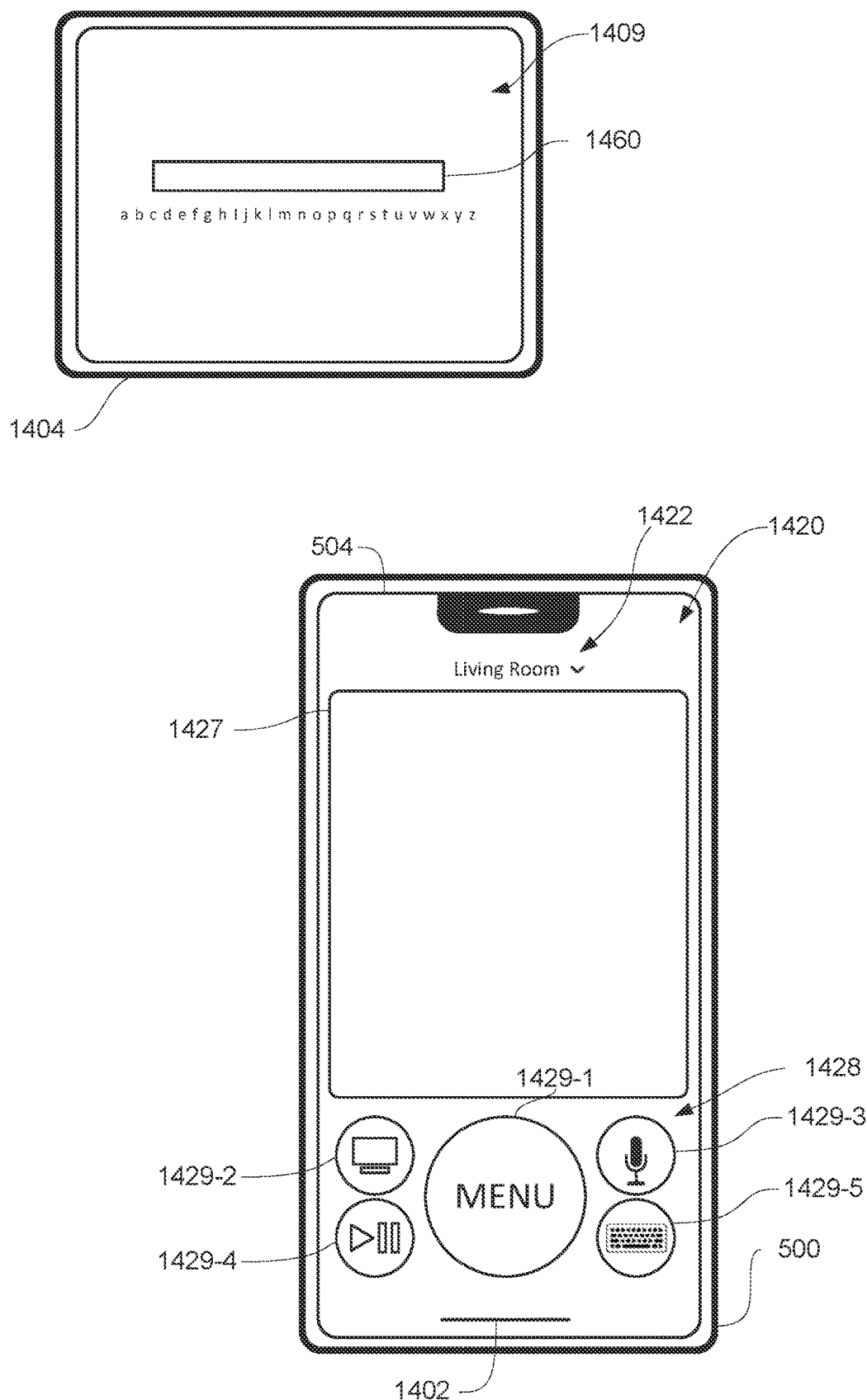
Figure 14H:
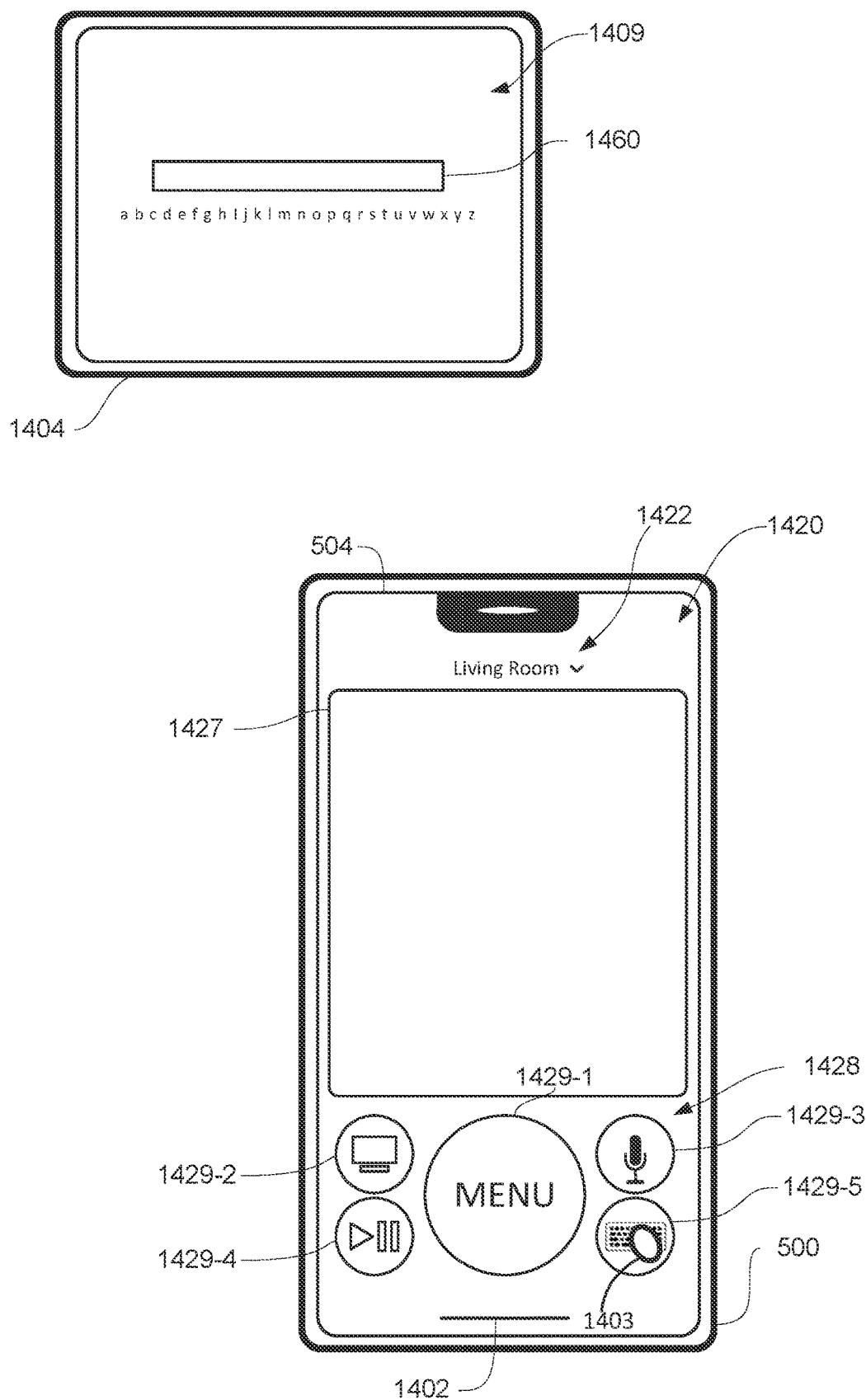
Figure 14I:
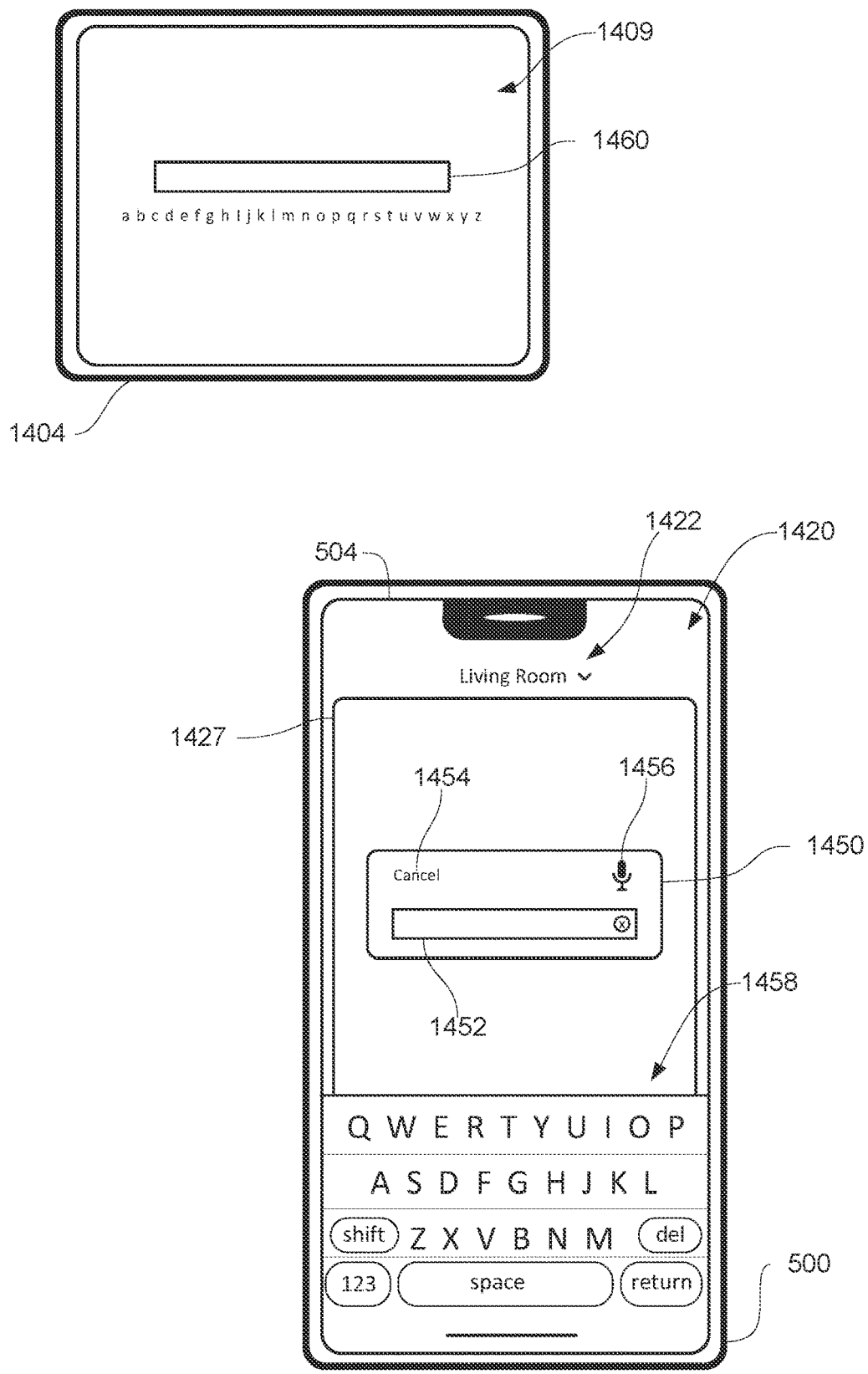
Figure 14J:
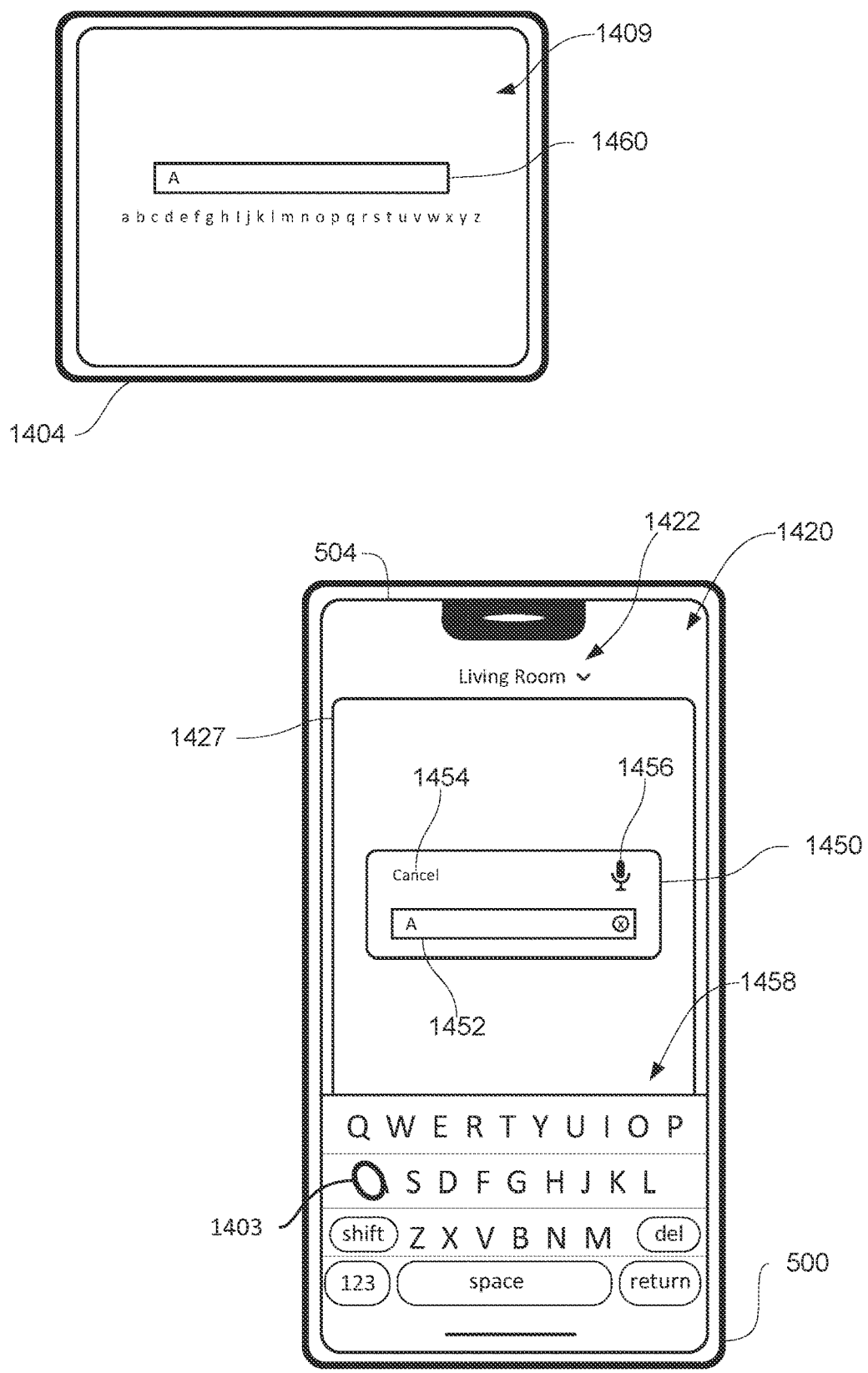
Figure 14K:
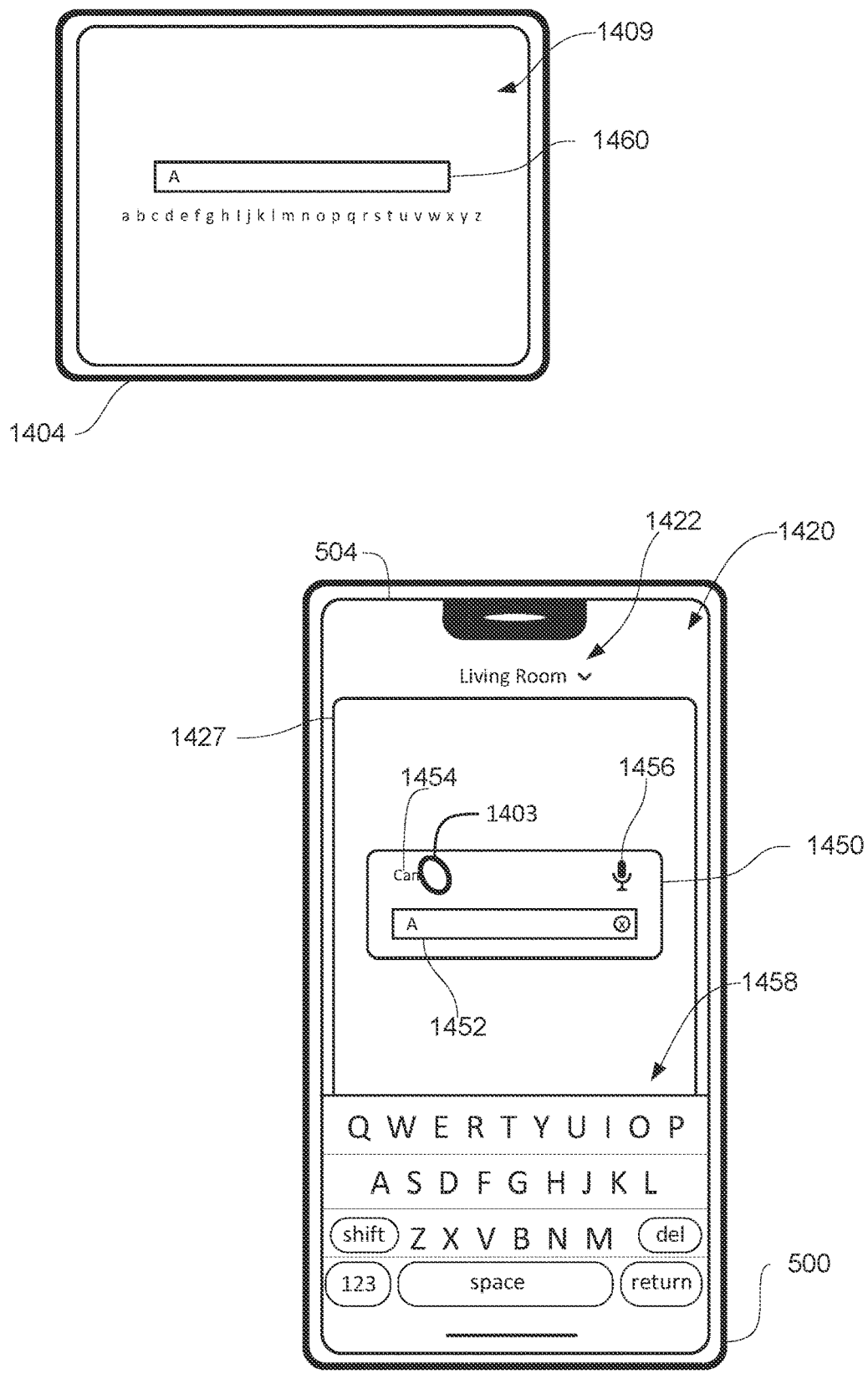
Figure 14L:
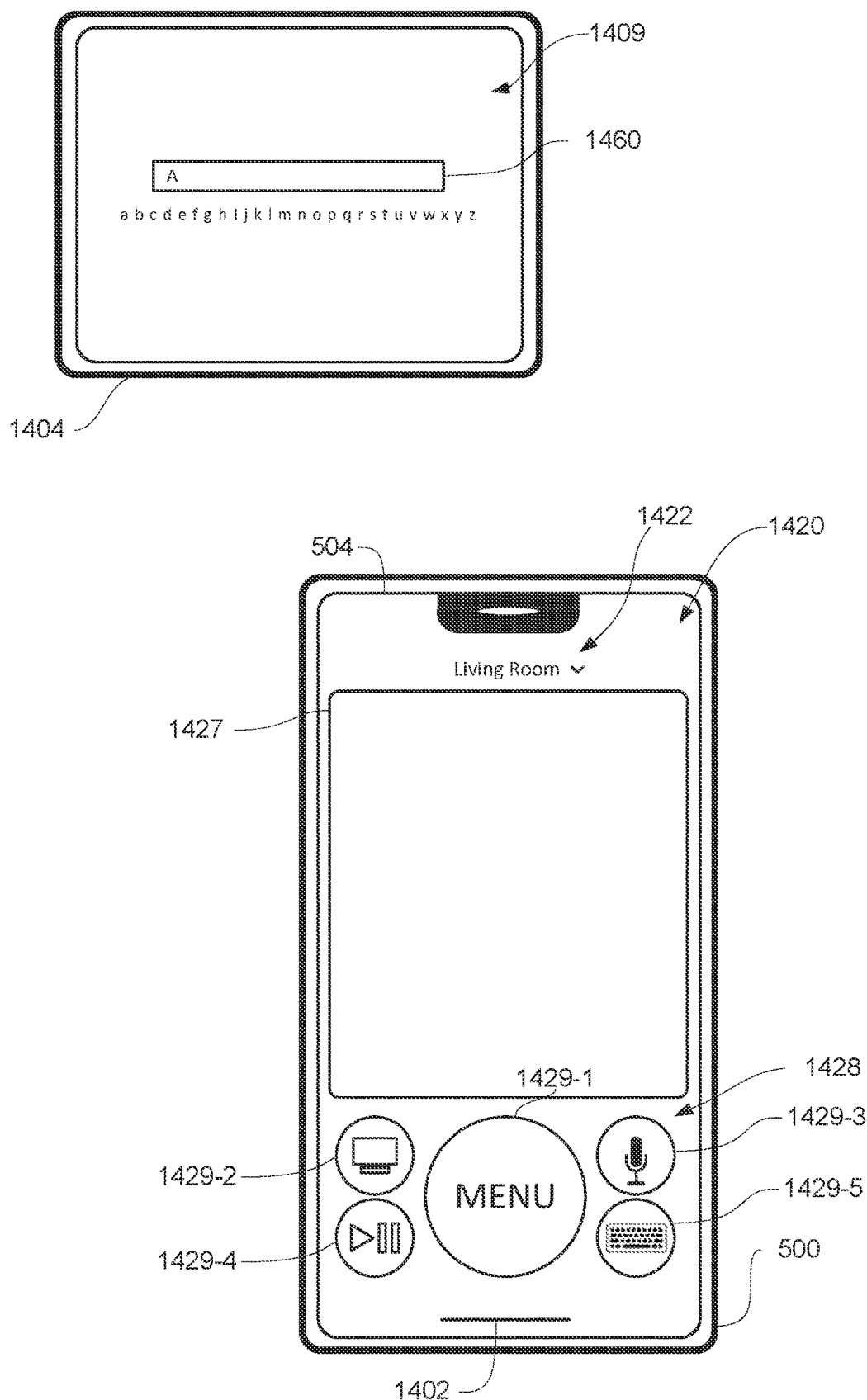
Figure 14M:
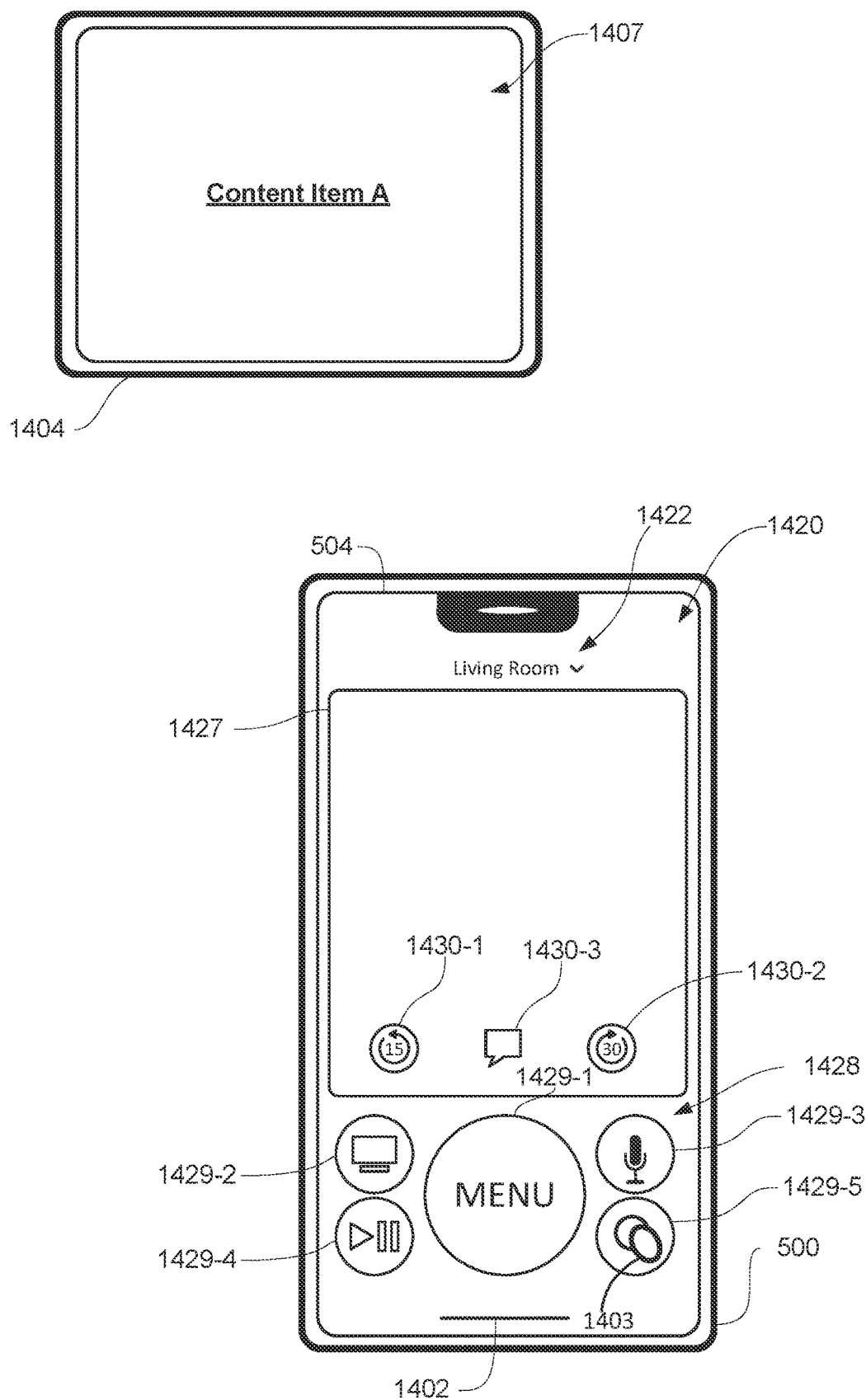
Figure 14N:
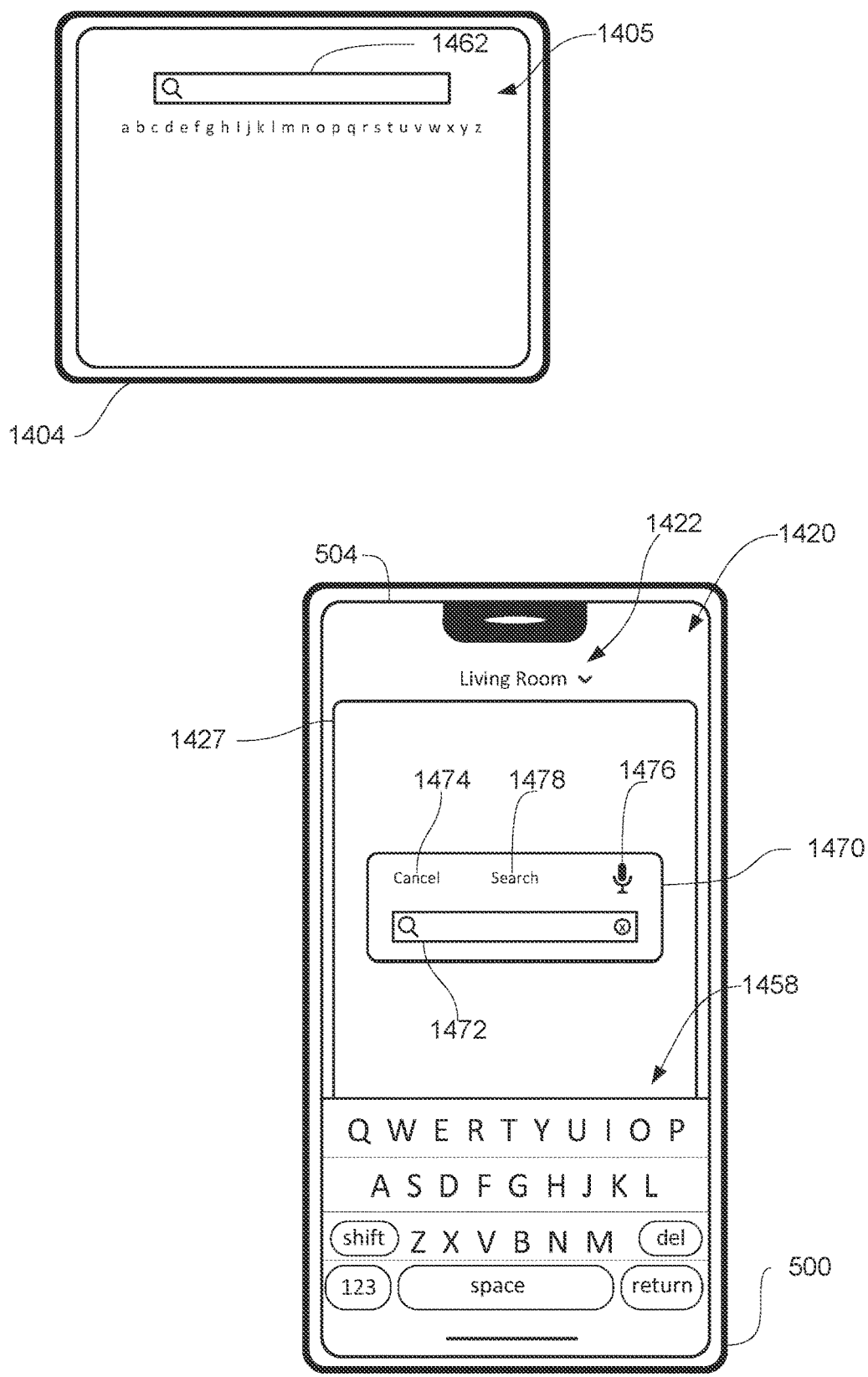
Figure 14O:
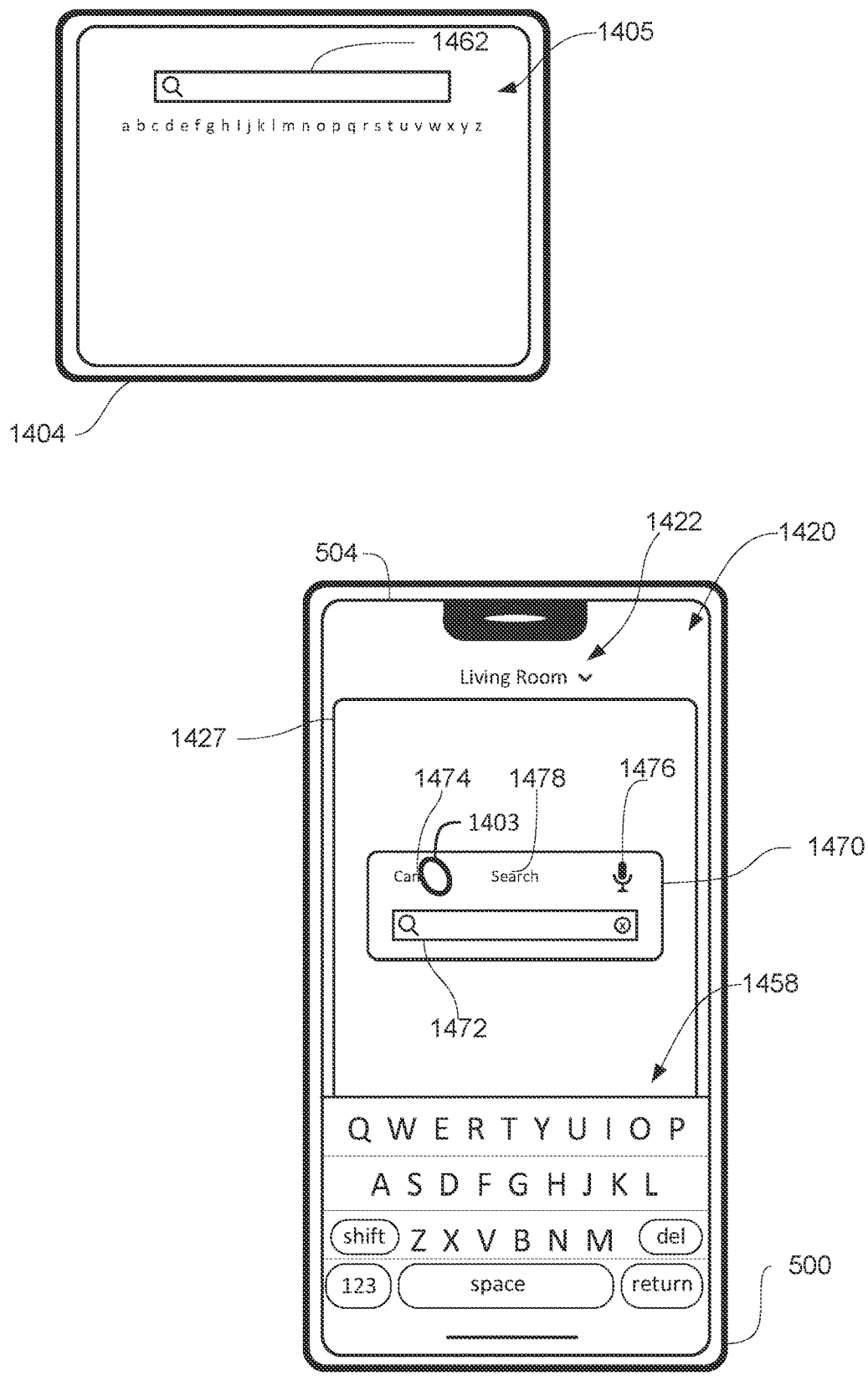
Figure 14P:
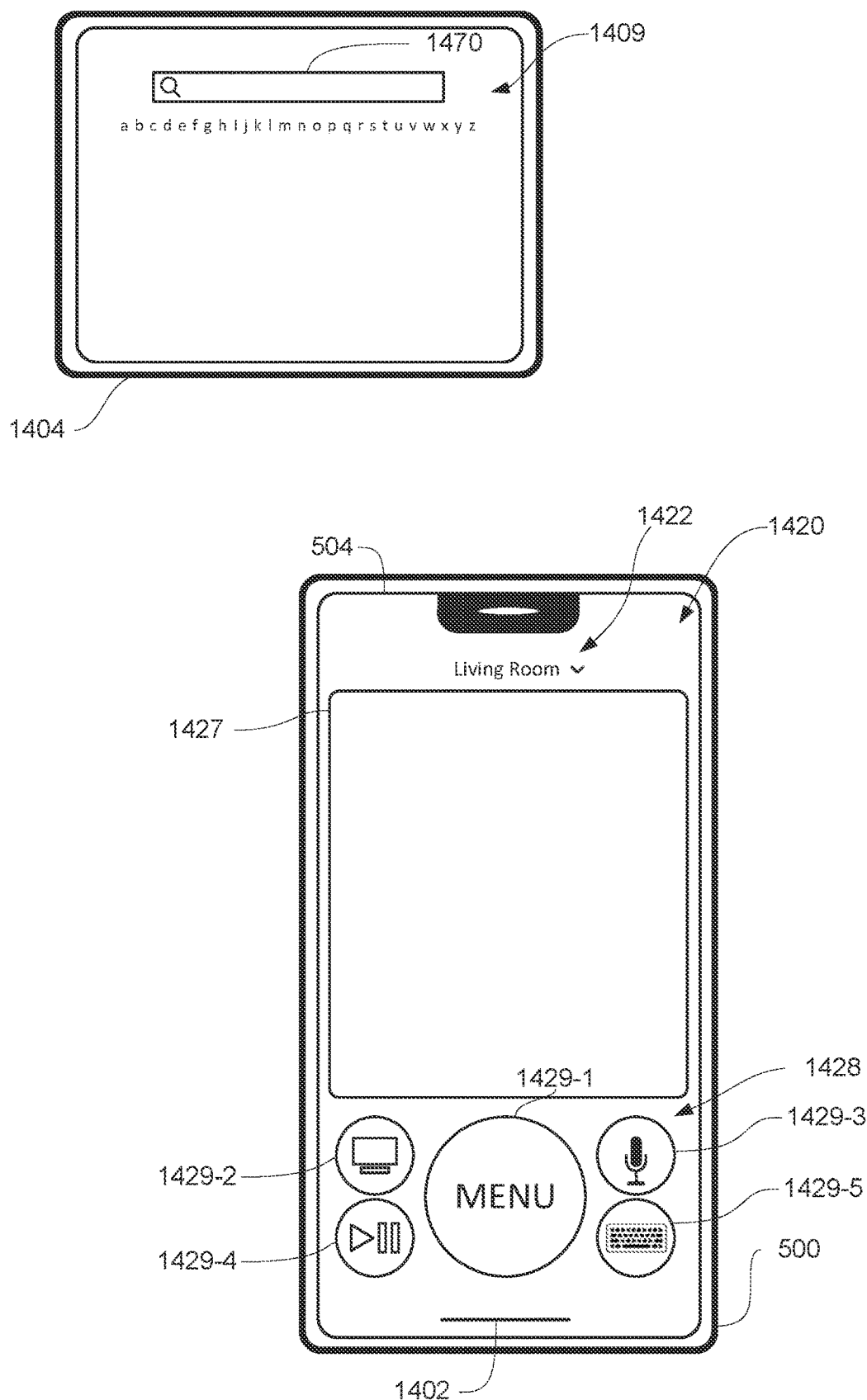
Figure 14Q:
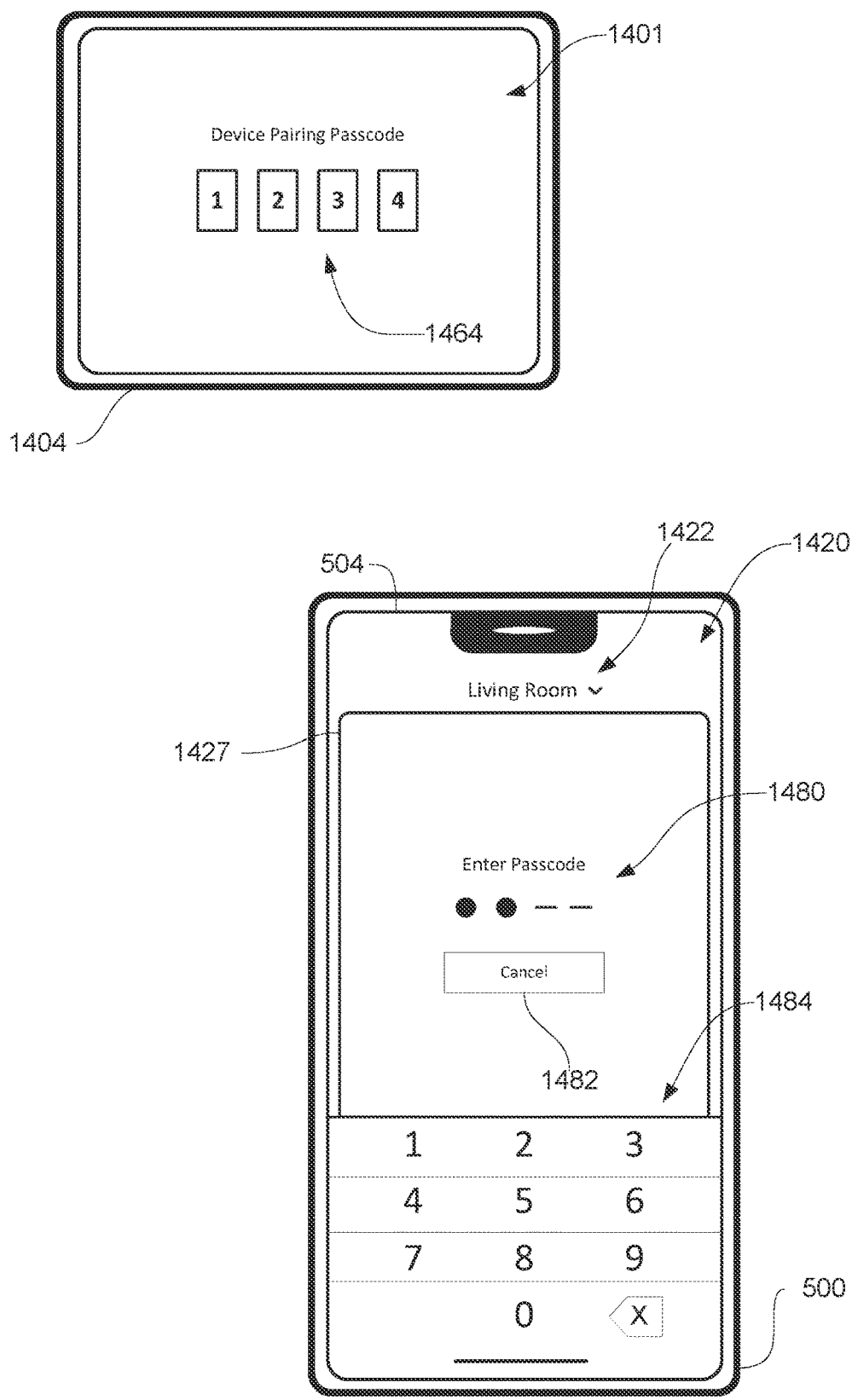
Figure 15A:
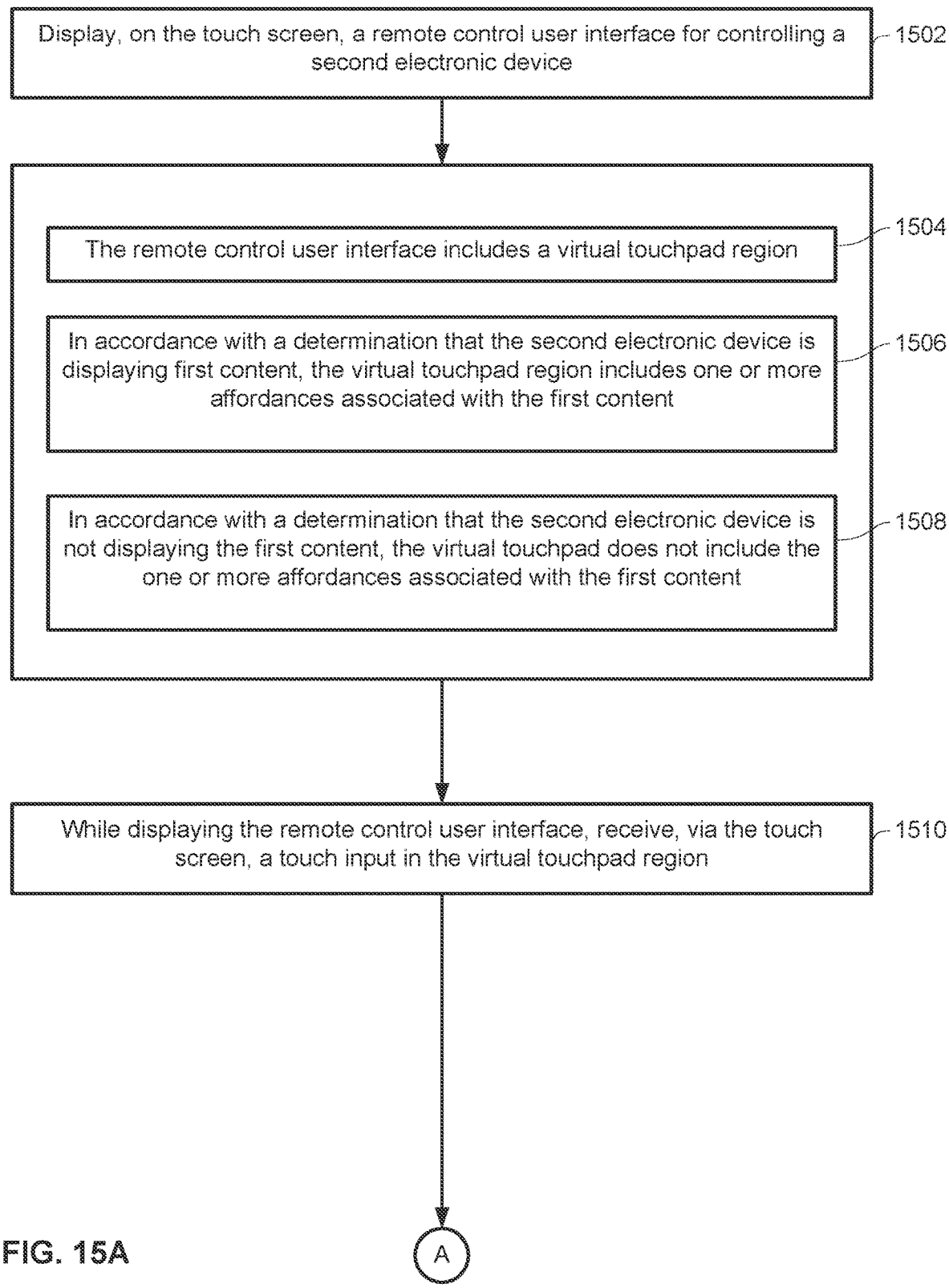
FIGS. 15A-15F are flow diagrams illustrating a method of presenting selectable options to control another electronic device in accordance with some embodiments.
Figure 15B:
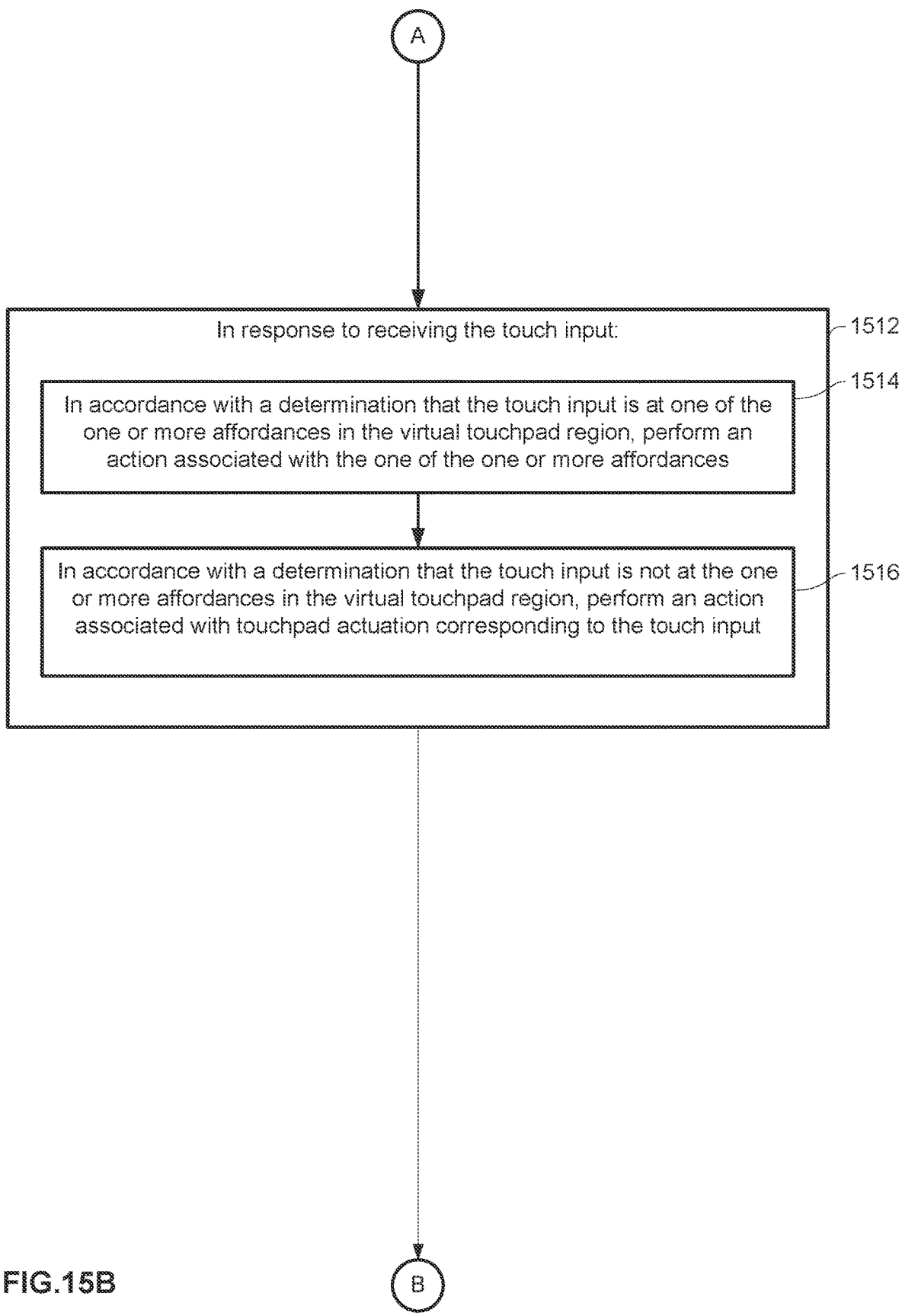
Figure 15C:
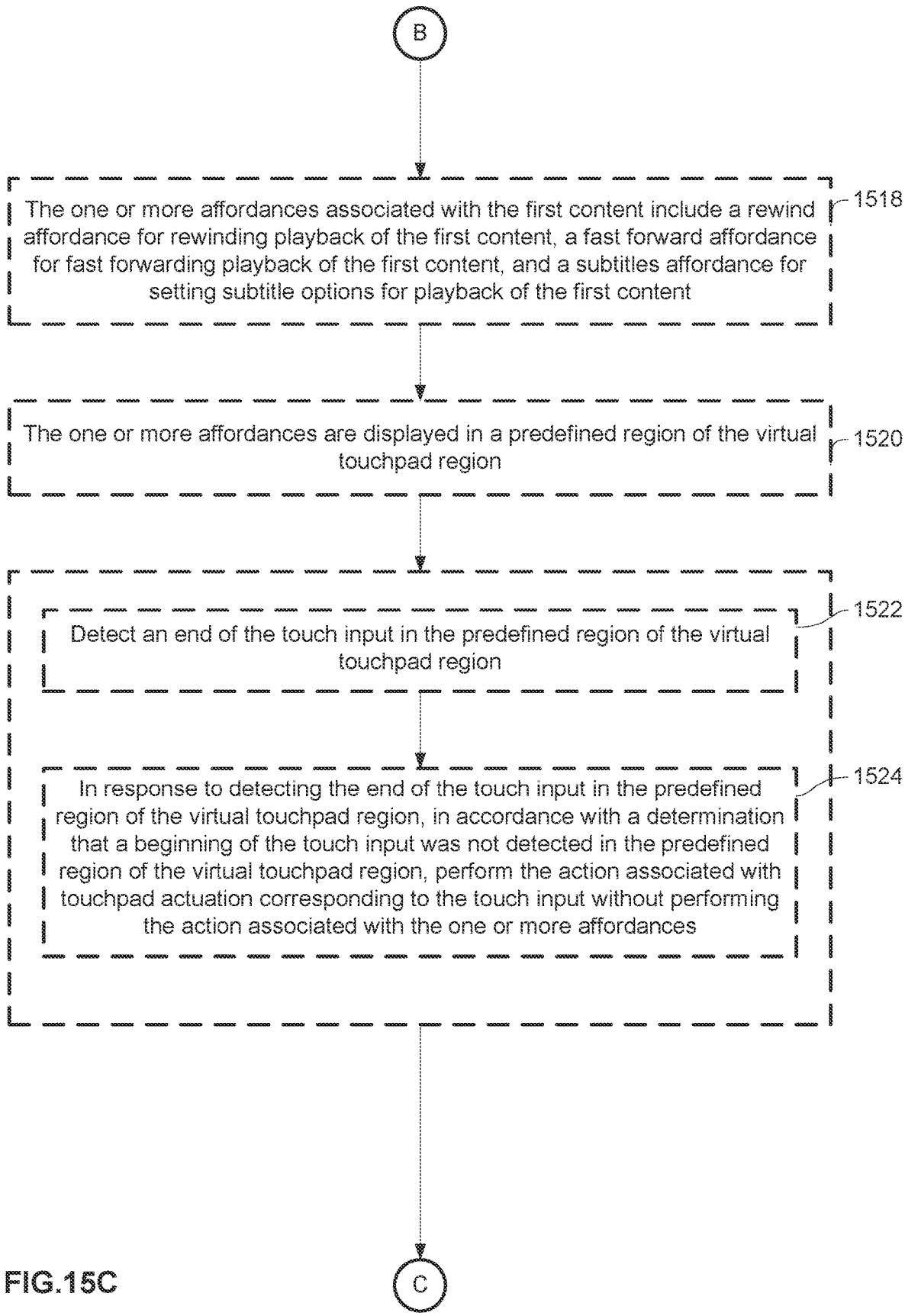
Figure 15D:
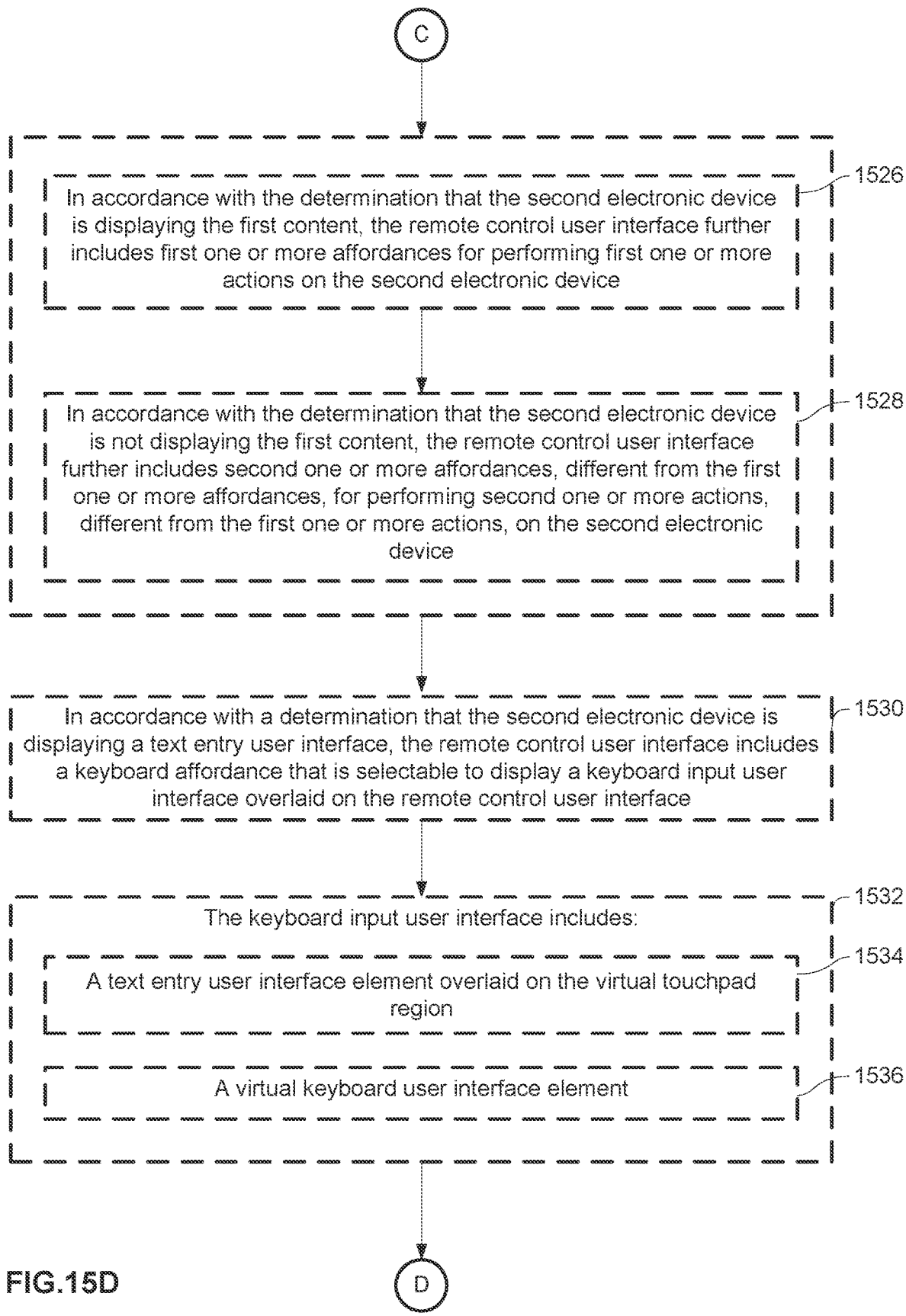
Figure 15E:
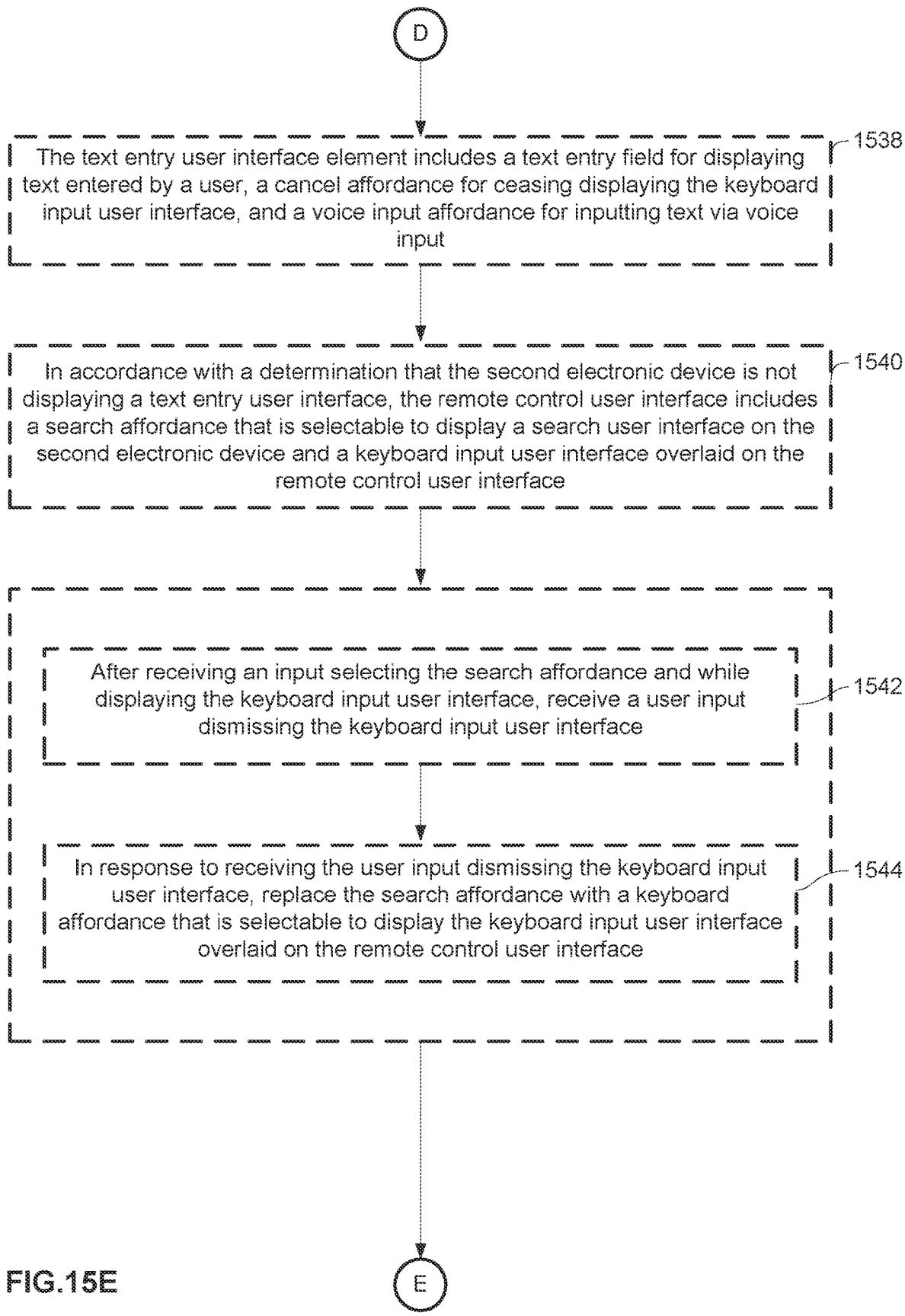
Figure 15F:

FIGS. 14A-14Q illustrate exemplary ways in which an electronic device presents selectable options to control another electronic device. The embodiments in these figures are used to illustrate the processes described below, including the processes described with reference to FIGS. 15A-15F.

FIG. 14A illustrates an exemplary device 500 that includes touch screen 504. In some embodiments, the electronic device 500 is in communication with other electronic devices, such as electronic device 1404. In some embodiments, electronic device 1404 is similar to and/or has the features of electronic device 1204. In some embodiments, electronic device 500 is in communication with multiple electronic devices including multiple display devices (e.g., smart televisions) and/or multiple speakers. In some embodiments, electronic device 1404 comprises a set-top box in communication with a display (e.g., such as device 580). The communication link between the electronic device 500 and the other electronic devices allows the electronic device 500 to remotely control one or more of the electronic devices, as will be described herein. In some embodiments, the communication link additionally or alternatively allows electronic device 500 to stream content to the respective electronic device as was described above with respect to FIG. 8A. For case of description, the below description will begin by assuming that electronic device 500 is in communication with electronic device 1404, unless otherwise stated.

In some embodiments, electronic device 500 displays a remote control user interface 1420 on touch screen 504. In some embodiments, remote control user interface is similar to and/or shares the features of remote control user interface 1220. In some embodiments, the remote control user interface 1420 includes a virtual touch pad region 1427 and a control options region 1428. In some embodiments, remote control user interface includes a device selection user interface 1421.

In some embodiments, the virtual touch pad region 1427 is a rectangular region on the remote control user interface 1420 in which user inputs on the touch screen 504 are acceptable to send or transmit the user input to electronic device 1404 (e.g., the electronic device being controlled by the remote control user interface). In some embodiments, the virtual touch pad region 1427 simulates a physical touch pad on a physical remote control device (e.g., remote 590) or other type of device for controlling the second electronic device. For example, a tap input in the virtual touch pad region 1427 can cause a transmission of a tap command to electronic device 1404. In some embodiments, a swipe gesture can cause a transmission of a swipe command to electronic device 1404. In some embodiments, instead of transmitting the raw touch input data (e.g., tap or swipe), electronic device 500 interprets the user input, translates the user input into commands (e.g., navigation commands, selection commands, etc.), and transmits the translated commands to electronic device 1404. For example, a tap input in the virtual touch pad region 1427 is optionally interpreted by electronic device 500 as a selection input and a selection command is optionally transmitted to electronic device 1404. In some embodiments, the virtual touch pad region 1427 supports multiple different types of inputs and gestures.

In some embodiments, the control options region 1428 includes one or more selectable options (e.g., affordances and/or virtual buttons) for performing (or otherwise causing) actions on electronic device 1404. In some embodiments, the functions that are performed by the buttons in the control options region 1428 are functions that are better suited to a shortcut button rather than with a virtual touchpad (e.g., menu buttons, search buttons, etc.). In some embodiments, the functions performed by the options in the control options region 1428 are the most commonly used functions. In some embodiments, control options region 1428 includes five selectable control options 1429-1, 1429-2, 1429-3, 1429-4, and 1429-5. In some embodiments, control option 1429-1 is selectable to display a menu on electronic device 1404, control option 1429-2 is selectable to display a unified media browsing application (e.g., if one exists on the controlled device), control option 1429-3 is selectable to initiate a voice assistant (similar to the voice assistant described with respect to FIG. 8N-8O), control option 1429-4 is selectable to pause or play the playback of content currently displayed on electronic device 1404, and control option 1429-5 is selectable to cause a search functionality on the controlled device. In some embodiments, control option 1429-1 alternatively causes display of a previously displayed user interface, a previously displayed content item, or a previous menu option (e.g., performing a "back" functionality). In some embodiments, control option 1429-1 performs either a "menu" action or a "back" function based on the context of second electronic device. In some embodiments, the selectable options displayed in the control options region 1428 mimic the physical buttons available on a physical remote control device for the second electronic device (e.g., remote 590)

In FIG. 14B, electronic device 1404 is displaying a content item (e.g., "Content Item A") on a content item user interface 1407. In some embodiments, when electronic device 1404 is displaying a content item, virtual touchpad region 1427 displays one or more playback controls that correspond to functions that are performable on device 1404 while content of the type of "Content Item A" is playing on device 1404. In some embodiments, the one or more playback controls provide the user with shortcuts to control the playback of the content item that is being displayed on electronic device 1404. In some embodiments, the playback controls are the most commonly used functions for controlling the playback of content on electronic device 1404. In some embodiments, the one or more playback controls include rewind playback control 1430-1, fast-forward playback control 1430-2 and subtitles playback control 1430-3. In some embodiments, when electronic device 1404 is not displaying a content item, virtual touchpad region 1427 does not display the one or more playback controls, or displays a different set of playback controls than those described above. In some embodiments, the content items that cause display of the playback controls include playing shows and movies or playing music, or any other suitable audio, visual, or audiovisual (e.g., multimedia) content.

As shown in FIG. 14C, electronic device 500 receives a user input 1403 selecting rewind playback control 1430-1. In some embodiments, in response to receiving the user input 1403 on rewind playback control 1430-1, electronic device 1404 causes a rewind of the playback of the content item on electronic device 1404. In some embodiments, rewind playback control 1430-1 causes a 15 second rewind of the content item. In some embodiments, other rewind amounts are possible such as 10 seconds or 30 seconds, etc. In FIG. 14D, electronic device 500 receives a user input 1403 on fast-forward playback control 1430-2. In some embodiments, in response to receiving the user input 1403 on fast-forward playback control 1430-2, electronic device 1404 causes a fast-forward of the playback of the content item on electronic device 1404. In some embodiments, fast-forward playback control 1430-2 causes a 30 second fast-forward of the content item. In some embodiments, other fast-forward amounts are possible such as 10 seconds or 15 seconds, etc. In some embodiments, in response to receiving a user input on subtitles playback control 1430-3 causes display of a language and subtitles menu on electronic device 500, similar to the language and subtitles menu described with respect to FIG. 8G.

In FIG. 14E, electronic device 500 receives an initial touch-down of contact 1403 in virtual touchpad region 1427. In some embodiments, while continuing contact with display 504, contact 1403 moves downwards in a downward swipe motion, as shown in FIG. 14F. In some embodiments, contact 1403 swipes into the location of subtitles playback control 1430-3 and then lifts-off touch screen 504. In some embodiments, instead of actuating subtitles playback control 1430-3, electronic device 500 interprets the user input as a downward swipe gesture. In other words, when a contact begins outside of the location of the playback controls and subsequently enters into the location or passes through the location of the playback controls, the swipe input will still be interpreted as a swipe input on the virtual touchpad rather than a selection of the respective playback control. As shown in FIG. 14F, a downward swipe command is sent to electronic device 1404, causing display of contextual menu 1408 associated with the content item being displayed. In some embodiments, only user inputs that directly select the playback controls (e.g., a tap input that begin and end at the location of the respective playback control) are interpreted as a selection of the playback control. In some embodiments, if a user input swipes into the location of a playback control and maintains contact with the playback control for a threshold amount of time, electronic device 500 optionally interprets the user input as a selection of the respective playback control and transmit the respective playback command to electronic device 1404.

In FIG. 14G, electronic device 1404 displays a text entry user interface 1409 including a text entry field 1460. In some embodiments, when electronic device 1404 displays a text entry user interface 1409, selectable option 1429-5 changes from a search functionality and displaying a search icon to displaying a keyboard icon and a keyboard functionality. Thus, in some embodiments, any of the selectable options can be updated or otherwise modified to display a different icon and/or perform a different function when selected based on the content that is displayed on the electronic device being controlled by remote control user interface 1420. In some embodiments, a user input 1403 is received on selectable option 1429-5, as shown in FIG. 14H. In response to receiving a user input 1403 on selectable option 1429-5, electronic device 500 displays a text entry user interface 1450, as shown in FIG. 14I. In some embodiments, text entry user interface 1450 is a dialog box that includes a text entry field 1452, a cancel button 1454 for dismissing the text entry user interface 1450 and a voice input button 1456 for initiating text input via voice entry. In some embodiments, in response to receiving the user input 1403 on selectable option 1429-5, electronic device 500 displays a virtual keyboard interface 1458, as shown in FIG. 14I. In some embodiments, virtual keyboard interface 1458 is a default system keyboard for device 500. In some embodiments, virtual keyboard interface 1458 is a keyboard specific to electronic device 1404.

In FIG. 14J, a tap user input 1403 is received on the virtual keyboard user interface 1458 on the letter "A". In some embodiments, in response to receiving the tap user input 1403 on the letter "A", text entry field 1452 updates to display the letter "A" corresponding to the user input. In some embodiments, a text entry command for the letter "A" is sent to electronic device 1404 and text entry field 1460 updates to display the letter "A" corresponding to the user input. Thus, as shown in FIG. 14J, a user input on the virtual keyboard user interface 1458 selecting text causes respective text to simultaneously appear on text input user interface 1450 on electronic device 500 and text input user interface 1409 on electronic device 1404. It is understood that deleting text (e.g., by selecting the backspace option on the virtual keyboard or selecting the "x" affordance on the text input user interface 1450) optionally also causes a simultaneous deletion of text on the text entry field 1460 on electronic device 1404. In some embodiments, when a user enters text into text entry field 1460 using another remote control method (e.g., via a physical remote or another electronic device similar to electronic device 500 that is simultaneously in communication with electronic device 1404), the entered text also simultaneously appears in text entry field 1452 on electronic device 500.

In FIG. 14K, a tap input 1403 is received on cancel button 1454. In some embodiments, in response to receiving the tap input 1403 on cancel button 1454, text input user interface 1450 is dismissed and/or virtual keyboard 1458 is dismissed, as shown in FIG. 14L. In some embodiments, after dismissing the text input user interface 1450 and virtual keyboard 1458, electronic device 1404 maintains display of text entry field 1460. In some embodiments, text entry field 1460 continues to display the text that was previously inputted by the user on text input user interface 1450 (e.g., "A" in FIG. 14L). In some embodiments, dismissing the text input user interface 1450 causes previously entered text to be removed from text entry field 1460 on electronic device 1404. In some embodiments, after dismissing the text input user interface 1450, selectable option 1429-5 continues displaying a keyboard icon and selection of selectable option 1429-5 continues to perform keyboard functionality (e.g., because a text entry is still requested on electronic device 1404).

In FIG. 14M, electronic device 1404 is displaying a content item (e.g., "Content Item A") on a content item user interface 1407. In some embodiments, when electronic device 1404 is displaying a content item, virtual touchpad region 1427 on electronic device 500 displays one or more playback controls, as described above. As described above, in some embodiments, control options region 1428 includes five selectable control options 1429-1, 1429-2, 1429-3, 1429-4, and 1429-5. In some embodiments, control option 1429-5 displays a search icon and is selectable to cause a search functionality on electronic device 1404. In some embodiments, as shown in FIG. 14M, a tap input 1403 is received on touch screen 504 selecting control option 1429-5 while control option 1429-5 is displaying a search icon and is selectable to cause a search functionality (e.g., as opposed to displaying a keyboard icon and is selectable to cause display of a text entry user interface as described above with respect to FIGS. 14H-14K). In some embodiments, as shown in FIG. 14N, in response to receiving the tap input 1403 selecting control option 1429-5, a search command is transmitted to electronic device 1404 and a search function is performed on electronic device 1404. In some embodiments, in response to receiving the search command, electronic device 1404 displays a search user interface 1405 in virtual touchpad region 1427.

In some embodiments, the search user interface 1405 is a system user interface of electronic device 1404. In some embodiments, the search user interface 1405 is an application user interface of an application installed on electronic device 1404. In some embodiments, the search user interface 1405 is a user interface of a unified media browsing application installed on electronic device 1404 and receiving the search command causes electronic device 1404 to launch the unified media browsing application and navigate to the search functionality of the unified media browsing application. In some embodiments, the unified media browsing application provides a centralized location for browsing, searching, viewing, or otherwise accessing content on electronic device 1404. The unified media browsing application optionally receives content viewing information from multiple content providers and/or applications for viewing content from those content providers that are installed on electronic device 1404 (e.g., the content providers that have enabled sharing of content viewing information with the unified media browsing application, such as a separate CBS application, a separate Fox application, a separate ESPN application, etc.). In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application allows the user to browse or search the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device). In some embodiments, the search user interface 1405 is a user interface of another application and receiving the search command causes electronic device 1404 to launch the other application and navigate to the search functionality of the other application.

In some embodiments, the search user interface 1405 includes a search text entry field 1462.

In some embodiments, in response to electronic device 1404 displaying the search text entry field 1462 and/or in response to the user selecting control option 1429-5, electronic device 500 displays a search text entry user interface 1470 and/or virtual keyboard 1458, as shown in FIG. 14N. In some embodiments, electronic device 500 displays the search text entry user interface 1470 after receiving an acknowledgement or confirmation that electronic device 1404 is displaying search user interface 1405. In some embodiments, electronic device 500 displays the search text entry user interface 1470 automatically after and/or simultaneously with sending the search command to electronic device 1404. In some embodiments, search text entry user interface 1470 shares the features of text entry user interface 1450, including search text entry field 1472, cancel button 1474 for dismissing the search text entry user interface 1470 and a voice input button 1476 for initiating text input via voice entry. In some embodiments, search text entry user interface 1470 includes a text label 1478 indicating that the search text entry user interface 1470 is for performing a search function on electronic device 1404 (e.g., a "Search" text label) (e.g., the "Search" label 1478 corresponds to the search user interface displayed on device 1404).

In FIG. 14O, a tap input 1403 is received on cancel button 1474. In some embodiments, in response to receiving the tap input 1403 on cancel button 1474, search text input user interface 1470 is dismissed and/or virtual keyboard 1458 is dismissed, as shown in FIG. 14P. In some embodiments, after dismissing the search text input user interface 1470 and virtual keyboard 1458, electronic device 1404 maintains display of search text entry field 1470. In some embodiments, search text entry field 1470 on electronic device 1404 continues to display the text that was previously inputted by the user on search text input user interface 1470. In some embodiments, dismissing the text input user interface 1470 causes previously entered text to be removed from search text entry field 1470 on electronic device 1404. In some embodiments, as shown in FIG. 14P, after dismissing the text input user interface 1470, selectable option 1429-5 updates or otherwise changes from displaying a search icon to displaying a keyboard icon and selection of selectable option 1429-5 is updated to perform a keyboard functionality (e.g., because a text entry is now requested on electronic device 1404 and electronic device 1404 is already in the search user interface).

FIG. 14Q illustrates an exemplary embodiment in which electronic device 1404 is displaying a passcode. In some embodiments, electronic device 1404 displays a passcode while pairing electronic device 1404 with electronic device 500 (e.g., for the purpose of streaming content from electronic device 500 to electronic device 1404 and/or controlling electronic device 1401 using electronic device 500). In some embodiments, electronic device 1404 displays a pairing passcode user interface 1401. In some embodiments, pairing passcode user interface 1401 includes a passcode field 1464 that displays the digits of the passcode needed for pairing. In some embodiments, pairing electronic device 1404 to electronic device 500 includes displaying a pairing passcode on electronic device 1404 and receiving entry of the pairing passcode on electronic device 500. In some embodiments, when the passcode entered on electronic device 500 matches the passcode displayed on electronic device 1404, the two electronic devices verify the pairing and pairing is successful. In some embodiments, because electronic device 1404 is displaying the passcode for pairing, electronic device 1404 does not expect to receive user inputs from the user. Instead, electronic device 500 receives the user input and communicates with electronic device 1404 to verify the entered passcode.

In such embodiments, in response to displaying the pairing passcode user interface 1401 and/or in response to receiving a user input selecting selectable option 1429-5 when it is displaying a keyboard icon or when selectable option 1429-5 is displaying a numeric keypad icon, electronic device 500 displays a passcode entry user interface in the virtual touchpad region 1427. In some embodiments, the passcode entry user interface includes a passcode entry field 1480. In some embodiments, passcode entry field 1480 consists of a plurality of dashed lines representing the number of digits in the passcode. In some embodiments, as the user selects numbers on the numeric keypad and enters digits of the passcode, the dashed lines are replaced with solid dots or stars. In some embodiments, in addition to displaying the passcode entry field 1480, a virtual numeric keypad 1484 is displayed. In some embodiments, user input selecting a number from virtual numeric keypad 1484 causes entry of a number that is displayed in the passcode entry field 1480. In some embodiments, passcode entry user interface includes a cancel affordance 1482 for dismissing the passcode entry user interface. In some embodiments, receiving a user input on the cancel affordance 1482 cancels the passcode entry process (e.g., the device pairing process) and sends a cancellation command toe electronic device 1404. In some embodiments, receiving a user input on the cancel affordance 1482 only causes dismissal of the passcode entry user interface and/or the virtual numeric keypad 1482 and electronic device 500 returns to displaying a remote control user interface 1420 without the passcode entry user interface or virtual numeric keypad. In some embodiments, the resulting remote control user interface 1420 can include a control option 1429-5, which is updated to display (or continues to display) a keyboard icon or a numeric keypad icon, selection of which causes re-displaying of the passcode entry user interface and/or the virtual numeric keypad.

In some embodiments, electronic device 1404 displays another passcode entry user interface. For example, a user may desire to set access restrictions on electronic device 1404, such as parental controls or content restrictions. In some embodiments, the process of setting restrictions on electronic device 1404 includes requesting the user to enter a passcode or pin that can be used to unlock, change, or otherwise modify the restrictions on electronic device 1404. In some embodiments, electronic device 1404 expects user input to provide numeric digits for setting the passcode or pin (e.g., as opposed to merely displaying a passcode in the case of device pairing process described above). In such embodiments, in response to displaying a passcode entry user interface and/or in response to receiving a user input selecting selectable option 1429-5 when it is displaying a keyboard icon or when selectable option 1429-5 is displaying a numeric keypad icon, electronic device 500 displays a passcode entry user interface in the virtual touchpad region 1427, which optionally has the features described above with reference to FIG. 14Q. Additionally or alternatively to as described above, in some embodiments, entry of a number on the virtual numeric keypad 1484 transmits the number to electronic device 1404. In some embodiments, transmission of the number to electronic device 1404 causes a simultaneous display of the entered number on electronic device 1404. In some embodiments, the number displayed on electronic device 1404 can be a solid dot or stars similar to the solid dot or starts shown in FIG. 14Q. In some embodiments, the number displayed on electronic device 1404 is not hidden and the actual number is shown. Thus a user input on the virtual numeric keypad 1484 selecting numbers causes a respective number to simultaneously appear on passcode entry field 1480 on electronic device 500 and a passcode entry field on electronic device 1404. It is understood that deleting numbers (e.g., by selecting the backspace option on the virtual numeric keypad) optionally also causes a simultaneous deletion of text on the passcode entry field on electronic device 1404. In some embodiments, when a user enters numbers into the passcode entry field of electronic device 1404 using another remote control method (e.g., via a physical remote or another electronic device similar to electronic device 500 that is simultaneously in communication with electronic device 1404), the entered number also simultaneously appears in passcode entry field 1480 on electronic device 500.

In some embodiments, passcode entry user interface includes a cancel affordance 1482 for dismissing the passcode entry user interface. In some embodiments, receiving a user input on the cancel affordance 1482 cancels the passcode entry process (e.g., the device pairing process) and sends a cancellation command toe electronic device 1404. In some embodiments, receiving a user input on the cancel affordance 1482 only causes dismissal of the passcode entry user interface and/or the virtual numeric keypad 1482 and electronic device 500 returns to displaying a remote control user interface 1420. In some embodiments, the resulting remote control user interface 1420 can include a control option 1429-5, which is updated to display (or continues to display) a keyboard icon or a numeric keypad icon, selection of which causes re-displaying of the passcode entry user interface and/or the virtual numeric keypad.

FIGS. 15A-15F are flow diagrams illustrating a method 1500 of presenting a user interface for controlling electronic devices that automatically provides different context-specific selectable options based on the content being displayed on the electronic device being controlled by the user interface. The method 1500 is optionally performed at an electronic device such as device 100, device 300, device 500, device 501, device 510, and device 591 as described above with reference to FIGS. 1A-1B, 2-3, 4A-4B and 5A-5J. Some operations in method 1500 are, optionally combined and/or order of some operations is, optionally, changed As described below, the method 1500 provides ways to present a user interface for controlling electronic devices that automatically provides different context-specific selectable options based on the content being displayed on the electronic device being controlled by the user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device (e.g., electronic device, a smartphone, a tablet computer, a wearable device, etc. such as device 100, device 300, device 500, device 501, or device 591) in communication with a touch screen (e.g., a touch screen, such as touch screen 112, included in or in communication with the first electronic device) displays (1502), on the touch screen, a remote control user interface (e.g., a user interface that simulates a remote control device such as remote 590) for controlling a second electronic device (e.g., a set top box, a smart television, etc. such as device 580), such as in FIG. 14A.

In some embodiments, the remote control user interface includes a virtual touchpad region (1504) (e.g., a region on the remote control user interface that simulates a physical touchpad), such as in FIG. 14A. In some embodiments, a user optionally performs touch interactions on the virtual touchpad region such as swipes and/or taps to cause a respective response on the second electronic device. For example, a swipe on the virtual touchpad is optionally interpreted as a navigational input and a respective navigational signal is optionally sent to the second electronic device (e.g., an upward swipe is optionally interpreted as an upward navigation, etc.). In some embodiments, a tap on the virtual touchpad in sub-regions of the virtual touchpad is optionally interpreted as a navigational input and a respective navigational signal is optionally sent to the second electronic device (e.g., a tap at the top, left, right, or bottom regions of the virtual touchpad region is optionally interpreted as a up, left, right, or down navigation, respectively and a tap at the center region is optionally interpreted as a selection input).

In some embodiments, in accordance with a determination that the second electronic device is displaying first content (e.g., a movie, a television show, audio content, video content, etc.), the virtual touchpad region includes one or more affordances associated with the first content (1506), such as in FIG. 14B. For example, one or more buttons is optionally displayed in the virtual touchpad region. In some embodiments, the one or more buttons provide control of the content that is displayed on the second electronic device, thus increasing the functionality supported by the virtual touchpad region. In some embodiments, the one or more buttons are playback controls for the first content. For example, the buttons optionally include a rewind button (e.g., 10 second rewind, 15 second rewind, etc.), a fast-forward button (e.g., 10 second fast forward, 20 second fast forward, 30 second fast forward, etc.), and a subtitles options button (e.g., to display a subtitles selection user interface, such as a dialog box, for selecting different language options and/or subtitles/captions options supported by and associated with the first content being displayed on the second electronic device).

In some embodiments, in accordance with a determination that the second electronic device is not displaying the first content, the virtual touchpad does not include the one or more affordances associated with the first content (1508), such as in FIG. 14A. In some embodiments, the virtual touchpad region does not display the buttons that are displayed when the second electronic device is displaying the first content. In some embodiments, the virtual touchpad region displays a set of buttons different from the set of buttons that are displayed when the second electronic device is displaying the first content. In some embodiments, no additional buttons are displayed in the virtual touchpad region.

In some embodiments, while displaying the remote control user interface, the first electronic device receives (1510), via the touch screen, a touch input in the virtual touchpad region (e.g., a tap, swipe, or other gesture in the virtual touchpad region).

In some embodiments, in response to receiving the touch input (1512), such as in FIG. 14C: in accordance with a determination that the touch input is at one of the one or more affordances in the virtual touchpad region, the first electronic device performs (1514) an action associated with the one of the one or more affordances (e.g., receiving a user input selecting one of the affordances and sending (or otherwise transmitting) a command or signal or otherwise causing an action on the second electronic device related to the one or more affordances that was selected by the user input (e.g., via WiFi, WiFi Direct, Bluetooth, NFC, infrared, RF, or any other wireless communication protocol)), such as in FIG. 14C. For example, if the user input is a tap input at a button associated with a 10-second rewind functionality, then send a command or signal or otherwise cause the second electronic device to rewind the currently-displayed content by 10 seconds. In some embodiments, if the user input is a tap at a button associated with the subtitles option, the first electronic device optionally displays a subtitles selection user interface, such as a dialog box, for selecting different language options and/or subtitles/captions options supported by and associated with the first content being displayed on the second electronic device. In some embodiments, the first electronic device queries the second electronic device for compatible options to display in the subtitles selection user interface.

In some embodiments, in accordance with a determination that the touch input is not at the one or more affordances in the virtual touchpad region, the first electronic device performs (1516) an action associated with touchpad actuation corresponding to the touch input (e.g., receiving a user input in a location on the virtual touchpad region that is not associated with the one or more affordances and performing a virtual touchpad action in response to the user input), such as in FIGS. 14E-14F. For example, a swipe on the virtual touchpad is optionally interpreted as a navigational input and a respective navigational command is optionally sent to the second electronic device (e.g., an upward swipe is optionally interpreted as an upward navigation, etc.). In some embodiments, a tap on the virtual touchpad in sub-regions of the virtual touchpad, outside of the buttons, is optionally interpreted as a navigational input and a respective navigational signal is optionally sent to the second electronic device (e.g., a tap at the top, left, right, or bottom regions of the virtual touchpad region is optionally interpreted as a up, left, right, or down navigation, respectively and a tap at the center region is optionally interpreted as a selection input).

The above-described manner of controlling a second electronic device using a first electronic device based on the content displayed on the second electronic device (e.g., by displaying one or more buttons in the virtual touchpad region if the second electronic device is displaying a first content and not displaying the buttons if the second electronic device is not displaying the first content) allows the first electronic device to provide the user with context-specific controls for the second electronic devices (e.g., using a single user interface on the first electronic device that provides different remote control functions to the user based on what is being displayed on the second electronic device, without requiring the user to navigate to a separate user interface to access different types of functions that are relevant to the content being displayed by the second electronic device), which simplifies the interaction between the user and the first and second electronic devices and enhances the operability of the first and second electronic devices and makes the user-device interface more efficient (e.g., by providing the user with a single user interface that provides additional remote control functions to the user when appropriate), which additionally reduces power usage and improves battery life of the first and second electronic devices by enabling the user to use the first and second electronic devices more quickly and efficiently.

In some embodiments, the one or more affordances associated with the first content include a rewind affordance for rewinding playback of the first content (e.g., in some embodiments, the rewind affordance causes a 10 second rewind, 15 second rewind, or 30 second rewind of the first content.), a fast forward affordance for fast forwarding playback of the first content (e.g., in some embodiments, the fast forward affordance causes a 10 second fast forward, 15 second fast forward, or 30 second fast forward of the first content.), and a subtitles affordance for setting subtitle options for playback of the first content (1518), such as in FIG. 14B. For example, in response to detecting selection of the subtitles option, the first electronic device optionally presents one or more selectable options for changing the language of the audio content of the content on the second device and/or changing the language of subtitles presented with the content on the second device, including an option to turn off the subtitles. In some embodiments, selection of the subtitles affordance causes display of a language and subtitles menu with features of the menu described in FIG. 8G.

The above-described manner of controlling a second electronic device using a first electronic device based on the content displayed on the second electronic device (e.g., by displaying a rewind button, a fast forward button, and a subtitles button in the virtual touchpad region) allows the first electronic device to provide the user with context-specific controls for the second electronic devices (e.g., using a single user interface on the first electronic device that provides different remote control functions to the user based on what is being displayed on the second electronic device, without requiring the user to navigate to a separate user interface to access different types of functions that are relevant to the content being displayed by the second electronic device), which simplifies the interaction between the user and the first and second electronic devices and enhances the operability of the first and second electronic devices and makes the user-device interface more efficient (e.g., by providing the user with a single user interface that provides additional playback control functions to the user when appropriate), which additionally reduces power usage and improves battery life of the first and second electronic devices by enabling the user to use the first and second electronic devices more quickly and efficiently.

In some embodiments, the one or more affordances are displayed in a predefined region of the virtual touchpad region (1520), such as in FIG. 14B. For example, the contextual buttons are optionally displayed on the bottom of the virtual touchpad region. In some embodiments, the contextual buttons are displayed at the top, left side, or right side of the virtual touchpad region.

The above-described manner of displaying the contextual playback buttons (e.g., by displaying the contextual playback buttons in a predefined region of the virtual touchpad) allows the first electronic device to provide the user with context-specific controls for the second electronic devices without interfering with the user's interaction of the virtual touchpad (e.g., by placing the contextual playback buttons in lesser trafficked areas of the virtual touchpad region), which simplifies the interaction between the user and the first and second electronic devices and enhances the operability of the first and second electronic devices and makes the user-device interface more efficient (e.g., by providing the user with a single user interface that provides additional playback control functions to the user when appropriate while maximizing the area for the user to interact with the virtual touchpad region), which additionally reduces power usage and improves battery life of the first and second electronic devices by enabling the user to use the first and second electronic devices more quickly and efficiently while reducing errors in usage of the devices.

In some embodiments, the first electronic device detects (1522) an end of the touch input in the predefined region of the virtual touchpad region (e.g., the end of a swipe or other gesture input), such as in FIG. 14F. In some embodiments, in response to detecting the end of the touch input in the predefined region of the virtual touchpad region, in accordance with a determination that a beginning of the touch input was not detected in the predefined region of the virtual touchpad region, the first electronic device performs (1524) the action associated with touchpad actuation corresponding to the touch input without performing the action associated with the one or more affordances, such as in FIG. 14F. For example, if the beginning of the swipe or other gesture input began in a location outside of the contextual buttons, then the input is optionally interpreted according to the swipe or other gesture input regardless of whether the swipe or other gesture input encroaches on or passes through or across any of the contextual buttons. In such cases, the system does not interpret the input as an actuation of the contextual buttons and does not perform the action associated with the contextual buttons. In some embodiments, if the swipe or other gesture input ends at a contextual button and remains there for a threshold amount of time, the first electronic device optionally determines that the user intends to actuate the respective contextual button and cancels or otherwise ignores the swipe or other gesture input and performs the action associated with the respective contextual button.

The above-described manner of interpreting a user's touch input (e.g., by interpreting an input gesture as a input gesture rather than an actuation of a contextual playback button if the gesture began in an area on the virtual touchpad other than where the contextual playback buttons reside) allows the first electronic device to provide the user with gesture inputs for the second electronic devices without the contextual playback buttons interfering with the user's interaction of the virtual touchpad (e.g., by interpreting a gesture as an intended gesture even if the gesture moves into or across the contextual playback buttons), which simplifies the interaction between the user and the first and second electronic devices and enhances the operability of the first and second electronic devices and makes the user-device interface more efficient (e.g., by providing the user with a single user interface that provides additional playback control functions to the user only when the user's actions indicate an intention to trigger the additional playback controls), which additionally reduces power usage and improves battery life of the first and second electronic devices by enabling the user to use the first and second electronic devices more quickly and efficiently.

In some embodiments, in accordance with the determination that the second electronic device is displaying the first content, the remote control user interface further includes first one or more affordances for performing first one or more actions on the second electronic device (1526), such as in FIG. 14G. In some embodiments, based on the content being displayed on the second electronic device, the remote control user interface includes different buttons for controlling the content on the second electronic device. In some examples, if the content on the second electronic device is a text entry interface, then the remote control user interface includes a button to display a keyboard and text entry interface on the first electronic device. In some embodiments, if the content on the second electronic device is a pin entry user interface, then the remote control user interface includes a button to display a numeric keypad and pin entry interface on the first electronic device.

In some embodiments, in accordance with the determination that the second electronic device is not displaying the first content, the remote control user interface further includes second one or more affordances, different from the first one or more affordances, for performing second one or more actions, different from the first one or more actions, on the second electronic device (1528), such as in FIG. 14B. In some embodiments, if the content on the second electronic device is not a text entry interface, then the remote control user interface does not include a button to display a keyboard and text entry interface on the first electronic device. In some embodiments, the respective button is, instead, selectable to initiate a search on the second electronic device.

The above-described manner of providing context specific buttons (e.g., by providing a set of buttons if the second electronic device is displaying a first content and displaying a different set of buttons if the second electronic device is not displaying the first content) allows the first electronic device to provide the user with context-specific functionalities when appropriate (e.g., by providing only buttons that are supported by the content being displayed on the second electronic device), which simplifies the interaction between the user and the first and second electronic devices, maximizes the limited screen space, and enhances the operability of the first and second electronic devices and makes the user-device interface more efficient (e.g., by providing context-specific functions on a single user interface and not displaying any functions that are less commonly used or not relevant to the content being displayed on the second electronic device without requiring the user to navigate to a different user interface to perform the same functions based on the content being displayed on the second electronic device), which additionally reduces power usage and improves battery life of the first and second electronic devices by enabling the user to use the first and second electronic devices more quickly and efficiently.

In some embodiments, in accordance with a determination that the second electronic device is displaying a text entry user interface, the remote control user interface includes a keyboard affordance that is selectable to display a keyboard input user interface overlaid on the remote control user interface (1530), such as in FIG. 14G. In some embodiments, the remote control user interface includes a button that changes based on the content displayed on the second electronic device. In some embodiments, if the content is a text entry user interface, the button is reconfigured to display a keyboard icon and becomes selectable to display a keyboard input user interface. In some embodiments, instead of a single button that changes functionality, the remote control user interface replaces a button in the remote control user interface (that is selectable to perform a function other than display a keyboard input user interface) with another button that is selectable to display a keyboard input user interface. In some embodiments, in accordance with a determination that the second electronic device is not displaying a text entry user interface, the remote control user interface does not include the keyboard affordance.

The above-described manner of providing context specific buttons (e.g., by providing a keyboard button if the second electronic device is displaying a text entry user interface) allows the first electronic device to provide the user with text entry functionalities when the second electronic device calls for it (e.g., by automatically providing the user with the ability to use a keyboard to enter text on the second electronic device when the second electronic device expects text input from the user), which simplifies the interaction between the user and the first and second electronic devices, maximizes the limited screen space, and enhances the operability of the first and second electronic devices and makes the user-device interface more efficient (e.g., by automatically providing an option to display a keyboard when the second electronic device expects text entry and not displaying functions that are not relevant to text entry without requiring the user to navigate to a different user interface or use a dedicated electronic device (e.g., a remote) to enter text on the second electronic device), which additionally reduces power usage and improves battery life of the first and second electronic devices by enabling the user to use the first and second electronic devices more quickly and efficiently.

In some embodiments, the keyboard input user interface includes (1532): a text entry user interface element overlaid on the virtual touchpad region (1534), such as in FIG. 14I. In some embodiments, the first electronic device displays a text entry user interface, such as a text entry field. In some embodiments, the text entry user interface element mimics the user interface that is displayed on the second electronic device.

In some embodiments, the keyboard input user interface includes a virtual keyboard user interface element (1536), such as in FIG. 14I. In some embodiments, the first electronic device displays a virtual keyboard beneath the text entry user interface element. In some embodiments, the virtual keyboard is the default keyboard on the first electronic device. In some embodiments, the virtual keyboard is optionally a keyboard customized for the second electronic device.

The above-described manner of displaying a keyboard input user interface (e.g., by displaying a text entry user interface and a virtual keyboard) allows the first electronic device to provide the user with text entry functionalities using a virtual keyboard as well as visual feedback of the text being entered by the user (e.g., by displaying a virtual keyboard and a text entry user interface in the same user interface), which simplifies the interaction between the user and the first and second electronic devices and enhances the operability of the first and second electronic devices and makes the user-device interface more efficient (e.g., by displaying a virtual keyboard and a text entry user interface in the same user interface without requiring the user to look at the second electronic device to verify the text that is being entered by the user and allowing the user to immediately return to remote controlling the device without any further user inputs to navigate to another user interface), which additionally reduces power usage and improves battery life of the first and second electronic devices by enabling the user to use the first and second electronic devices more quickly and efficiently while reducing errors in usage of the devices.

In some embodiments, the text entry user interface element includes a text entry field for displaying text entered by a user (e.g., a text entry field in which the text entered by the user is displayed), a cancel affordance for ceasing displaying the keyboard input user interface (e.g., a cancel button which when selected, causes the dismissal of the keyboard input user interface), and a voice input affordance for inputting text via voice input (1538), such as in FIG. 14I. In some embodiments, selecting the cancel button causes the second electronic device to also dismiss the text entry user interface. In some embodiments, selecting the cancel button does not dismiss the text entry user interface on the second electronic device. In some embodiments, selecting the cancel button does not delete or remove text that has already been entered by the user. In some embodiments, selecting the voice input affordance prompts the user to input text by speaking into a microphone. In some embodiments, the microphone is embedded into the first electronic device. In some embodiments, the microphone is embedded in the second electronic device. In some embodiments, an external microphone is optionally in communication with the first or second electronic device and receives the voice input from the user.

The above-described manner of displaying a keyboard input user interface (e.g., by displaying a text entry field, a cancel button, and a voice input button) allows the first electronic device to provide the user with different text entry functions (e.g., by allowing the user to dismiss the text entry interface or use voice input to enter text), which simplifies the interaction between the user and the first and second electronic devices and enhances the operability of the first and second electronic devices and makes the user-device interface more efficient (e.g., providing the user with the option to use voice input and view the results of entering text in a text entry field and the option to cancel text entry without requiring the user to navigate to a separate user interface to perform the same functions), which additionally reduces power usage and improves battery life of the first and second electronic devices by enabling the user to use the first and second electronic devices more quickly and efficiently.

In some embodiments, in accordance with a determination that the second electronic device is not displaying a text entry user interface, the remote control user interface includes a search affordance that is selectable to display a search user interface on the second electronic device and a keyboard input user interface overlaid on the remote control user interface (1540), such as in FIG. 14M.

For example, the search affordance is optionally the same button as the keyboard affordance that is reconfigured to display a different icon and/or perform a different function or action. In some embodiments, selection of the search button causes the second electronic device to initiate a search and display a search user interface. In some embodiments, the search user interface is a system user interface. In some embodiments, the search user interface is a user interface of an application (e.g., not a system user interface). In some embodiments, selecting the search affordance initiates display of a unified media browsing application and displays a search user interface of the unified media browsing application. In some embodiments, the unified media browsing application provides a centralized location for browsing, searching, viewing, or otherwise accessing content on the second electronic device. The unified media browsing application optionally receives content viewing information from multiple content providers and/or applications for viewing content from those content providers that are installed on the second electronic device (e.g., the content providers that have enabled sharing of content viewing information with the unified media browsing application, such as a separate CBS application, a separate Fox application, a separate ESPN application, etc.). In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application allows the user to browse or search the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device). In some embodiments, the search user interface includes a text entry user interface. In some embodiments, when the search user interface includes a text entry user interface, the first electronic device automatically displays a keyboard input user interface (e.g., including a virtual keyboard element). In some embodiments, in accordance with a determination that the second electronic device is not displaying a text entry user interface, the remote control user interface does not include the keyboard affordance.

The above-described manner of providing context specific functions (e.g., by providing a search button if the second electronic device is not displaying a text entry user interface and automatically displaying a keyboard input user interface) allows the first electronic device to provide the user with functionalities when the commands sent to the second electronic device necessitate the use of a text entry interface (e.g., by automatically displaying a keyboard input user interface after receiving a command to initiate a search on the second electronic device), which simplifies the interaction between the user and the first and second electronic devices and enhances the operability of the first and second electronic devices and makes the user-device interface more efficient (e.g., by automatically displaying a keyboard input user interface without requiring the user to navigate to a different user interface to perform a search function and enter text into a search user interface on the second electronic device without requiring separate user inputs to initiate the search interface and to display the virtual keyboard), which additionally reduces power usage and improves battery life of the first and second electronic devices by enabling the user to use the first and second electronic devices more quickly and efficiently.

In some embodiments, after receiving an input selecting the search affordance and while displaying the keyboard input user interface, the first electronic device receives (1542) a user input dismissing the keyboard input user interface (e.g., receiving a tap input on a cancel button or otherwise dismissing the keyboard input user interface), such as in FIG. 14O.

In some embodiments, in response to receiving the user input dismissing the keyboard input user interface, the first electronic device replaces (1544) the search affordance with a keyboard affordance that is selectable to display the keyboard input user interface overlaid on the remote control user interface, such as in FIG. 14P. In some embodiments, because the second electronic device is still displaying a text entry user interface, the remote control user interface includes a keyboard affordance. In some embodiments, the search affordance that was on the remote control user interface before the display of the keyboard input user interface is replaced with the keyboard affordance. In some embodiments, the keyboard affordance is the same button as the search affordance that has been reconfigured to display a keyboard icon and is selectable to cause display of a keyboard input user interface.

The above-described manner of providing context specific buttons (e.g., by providing a keyboard button if the second electronic device is displaying a text entry user interface, even after receiving a user input dismissing the keyboard input user interface) allows the first electronic device to provide the user with text entry functionalities when the second electronic device calls for it (e.g., by providing the user with the option to re-display the keyboard entry user interface when the second electronic device continues to expect text entry from the user), which simplifies the interaction between the user and the first and second electronic devices and enhances the operability of the first and second electronic devices and makes the user-device interface more efficient (e.g., by automatically updating the search affordance with a keyboard affordance to allow the user to display the keyboard input user interface and provide text entry to the second electronic device without requiring the user to navigate to a different user interface or use a dedicated electronic device (e.g., a remote) to enter text on the second electronic device), which additionally reduces power usage and improves battery life of the first and second electronic devices by enabling the user to use the first and second electronic devices more quickly and efficiently.

In some embodiments, in accordance with a determination that the second electronic device is displaying a passcode entry user interface, the remote control user interface includes a passcode entry field overlaid on the virtual touchpad region and a virtual numeric keypad user interface (1546), such as in FIG. 14Q. In some embodiments, selection of the keyboard button displays a passcode entry user interface and a numeric keyboard user interface. In some embodiments, the second electronic device is displaying a passcode for pairing the second electronic device with the first electronic device. In such embodiments, the second electronic device does not expect to receive user input (e.g., the second electronic device is merely displaying a passcode for purposes of verifying and pairing with the second electronic device by providing the respective passcode to the first electronic device) and thus user entries on the numeric keypad are displayed on the passcode entry user interface of the first electronic device but are not transmitted to the second electronic device. In some embodiments, the second electronic device displays a passcode entry user interface (e.g., for setting a pin or passcode to set parental controls or other types of restrictions). In such embodiments, the second electronic device does expect to receive user input (e.g., the second electronic device is requesting the user to set a pin or passcode) and thus user entries on the numeric keypad are displayed on the passcode entry user interface and also transmitted to the second electronic device to be displayed on the passcode entry user interface of the second electronic device.

The above-described manner of providing context specific buttons (e.g., by providing a numeric keypad user interface and a passcode entry field if the second electronic device is displaying a passcode entry user interface) allows the first electronic device to provide the user with passcode entry functionalities when the second electronic device calls for it (e.g., by providing the user with a passcode entry specific user interface that includes a numeric keypad when the second electronic device expects passcode entry from the user), which simplifies the interaction between the user and the first and second electronic devices and enhances the operability of the first and second electronic devices and makes the user-device interface more efficient (e.g., by automatically updating the interface to display a passcode entry interface rather than displaying a virtual keyboard that is not customized for numeric entry, thus not requiring the user to navigate to a different user interface or use a dedicated electronic device (e.g., a remote) or to navigate to the numeric entry interface of the virtual keyboard to enter a passcode on the second electronic device), which additionally reduces power usage and improves battery life of the first and second electronic devices by enabling the user to use the first and second electronic devices more quickly and efficiently.

It should be understood that the particular order in which the operations in FIGS. 15A-15F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and 1300) are also applicable in an analogous manner to method 1500 described above with respect to FIGS. 15A-15F. For example, the indications of remote controlling an electronic device described above with reference to method 1500 optionally have one or more of the characteristics of the streaming mode operation and presentation of playback control options, etc., described herein with reference to other methods described herein (e.g., methods 700, 900, 1100, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 15A-15F are, optionally, implemented by components depicted in FIGS. 1A-1B. For example, displaying operations 1502 and receiving operations 1510, 1512, and 1542 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to facilitate the streaming of content from one electronic device to another. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to automatically perform operations with respect to a streaming mode (e.g., generating a prompt to select a streaming destination in response to opening a content application or automatically entering the streaming mode with a particular streaming destination in response to opening a content application). Accordingly, use of such personal information data enables users to enter fewer inputs to perform an action with respect to the streaming mode. Further, other uses for personal information data that benefit the user are also contemplated by the present disclosure. For instance, content consumption history may be used to generate suggested content for the user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to be paired to another electronic device for the purpose of content streaming if both electronic devices are connected to the same secured network (e.g., a secured Wi-Fi network). In another example, users can manage the privacy of their content consumption history.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at a first electronic device in communication with a display and one or more input devices:
receiving, via the one or more input devices, an input corresponding to a request to display a user interface for controlling content playback via the first electronic device; and
in response to receiving the input, displaying, on the display, the user interface including a first playback control element with a first selectable option for controlling content playback at a first playback destination, wherein:
in accordance with a determination that the first playback destination is configured to be controlled with a remote control device, the first playback control element further includes a second selectable option, in addition to the first selectable option, that is selectable to display, on the display, a remote control user interface, corresponding to the remote control device, for controlling the first playback destination; and
in accordance with a determination that the first playback destination is not configured to be controlled with the remote control device, the first playback control element does not include the second selectable option that is selectable to display, on the display, the remote control user interface.

2. The method of claim 1, further comprising:
receiving, via the one or more input devices, an input selecting the second selectable option in the first playback control element; and
in response to receiving the input selecting the second selectable option in the first playback control element, displaying, on the display, the remote control user interface, wherein the remote control user interface includes:
a touch input region configured to control the first playback destination in response to touch input detected in the touch input region, and
one or more controls configured to control the first playback destination in response to selection of the one or more controls.

3. The method of claim 2, further comprising:
while displaying the remote control user interface, receiving, via the one or more input devices, a respective input; and
in response to receiving the respective input,
ceasing to display the remote control user interface, and
displaying the user interface for controlling content playback via the first electronic device, wherein the first electronic device is configured to display a home screen of an operating system of the first electronic device in response to detecting the respective input when the respective input is detected while the first electronic device is displaying a user interface other than the remote control user interface.

4. The method of claim 1, wherein:
in accordance with a determination that the first playback destination provides absolute volume information to the first electronic device, the first playback control element includes an absolute volume control element for controlling a volume level at the first playback destination, wherein the absolute volume control element indicates a current volume level of the first playback destination, and
in accordance with a determination that the first playback destination does not provide absolute volume information to the first electronic device, the first playback control element includes a relative volume control element for controlling the volume level at the first playback destination, wherein the relative volume control element does not indicate the current volume level of the first playback destination.

5. The method of claim 1, wherein:
in accordance with a determination that the first playback destination comprises a display device, the first playback control element includes a third selectable option that, when selected, causes the first electronic device to display, on the display, language and subtitle options for the first playback destination, and
in accordance with a determination that the first playback destination does not comprise a display device, the first playback control element does not include the third selectable option that, when selected, causes the first electronic device to display, on the display, the language and subtitle options for the first playback destination.

6. The method of claim 1, further comprising:
while displaying, on the display, the first playback control element:
while a content item is being played at the first playback destination via the first electronic device, displaying the first playback control element including one or more playback controls for controlling the first playback destination, including the second selectable option that is selectable to display, on the display, the remote control user interface;
while displaying the first playback control element with the one or more playback controls, detecting an end of playback of the content item; and in response to detecting the end of the playback of the content item, replacing the one or more playback controls in the first playback control element with one or more representations of recommended content items.

7. The method of claim 1, wherein:
the first playback control element has an expanded state and a collapsed state, in the expanded state, the first playback control element includes the second selectable option that is selectable to display the remote control user interface independent of whether a content item is being played at the first playback destination, and
in the collapsed state:
in accordance with a determination that a content item is being played at the first playback destination, the first playback control element does not include the second selectable option that is selectable to display the remote control user interface, and
in accordance with a determination that a content item is not being played at the first playback destination, the first playback control element does include the second selectable option that is selectable to display the remote control user interface.

8. The method of claim 1, wherein the first playback destination is currently playing a content item, and the first playback control element includes the second selectable option that is selectable to display the remote control user interface, and a third selectable option that is selectable to display, on the display, language and subtitle options corresponding to the currently-playing content item for the first playback destination.

9. The method of claim 1, wherein the user interface including the first playback control element is a wake screen user interface of the first electronic device.

10. The method of claim 1, wherein the user interface including the first playback control element is a voice input user interface of the first electronic device, and wherein the first playback control element is displayed by the first electronic device in the voice input user interface in response to a voice input provided to the voice input user interface.

11. The method of claim 1, wherein the user interface including the first playback control element is displayed in response to detection of selection of a streaming mode status indicator displayed on the display, the streaming mode status indicator indicating that the first electronic device is operating in a streaming mode in which the first electronic device is configured to stream content from the first electronic device to a second electronic device.

12. The method of claim 1, wherein the user interface including the first playback control element is displayed in response to detection of selection of a representation of the first playback destination in a smart home application on the first electronic device, the smart home application configured to control operation of one or more electronic devices, including the first playback destination, in a home associated with a user of the first electronic device.

13. The method of claim 1, wherein the user interface including the first playback control element is displayed in response to detection of selection of a respective playback control element for controlling playback of a content item via the first electronic device, the respective playback control element displayed in a control user interface for controlling a plurality of functionalities, other than content playback, of the first electronic device.

14. A first electronic device, comprising:
one or more processors; and
memory storing one or more programs that include instructions that are configured to be executed by the one or more processors, wherein the first electronic device is in communication with a display and one or more input devices, and wherein the instructions, when executed, cause the first electronic device to perform a method including:
receiving, via the one or more input devices, an input corresponding to a request to display a user interface for controlling content playback via the first electronic device; and
in response to receiving the input, displaying, on the display, the user interface including a first playback control element with a first selectable option for controlling content playback at a first playback destination, wherein:
in accordance with a determination that the first playback destination is configured to be controlled with a remote control device, the first playback control element further includes a second selectable option, in addition to the first selectable option, that is selectable to display, on the display, a remote control user interface, corresponding to the remote control device, for controlling the first playback destination; and
in accordance with a determination that the first playback destination is not configured to be controlled with the remote control device, the first playback control element does not include the second selectable option that is selectable to display, on the display, the remote control user interface.

15. The first electronic device of claim 14, the method further comprising:
receiving, via the one or more input devices, an input selecting the second selectable option in the first playback control element; and
in response to receiving the input selecting the second selectable option in the first playback control element, displaying, on the display, the remote control user interface, wherein the remote control user interface includes:
a touch input region configured to control the first playback destination in response to touch input detected in the touch input region, and
one or more controls configured to control the first playback destination in response to selection of the one or more controls.

16. The first electronic device of claim 15, the method further comprising:
while displaying the remote control user interface, receiving, via the one or more input devices, a respective input; and
in response to receiving the respective input,
ceasing to display the remote control user interface, and
displaying the user interface for controlling content playback via the first electronic device, wherein the first electronic device is configured to display a home screen of an operating system of the first electronic device in response to detecting the respective input when the respective input is detected while the first electronic device is displaying a user interface other than the remote control user interface.

17. The first electronic device of claim 14, wherein:
in accordance with a determination that the first playback destination provides absolute volume information to the first electronic device, the first playback control element includes an absolute volume control element for controlling a volume level at the first playback destination, wherein the absolute volume control element indicates a current volume level of the first playback destination, and in accordance with a determination that the first playback destination does not provide absolute volume information to the first electronic device, the first playback control element includes a relative volume control element for controlling the volume level at the first playback destination, wherein the relative volume control element does not indicate the current volume level of the first playback destination.

18. The first electronic device of claim 14, wherein:

in accordance with a determination that the first playback destination comprises a display device, the first playback control element includes a third selectable option that, when selected, causes the first electronic device to display, on the display, language and subtitle options for the first playback destination, and in accordance with a determination that the first playback destination does not comprise a display device, the first playback control element does not include the third selectable option that, when selected, causes the first electronic device to display, on the display, the language and subtitle options for the first playback destination.

19. The first electronic device of claim 14, the method further comprising:

while displaying, on the display, the first playback control element:

while a content item is being played at the first playback destination via the first electronic device, displaying the first playback control element including one or more playback controls for controlling the first playback destination, including the second selectable option that is selectable to display, on the display, the remote control user interface;

while displaying the first playback control element with the one or more playback controls, detecting an end of playback of the content item; and in response to detecting the end of the playback of the content item, replacing the one or more playback controls in the first playback control element with one or more representations of recommended content items.

20. The first electronic device of claim 14, wherein:

the first playback control element has an expanded state and a collapsed state, in the expanded state, the first playback control element includes the second selectable option that is selectable to display the remote control user interface independent of whether a content item is being played at the first playback destination, and in the collapsed state:

in accordance with a determination that a content item is being played at the first playback destination, the first playback control element does not include the second selectable option that is selectable to display the remote control user interface, and in accordance with a determination that a content item is not being played at the first playback destination, the first playback control element does include the second selectable option that is selectable to display the remote control user interface.

21. The first electronic device of claim 14, wherein the first playback destination is currently playing a content item, and the first playback control element includes the second selectable option that is selectable to display the remote control user interface, and a third selectable option that is selectable to display, on the display, language and subtitle options corresponding to the currently-playing content item for the first playback destination.

22. The first electronic device of claim 14, wherein the user interface including the first playback control element is a wake screen user interface of the first electronic device.

23. The first electronic device of claim 14, wherein the user interface including the first playback control element is a voice input user interface of the first electronic device, and wherein the first playback control element is displayed by the first electronic device in the voice input user interface in response to a voice input provided to the voice input user interface.

24. The first electronic device of claim 14, wherein the user interface including the first playback control element is displayed in response to detection of selection of a streaming mode status indicator displayed on the display, the streaming mode status indicator indicating that the first electronic device is operating in a streaming mode in which the first electronic device is configured to stream content from the first electronic device to a second electronic device.

25. The first electronic device of claim 14, wherein the user interface including the first playback control element is displayed in response to detection of selection of a representation of the first playback destination in a smart home application on the first electronic device, the smart home application configured to control operation of one or more electronic devices, including the first playback destination, in a home associated with a user of the first electronic device.

26. The first electronic device of claim 14, wherein the user interface including the first playback control element is displayed in response to detection of selection of a respective playback control element for controlling playback of a content item via the first electronic device, the respective playback control element displayed in a control user interface for controlling a plurality of functionalities, other than content playback, of the first electronic device.

27. A non-transitory computer readable storage medium storing one or more programs, the one or more programs comprising instructions, which when executed by one or more processors of a first electronic device that is in communication with a display and one or more input devices, cause the first electronic device to perform a method including:

receiving, via the one or more input devices, an input corresponding to a request to display a user interface for controlling content playback via the first electronic device; and in response to receiving the input, displaying, on the display, the user interface including a first playback control element with a first selectable option for controlling content playback at a first playback destination, wherein:

in accordance with a determination that the first playback destination is configured to be controlled with a remote control device, the first playback control element further includes a second selectable option, in addition to the first selectable option, that is selectable to display, on the display, a remote control user interface, corresponding to the remote control device, for controlling the first playback destination; and in accordance with a determination that the first playback destination is not configured to be controlled with the remote control device, the first playback control element does not include the second selectable option that is selectable to display, on the display, the remote control user interface.

28. The non-transitory computer readable storage medium of claim 27, the method further comprising:

receiving, via the one or more input devices, an input selecting the second selectable option in the first playback control element; and in response to receiving the input selecting the second selectable option in the first playback control element, displaying, on the display, the remote control user interface, wherein the remote control user interface includes:

a touch input region configured to control the first playback destination in response to touch input detected in the touch input region, and one or more controls configured to control the first playback destination in response to selection of the one or more controls.

29. The non-transitory computer readable storage medium of claim 28, the method further comprising:

while displaying the remote control user interface, receiving, via the one or more input devices, a respective input; and in response to receiving the respective input, ceasing to display the remote control user interface, and displaying the user interface for controlling content playback via the first electronic device, wherein the first electronic device is configured to display a home screen of an operating system of the first electronic device in response to detecting the respective input when the respective input is detected while the first electronic device is displaying a user interface other than the remote control user interface.

30. The non-transitory computer readable storage medium of claim 27, wherein:

in accordance with a determination that the first playback destination provides absolute volume information to the first electronic device, the first playback control element includes an absolute volume control element for controlling a volume level at the first playback destination, wherein the absolute volume control element indicates a current volume level of the first playback destination, and in accordance with a determination that the first playback destination does not provide absolute volume information to the first electronic device, the first playback control element includes a relative volume control element for controlling the volume level at the first playback destination, wherein the relative volume control element does not indicate the current volume level of the first playback destination.

31. The non-transitory computer readable storage medium of claim 27, wherein:

in accordance with a determination that the first playback destination comprises a display device, the first playback control element includes a third selectable option that, when selected, causes the first electronic device to display, on the display, language and subtitle options for the first playback destination, and in accordance with a determination that the first playback destination does not comprise a display device, the first playback control element does not include the third selectable option that, when selected, causes the first electronic device to display, on the display, the language and subtitle options for the first playback destination.

32. The non-transitory computer readable storage medium of claim 27, the method further comprising:

while displaying, on the display, the first playback control element:

while a content item is being played at the first playback destination via the first electronic device, displaying the first playback control element including one or more playback controls for controlling the first playback destination, including the second selectable option that is selectable to display, on the display, the remote control user interface;

while displaying the first playback control element with the one or more playback controls, detecting an end of playback of the content item; and in response to detecting the end of the playback of the content item, replacing the one or more playback controls in the first playback control element with one or more representations of recommended content items.

33. The non-transitory computer readable storage medium of claim 27, wherein:

the first playback control element has an expanded state and a collapsed state, in the expanded state, the first playback control element includes the second selectable option that is selectable to display the remote control user interface independent of whether a content item is being played at the first playback destination, and in the collapsed state:

in accordance with a determination that a content item is being played at the first playback destination, the first playback control element does not include the second selectable option that is selectable to display the remote control user interface, and in accordance with a determination that a content item is not being played at the first playback destination, the first playback control element does include the second selectable option that is selectable to display the remote control user interface.

34. The non-transitory computer readable storage medium of claim 27, wherein the first playback destination is currently playing a content item, and the first playback control element includes the second selectable option that is selectable to display the remote control user interface, and a third selectable option that is selectable to display, on the display, language and subtitle options corresponding to the currently-playing content item for the first playback destination.

35. The non-transitory computer readable storage medium of claim 27, wherein the user interface including the first playback control element is a wake screen user interface of the first electronic device.

36. The non-transitory computer readable storage medium of claim 27, wherein the user interface including the first playback control element is a voice input user interface of the first electronic device, and wherein the first playback control element is displayed by the first electronic device in the voice input user interface in response to a voice input provided to the voice input user interface.

37. The non-transitory computer readable storage medium of claim 27, wherein the user interface including the first playback control element is displayed in response to detection of selection of a streaming mode status indicator displayed on the display, the streaming mode status indicator indicating that the first electronic device is operating in a streaming mode in which the first electronic device is configured to stream content from the first electronic device to a second electronic device.

38. The non-transitory computer readable storage medium of claim 27, wherein the user interface including the first playback control element is displayed in response to detection of selection of a representation of the first playback destination in a smart home application on the first electronic device, the smart home application configured to control operation of one or more electronic devices, including the first playback destination, in a home associated with a user of the first electronic device.

39. The non-transitory computer readable storage medium of claim 27, wherein the user interface including the first playback control element is displayed in response to detection of selection of a respective playback control element for controlling playback of a content item via the first electronic device, the respective playback control element displayed in a control user interface for controlling a plurality of functionalities, other than content playback, of the first electronic device.

* * * * *